US012651152B2

(12) United States Patent
Kovshov et al.

(10) Patent No.: US 12,651,152 B2
(45) Date of Patent: Jun. 9, 2026

(54) ANALOG HARDWARE REALIZATION OF NEURAL NETWORKS USING LIBRARIES OF I/O INTERFACES AND POWER MANAGEMENT UNITS

(71) Applicant: PolyN Technology Limited, Bristol (GB)

(72) Inventors: Nikolai Vladimirovich Kovshov, Tbilisi (GE); Dmitry Yulievich Godovskiy, Bucharest (RO); Aleksandrs Timofejevs, Riga (LV); Boris Maslov, Palmetto, FL (US)

(73) Assignee: PolyN Technology Limited, Bristol (GB)

( * ) Notice: Subject to any disclaimer, the term of this patent is extended or adjusted under 35 U.S.C. 154(b) by 516 days.

(21) Appl. No.: 18/467,671

(22) Filed: Sep. 14, 2023

(65) Prior Publication Data

US 2024/0005141 A1 Jan. 4, 2024

Related U.S. Application Data

(63) Continuation of application No. PCT/RU2021/000630, filed on Dec. 30, 2021.

(51) Int. Cl.
| | |
|---|---|
| *G06N 3/065* | (2023.01) |
| *G06N 3/049* | (2023.01) |
| *G06N 3/0495* | (2023.01) |
| *G06N 3/082* | (2023.01) |

(52) U.S. Cl.
CPC .......... *G06N 3/065* (2023.01); *G06N 3/0495* (2023.01); *G06N 3/082* (2013.01)

(58) Field of Classification Search
CPC ....... G06N 3/065; G06N 3/0495; G06N 3/082
See application file for complete search history.

(56) References Cited

U.S. PATENT DOCUMENTS

| | | | |
|---|---|---|---|
| 2016/0283842 A1* | 9/2016 | Pescianschi | G06N 3/08 |
| 2017/0017879 A1* | 1/2017 | Kataeva | G06F 11/0721 |
| 2020/0110991 A1 | 4/2020 | Kataeva et al. | |
| 2020/0202206 A1* | 6/2020 | Rummens | G11C 11/54 |

OTHER PUBLICATIONS

PolyN Technology Limited, International Search Report and Written Opinion, PCT/RU2021/000630, Mar. 17, 2022, 11 pgs.

(Continued)

*Primary Examiner* — Van C Mang
(74) *Attorney, Agent, or Firm* — SankerIP

(57) ABSTRACT

Systems and methods are provided for analog hardware realization of neural networks. The method incudes obtaining a neural network topology and weights of a trained neural network. The method also includes transforming the neural network topology into an equivalent analog network of analog components. The method also includes computing a weight matrix for the equivalent analog network based on the weights of the trained neural network. Each element of the weight matrix represents a respective connection between analog components of the equivalent analog network. The method also includes generating a schematic model for implementing the equivalent analog network based on the weight matrix, including selecting component parameter values for the analog components.

20 Claims, 75 Drawing Sheets

(56) References Cited

OTHER PUBLICATIONS

PolyN Technology Limited, International Preliminary Report on Patentability, PCT/RU2021/000630, Jun. 20, 2024, 8 pgs.

Alon Ascoli et al., "Emergence of Synchronization in Bio-inspired Memristor-Coupled Oscillatory Cells", Nonlinear Theory and Its Applications, IEICE, vol. 5, No. 3, Jul. 1, 2014, 17 pgs., Retrieved from the Internet: https://www.jstage.jst.go.jp/article/nolta/5/3/5_292/_pdf/-char/ja.

PolyN Technology Limited, European Search Report, EP 21970123.2, Sep. 12, 2025, 19 pgs.

Marciej Kasperski et al., "Rational and Irrational Numbers From Unit Resistors", European Journal of Physics, Institute of Physics Publishing, Bristol, GB, vol. 35, No. 1, Nov. 13, 2013, 3 pgs., Retrieved from the Internet: https://iopscience.iop.org/article/10.1088/0143-0807/35/1/015008/meta.

Wenli Zhang et al., "ROA: A Rapid Learning Scheme for In-Situ Memristor Networks", Frontiers in Artificial Intelligence, vol. 4, Oct. 15, 2021, 11 pgs., Retrieved from the Internet: https://www.frontiersin.org/journals/artificial-intelligence/articles/10.3389/frai.2021.692065/pdf.

* cited by examiner

Analog Hardware Realization of Neural Networks 100

Trained Neural Network(s) 102 — 142 → Retrained Neural Network(s) 124

126

156

Analog Neural Network(s) 104 ← 146 — Analog Integrated Circuit Design Constraint(s) 184

144

128

Weights for Connections 106 ← 148 → Resistance Values 112

130

136 — Schematic Model(s) 108 ← 150 — Optimized Analog Neural Network(s) 114

132

Lithographic Mask(s) for Analog Neurons 120

Lithographic Mask(s) for connections 110 — 152 → Libraries of Lithographic Masks 116

134

138 → Fabricated Analog Integrated Circuit(s) 118 ← 154

140

Optimized Analog Integrated Circuit(s) for Inferencing 122

Figure 1A

**Analog Hardware
Realization of
Neural Networks
(Alternative) 100**

156

Train neural network in software,
determining weights of connections

158

Generate electronic circuit,
equivalent to neural network

160

Calculate resistor values,
corresponding to weights of each
connection

162

Generate lithography mask with
resistor values

Computing Device 200

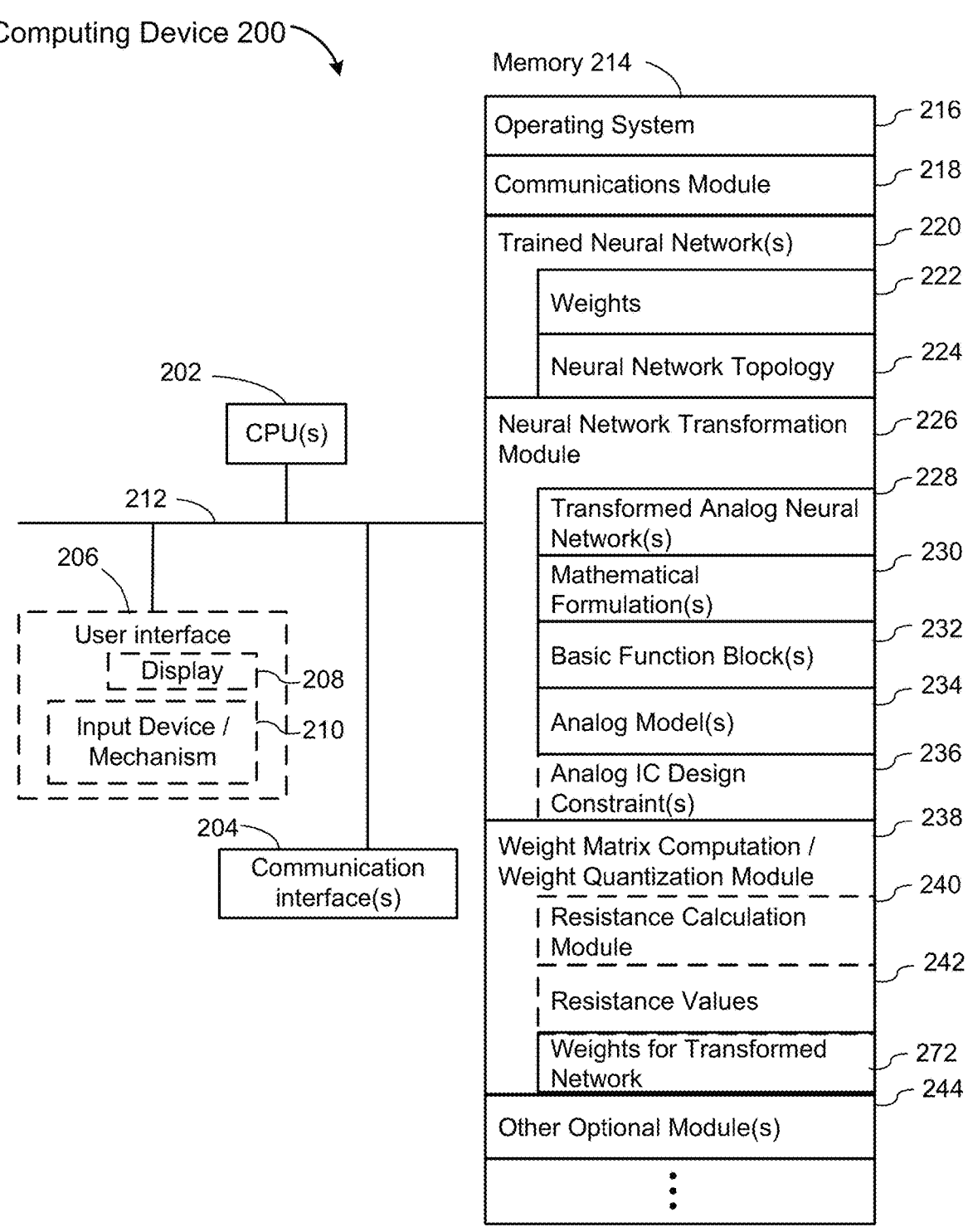

Memory 214

| Operating System | 216 |
| Communications Module | 218 |
| Trained Neural Network(s) | 220 |
| Weights | 222 |
| Neural Network Topology | 224 |
| Neural Network Transformation Module | 226 |
| Transformed Analog Neural Network(s) | 228 |
| Mathematical Formulation(s) | 230 |
| Basic Function Block(s) | 232 |
| Analog Model(s) | 234 |
| Analog IC Design Constraint(s) | 236 |
| Weight Matrix Computation / Weight Quantization Module | 238 |
| Resistance Calculation Module | 240 |
| Resistance Values | 242 |
| Weights for Transformed Network | 272 |
| Other Optional Module(s) | 244 |

202 — CPU(s)

212

206 — User interface
Display — 208
Input Device / Mechanism — 210

204 — Communication interface(s)

Figure 2A

Process for Generating Schematic Models 300

600

602

P architecture

P-NN architecture

PSNN architecture

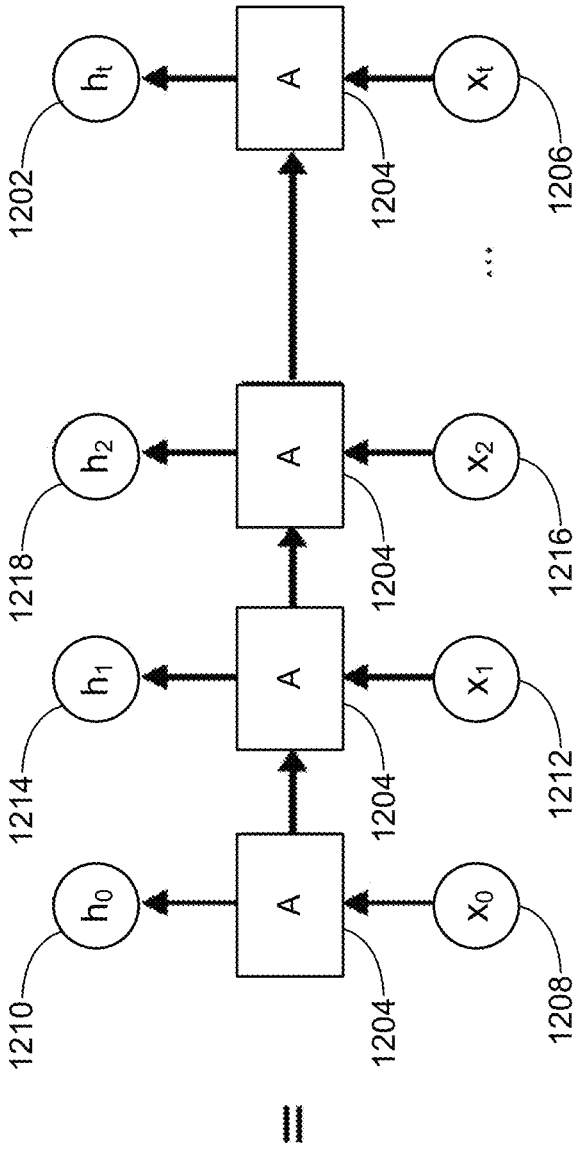
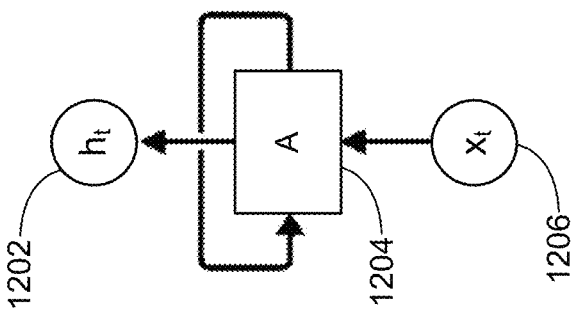
Figure 12

1710

1714

1720

1714

1948 ⬎

Description:

| N-Channel MOSFET Transistors with Explicit Substrate Connection: | | |
|---|---|---|
| The Shutter Ratio of Length (L) | The Shutter Ratio of Width (W) | Transistors |
| L = 35u | W = 175u | M1, M3 |
| L = 35u | W = 90u | M6, M11, M12 |
| L = 70u | W = 350u | M8, M10 |
| P-Channel MOSFET Transistors with Explicit Substrate Connection: | | |
| The Shutter Ratio of Length (L) | The Shutter Ratio of Width (W) | Transistors |
| L = 70u | W = 180u | M2, M4, M5 |
| L = 140u | W = 90u | M7, M9 |

Figure 20F:
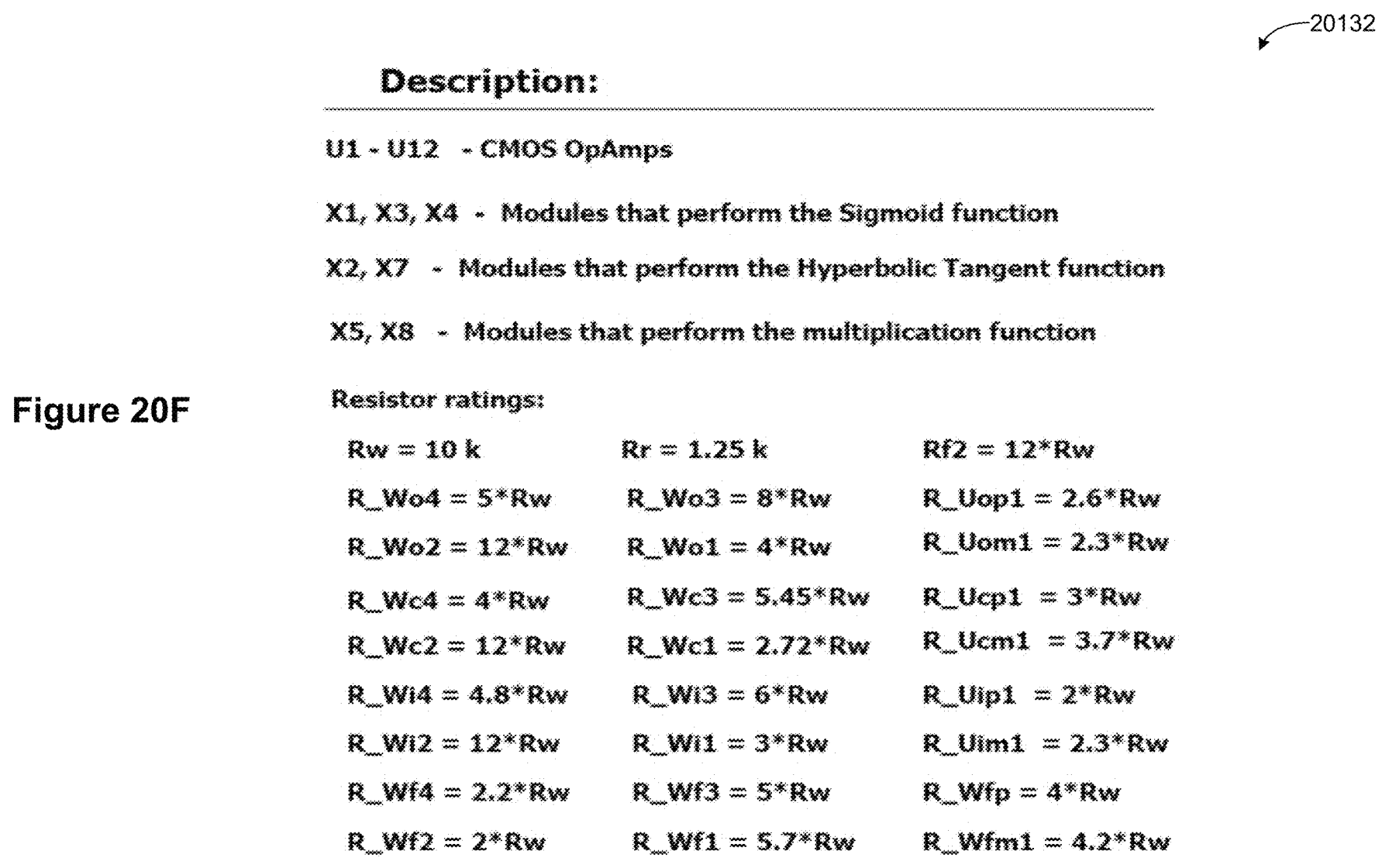

Description:

U1 - U12  - CMOS OpAmps

X1, X3, X4 -  Modules that perform the Sigmoid function

X2, X7  -  Modules that perform the Hyperbolic Tangent function

X5, X8  -  Modules that perform the multiplication function

Resistor ratings:

Rw = 10 k

Rr = 1.25 k

Rf2 = 12*Rw

R_Wo4 = 5*Rw

R_Wo3 = 8*Rw

R_Uop1 = 2.6*Rw

R_Wo2 = 12*Rw

R_Wo1 = 4*Rw

R_Uom1 = 2.3*Rw

R_Wc4 = 4*Rw

R_Wc3 = 5.45*Rw

R_Ucp1 = 3*Rw

R_Wc2 = 12*Rw

R_Wc1 = 2.72*Rw

R_Ucm1 = 3.7*Rw

R_Wi4 = 4.8*Rw

R_Wi3 = 6*Rw

R_Uip1 = 2*Rw

R_Wi2 = 12*Rw

R_Wi1 = 3*Rw

R_Uim1 = 2.3*Rw

R_Wf4 = 2.2*Rw

R_Wf3 = 5*Rw

R_Wfp = 4*Rw

R_Wf2 = 2*Rw

R_Wf1 = 5.7*Rw

R_Wfm1 = 4.2*Rw

Vss              Figure 21E   (H)

Vdd          Figure 21E   (G)

21004

37008

V_two

M19

21086

NMOS

M23

21094

PMOS

M20

21088

NMOS

21010

M21

21090 negA

NMOS

M24

21096

M22

21092

PMOS

21016

NMOS

Description:

U1 - U5   - CMOS OpAmps

| N — Chanel MOSFET transistors with explicit substrate connection: | | |
|---|---|---|
| The shutter ratio of Length ( L ) | The shutter ratio of Width ( W ) | Transistors |
| L = 2.4u | W = 1.26u | M1, M2, M25, M26 |
| L = 0.36u | W = 7.2u | M5, M6, M29, M30 |
| L = 0.36u | W =199.98u | M7, M8, M31, M32 |
| L = 0.36u | W = 0.4u | M11, M12, M13, M14, M19, M20, M21, M22, M35, M36, M37, M38, M41, M42, M43, M44 |
| L = 0.36u | W = 0.72u | M17, M47, M51, M53, M57, M59, M63, M65 |

| P — Chanel MOSFET transistors with explicit substrate connection: | | |
|---|---|---|
| The shutter ratio of Length ( L ) | The shutter ratio of Width ( W ) | Transistors |
| L = 2.4u | W = 1.26u | M3, M4, M27, M28 |
| L = 0.36u | W = 7.2u | M9, M10, M33, M34 |
| L = 0.36u | W = 0.8u | M18, M48, M49, M50, M52, M54, M55, M56, M58, M60, M61, M62, M64, M66, M67, M68 |
| L = 0.36u | W = 0.72u | M15, M16, M23, M24, M39, M40, M45, M46 |

Resistor ratings:

Ro = 1 k          Rin = 1 k          Rf = 1 k

Description: ⟋—2278

U1 - U8   - CMOS OpAmps

| N – Chanel MOSFET transistors | | |
| --- | --- | --- |
| The shutter ratio of Length ( L ) | The shutter ratio of Width ( W ) | Transistors |
| L = 0.18u | W = 0.9u | M1, M2, M3 |

Description:

| U1 - U8 - CMOS OpAmps | | |
|---|---|---|
| N-Channel MOSFET Transistors | | |
| The Shutter Ratio of Length (L) | The Shutter Ratio of Width (W) | Transistors |
| L = 0.18u | W = 0.9u | M1, M2, M3 |

2400

2402

Vdd

2404

Vss

2406

Bias

2476 →

Description:

(R p / R1+) - (Rn / R1-) = w1
(R p / R2+) - (Rn / R2-) = w2
(R p / R bias+) - (Rn / Rbias-) = w bias

| Description: | The Shutter Ratio of Length (L) | The Shutter Ratio of Width (W) | Transistors |
|---|---|---|---|
| N - Channel MOSFET Transistors with Explicit Substrate Connection: | L = 0.36u | W = 3.6u | M2, M5 |
| | L = 0.36u | W = 1.8u | M3, M6, M11, M12, M14, M16 |
| | L = 0.36u | W = 18u | M18 |
| P - Channel MOSFET Transistors with Explicit Substrate Connection: | L = 0.36u | W = 3.96u | M1, M4, M7, M8, M13, M15 |
| | L = 0.36u | W = 11.88u | M9, M10 |
| | L = 0.36u | W = 39.6u | M17 |

Description:

| | The shutter ratio of Length ( L ) | The shutter ratio of Width ( W ) | Transistors |
|---|---|---|---|
| N – Chanel MOSFET transistors with explicit substrate connection: | L = 0.36u | W = 3.6u | M2, M5, M18, M21, M34, M37 |
| | L = 0.36u | W = 1.8u | M3, M6, M11, M12, M14, M16, M19, M22, M27, M28, M32, M38, M35, M38, M43, M44, M46, M48 |
| p – Chanel MOSFET transistors with explicit substrate connection: | L = 0.36u | W = 3.96u | M1, M4, M7, M8, M13, M15, M17, M20, M23, M24, M29, M31, M33, M36, M39, M40, M45, M47 |
| | L = 0.36u | W = 11.88u | M9, M10, M25, M26, M41, M42 |

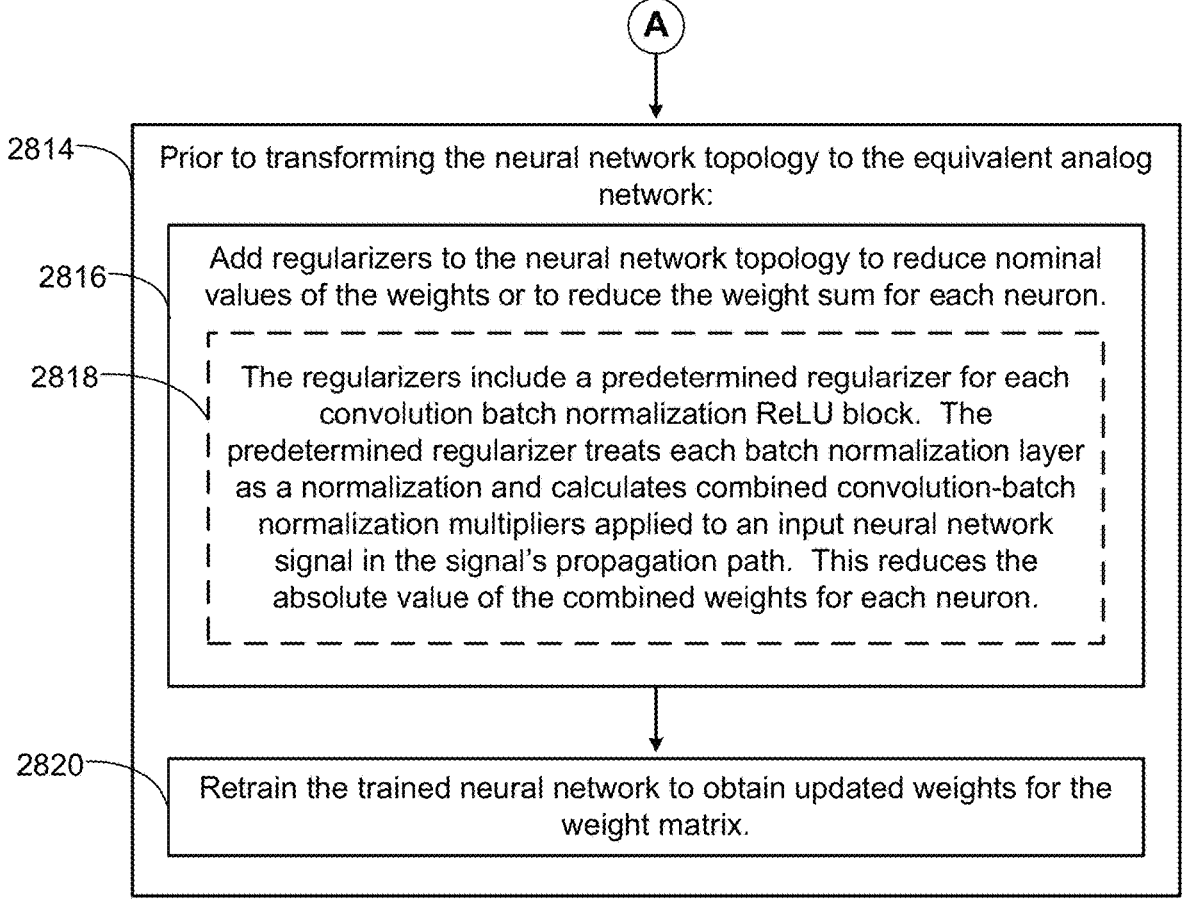

2814 — Prior to transforming the neural network topology to the equivalent analog network:

2816 — Add regularizers to the neural network topology to reduce nominal values of the weights or to reduce the weight sum for each neuron.

2818 — The regularizers include a predetermined regularizer for each convolution batch normalization ReLU block. The predetermined regularizer treats each batch normalization layer as a normalization and calculates combined convolution-batch normalization multipliers applied to an input neural network signal in the signal's propagation path. This reduces the absolute value of the combined weights for each neuron.

2820 — Retrain the trained neural network to obtain updated weights for the weight matrix.

Figure 28B

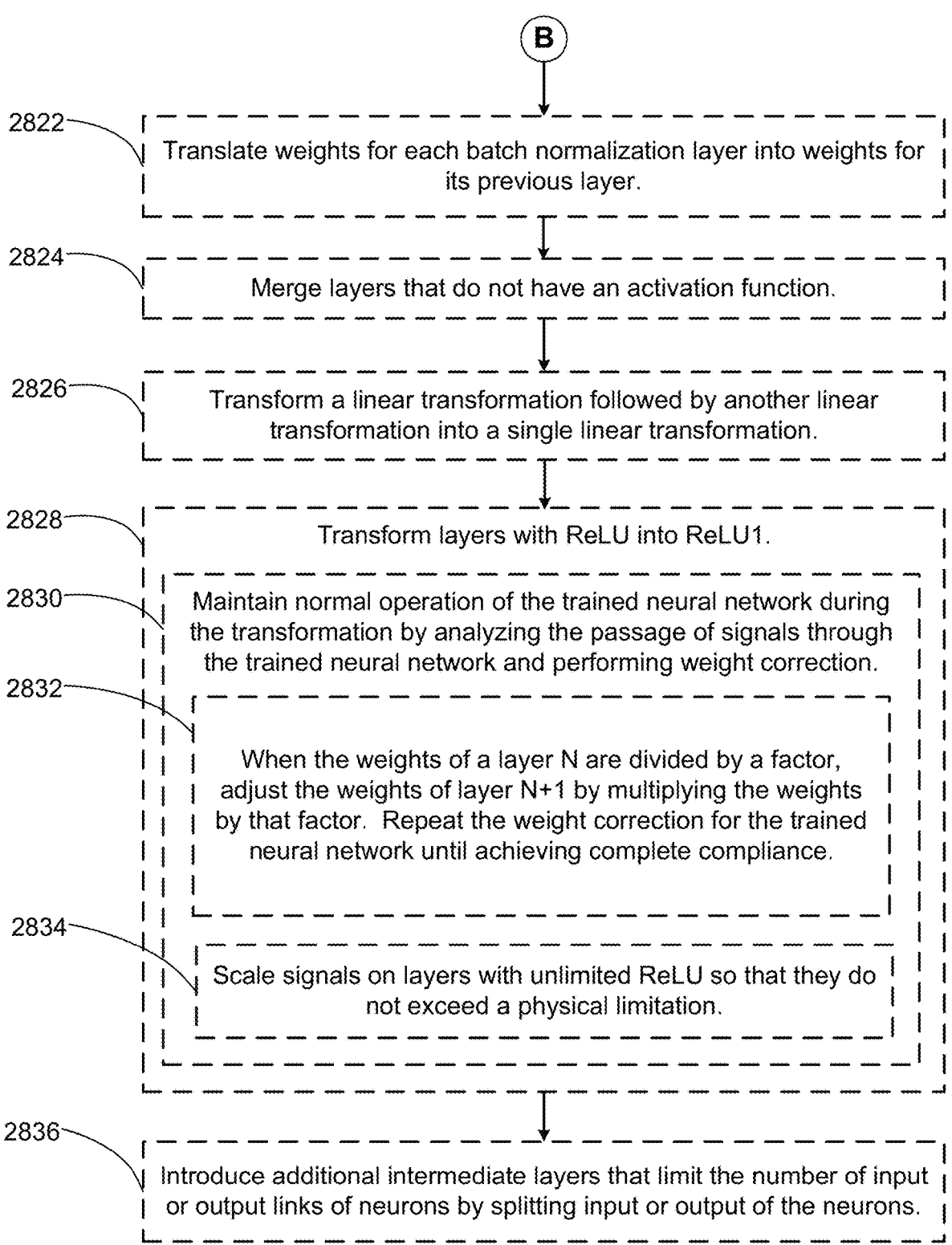

2822 — Translate weights for each batch normalization layer into weights for its previous layer.

2824 — Merge layers that do not have an activation function.

2826 — Transform a linear transformation followed by another linear transformation into a single linear transformation.

2828 — Transform layers with ReLU into ReLU1.

2830 — Maintain normal operation of the trained neural network during the transformation by analyzing the passage of signals through the trained neural network and performing weight correction.

2832 — When the weights of a layer N are divided by a factor, adjust the weights of layer N+1 by multiplying the weights by that factor. Repeat the weight correction for the trained neural network until achieving complete compliance.

2834 — Scale signals on layers with unlimited ReLU so that they do not exceed a physical limitation.

2836 — Introduce additional intermediate layers that limit the number of input or output links of neurons by splitting input or output of the neurons.

Figure 28C

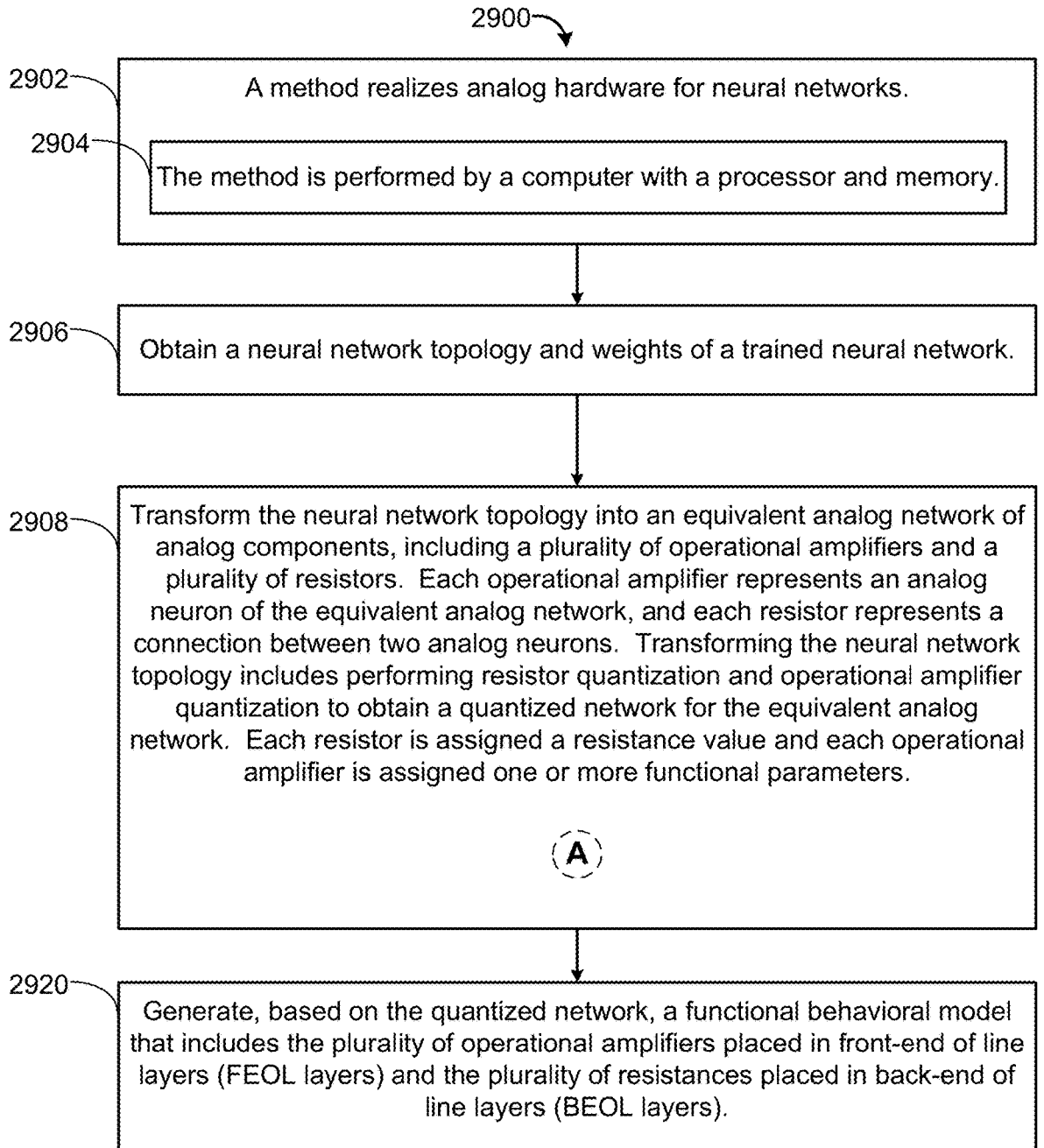

2900

2902 — A method realizes analog hardware for neural networks.

2904 — The method is performed by a computer with a processor and memory.

2906 — Obtain a neural network topology and weights of a trained neural network.

2908 — Transform the neural network topology into an equivalent analog network of analog components, including a plurality of operational amplifiers and a plurality of resistors. Each operational amplifier represents an analog neuron of the equivalent analog network, and each resistor represents a connection between two analog neurons. Transforming the neural network topology includes performing resistor quantization and operational amplifier quantization to obtain a quantized network for the equivalent analog network. Each resistor is assigned a resistance value and each operational amplifier is assigned one or more functional parameters.

(A)

2920 — Generate, based on the quantized network, a functional behavioral model that includes the plurality of operational amplifiers placed in front-end of line layers (FEOL layers) and the plurality of resistances placed in back-end of line layers (BEOL layers).

Figure 29A

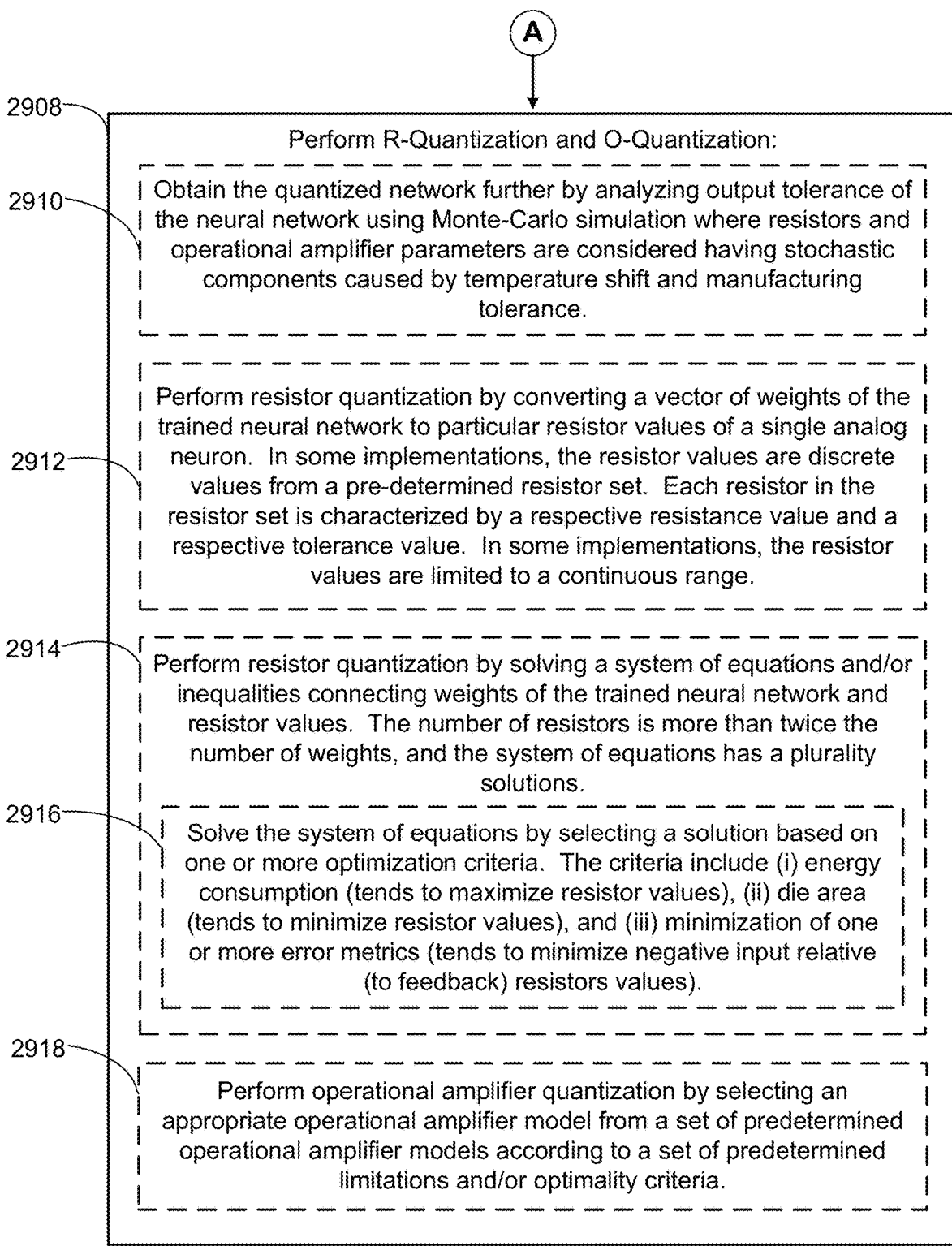

2908

Perform R-Quantization and O-Quantization:

2910 — Obtain the quantized network further by analyzing output tolerance of the neural network using Monte-Carlo simulation where resistors and operational amplifier parameters are considered having stochastic components caused by temperature shift and manufacturing tolerance.

2912 — Perform resistor quantization by converting a vector of weights of the trained neural network to particular resistor values of a single analog neuron. In some implementations, the resistor values are discrete values from a pre-determined resistor set. Each resistor in the resistor set is characterized by a respective resistance value and a respective tolerance value. In some implementations, the resistor values are limited to a continuous range.

2914 — Perform resistor quantization by solving a system of equations and/or inequalities connecting weights of the trained neural network and resistor values. The number of resistors is more than twice the number of weights, and the system of equations has a plurality solutions.

2916 — Solve the system of equations by selecting a solution based on one or more optimization criteria. The criteria include (i) energy consumption (tends to maximize resistor values), (ii) die area (tends to minimize resistor values), and (iii) minimization of one or more error metrics (tends to minimize negative input relative (to feedback) resistors values).

2918 — Perform operational amplifier quantization by selecting an appropriate operational amplifier model from a set of predetermined operational amplifier models according to a set of predetermined limitations and/or optimality criteria.

*Thin film resistors are placed here*

3002

BEOL

MEOL    3004

FEOL
3006

*Operational amplifiers are placed here*

ANALOG HARDWARE REALIZATION OF NEURAL NETWORKS USING LIBRARIES OF I/O INTERFACES AND POWER MANAGEMENT UNITS

RELATED APPLICATIONS

This application is a continuation of PCT Application PCT/RU2021/000630, filed Dec. 30, 2021, entitled "Transformations, Optimizations, and Interfaces for Analog Hardware Realization of Neural Networks," which is incorporated by reference herein in its entirety.

This application is related to U.S. application Ser. No. 17/189,109, filed Mar. 1, 2021, entitled "Analog Hardware Realization of Neural Networks," which is a continuation of PCT Application PCT/RU2020/000306, filed Jun. 25, 2020, entitled "Analog Hardware Realization of Neural Networks," each of which is incorporated by reference herein in its entirety. U.S. application Ser. No. 17/189,109 is also a continuation-in-part of PCT Application PCT/EP2020/067800, filed Jun. 25, 2020, entitled "Analog Hardware Realization of Neural Networks," which is incorporated by reference herein in its entirety.

TECHNICAL FIELD

The disclosed implementations relate generally to neural networks, and more specifically to systems and methods for hardware realization of neural networks.

BACKGROUND

Conventional hardware has failed to keep pace with innovation in neural networks and the growing popularity of machine learning based applications. Complexity of neural networks continues to outpace CPU and GPU computational power as digital microprocessor advances are plateauing. Neuromorphic processors based on spike neural networks, such as Loihi and True North, are limited in their applications. For GPU-like architectures, power and speed of such architectures are limited by data transmission speed. Data transmission can consume up to 80% of chip power, and can significantly impact speed of calculations. Edge applications demand low power consumption, but there are currently no known performant hardware implementations that consume less than 50 milliwatts of power.

Memristor-based architectures that use cross-bar technology remain impractical for manufacturing recurrent and feed-forward neural networks. For example, memristor-based cross-bars have a number of disadvantages, including high latency and leakage of currents during operation, that make them impractical. Also, there are reliability issues in manufacturing memristor-based cross-bars, especially when neural networks have both negative and positive weights. For large neural networks with many neurons, at high dimensions, memristor-based cross-bars cannot be used for simultaneous propagation of different signals, which in turn complicates summation of signals, when neurons are represented by operational amplifiers. Furthermore, memristor-based analog integrated circuits have a number of limitations, such as a small number of resistive states, first cycle problem when forming memristors, complexity with channel formation when training the memristors, unpredictable dependency on dimensions of the memristors, slow operations of memristors, and drift of state of resistance.

Additionally, the training process required for neural networks presents unique challenges for hardware realization of neural networks. A trained neural network is used for specific inferencing tasks, such as classification. Once a neural network is trained, a hardware equivalent is manufactured. When the neural network is retrained, the hardware manufacturing process is repeated, driving up costs. Although some reconfigurable hardware solutions exist, such hardware cannot be easily mass produced, and cost a lot more (e.g., cost 5 times more) than hardware that is not reconfigurable. Further, edge environments, such as smart-home applications, do not require re-programmability as such. For example, 85% of all applications of neural networks do not require any retraining during operation, so on-chip learning is not that useful. Furthermore, edge applications include noisy environments, that can cause reprogrammable hardware to become unreliable.

SUMMARY

Accordingly, there is a need for methods, circuits and/or interfaces that address at least some of the deficiencies identified above. Analog circuits that model trained neural networks and manufactured according to the techniques described herein, can provide improved performance per watt advantages, can be useful in implementing hardware solutions in edge environments, and can tackle a variety of applications, such as drone navigation and autonomous cars. The cost advantages provided by the proposed manufacturing methods and/or analog network architectures are even more pronounced with larger neural networks. Also, analog hardware implementations of neural networks provide improved parallelism and neuromorphism. Moreover, neuromorphic analog components are not sensitive to noise and temperature changes, when compared to digital counterparts.

Chips manufactured according to the techniques described herein provide order of magnitude improvements over conventional systems in size, power, and performance, and are ideal for edge environments, including for retraining purposes. Such analog neuromorphic chips can be used to implement edge computing applications or in Internet-of-Things (IoT) environments. Due to the analog hardware, initial processing (e.g., formation of descriptors for image recognition), that can consume over 80-90% of power, can be moved on chip, thereby decreasing energy consumption and network load that can open new markets for applications.

Various edge applications can benefit from use of such analog hardware. For example, for video processing, the techniques described herein can be used to include direct connection to CMOS sensor without digital interface. Various other video processing applications include road sign recognition for automobiles, camera-based true depth and/or simultaneous localization and mapping for robots, room access control without server connection, and always-on solutions for security and healthcare. Such chips can be used for data processing from radars and lidars, and for low-level data fusion. Such techniques can be used to implement battery management features for large battery packs, sound/voice processing without connection to data centers, voice recognition on mobile devices, wake up speech instructions for IoT sensors, translators that translate one language to another, large sensors arrays of IoT with low signal intensity, and/or configurable process control with hundreds of sensors.

Neuromorphic analog chips can be mass produced after standard software-based neural network simulations/training, according to some implementations. A client's neural network can be easily ported, regardless of the structure of the neural network, with customized chip design and production. Moreover, a library of ready to make on-chip solutions (network emulators) are provided, according to some implementations. Such solutions require only training, one lithographic mask change, following which chips can be mass produced. For example, during chip production, only part of the lithography masks need to be changed.

The techniques described herein can be used to design and/or manufacture an analog neuromorphic integrated circuit that is mathematically equivalent to a trained neural network (either feed-forward or recurrent neural networks). According to some implementations, the process begins with a trained neural network that is first converted into a transformed network comprised of standard elements. Operation of the transformed network are simulated using software with known models representing the standard elements. The software simulation is used to determine the individual resistance values for each of the resistors in the transformed network. Lithography masks are laid out based on the arrangement of the standard elements in the transformed network. Each of the standard elements are laid out in the masks using an existing library of circuits corresponding to the standard elements to simplify and speed up the process. In some implementations, the resistors are laid out in one or more masks separate from the masks including the other elements (e.g., operational amplifiers) in the transformed network. In this manner, if the neural network is retrained, only the masks containing the resistors, or other types of fixed-resistance elements, representing the new weights in the retrained neural network need to be regenerated, which simplifies and speeds up the process. The lithography masks are then sent to a fab for manufacturing the analog neuromorphic integrated circuit.

In one aspect, a method is provided for hardware realization of neural networks, according to some implementations. The method incudes obtaining a neural network topology and weights of a trained neural network. The method also includes transforming the neural network topology to an equivalent analog network of analog components. The method also includes computing a weight matrix for the equivalent analog network based on the weights of the trained neural network. Each element of the weight matrix represents a respective connection between analog components of the equivalent analog network. The method also includes generating a schematic model for implementing the equivalent analog network based on the weight matrix, including selecting component values for the analog components.

In some implementations, generating the schematic model includes generating a resistance matrix for the weight matrix. Each element of the resistance matrix corresponds to a respective weight of the weight matrix and represents a resistance value.

In some implementations, the method further includes obtaining new weights for the trained neural network, computing a new weight matrix for the equivalent analog network based on the new weights, and generating a new resistance matrix for the new weight matrix.

In some implementations, the neural network topology includes one or more layers of neurons, each layer of neurons computing respective outputs based on a respective mathematical function, and transforming the neural network topology to the equivalent analog network of analog components includes: for each layer of the one or more layers of neurons: (i) identifying one or more function blocks, based on the respective mathematical function, for the respective layer. Each function block has a respective schematic implementation with block outputs that conform to outputs of a respective mathematical function; and (ii) generating a respective multilayer network of analog neurons based on arranging the one or more function blocks. Each analog neuron implements a respective function of the one or more function blocks, and each analog neuron of a first layer of the multilayer network is connected to one or more analog neurons of a second layer of the multilayer network.

In some implementations, the one or more function blocks include one or more basic function blocks selected from the group consisting of: (i) a weighted summation block with a block output $$ V^{out} = ReLU\left(\sum w_i \cdot V_i^{in} + \text{bias}\right). $$

ReLU is Rectified Linear Unit (ReLU) activation function or a similar activation function, $V_i$ represents an i-th input, $w_i$ represents a weight corresponding to the i-th input, and bias represents a bias value, and $\Sigma$ is a summation operator; (ii) a signal multiplier block with a block output $V^{out} = \text{coeff} \cdot V_i \cdot V_j$. $V_i$ represents an i-th input and $V_j$ represents a j-th input, and coeff is a predetermined coefficient; (iii) a sigmoid activation block with a block output $$ V^{out} = \frac{A}{1 + e^{-B \cdot V}}. $$

V represents an input, and A and B are predetermined coefficient values of the sigmoid activation block; (iv) a hyperbolic tangent activation block with a block output $V^{out} = A * \tan h(B * V^{in})$. $V^{in}$ represents an input, and A and B are predetermined coefficient values; and (v) a signal delay block with a block output $U(t) = V(t-dt)$. t represents a current time-period, $V(t-dt)$ represents an output of the signal delay block for a preceding time period t−dt, and dt is a delay value.

In some implementations, identifying the one or more function blocks includes selecting the one or more function blocks based on a type of the respective layer.

In some implementations, the neural network topology includes one or more layers of neurons, each layer of neurons computing respective outputs based on a respective mathematical function, and transforming the neural network topology to the equivalent analog network of analog components includes: (i) decomposing a first layer of the neural network topology to a plurality of sub-layers, including decomposing a mathematical function corresponding to the first layer to obtain one or more intermediate mathematical functions. Each sub-layer implements an intermediate mathematical function; and (ii) for each sub-layer of the first layer of the neural network topology: (a) selecting one or more sub-function blocks, based on a respective intermediate mathematical function, for the respective sub-layer; and (b) generating a respective multilayer analog sub-network of analog neurons based on arranging the one or more sub-function blocks. Each analog neuron implements a respective function of the one or more sub-function blocks, and each analog neuron of a first layer of the multilayer analog sub-network is connected to one or more analog neurons of a second layer of the multilayer analog sub-network.

In some implementations, the mathematical function corresponding to the first layer includes one or more weights, and decomposing the mathematical function includes adjusting the one or more weights such that combining the one or more intermediate functions results in the mathematical function.

In some implementations, the method further includes: (i) generating equivalent digital network of digital components for one or more output layers of the neural network topology; and (ii) connecting output of one or more layers of the equivalent analog network to the equivalent digital network of digital components.

In some implementations, the analog components include a plurality of operational amplifiers and a plurality of resistors, each operational amplifier represents an analog neuron of the equivalent analog network, and each resistor represents a connection between two analog neurons.

In some implementations, selecting component values of the analog components includes performing a gradient descent method to identify possible resistance values for the plurality of resistors.

In some implementations, the neural network topology includes one or more GRU or LSTM neurons, and transforming the neural network topology includes generating one or more signal delay blocks for each recurrent connection of the one or more GRU or LSTM neurons.

In some implementations, the one or more signal delay blocks are activated at a frequency that matches a predetermined input signal frequency for the neural network topology.

In some implementations, the neural network topology includes one or more layers of neurons that perform unlimited activation functions, and transforming the neural network topology includes applying one or more transformations selected from the group consisting of: (i) replacing the unlimited activation functions with limited activation; and (ii) adjusting connections or weights of the equivalent analog network such that, for predetermined one or more inputs, difference in output between the trained neural network and the equivalent analog network is minimized.

In some implementations, the method further includes generating one or more lithographic masks for fabricating a circuit implementing the equivalent analog network of analog components based on the resistance matrix.

In some implementations, the method further includes: (i) obtaining new weights for the trained neural network; (ii) computing a new weight matrix for the equivalent analog network based on the new weights; (iii) generating a new resistance matrix for the new weight matrix; and (iv) generating a new lithographic mask for fabricating the circuit implementing the equivalent analog network of analog components based on the new resistance matrix.

In some implementations, the trained neural network is trained using software simulations to generate the weights.

In another aspect, a method for hardware realization of neural networks is provided, according to some implementations. The method includes obtaining a neural network topology and weights of a trained neural network. The method also includes calculating one or more connection constraints based on analog integrated circuit (IC) design constraints. The method also includes transforming the neural network topology to an equivalent sparsely connected network of analog components satisfying the one or more connection constraints. The method also includes computing a weight matrix for the equivalent sparsely connected network based on the weights of the trained neural network. Each element of the weight matrix represents a respective connection between analog components of the equivalent sparsely connected network.

In some implementations, transforming the neural network topology to the equivalent sparsely connected network of analog components includes deriving a possible input connection degree $N_i$ and output connection degree $N_o$, according to the one or more connection constraints.

In some implementations, the neural network topology includes at least one densely connected layer with K inputs and L outputs and a weight matrix U. In such cases, transforming the at least one densely connected layer includes constructing the equivalent sparsely connected network with K inputs, L outputs, and $\lceil \log_{N_i} K \rceil + \lceil \log_{N_o} L \rceil - 1$ layers, such that input connection degree does not exceed $N_i$, and output connection degree does not exceed $N_o$.

In some implementations, the neural network topology includes at least one densely connected layer with K inputs and L outputs and a weight matrix U. In such cases, transforming the at least one densely connected layer includes constructing the equivalent sparsely connected network with K inputs, L outputs, and $M \geq \max(\lceil \log_{N_i} L \rceil, \lceil \log_{N_o} K \rceil)$ layers. Each layer m is represented by a corresponding weight matrix $U_m$, where absent connections are represented with zeros, such that input connection degree does not exceed $N_i$, and output connection degree does not exceed $N_o$. The equation $U = \Pi_{m=1 \ldots M} U_m$ is satisfied with a predetermined precision.

In some implementations, the neural network topology includes a single sparsely connected layer with K inputs and L outputs, a maximum input connection degree of $P_i$, a maximum output connection degree of $P_o$, and a weight matrix of U, where absent connections are represented with zeros. In such cases, transforming the single sparsely connected layer includes constructing the equivalent sparsely connected network with K inputs, L outputs, $M \geq \max(\lceil \log_{N_i} P_i \rceil, \lceil \log_{N_o} P_o \rceil)$ layers, each layer m represented by a corresponding weight matrix $U_m$, where absent connections are represented with zeros, such that input connection degree does not exceed $N_i$, and output connection degree does not exceed $N_o$. The equation $U = \Pi_{m=1 \ldots M} U_m$ is satisfied with a predetermined precision.

In some implementations, the neural network topology includes a convolutional layer with K inputs and L outputs. In such cases, transforming the neural network topology to the equivalent sparsely connected network of analog components includes decomposing the convolutional layer into a single sparsely connected layer with K inputs, L outputs, a maximum input connection degree of $P_i$, and a maximum output connection degree of $P_o$. $P_i \leq N_i$ and $P_o \leq N_o$.

In some implementations, generating a schematic model for implementing the equivalent sparsely connected network utilizing the weight matrix.

In some implementations, the neural network topology includes a recurrent neural layer. In such cases, transforming the neural network topology to the equivalent sparsely connected network of analog components includes transforming the recurrent neural layer into one or more densely or sparsely connected layers with signal delay connections.

In some implementations, the neural network topology includes a recurrent neural layer. In such cases, transforming the neural network topology to the equivalent sparsely connected network of analog components includes decomposing the recurrent neural layer into several layers, where at least one of the layers is equivalent to a densely or sparsely connected layer with K inputs and L output and a weight matrix U, where absent connections are represented with zeros.

In some implementations, the neural network topology includes K inputs, a weight vector $U \in R^K$, and a single layer perceptron with a calculation neuron with an activation function F. In such cases, transforming the neural network topology to the equivalent sparsely connected network of analog components includes: (i) deriving a connection degree N for the equivalent sparsely connected network according to the one or more connection constraints; (ii) calculating a number of layers m for the equivalent sparsely connected network using the equation m=⌈$\log_N$K⌉; and (iii) constructing the equivalent sparsely connected network with the K inputs, m layers and the connection degree N. The equivalent sparsely connected network includes respective one or more analog neurons in each layer of the m layers, each analog neuron of first m−1 layers implements identity transform, and an analog neuron of last layer implements the activation function F of the calculation neuron of the single layer perceptron. Also, in such cases, computing the weight matrix for the equivalent sparsely connected network includes calculating a weight vector W for connections of the equivalent sparsely connected network by solving a system of equations based on the weight vector U. The system of equations includes K equations with S variables, and S is computed using the equation $$S = K\left(\frac{N^m - 1}{N^{m-1}(N-1)}\right).$$

In some implementations, the neural network topology includes K inputs, a single layer perceptron with L calculation neurons, and a weight matrix V that includes a row of weights for each calculation neuron of the L calculation neurons. In such cases, transforming the neural network topology to the equivalent sparsely connected network of analog components includes: (i) deriving a connection degree N for the equivalent sparsely connected network according to the one or more connection constraints; (ii) calculating number of layers m for the equivalent sparsely connected network using the equation m=⌈$\log_N$K⌉; (iii) decomposing the single layer perceptron into L single layer perceptron networks. Each single layer perceptron network includes a respective calculation neuron of the L calculation neurons; (iv) for each single layer perceptron network of the L single layer perceptron networks: (a) constructing a respective equivalent pyramid-like sub-network for the respective single layer perceptron network with the K inputs, the m layers and the connection degree N. The equivalent pyramid-like sub-network includes one or more respective analog neurons in each layer of the m layers, each analog neuron of first m−1 layers implements identity transform, and an analog neuron of last layer implements the activation function of the respective calculation neuron corresponding to the respective single layer perceptron; and (b) constructing the equivalent sparsely connected network by concatenating each equivalent pyramid-like sub-network including concatenating an input of each equivalent pyramid-like sub-network for the L single layer perceptron networks to form an input vector with L*K inputs. Also, in such cases, computing the weight matrix for the equivalent sparsely connected network includes, for each single layer perceptron network of the L single layer perceptron networks: (i) setting a weight vector U=$V_i$, $i^{th}$ row of the weight matrix V corresponding to the respective calculation neuron corresponding to the respective single layer perceptron network; and (ii) calculating a weight vector $W_i$ for connections of the respective equivalent pyramid-like sub-network by solving a system of equations based on the weight vector U. The system of equations includes K equations with S variables, and S is computed using the equation $$S = K\left(\frac{N^m - 1}{N^{m-1}(N-1)}\right).$$

In some implementations, the neural network topology includes K inputs, a multi-layer perceptron with S layers, each layer i of the S layers includes a corresponding set of calculation neurons $L_i$ and corresponding weight matrices $V^i$ that includes a row of weights for each calculation neuron of the $L_i$ calculation neurons. In such cases, transforming the neural network topology to the equivalent sparsely connected network of analog components includes: (i) deriving a connection degree N for the equivalent sparsely connected network according to the one or more connection constraints; (ii) decomposing the multi-layer perceptron into Q=$\Sigma_{i=1,S}(L_i)$ single layer perceptron networks. Each single layer perceptron network includes a respective calculation neuron of the Q calculation neurons. Decomposing the multi-layer perceptron includes duplicating one or more input of the K inputs that are shared by the Q calculation neurons; (iii) for each single layer perceptron network of the Q single layer perceptron networks: (a) calculating a number of layers m for a respective equivalent pyramid-like sub-network using the equation m=⌈$\log_N$$K_{i,j}$⌉. $K_{i,j}$ is number of inputs for the respective calculation neuron in the multi-layer perceptron; and (b) constructing the respective equivalent pyramid-like sub-network for the respective single layer perceptron network with $K_{i,j}$ inputs, the m layers and the connection degree N. The equivalent pyramid-like sub-network includes one or more respective analog neurons in each layer of the m layers, each analog neuron of first m−1 layers implements identity transform, and an analog neuron of last layer implements the activation function of the respective calculation neuron corresponding to the respective single layer perceptron network; and (iv) constructing the equivalent sparsely connected network by concatenating each equivalent pyramid-like sub-network including concatenating input of each equivalent pyramid-like sub-network for the Q single layer perceptron networks to form an input vector with Q*$K_{i,j}$ inputs. Also, in such cases, computing the weight matrix for the equivalent sparsely connected network includes: for each single layer perceptron network of the Q single layer perceptron networks: (i) setting a weight vector $$U = V_i^j,$$

the $i^{th}$ row of the weight matrix V corresponding to the respective calculation neuron corresponding to the respective single layer perceptron network, where j is the corresponding layer of the respective calculation neuron in the multi-layer perceptron; and (ii) calculating a weight vector $W_i$ for connections of the respective equivalent pyramid-like sub-network by solving a system of equations based on the weight vector U. The system of equations includes $K_{i,j}$ equations with S variables, and S is computed using the equation $$S = K_{i,j}\left(\frac{N^m - 1}{N^{m-1}(N-1)}\right).$$

In some implementations, the neural network topology includes a Convolutional Neural Network (CNN) with K inputs, S layers, each layer i of the S layers includes a corresponding set of calculation neurons $L_i$ and corresponding weight matrices $V^i$ that includes a row of weights for each calculation neuron of the $L_i$ calculation neurons. In such cases, transforming the neural network topology to the equivalent sparsely connected network of analog components includes: (i) deriving a connection degree N for the equivalent sparsely connected network according to the one or more connection constraints; (ii) decomposing the CNN into $Q=\Sigma_{i=1,S}(L_i)$ single layer perceptron networks. Each single layer perceptron network includes a respective calculation neuron of the Q calculation neurons. Decomposing the CNN includes duplicating one or more input of the K inputs that are shared by the Q calculation neurons; (iii) for each single layer perceptron network of the Q single layer perceptron networks: (a) calculating number of layers m for a respective equivalent pyramid-like sub-network using the equation $m=\lceil \log_N K_{i,j} \rceil$. j is the corresponding layer of the respective calculation neuron in the CNN, and $K_{i,j}$ is number of inputs for the respective calculation neuron in the CNN; and (b) constructing the respective equivalent pyramid-like sub-network for the respective single layer perceptron network with $K_{i,j}$ inputs, the m layers and the connection degree N. The equivalent pyramid-like sub-network includes one or more respective analog neurons in each layer of the m layers, each analog neuron of first m−1 layers implements identity transform, and an analog neuron of last layer implements the activation function of the respective calculation neuron corresponding to the respective single layer perceptron network; and (iv) constructing the equivalent sparsely connected network by concatenating each equivalent pyramid-like sub-network including concatenating input of each equivalent pyramid-like sub-network for the Q single layer perceptron networks to form an input vector with $Q*K_{i,j}$ inputs. Also, in such cases, computing the weight matrix for the equivalent sparsely connected network includes, for each single layer perceptron network of the Q single layer perceptron networks: (i) setting a weight vector $$U = V_i^j,$$

the $i^{th}$ row of the weight matrix V corresponding to the respective calculation neuron corresponding to the respective single layer perceptron network, where j is the corresponding layer of the respective calculation neuron in the CNN; and (ii) calculating weight vector $W_i$ for connections of the respective equivalent pyramid-like sub-network by solving a system of equations based on the weight vector U. The system of equations includes $K_{i,j}$ equations with S variables, and S is computed using the equation $$S = K_{i,j}\left(\frac{N^m - 1}{N^{m-1}(N - 1)}\right).$$

In some implementations, the neural network topology includes K inputs, a layer $L_p$ with K neurons, a layer $L_n$ with L neurons, and a weight matrix $W \in R^{L \times K}$, where R is the set of real numbers, each neuron of the layer $L_p$ is connected to each neuron of the layer $L_n$, each neuron of the layer $L_n$ performs an activation function F, such that output of the layer $L_n$ is computed using the equation $Y_o=F(W \cdot x)$ for an input x. In such cases, transforming the neural network topology to the equivalent sparsely connected network of analog components includes performing a trapezium transformation that includes: (i) deriving a possible input connection degree $N_I > 1$ and a possible output connection degree $N_O > 1$, according to the one or more connection constraints; (ii) in accordance with a determination that $K \cdot L < L \cdot N_I + K \cdot N_O$, constructing a three-layered analog network that includes a layer $LA_p$ with K analog neurons performing identity activation function, a layer $LA_h$ with $$M = \left\lceil \max\left(\frac{K \cdot N_I}{N_o}, \frac{L \cdot N_o}{N_I}\right)\right\rceil$$

analog neurons performing identity activation function, and a layer $LA_o$ with L analog neurons performing the activation function F, such that each analog neuron in the layer $LA_p$ has $N_O$ outputs, each analog neuron in the layer $LA_h$ has not more than $N_I$ inputs and $N_O$ outputs, and each analog neuron in the layer $LA_o$ has $N_I$ inputs. Also, in such cases, computing the weight matrix for the equivalent sparsely connected network includes generating a sparse weight matrices $W_o$ and $W_h$ by solving a matrix equation $W_o \cdot W_h=W$ that includes $K \cdot L$ equations in $K \cdot N_O + L \cdot N_I$ variables, so that the total output of the layer $LA_o$ is calculated using the equation $Y_o=F(W_o \cdot W_h \cdot x)$. The sparse weight matrix $W_o \in R^{K \times M}$ represents connections between the layers $LA_p$ and $LA_h$, and the sparse weight matrix $W_h \in R^{M \times L}$ represents connections between the layers $LA_h$ and $LA_o$.

In some implementations, performing the trapezium transformation further includes: in accordance with a determination that $K \cdot L \geq L \cdot N_I + K \cdot N_O$: (i) splitting the layer $L_p$ to obtain a sub-layer $L_{p1}$ with K' neurons and a sub-layer $L_{p2}$ with (K−K') neurons such that $K' \cdot L \geq L \cdot N_I + K' \cdot N_O$; (ii) for the sub-layer $L_{p1}$ with K' neurons, performing the constructing, and generating steps; and (iii) for the sub-layer $L_{p2}$ with K−K' neurons, recursively performing the splitting, constructing, and generating steps.

In some implementations, the neural network topology includes a multilayer perceptron network. In such cases, the method further includes, for each pair of consecutive layers of the multilayer perceptron network, iteratively performing the trapezium transformation and computing the weight matrix for the equivalent sparsely connected network.

In some implementations, the neural network topology includes a recurrent neural network (RNN) that includes (i) a calculation of linear combination for two fully connected layers, (ii) element-wise addition, and (iii) a non-linear function calculation. In such cases, the method further includes performing the trapezium transformation and computing the weight matrix for the equivalent sparsely connected network, for (i) the two fully connected layers, and (ii) the non-linear function calculation.

In some implementations, the neural network topology includes a long short-term memory (LSTM) network or a gated recurrent unit (GRU) network that includes (i) a calculation of linear combination for a plurality of fully connected layers, (ii) element-wise addition, (iii) a Hadamard product, and (iv) a plurality of non-linear function calculations. In such cases, the method further includes performing the trapezium transformation and computing the weight matrix for the equivalent sparsely connected network, for (i) the plurality of fully connected layers, and (ii) the plurality of non-linear function calculations.

In some implementations, the neural network topology includes a convolutional neural network (CNN) that includes (i) a plurality of partially connected layers and (ii) one or more fully-connected layers. In such cases, the method further includes: (i) transforming the plurality of partially connected layers to equivalent fully-connected layers by inserting missing connections with zero weights; and (ii) for each pair of consecutive layers of the equivalent fully-connected layers and the one or more fully-connected layers, iteratively performing the trapezium transformation and computing the weight matrix for the equivalent sparsely connected network.

In some implementations, the neural network topology includes K inputs, L output neurons, and a weight matrix $U \in R^{L \times K}$, where R is the set of real numbers, each output neuron performs an activation function F. In such cases, transforming the neural network topology to the equivalent sparsely connected network of analog components includes performing an approximation transformation that includes: (i) deriving a possible input connection degree $N_I > 1$ and a possible output connection degree $N_O > 1$, according to the one or more connection constraints; (ii) selecting a parameter p from the set $\{0, 1, \ldots, \lceil \log_{N_I} K \rceil - 1\}$; (iii) in accordance with a determination that p>0, constructing a pyramid neural network that forms first p layers of the equivalent sparsely connected network, such that the pyramid neural network has $$N_p = \lceil K/N_I^p \rceil$$

neurons in its output layer. Each neuron in the pyramid neural network performs identity function; and (iv) constructing a trapezium neural network with $N_p$ inputs and L outputs. Each neuron in the last layer of the trapezium neural network performs the activation function F and all other neurons perform identity function. In such cases, computing the weight matrix for the equivalent sparsely connected network includes: (i) generating weights for the pyramid neural network including (a) setting weights of every neuron i of the first layer of the pyramid neural network according to following rule: (a)

$$w_{ik_i}^{(1)} = C.$$

C is a non-zero constant and $k_i = (i-1)N_I + 1$; and (b)

$$w_{ij}^{(1)} = \frac{1}{L} \sum_{l=1}^{L} \frac{U_{lj}}{U_{lk_i}} C,$$

for all weights j of the neuron except $k_i$; and (b) setting all other weights of the pyramid neural network to 1; and (ii) generating weights for the trapezium neural network including (a) setting weights of each neuron i of the first layer of the trapezium neural network according to the equation $$w_{ik_i}^{(p+1)} = \frac{U_{ik_i}}{C};$$

and (b) setting other weights of the trapezium neural network to 1.

In some implementations, the neural network topology includes a multilayer perceptron with the K inputs, S layers, and $L_{i=1,S}$ calculation neurons in i-th layer, and a weight matrix $U_{i=1,S} \in R^{L \times L}$. It for the i-th layer, where $L_0 = K$. In such cases, transforming the neural network topology to the equivalent sparsely connected network of analog components includes: for each layer j of the S layers of the multilayer perceptron: (i) constructing a respective pyramid-trapezium network $PTNNX_j$ by performing the approximation transformation to a respective single layer perceptron consisting of $L_{j-1}$ inputs, $L_j$ output neurons, and a weight matrix $U_j$; and (ii) constructing the equivalent sparsely connected network by stacking each pyramid trapezium network.

In another aspect, a method is provided for hardware realization of neural networks, according to some implementations. The method includes obtaining a neural network topology and weights of a trained neural network. The method also includes transforming the neural network topology to an equivalent analog network of analog components including a plurality of operational amplifiers and a plurality of resistors. Each operational amplifier represents an analog neuron of the equivalent analog network, and each resistor represents a connection between two analog neurons. The method also includes computing a weight matrix for the equivalent analog network based on the weights of the trained neural network. Each element of the weight matrix represents a respective connection. The method also includes generating a resistance matrix for the weight matrix. Each element of the resistance matrix corresponds to a respective weight of the weight matrix and represents a resistance value.

In some implementations, generating the resistance matrix for the weight matrix includes: (i) obtaining a predetermined range of possible resistance values $\{R_{min}, R_{max}\}$ and selecting an initial base resistance value $R_{base}$ within the predetermined range; (ii) selecting a limited length set of resistance values, within the predetermined range, that provide most uniform distribution of possible weights $$w_{i,j} = R_{base} \left( \frac{1}{R_i} - \frac{1}{R_j} \right)$$

within the range $[-R_{base}, R_{base}]$ for all combinations of $\{R_i, R_j\}$ within the limited length set of resistance values; (iii) selecting a resistance value $R^+ = R^-$, from the limited length set of resistance values, either for each analog neuron or for each layer of the equivalent analog network, based on maximum weight of incoming connections and bias $w_{max}$ of each neuron or for each layer of the equivalent analog network, such that $R^+ = R^-$ is the closest resistor set value to $R_{base} * w_{max}$; and (iv) for each element of the weight matrix, selecting a respective first resistance value $R_1$ and a respective second resistance value $R_2$ that minimizes an error according to equation $$err = \left( \frac{R^+}{R_1} + \frac{R^-}{R_2} \right) \cdot r_{err} + \left| w - \frac{R^+}{R_1} + \frac{R^-}{R_2} \right|$$

for all possible values of $R_1$ and $R_2$ within the predetermined range of possible resistance values. w is the respective element of the weight matrix, and $r_{err}$ is a predetermined relative tolerance value for resistances.

In some implementations, the predetermined range of possible resistance values includes resistances according to nominal series E24 in the range 100 KΩ to 1 MΩ.

In some implementations, $R^+$ and $R^-$ are chosen independently for each layer of the equivalent analog network.

In some implementations, $R^+$ and $R^-$ are chosen independently for each analog neuron of the equivalent analog network.

In some implementations, a first one or more weights of the weight matrix and a first one or more inputs represent one or more connections to a first operational amplifier of the equivalent analog network. In such cases, the method further includes, prior to generating the resistance matrix: (i) modifying the first one or more weights by a first value; and (ii) configuring the first operational amplifier to multiply, by the first value, a linear combination of the first one or more weights and the first one or more inputs, before performing an activation function.

In some implementations, the method further includes: (i) obtaining a predetermined range of weights; and (ii) updating the weight matrix according to the predetermined range of weights such that the equivalent analog network produces similar output as the trained neural network for same input.

In some implementations, the trained neural network is trained so that each layer of the neural network topology has quantized weights.

In some implementations, the method further includes retraining the trained neural network to reduce sensitivity to errors in the weights or the resistance values that cause the equivalent analog network to produce different output compared to the trained neural network.

In some implementations, the method further includes retraining the trained neural network so as to minimize weight in any layer that are more than mean absolute weight for that layer by larger than a predetermined threshold.

In another aspect, a method is provided for hardware realization of neural networks, according to some implementations. The method includes obtaining a neural network topology and weights of a trained neural network. The method also includes transforming the neural network topology to an equivalent analog network of analog components including a plurality of operational amplifiers and a plurality of resistors. Each operational amplifier represents an analog neuron of the equivalent analog network, and each resistor represents a connection between two analog neurons. The method also includes computing a weight matrix for the equivalent analog network based on the weights of the trained neural network. Each element of the weight matrix represents a respective connection. The method also includes generating a resistance matrix for the weight matrix. Each element of the resistance matrix corresponds to a respective weight of the weight matrix. The method also includes pruning the equivalent analog network to reduce number of the plurality of operational amplifiers or the plurality of resistors, based on the resistance matrix, to obtain an optimized analog network of analog components.

In some implementations, pruning the equivalent analog network includes substituting, with conductors, resistors corresponding to one or more elements of the resistance matrix that have resistance values below a predetermined minimum threshold resistance value.

In some implementations, pruning the equivalent analog network includes removing one or more connections of the equivalent analog network corresponding to one or more elements of the resistance matrix that are above a predetermined maximum threshold resistance value.

In some implementations, pruning the equivalent analog network includes removing one or more connections of the equivalent analog network corresponding to one or more elements of the weight matrix that are approximately zero.

In some implementations, pruning the equivalent analog network further includes removing one or more analog neurons of the equivalent analog network without any input connections.

In some implementations, pruning the equivalent analog network includes: (i) ranking analog neurons of the equivalent analog network based on detecting use of the analog neurons when making calculations for one or more data sets; (ii) selecting one or more analog neurons of the equivalent analog network based on the ranking; and (iii) removing the one or more analog neurons from the equivalent analog network.

In some implementations, detecting use of the analog neurons includes: (i) building a model of the equivalent analog network using a modelling software; and (ii) measuring propagation of analog signals by using the model to generate calculations for the one or more data sets.

In some implementations, detecting use of the analog neurons includes: (i) building a model of the equivalent analog network using a modelling software; and (ii) measuring output signals of the model by using the model to generate calculations for the one or more data sets.

In some implementations, detecting use of the analog neurons includes: (i) building a model of the equivalent analog network using a modelling software; and (ii) measuring power consumed by the analog neurons by using the model to generate calculations for the one or more data sets.

In some implementations, the method further includes subsequent to pruning the equivalent analog network, and prior to generating one or more lithographic masks for fabricating a circuit implementing the equivalent analog network, recomputing the weight matrix for the equivalent analog network and updating the resistance matrix based on the recomputed weight matrix.

In some implementations, the method further includes, for each analog neuron of the equivalent analog network: (i) computing a respective bias value for the respective analog neuron based on the weights of the trained neural network, while computing the weight matrix; (ii) in accordance with a determination that the respective bias value is above a predetermined maximum bias threshold, removing the respective analog neuron from the equivalent analog network; and (iii) in accordance with a determination that the respective bias value is below a predetermined minimum bias threshold, replacing the respective analog neuron with a linear junction in the equivalent analog network.

In some implementations, the method further includes reducing number of neurons of the equivalent analog network, prior to generating the weight matrix, by increasing number of connections from one or more analog neurons of the equivalent analog network.

In some implementations, the method further includes pruning the trained neural network to update the neural network topology and the weights of the trained neural network, prior to transforming the neural network topology, using pruning techniques for neural networks, so that the equivalent analog network includes less than a predetermined number of analog components.

In some implementations, the pruning is performed iteratively considering accuracy or a level of match in output between the trained neural network and the equivalent analog network.

In some implementations, the method further includes, prior to transforming the neural network topology to the equivalent analog network, performing network knowledge extraction.

In another aspect, an integrated circuit is provided, according to some implementations. The integrated circuit includes an analog network of analog components fabricated by a method that includes: (i) obtaining a neural network topology and weights of a trained neural network; (ii) transforming the neural network topology to an equivalent analog network of analog components including a plurality of operational amplifiers and a plurality of resistors. Each operational amplifier represents a respective analog neuron, and each resistor represents a respective connection between a respective first analog neuron and a respective second analog neuron; (iii) computing a weight matrix for the equivalent analog network based on the weights of the trained neural network. Each element of the weight matrix represents a respective connection; (iv) generating a resistance matrix for the weight matrix. Each element of the resistance matrix corresponds to a respective weight of the weight matrix; (v) generating one or more lithographic masks for fabricating a circuit implementing the equivalent analog network of analog components based on the resistance matrix; and (vi) fabricating the circuit based on the one or more lithographic masks using a lithographic process.

In some implementations, the integrated circuit further includes one or more digital to analog converters configured to generate analog input for the equivalent analog network of analog components based on one or more digital.

In some implementations, the integrated circuit further includes an analog signal sampling module configured to process 1-dimensional or 2-dimensional analog inputs with a sampling frequency based on number of inferences of the integrated circuit.

In some implementations, the integrated circuit further includes a voltage converter module to scale down or scale up analog signals to match operational range of the plurality of operational amplifiers.

In some implementations, the integrated circuit further includes a tact signal processing module configured to process one or more frames obtained from a CCD camera.

In some implementations, the trained neural network is a long short-term memory (LSTM) network. In such cases, the integrated circuit further includes one or more clock modules to synchronize signal tacts and to allow time series processing.

In some implementations, the integrated circuit further includes one or more analog to digital converters configured to generate digital signal based on output of the equivalent analog network of analog components.

In some implementations, the integrated circuit further includes one or more signal processing modules configured to process 1-dimensional or 2-dimensional analog signals obtained from edge applications.

In some implementations, the trained neural network is trained, using training datasets containing signals of arrays of gas sensors on different gas mixture, for selective sensing of different gases in a gas mixture containing predetermined amounts of gases to be detected. In such cases, the neural network topology is a 1-Dimensional Deep Convolutional Neural network (1D-DCNN) designed for detecting 3 binary gas components based on measurements by 16 gas sensors, and includes 16 sensor-wise 1-D convolutional blocks, 3 shared or common 1-D convolutional blocks and 3 dense layers. In such cases, the equivalent analog network includes: (i) a maximum of 100 input and output connections per analog neuron, (ii) delay blocks to produce delay by any number of time steps, (iii) a signal limit of 5, (iv) 15 layers, (v) approximately 100,000 analog neurons, and (vi) approximately 4,900,000 connections.

In some implementations, the trained neural network is trained, using training datasets containing thermal aging time series data for different MOSFETs, for predicting remaining useful life (RUL) of a MOSFET device. In such cases, the neural network topology includes 4 LSTM layers with 64 neurons in each layer, followed by two dense layers with 64 neurons and 1 neuron, respectively. In such cases, the equivalent analog network includes: (i) a maximum of 100 input and output connections per analog neuron, (ii) a signal limit of 5, (iii) 18 layers, (iv) between 3,000 and 3,200 analog neurons, and (v) between 123,000 and 124,000 connections.

In some implementations, the trained neural network is trained, using training datasets containing time series data including discharge and temperature data during continuous usage of different commercially available Li-Ion batteries, for monitoring state of health (SOH) and state of charge (SOC) of Lithium Ion batteries to use in battery management systems (BMS). In such cases, the neural network topology includes an input layer, 2 LSTM layers with 64 neurons in each layer, followed by an output dense layer with 2 neurons for generating SOC and SOH values. In such cases, the equivalent analog network includes: (i) a maximum of 100 input and output connections per analog neuron, (ii) a signal limit of 5, (iii) 9 layers, (iv) between 1,200 and 1,300 analog neurons, and (v) between 51,000 and 52,000 connections.

In some implementations, the trained neural network is trained, using training datasets containing time series data including discharge and temperature data during continuous usage of different commercially available Li-Ion batteries, for monitoring state of health (SOH) of Lithium Ion batteries to use in battery management systems (BMS). In such cases, the neural network topology includes an input layer with 18 neurons, a simple recurrent layer with 100 neurons, and a dense layer with 1 neuron. In such cases, the equivalent analog network includes: (i) a maximum of 100 input and output connections per analog neuron, (ii) a signal limit of 5, (iii) 4 layers, (iv) between 200 and 300 analog neurons, and (v) between 2,200 and 2,400 connections.

In some implementations, the trained neural network is trained, using training datasets containing speech commands, for identifying voice commands. In such cases, the neural network topology is a Depthwise Separable Convolutional Neural Network (DS-CNN) layer with 1 neuron. In such cases, the equivalent analog network includes: (i) a maximum of 100 input and output connections per analog neuron, (ii) a signal limit of 5, (iii) 13 layers, (iv) approximately 72,000 analog neurons, and (v) approximately 2.6 million connections.

In some implementations, the trained neural network is trained, using training datasets containing photoplethysmography (PPG) data, accelerometer data, temperature data, and electrodermal response signal data for different individuals performing various physical activities for a predetermined period of times and reference heart rate data obtained from ECG sensor, for determining pulse rate during physical exercises based on PPG sensor data and 3-axis accelerometer data. In such cases, the neural network topology includes two Conv1D layers each with 16 filters and a kernel of 20, performing time series convolution, two LSTM layers each with 16 neurons, and two dense layers with 16 neurons and 1 neuron, respectively. In such cases, the equivalent analog network includes: (i) delay blocks to produce any number of time steps, (ii) a maximum of 100 input and output connections per analog neuron, (iii) a signal limit of 5, (iv) 16 layers, (v) between 700 and 800 analog neurons, and (vi) between 12,000 and 12,500 connections.

In some implementations, the trained neural network is trained to classify different objects based on pulsed Doppler radar signal. In such cases, the neural network topology includes multi-scale LSTM neural network.

In some implementations, the trained neural network is trained to perform human activity type recognition, based on inertial sensor data. In such cases, the neural network topology includes three channel-wise convolutional networks each with a convolutional layer of 12 filters and a kernel dimension of 64, and each followed by a max pooling layer, and two common dense layers of 1024 neurons and N neurons, respectively, where N is a number of classes. In such cases, the equivalent analog network includes: (i) delay blocks to produce any number of time steps, (ii) a maximum of 100 input and output connections per analog neuron, (iii) an output layer of 10 analog neurons, (iv) signal limit of 5, (v) 10 layers, (vi) between 1,200 and 1,300 analog neurons, and (vi) between 20,000 and 21,000 connections.

In some implementations, the trained neural network is further trained to detect abnormal patterns of human activity based on accelerometer data that is merged with heart rate data using a convolution operation.

In another aspect, a method is provided for generating libraries for hardware realization of neural networks. The method includes obtaining a plurality of neural network topologies, each neural network topology corresponding to a respective neural network. The method also includes transforming each neural network topology to a respective equivalent analog network of analog components. The method also includes generating a plurality of lithographic masks for fabricating a plurality of circuits, each circuit implementing a respective equivalent analog network of analog components.

In some implementations, the method further includes obtaining a new neural network topology and weights of a trained neural network. The method also includes selecting one or more lithographic masks from the plurality of lithographic masks based on comparing the new neural network topology to the plurality of neural network topologies. The method also includes computing a weight matrix for a new equivalent analog network based on the weights. The method also includes generating a resistance matrix for the weight matrix. The method also includes generating a new lithographic mask for fabricating a circuit implementing the new equivalent analog network based on the resistance matrix and the one or more lithographic masks.

In some implementations, the new neural network topology includes a plurality of subnetwork topologies, and selecting the one or more lithographic masks is further based on comparing each subnetwork topology with each network topology of the plurality of network topologies.

In some implementations, one or more subnetwork topologies of the plurality of subnetwork topologies fails to compare with any network topology of the plurality of network topologies. In such cases, the method further includes: (i) transforming each subnetwork topology of the one or more subnetwork topologies to a respective equivalent analog subnetwork of analog components; and (ii) generating one or more lithographic masks for fabricating one or more circuits, each circuit of the one or more circuits implementing a respective equivalent analog subnetwork of analog components.

In some implementations, transforming a respective network topology to a respective equivalent analog network includes: (i) decomposing the respective network topology to a plurality of subnetwork topologies; (ii) transforming each subnetwork topology to a respective equivalent analog subnetwork of analog components; and (iii) composing each equivalent analog subnetwork to obtain the respective equivalent analog network.

In some implementations, decomposing the respective network topology includes identifying one or more layers of the respective network topology as the plurality of subnetwork topologies.

In some implementations, each circuit is obtained by: (i) generating schematics for a respective equivalent analog network of analog components; and (ii) generating a respective circuit layout design based on the schematics.

In some implementations, the method further includes combining one or more circuit layout designs prior to generating the plurality of lithographic masks for fabricating the plurality of circuits.

In another aspect, a method is provided for optimizing energy efficiency of analog neuromorphic circuits, according to some implementations. The method includes obtaining an integrated circuit implementing an analog network of analog components including a plurality of operational amplifiers and a plurality of resistors. The analog network represents a trained neural network, each operational amplifier represents a respective analog neuron, and each resistor represents a respective connection between a respective first analog neuron and a respective second analog neuron. The method also include generating inferences using the integrated circuit for a plurality of test inputs, including simultaneously transferring signals from one layer to a subsequent layer of the analog network. The method also includes, while generating inferences using the integrated circuit: (i) determining if a level of signal output of the plurality of operational amplifiers is equilibrated; and (ii) in accordance with a determination that the level of signal output is equilibrated: (a) determining an active set of analog neurons of the analog network influencing signal formation for propagation of signals; and (turning off power for one or more analog neurons of the analog network, distinct from the active set of analog neurons, for a predetermined period of time.

In some implementations, determining the active set of analog neurons is based on calculating delays of signal propagation through the analog network.

In some implementations, determining the active set of analog neurons is based on detecting the propagation of signals through the analog network.

In some implementations, the trained neural network is a feed-forward neural network, and the active set of analog neurons belong to an active layer of the analog network, and turning off power includes turning off power for one or more layers prior to the active layer of the analog network.

In some implementations, the predetermined period of time is calculated based on simulating propagation of signals through the analog network, accounting for signal delays.

In some implementations, the trained neural network is a recurrent neural network (RNN), and the analog network further includes one or more analog components other than the plurality of operational amplifiers, and the plurality of resistors. In such cases, the method further includes, in accordance with a determination that the level of signal output is equilibrated, turning off power, for the one or more analog components, for the predetermined period of time.

In some implementations, the method further includes turning on power for the one or more analog neurons of the analog network after the predetermined period of time.

In some implementations, determining if the level of signal output of the plurality of operational amplifiers is equilibrated is based on detecting if one or more operational amplifiers of the analog network is outputting more than a predetermined threshold signal level.

In some implementations, the method further includes repeating the turning off for the predetermined period of time and turning on the active set of analog neurons for the predetermined period of time, while generating the inferences.

In some implementations, the method further includes: (i) in accordance with a determination that the level of signal output is equilibrated, for each inference cycle: (a) during a first time interval, determining a first layer of analog neurons of the analog network influencing signal formation for propagation of signals; and (b) turning off power for a first one or more analog neurons of the analog network, prior to the first layer, for the predetermined period of time; and (ii) during a second time interval subsequent to the first time interval, turning off power for a second one or more analog neurons including the first layer of analog neurons and the first one or more analog neurons of the analog network, for the predetermined period.

In some implementations, the one or more analog neurons consist of analog neurons of a first one or more layers of the analog network, and the active set of analog neurons consist of analog neurons of a second layer of the analog network, and the second layer of the analog network is distinct from layers of the first one or more layers.

In another aspect, a method is provided for hardware realization of neural networks. The method includes obtaining a neural network topology and weights of a trained neural network. The method also includes transforming the neural network topology to an equivalent analog network of analog components, including replacing composition or superposition of linear transformations by a single linear transformation. The method also includes computing a weight matrix for the equivalent analog network based on the weights of the trained neural network, wherein each element of the weight matrix represents a respective connection between analog components of the equivalent analog network. The method also includes generating a schematic model for implementing the equivalent analog network based on the weight matrix, including selecting component parameter values for the analog components.

In some implementations, the method further includes, prior to transforming the neural network topology to the equivalent analog network: adding regularizers to the neural network topology to reduce nominal values of the weights or to a respective reduce weight sum for each neuron; and retraining the trained neural network to obtain updated weights for the weight matrix.

In some implementations, the regularizers include a respective predetermined regularizer for each convolution batch normalization ReLU block. Each predetermined regularizer treats each batch normalization layer as a normalization and calculates combined convolution-batch normalization multipliers applied to an input neural network signal in the signal's propagation path, and reduces the absolute value of the combined weights for each neuron.

In some implementations, transforming the neural network topology into the equivalent analog network includes translating weights of each batch normalization layer to weights of its previous layer.

In some implementations, transforming the neural network topology into the equivalent analog network includes merging layers that do not have an activation function.

In some implementations, transforming the neural network topology into the equivalent analog network includes transforming a linear transformation followed by another linear transformation into a single linear transformation.

In some implementations, transforming the neural network topology into the equivalent analog network includes transforming layers with ReLU into ReLU1. In some implementations, transforming layers with ReLU into ReLU1 includes maintaining normal operation of the trained neural network during the transformation by analyzing the passage of signals through the trained neural network and performing weight correction.

In some implementations, performing weight correction includes adjusting weights so as to restrict signals in the neural network below a physical limit. In some implementations, performing weight correction includes: when the weights of a layer N are divided by a factor, adjusting the weights of layer N+1 by multiplying the weights by the factor. In some implementations, performing weight correction includes: adjusting weights and bias of one or more neurons and adjustment of weights of outgoing connections of the one or more neurons. In some implementations, performing weight correction includes: repeating weight correction for the trained neural network until complete compliance is achieved. In some implementations, performing weight correction includes scaling signals on layers with unlimited ReLU so that they do not exceed a physical limitation.

In some implementations, transforming the neural network topology to the equivalent analog network includes introducing additional intermediate layers that limit the number of input or output links of neurons by splitting inputs or outputs of the neurons.

In some implementations, the method further includes pruning at least some of the connections of the neural network topology.

In some implementations, the method further includes quantizing and/or restricting the weights of the neural network topology.

In some implementations, the method further includes identifying non-linear elements in the neural network topology.

In some implementations, the method further includes: (i) calculating a respective range of weights for each layer of the neural network topology and (ii) calculating a respective sum of the weights for each neuron of the neural network topology.

In another aspect, a method is provided for hardware realization of neural networks. The method includes obtaining a neural network topology and weights of a trained neural network. In some implementations, the trained neural network is trained using software simulations to generate the weights. The method transforms the neural network topology into an equivalent analog network of analog components including a plurality of operational amplifiers and a plurality of resistors. Each operational amplifier represents an analog neuron of the equivalent analog network, and each resistor represents a connection between two analog neurons. Transforming the neural network topology includes performing resistor quantization and operational amplifier quantization to obtain a quantized network for the equivalent analog network.

In some implementations, the quantized network is obtained by analyzing output tolerance of the neural network using Monte-Carlo simulation where resistors and operational amplifier parameters are considered having stochastic components caused by temperature shift and manufacturing tolerance.

In some implementations, performing resistor quantization includes converting a vector of weights of the trained neural network to particular resistor values of a single analog neuron. In some implementations, the resistor values are discrete values from a pre-determined resistor set. Each resistor in the resistor set is characterized by a respective resistance value and a respective tolerance value. In some implementations, the resistor values are limited to a continuous range.

In some implementations, performing resistor quantization includes solving a system of equations and/or inequalities connecting weights of the trained neural network and resistor values. The number of resistors is more than twice the number of weights, and the system of equations has a plurality solutions. In some implementations, solving the system of equations includes selecting a solution based on one or more optimization criteria. The criteria include (i) energy consumption (tends to maximize resistor values), (ii) die area (tends to minimize resistor values), and (iii) minimization of one or more error metrics (tends to minimize negative input relative (to feedback) resistors values. Some implementations also consider optimality criteria, such as die size, energy consumption, and/or tolerance, which are partially competing objectives. Some implementations reduce the complexity of the task for specific cases using particular schematic options. In some implementations, the one or more optimization criteria include R-quantization error (EQR), which is the mean error of the equivalent analog network with quantized resistors and perfect operational amplifiers versus a math network on a set of input data. In some implementations, the one or more optimization criteria include RO-quantization error (EQRO), which is the mean error of the equivalent analog network with quantized resistors and imperfect operational amplifiers with a particular pre-defined output model versus the math network on the set of input data. Imperfect operational amplifiers have some design flaws (designed in silicon) and produce slightly different output from perfect operational amplifiers. In some implementations, the one or more optimization criteria include RO-quantization R-randomization error (EQRO-RR), which is the mean error of the equivalent analog network with quantized resistors with random tolerance error and imperfect operational amplifiers with a predefined output model versus the math network on the set of input data. In some implementations, the one or more optimization criteria include RO-quantization RO-randomization error (EQRO-RRO), which is the mean error of a T-network with quantized resistors with random tolerance error and imperfect operational amplifiers with a predetermined output model and random tolerance error. Some implementations use Monte-Carlo methods for this modeling.

In some implementations, performing operational amplifier quantization includes selecting an appropriate operational amplifier model from a set of predetermined operational amplifier models according to a set of predetermined limitations and/or optimality criteria. In some implementations, the set of predetermined limitations and/or optimality criteria includes limitations of operational amplifiers for output currents. In some implementations, the set of predetermined limitations and/or optimality criteria includes neuron or operational amplifier die area limitations or minimization. In some implementations, the set of predetermined limitations and/or optimality criteria includes neuron or operational amplifier energy consumption limitations or minimization. In some implementations, the set of predetermined limitations and/or optimality criteria includes operational amplifier input voltage range limitations. In some implementations, the set of predetermined limitations and/or optimality criteria includes minimization of error metrics for resistor quantization.

The method also includes generating, based on the quantized network, a functional behavioral model, which includes the plurality of operational amplifiers placed in front-end of line layers (FEOL layers) and the plurality of resistances placed in back-end of line layers (BEOL layers).

In another aspect, a system is provided for producing analog neuromorphic computing hardware. The system includes one or more processors, memory, a plurality of library routines stored in the memory. The plurality of library routines includes (i) an input interface library routine configured to convert linear digital signals or consecutive analog signals to an array of parallel analog inputs for analog neural networks, (ii) a power management unit library routine configured to switch on or switch off layers of the analog neural networks, and (iii) an output interface library routine configured to digitize analog output from the analog neural networks. One or more programs are stored in the memory. The one or more programs are configured for execution by the one or more processors and include instructions for: receiving an analog neural network specification; extracting a plurality of parameter values, from the analog neural network specification, corresponding to parameters of the library routines; and generating a chip fabrication specification that includes an analog neural network corresponding to the analog neural network specification, the input interface library routine, the power management unit library routine, and the output interface library routine, using the plurality of parameter values for the library routines.

In some implementations, the input interface library routine includes a specification for one or more digital to analog converters configured to generate analog input for the analog neural core based on one or more digital signals.

In some implementations, the input interface library routine comprises specifications for a plurality of devices selected from the group consisting of: samplers, analog-to-digital converters, de-serializers, digital-to-analog converters, FIFO buffers, and hold units.

In some implementations, the output interface library routine comprises a specification for one or more analog to digital converters configured to digitize analog output from the final layers of neurons of the analog neural core.

In some implementations, the input interface library routine and the output interface library routine are configured to interface with the analog neural core representing an arbitrary neural network, based on the number of inputs, the number of outputs, and the type of the analog neural core.

In some implementations, the power management unit library routine is configured to control power supplied to the layers of the analog neural core based on the number of layers of the analog neural core.

In some implementations, the output interface library routine includes specifications for a variable number of comparators, multiplexers and analog-to-digital converters (ADCs) with different resolutions. The number of comparators, the number of multiplexers, and the number of ADCs are determined based on devices necessary for proper quantization of outputs of the analog neural core.

In some implementations, the input interface library routine and the output interface library routine are further configured to sample signals at a frequency determined based on physical activity levels of a user of the apparatus.

In some implementations, the chip fabrication specification further includes specification for a host interface in communications with a host processor that is configured to control the analog neural core.

In some implementations, the chip fabrication specification includes a specification for a reconfiguration unit configured to reconfigure the analog neural core depending on the type of inference application executed on the analog neural core.

In some implementations, the chip fabrication specification includes a specification for a telemetry unit configured to track performance of the analog neural core.

In some implementations, the analog neural core is configured to reset the apparatus initiate an interface for a system host to write a program into a memory of the apparatus using direct memory access (DMA) operations that in turn causes the apparatus to perform initialization steps, begin execution of the analog neural core, and send output to the system host.

In some implementations, the analog neural core is configured to reset a chip fabricated using the specification and to read a program into a memory of the chip from an external non-volatile memory (NVM) that in turn causes the chip to perform initialization steps, begin execution, and send control signals to one or more actuators.

In some implementations, the power management unit is configured to dynamically disable or enable each layer of the analog neural core during signal propagation.

In some implementations, the power management unit is programmed based on transistor-level simulations and/or test chip measurements of the analog neural core, and wherein the power management unit is configured to store enable or disable configurations in an on-chip nonvolatile memory.

In some implementations, a computer system has one or more processors and memory. The one or more programs include instructions for performing any of the methods described herein.

In some implementations, a non-transitory computer readable storage medium stores one or more programs configured for execution by a computer system having one or more processors and memory. The one or more programs include instructions for performing any of the methods described herein.

Thus, methods, systems, and devices are disclosed that are used for hardware realization of trained neural networks.

BRIEF DESCRIPTION OF THE DRAWINGS

For a better understanding of the aforementioned systems, methods, and graphical user interfaces, as well as additional systems, methods, and graphical user interfaces that provide data visualization analytics and data preparation, reference should be made to the Description of Implementations below, in conjunction with the following drawings in which like reference numerals refer to corresponding parts throughout the figures.

FIG. 1A is a block diagram of a system for hardware realization of trained neural networks using analog components, according to some implementations.

FIG. 2A is a system diagram of a computing device in accordance with some implementations.

FIG. 12 shows an example Recurrent Neural Network (RNN), according to some implementations.

FIG. 19B shows a table of description for the example circuit shown in FIG. 19A, according to some implementations.

FIG. 20F shows a table of description for the example circuit shown in FIG. 20A-20D, according to some implementations.

FIGS. 21A-21I show a schematic diagram of a multiplier block, according to some implementations. FIG. 21J shows a table of description for the schematic shown in FIGS. 21A-21I, according to some implementations.

FIG. 22B shows a table of description for the schematic diagram shown in FIG. 22A, according to some implementations.

FIG. 24D shows a table of description for the schematic diagram shown in FIG. 24A-24C, according to some implementations.

FIG. 25E shows a table of description for the schematic diagram shown in FIG. 25A-25D, according to some implementations.

FIGS. 28A-28C show a flowchart of a method for hardware realization of neural networks, according to some implementations.

FIGS. 29A and 29B show a flowchart of a method for hardware realization of neural networks, according to some implementations.

Figure 1B:
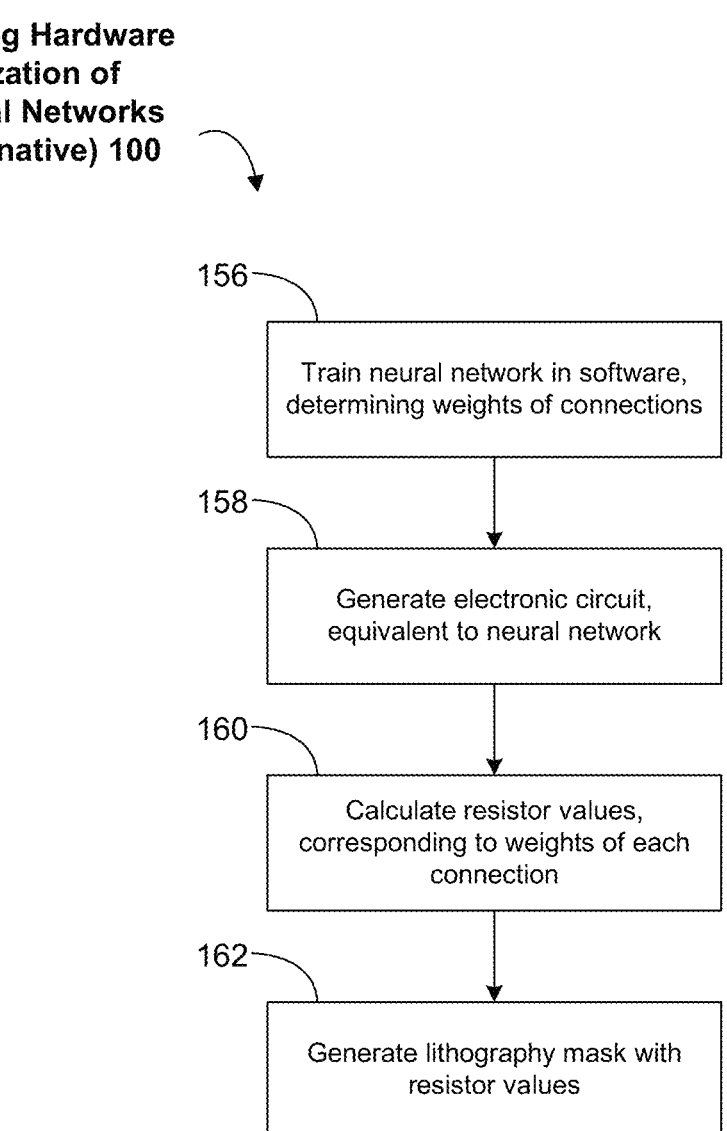
FIG. 1B is a block diagram of an alternative representation of the system of FIG. 1A for hardware realization of trained neural networks using analog components, according to some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

FIG. 1A is a block diagram of a system 100 for hardware realization of trained neural networks using analog components, according to some implementations. The system includes transforming (126) trained neural networks 102 to analog neural networks 104. In some implementations, analog integrated circuit constraints 184 constrain (146) the transformation (126) to generate the analog neural networks 104. Subsequently, the system derives (calculates or generates) weights 106 for the analog neural networks 104 by a process that is sometimes called weight quantization (128). In some implementations, the analog neural network includes a plurality of analog neuron, each analog neuron represented by an analog component, such as an operational amplifier, and each analog neuron connected to another analog neuron via a connection. In some implementations, the connections are represented using resistors that reduce the current flow between two analog neurons. In some implementations, the system transforms (148) the weights 106 to resistance values 112 for the connections. The system subsequently generates (130) one or more schematic models 108 for implementing the analog neural networks 104 based on the weights 106. In some implementations, the system optimizes resistance values 112 (or the weights 106) to form optimized analog neural networks 114 which is further used to generate (150) the schematic models 108. In some implementations, the system generates (132) lithographic masks 110 for the connections and/or generates (136) lithographic masks 120 for the analog neurons. In some implementations, the system fabricates (134 and/or 138) analog integrated circuits 118 that implement the analog neural networks 104. In some implementations, the system generates (152) libraries of lithographic masks 116 based on the lithographic masks for connections 110 and/or lithographic masks 120 for the analog neurons. In some implementations, the system uses (154) the libraries of lithographic masks 116 to fabricate the analog integrated circuits 118. In some implementations, when the trained neural networks 142 are retrained (142), the system regenerates (or recalculates) (144) the resistance values 112 (and/or the weights 106), the schematic model 108, and/or the lithographic masks for connections 110. In some implementations, the system reuses the lithographic masks 120 for the analog neurons 120. In other words, in some implementations, only the weights 106 (or the resistance values 112 corresponding to the changed weights), and/or the lithographic masks for the connections 110 are regenerated. Since only the connections, weights, the schematic model, and/or the corresponding lithographic masks for the connections are regenerated, as indicated by the dashed line 156, the process for (or the path to) fabricating analog integrated circuits for the retrained neural networks is substantially simplified, and the time to market for re-spinning hardware for neural networks is reduced, when compared to conventional techniques for hardware realization of neural networks.

FIG. 1B is a block diagram of an alternative representation of the system 100 for hardware realization of trained neural networks using analog components, according to some implementations. The system includes training (156) neural networks in software, determining weights of connections, generating (158) electronic circuit equivalent to the neural network, calculating (160) resistor values corresponding to weights of each connection, and subsequently generating (162) lithography mask with resistor values.

Figure 1C:
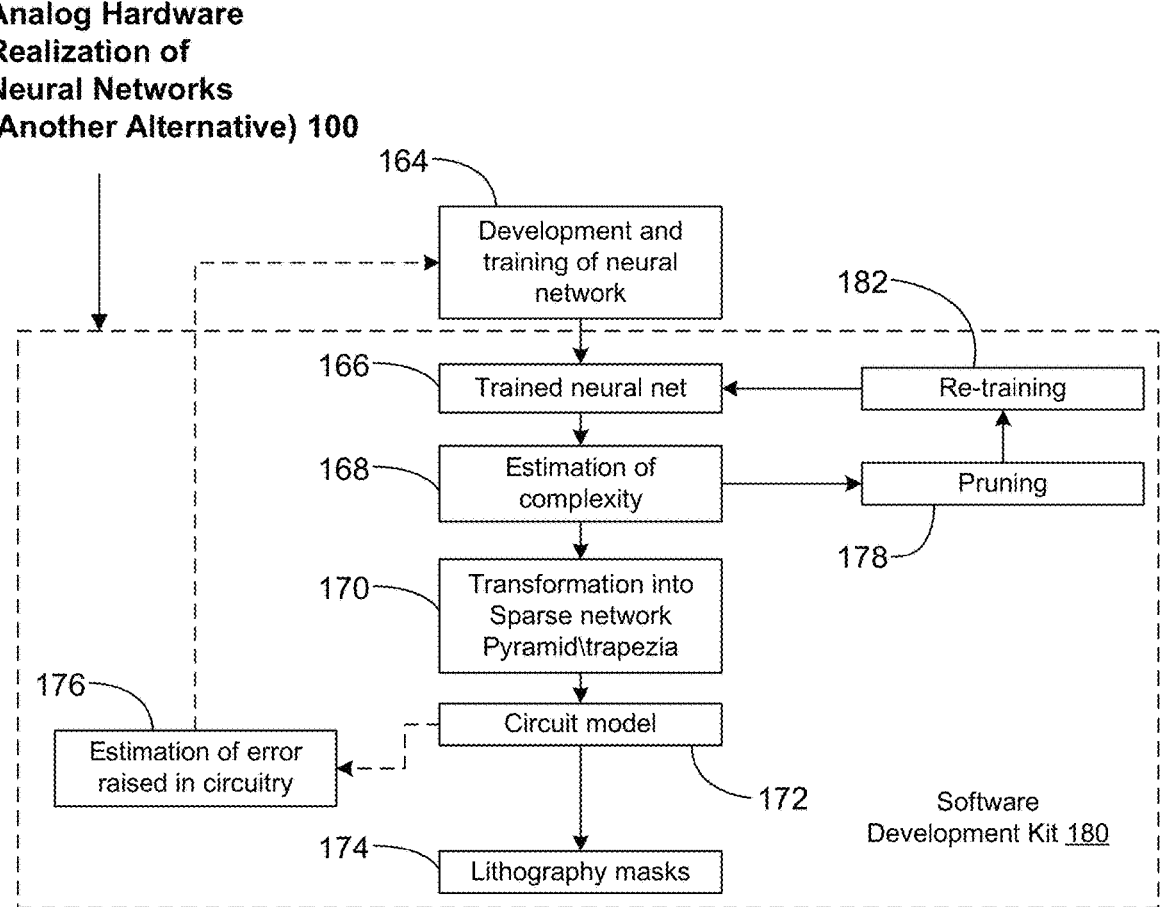
FIG. 1C is a block diagram of another representation of the system of FIG. 1A for hardware realization of trained neural networks using analog components, according to some implementations.

FIG. 1C is a block diagram of another representation of the system 100 for hardware realization of trained neural networks using analog components, according to some implementations. The system is distributed as a software development kit (SDK) 180, according to some implementations. A user develops and trains (164) a neural network and inputs the trained neural net 166 to the SDK 180. The SDK estimates (168) complexity of the trained neural net 166. If the complexity of the trained neural net can be reduced (e.g., some connections and/or neurons can be removed, some layers can be reduced, or the density of the neurons can be changed), the SDK 180 prunes (178) the trained neural net and retrains (182) the neural net to obtain an updated trained neural net 166. Once the complexity of the trained neural net is reduced, the SDK 180 transforms (170) the trained neural net 166 into a sparse network of analog components (e.g., a pyramid- or a trapezia-shaped network). The SDK 180 also generates a circuit model 172 of the analog network. In some implementations, the SDK estimates (176) a deviation in an output generated by the circuit model 172 relative to the trained neural network for a same input, using software simulations. If the estimated error exceeds a threshold error (e.g., a value set by the user), the SDK 180 prompts the user to reconfigure, redevelop, and/or retrain the neural network. In some implementations, although not shown, the SDK automatically reconfigures the trained neural net 166 so as to reduce the estimated error. This process is iterated multiple times until the error is reduced below the threshold error. In FIG. 1C, the dashed line from the block 176 ("Estimation of error raised in circuitry") to the block 164 ("Development and training of neural network") indicates a feedback loop. For example, if the pruned network did not show desired accuracy, some implementations prune the network differently, until accuracy exceeds a predetermined threshold (e.g., 98% accuracy) for a given application. In some implementations, this process includes recalculating the weights, since pruning includes retraining of the whole network.

In some implementations, components of the system 100 described above are implemented in one or more computing devices or server systems as computing modules. FIG. 2A is a system diagram of a computing device 200 in accordance with some implementations. As used herein, the term "computing device" includes both personal devices 102 and servers. A computing device 200 typically includes one or more processing units/cores (CPUs) 202 for executing modules, programs, and/or instructions stored in the memory 214 and thereby performing processing operations; one or more network or other communications interfaces 204; memory 214; and one or more communication buses 212 for interconnecting these components. The communication buses 212 may include circuitry that interconnects and controls communications between system components. A computing device 200 may include a user interface 206 comprising a display device 208 and one or more input devices or mechanisms 210. In some implementations, the input device/mechanism 210 includes a keyboard; in some implementations, the input device/mechanism includes a "soft" keyboard, which is displayed as needed on the display device 208, enabling a user to "press keys" that appear on the display 208. In some implementations, the display 208 and input device/mechanism 210 comprise a touch screen display (also called a touch sensitive display). In some implementations, the memory 214 includes high-speed random access memory, such as DRAM, SRAM, DDR RAM, or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternatively the non-volatile memory device(s) within the memory 214, comprises a computer readable storage medium. In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communications module 218, which is used for connecting the computing device 200 to other computers and devices via the one or more communication network interfaces 204 (wired or wireless) and one or more communication networks, such as the Internet, other wide area networks, local area networks, metropolitan area networks, and so on;

- trained neural networks 220 that includes weights 222 and neural network topologies 224. Examples of input neural networks are described below in reference to FIGS. 4A-4C, FIG. 12, FIGS. 13A, and 14A, according to some implementations;
- a neural network transformation module 226 that includes transformed analog neural networks 228, mathematical formulations 230, the basic function blocks 232, analog models 234 (sometimes called neuron models), and/or analog integrated circuit (IC) design constraints 236. Example operations of the neural network transformation module 226 are described below in reference to at least FIGS. 5, 6A-6C, 7, 8, 9, 10, and 11A-11C, and the flowcharts shown in FIGS. 27A-27B, FIGS. 28A-28C, and FIGS. 29A-29B; and/or
- a weight matrix computation (sometimes called a weight quantization) module 238 that includes weights 272 of transformed networks, and optionally includes resistance calculation module 240, resistance values 242. Example operations of the weight matrix computation module 238 and/or weight quantization are described in reference to at least FIGS. 17A-17C, FIGS. 18A and 18B, and FIGS. 29A-29F, according to some implementations.

Figure 2B:
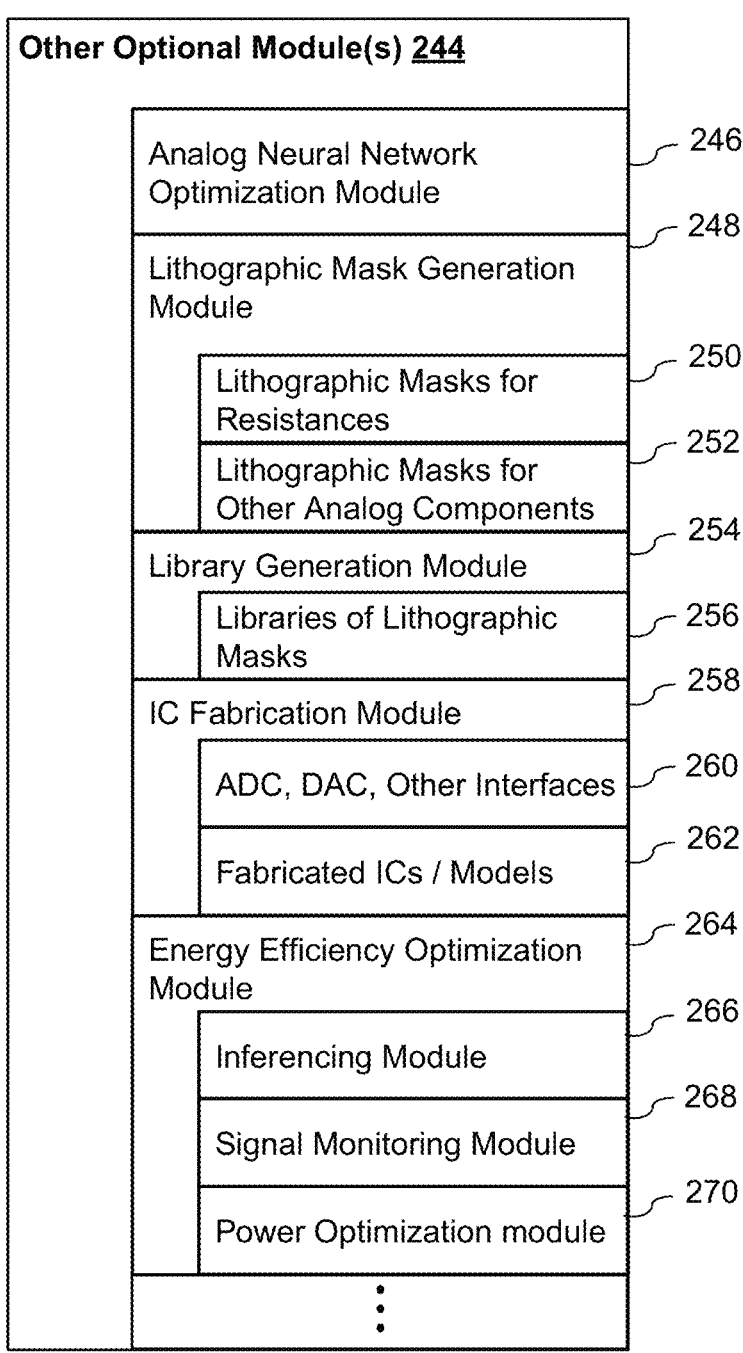
FIG. 2B shows optional modules of the computing device, according to some implementations.

Some implementations include one or more optional modules 244 as shown in FIG. 2B. Some implementations include an analog neural network optimization module 246. Examples of analog neural network optimization are described below in reference to FIGS. 30A-30M, according to some implementations.

Some implementations include a lithographic mask generation module 248 that further includes lithographic masks 250 for resistances (corresponding to connections), and/or lithographic masks for analog components (e.g., operational amplifiers, multipliers, delay blocks, etc.) other than the resistances (or connections). In some implementations, lithographic masks are generated based on chip design layout following chip design using Cadence, Synopsys, or Mentor Graphics software packages. Some implementations use a design kit from a silicon wafer manufacturing plant (sometimes called a fab). Lithographic masks are intended to be used in that particular fab that provides the design kit (e.g., TSMC 65 nm design kit). The lithographic mask files that are generated are used to fabricate the chip at the fab. In some implementations, the Cadence, Mentor Graphics, or Synopsys software packages-based chip design is generated semi-automatically from the SPICE or Fast SPICE (Mentor Graphics) software packages. In some implementations, a user with chip design skill drives the conversion from the SPICE or Fast SPICE circuit into Cadence, Mentor Graphics or Synopsis chip design. Some implementations combine Cadence design blocks for single neuron unit, establishing proper interconnects between the blocks.

Some implementations include a library generation module 254 that further includes libraries of lithographic masks 256. Examples of library generation are described below in reference to FIGS. 32A-32E, according to some implementations.

Some implementations include Integrated Circuit (IC) fabrication module 258 that further includes Analog-to-Digital Conversion (ADC), Digital-to-Analog Conversion (DAC), or similar other interfaces 260, and/or fabricated ICs or models 262. Example integrated circuits and/or related modules are described below in reference to FIGS. 31A-31Q, according to some implementations.

Some implementations include an energy efficiency optimization module 264 that further includes an inferencing module 266, a signal monitoring module 268, and/or a power optimization module 270. Examples of energy efficiency optimizations are described below in reference to FIGS. 33A-33K, according to some implementations.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, the memory 214 stores a subset of the modules and data structures identified above. Furthermore, in some implementations, the memory 214 stores additional modules or data structures not described above.

Although FIG. 2A shows a computing device 200, FIG. 2A is intended more as a functional description of the various features that may be present rather than as a structural schematic of the implementations described herein. In practice, and as recognized by those of ordinary skill in the art, items shown separately could be combined and some items could be separated.

Example Process for Generating Schematic Models of Analog Networks

Figures 3A, 3B:
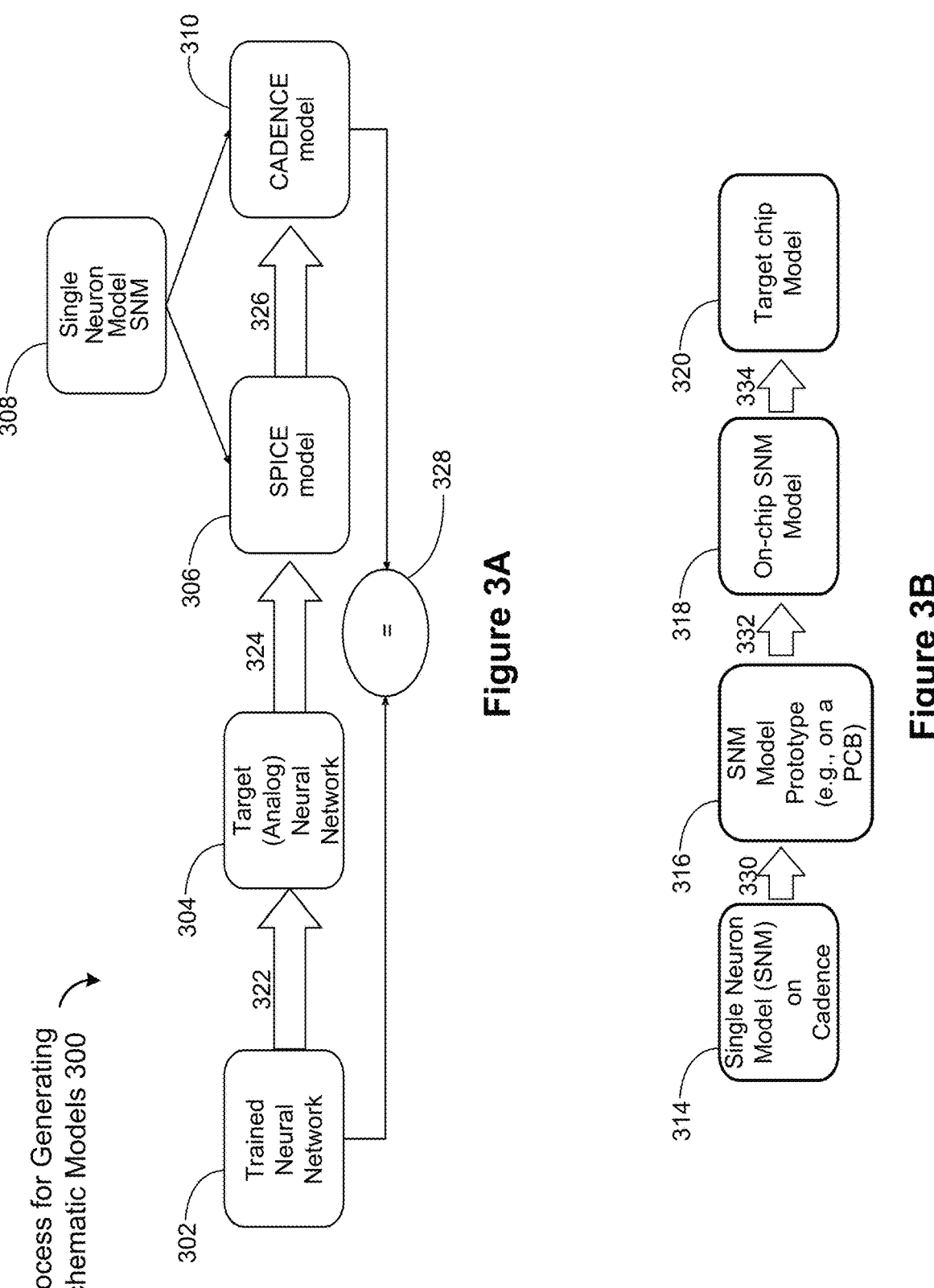
FIG. 3A shows an example process for generating schematic models of analog networks corresponding to trained neural networks, according to some implementations.
FIG. 3B shows an example manual prototyping process used for generating a target chip model, according to some implementations.

FIG. 3A shows an example process 300 for generating schematic models of analog networks corresponding to trained neural networks, according to some implementations. As shown in FIG. 3A, a trained neural network 302 (e.g., MobileNet) is converted (322) to a target or equivalent analog network 304 (using a process that is sometimes called T-transformation). The target neural network (sometimes called a T-network) 304 is exported (324) to SPICE (as a SPICE model 306) using a single neuron model (SNM), which is exported (326) from SPICE to CADENCE and full on-chip designs using a CADENCE model 308. The CADENCE model 308 is cross-validated (328) against the initial neural network for one or more validation inputs.

In the description above and below, a math neuron is a mathematical function which receives one or more weighted inputs and produces a scalar output. In some implementations, a math neuron can have memory (e.g., long short-term memory (LSTM), recurrent neuron). A trivial neuron is a math neuron that performs a function, representing an 'ideal' mathematical neuron, $$V^{out} = f\left(\sum\left(V_i^{in} \cdot \omega_i + \text{bias}\right)\right),$$

where f(x) is an activation function. A SNM is a schematic model with analog components (e.g., operational amplifiers, resistors $R_1 \ldots, R_n$, and other components) representing a specific type of math neuron (for example, trivial neuron) in schematic form. SNM output voltage is represented by a corresponding formula that depends on K input voltages and SNM component values $$V^{out} = g\left(V_i^m, \ldots, V_K^{in}, R_1 \ldots R_n\right).$$

According to some implementations, with properly selected component values, SNM formula is equivalent to math neuron formula, with a desired weights set. In some implementations, the weights set is fully determined by resistors used in a SNM. A target (analog) neural network 304 (sometimes called a T-network) is a set of math neurons which have defined SNM representation, and weighted connections between them, forming a neural network. A T-network follows several restrictions, such as an inbound limit (a maximum limit of inbound connections for any neuron within the T-network), an outbound limit (a maximum limit of outbound connections for any neuron within the T-network), and a signal range (e.g., all signals should be inside pre-defined signal range). T-transformation (322) is a process of converting some desired neural network, such as MobileNet, to a corresponding T-network. A SPICE model 306 is a SPICE Neural Network model of a T-network 304, where each math neuron is substituted with corresponding one or more SNMs. A Cadence NN model 310 is a Cadence model of the T-network 304, where each math neuron is substituted with a corresponding one or more SNMs. Also, as described herein, two networks L and M have mathematical equivalence, if for all neuron outputs of these networks $$\left|V_i^L - V_i^M\right| < eps,$$

where eps is relatively small (e.g., between 0.1-1% of operating voltage range). Also, two networks L and M have functional equivalence, if for a given validation input data set $\{I_1, \ldots, I_n\}$, the classification results are mostly the same, i.e., $P(L(I_k)-M(I_k))=1-eps$, where eps is relatively small.

FIG. 3B shows an example manual prototyping process used for generating a target chip model 320 based on a SNM model on Cadence 314, according to some implementations. Note that although the following description uses Cadence, alternate tools from Mentor Graphic design or Synopsys (e.g., Synopsys design kit) may be used in place of Cadence tools, according to some implementations. The process includes selecting SNM limitations, including inbound and outbound limits and signal limitation, selecting analog components (e.g., resistors, including specific resistor array technology) for connections between neurons, and developing a Cadence SNM model 314. A prototype SNM model 316 (e.g., a PCB prototype) is developed (330) based on the SNM model on Cadence 314. The prototype SNM model 316 is compared with a SPICE model for equivalence. In some implementations, a neural network is selected for an on-chip prototype, when the neural network satisfies equivalence requirements. Because the neural network is small in size, the T-transformation can be hand-verified for equivalence. Subsequently, an on-chip SNM model 318 is generated (332) based on the SNM model prototype 316. The on-chip SNM model is optimized as possible, according to some implementations. In some implementations, an on-chip density for the SNM model is calculated prior to generating (334) a target chip model 320 based on the on-chip SNM model 318, after finalizing the SNM. During the prototyping process, a practitioner may iterate selecting neural network task or application and specific neural network (e.g., a neural network having in the order of 0.1 to 1.1 million neurons), performing T-transformation, building a Cadence neural network model, designing interfaces and/or the target chip model.

Example Input Neural Networks

Figure 4A:
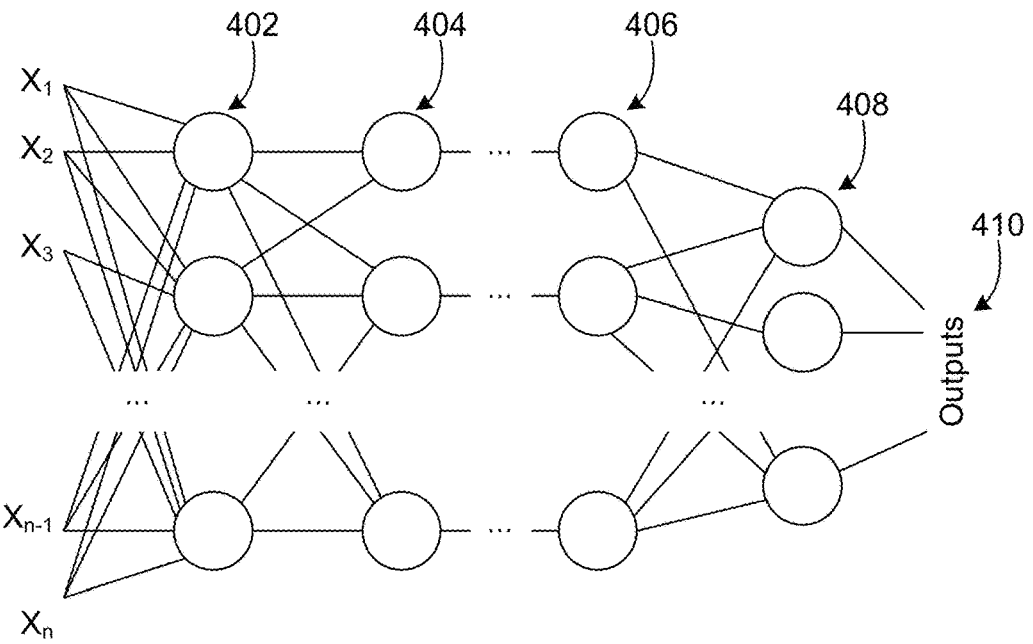
FIGS. 4A, 4B, and 4C show examples of neural networks that are transformed to mathematically equivalent analog networks, according to some implementations.
Figure 4B:
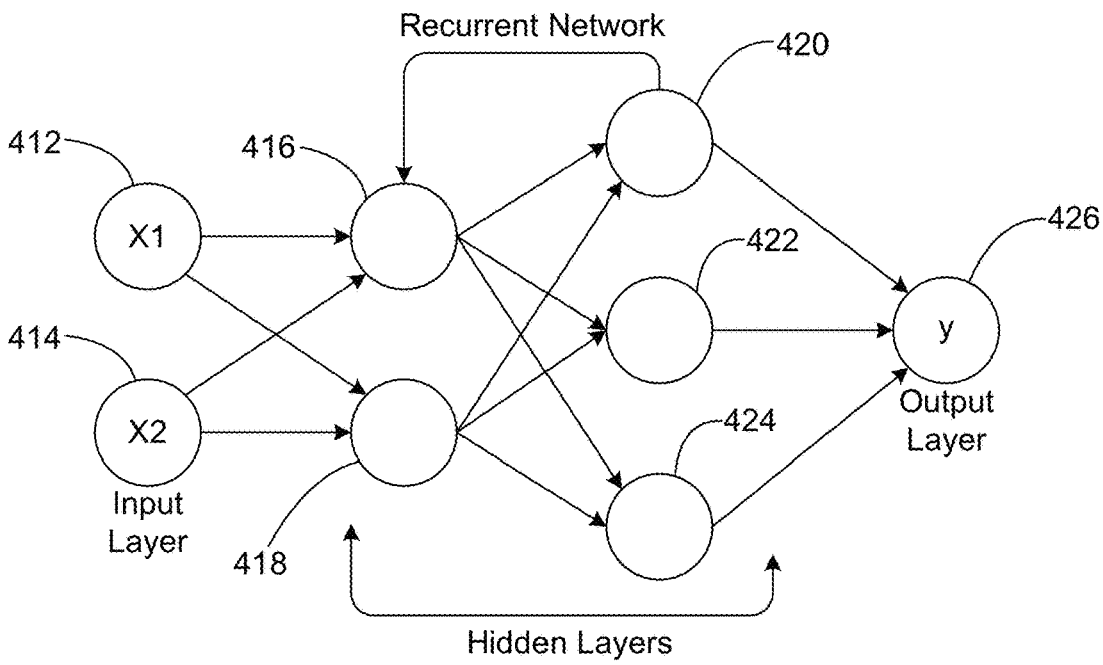
Figure 4C:
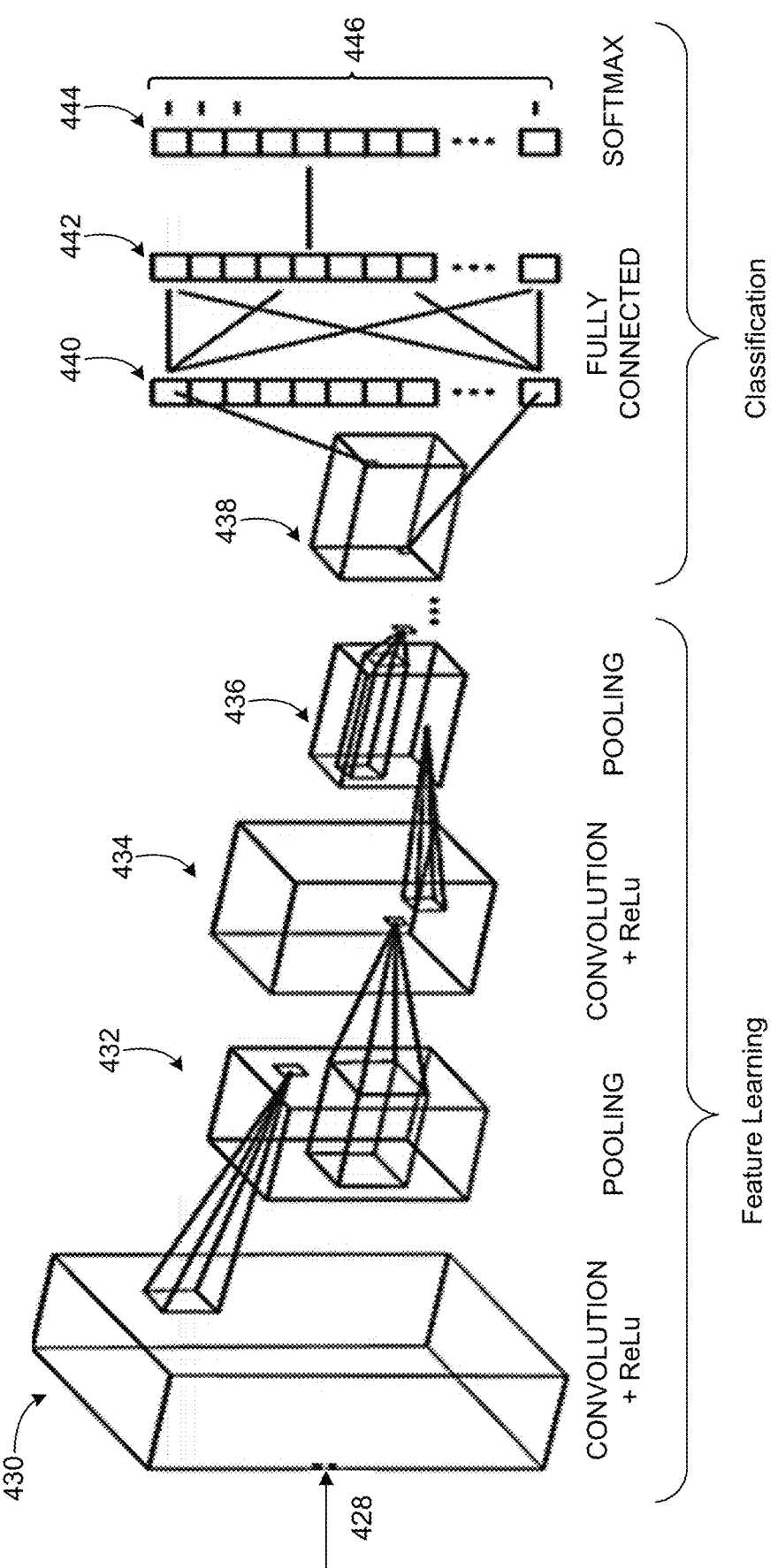

FIGS. 4A, 4B, and 4C show examples of trained neural networks (e.g., the neural networks 220) that are input to the system 100 and transformed to mathematically equivalent analog networks, according to some implementations. FIG. 4A shows an example neural network (sometimes called an artificial neural network) that are composed of artificial neurons that receive input, combine the input using an activation function, and produce one or more outputs. The input includes data, such as images, sensor data, and documents. Typically, each neural network performs a specific task, such as object recognition. The networks include connections between the neurons, each connection providing the output of a neuron as an input to another neuron. After training, each connection is assigned a corresponding weight. As shown in FIG. 4A, the neurons are typically organized into multiple layers, with each layer of neurons connected only to the immediately preceding and following layer of neurons. An input layer of neurons 402 receives external input (e.g., the input $X_1, X_2, \ldots, X_n$). The input layer 402 is followed by one or more hidden layers of neurons (e.g., the layers 404 and 406), that is followed by an output layer 408 that produces outputs 410. Various types of connection patterns connect neurons of consecutive layers, such as a fully-connected pattern that connects every neuron in one layer to all the neurons of the next layer, or a pooling pattern that connect output of a group of neurons in one layer to a single neuron in the next layer. In contrast to the neural network shown in FIG. 4A that are sometimes called feed-forward networks, the neural network shown in FIG. 4B includes one or more connections from neurons in one layer to either other neurons in the same layer or neurons in a preceding layer. The example shown in FIG. 4B is an example of a recurrent neural network, and includes two input neurons 412 (that accepts an input X1) and 414 (that accepts an input X2) in an input layer followed by two hidden layers. The first hidden layer includes neurons 416 and 418 that is fully connected with neurons in the input layer, and the neurons 420, 422, and 424 in the second hidden layer. The output of the neuron 420 in the second hidden layer is connected to the neuron 416 in the first hidden layer, providing a feedback loop. The hidden layer including the neurons 420, 422, and 424 are input to a neuron 426 in the output layer that produces an output y.

FIG. 4C shows an example of a convolutional neural network (CNN), according to some implementations. In contrast to the neural networks shown in FIGS. 4A and 4B, the example shown in FIG. 4C includes different types of neural network layers, that includes a first stage of layers for feature learning, and a second stage of layers for classification tasks, such as object recognition. The feature learning stage includes a convolution and Rectified Linear Unit (ReLU) layer 430, followed by a pooling layer 432, that is followed by another convolution and ReLU layer 434, which is in turn followed by another pooling layer 436. The first layer 430 extracts features from an input 428 (e.g., an input image or portions thereof), and performs a convolution operation on its input, and one or more non-linear operations (e.g., ReLU, tanh, or sigmoid). A pooling layer, such as the layer 432, reduces the number of parameters when the inputs are large. The output of the pooling layer 436 is flattened by the layer 438 and input to a fully connected neural network with one or more layers (e.g., the layers 440 and 442). The output of the fully-connected neural network is input to a softmax layer 444 to classify the output of the layer 442 of the fully-connected network to produce one of many different output 4446 (e.g., object class or type of the input image 428).

Some implementations store the layout or the organization of the input neural networks including number of neurons in each layer, total number of neurons, operations or activation functions of each neuron, and/or connections between the neurons, in the memory 214, as the neural network topology 224.

Figure 5:
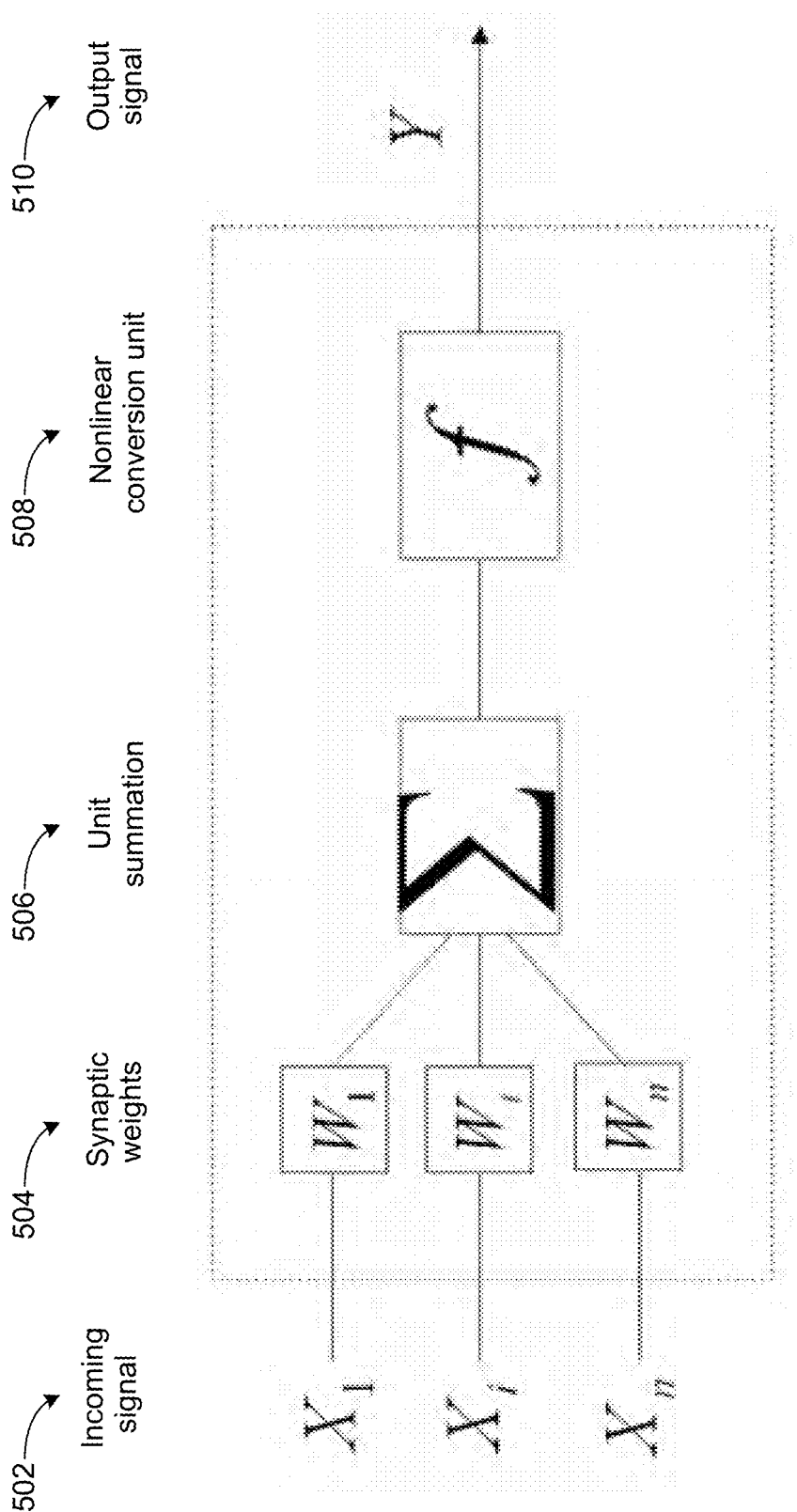
FIG. 5 shows an example of a math model for a neuron, according to some implementations.

FIG. 5 shows an example of a math model 500 for a neuron, according to some implementations. The math model includes incoming signals 502 input multiplied by synaptic weights 504 and summed by a unit summation 506. The result of the unit summation 506 is input to a nonlinear conversion unit 508 to produce an output signal 510, according to some implementations.

Figure 6A:
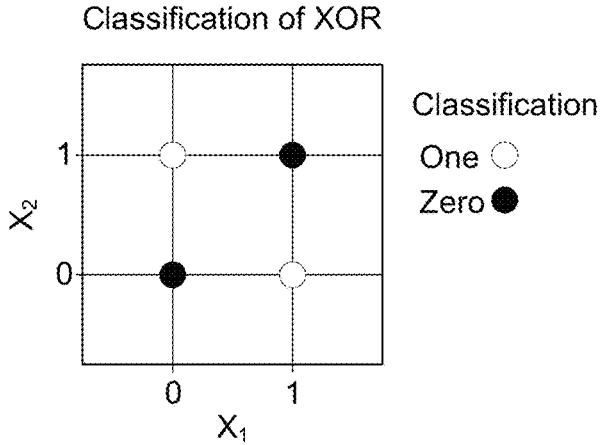
FIGS. 6A-6C illustrate an example process for analog hardware realization of a neural network for computing an XOR of input values, according to some implementations.
Figure 6B:
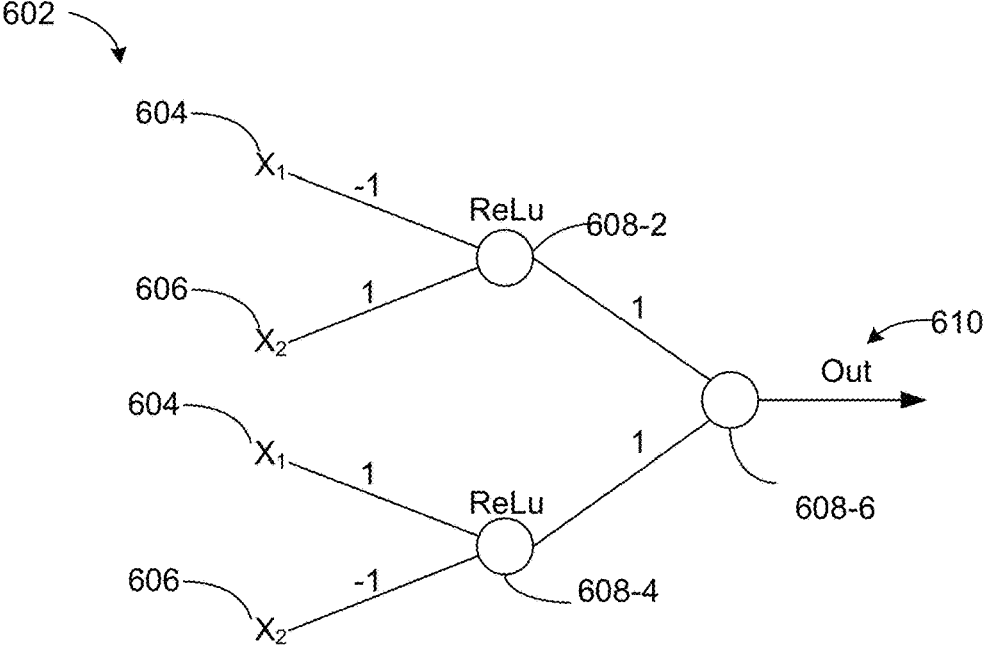
Figure 6C:
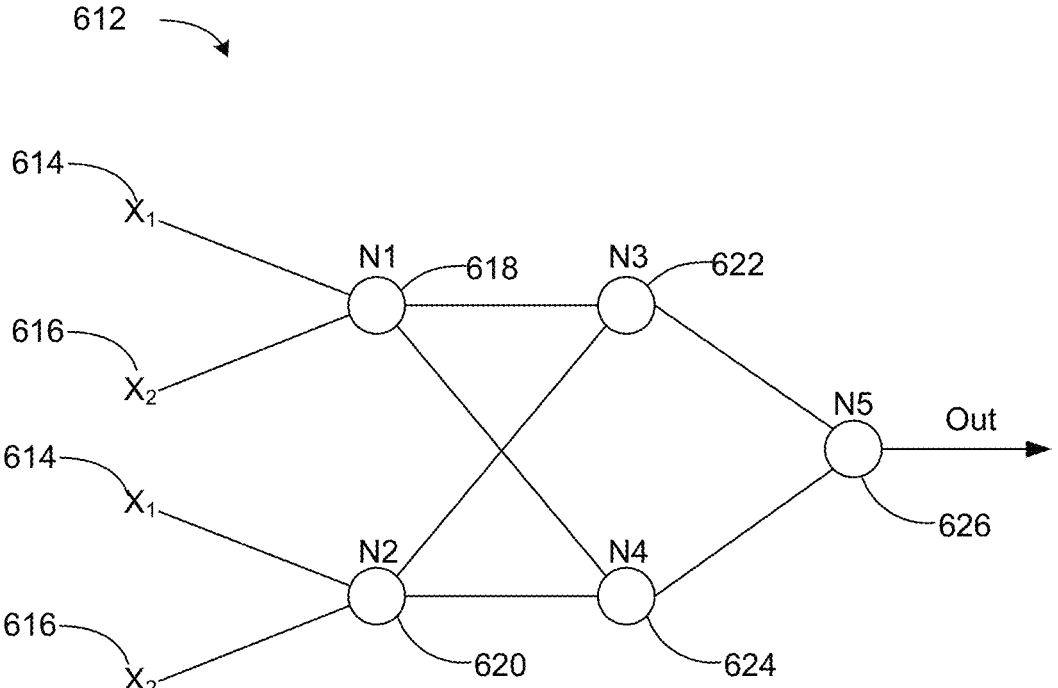

FIGS. 6A-6C illustrate an example process for analog hardware realization of a neural network for computing an XOR (classification of XOR results) of input values, according to some implementations. FIG. 6A shows a table 600 of possible input values $X_1$ and $X_2$ along x- and y-axis, respectively. The expected result values are indicated by hollow circle (represents a value of 1) and a filled or dark circle (represents a value of 0)—this is a typical XOR problem with 2 input signals and 2 classes. Only if either, not both, of the values $X_1$ and $X_2$ are 1, the expected result is 1, and 0, otherwise. Training set consists of 4 possible input signal combinations (binary values for the $X_1$ and $X_2$ inputs). FIG. 6B shows a ReLU-based neural network 602 to solve the XOR classification of FIG. 6A, according to some implementations. The neurons do not use any bias values, and use ReLU activation. Inputs 604 and 606 (that correspond to $X_1$ and $X_2$, respectively) are input to a first ReLU neuron 608-2. The inputs 604 and 606 are also input to a second ReLU neuron 608-4. The results of the two ReLU neurons 608-2 and 608-4 are input to a third neuron 608-6 that performs linear summation of the input values, to produce an output value 510 (the Out value). The neural network 602 has the weights −1 and 1 (for the input values $X_1$ and $X_2$, respectively) for the ReLU neuron 608-2, the weights 1 and −1 (for the input values $X_1$ and $X_2$, respectively) for the ReLU neuron 608-4, and the weights 1 and 1 (for the output of the RelLu neurons 608-2 and 608-4, respectively). In some implementations, the weights of trained neural networks are stored in memory 214, as the weights 222.

FIG. 6C shows an example equivalent analog network for the network 602, according to some implementations. The analog equivalent inputs 614 and 616 of the $X_1$ and $X_2$ inputs 604 and 606 are input to analog neurons N1 618 and N2 620 of a first layer. The neurons N1 and N2 are densely connected with neurons N3 and N4 of a second layer. The neurons of a second layer (i.e. neuron N3 622 and neuron N4 624) are connected with an output neuron N5 626 that produces the output Out (equivalent to the output 610 of the network 602). The neurons N1, N2, N3, N4 and N5 have ReLU (maximum value=1) activation function.

Some implementations use Keras learning that converges in approximately 1000 iterations, and results in weights for the connections. In some implementations, the weights are stored in memory 214, as part of the weights 222. In the following example, data format is 'Neuron [$1^{st}$ link weight, $2^{nd}$ link weight, bias]'.

N1 [−0.9824321, 0.976517, −0.00204677];
N2 [1.0066702, −1.0101418, −0.00045485];
N3 [1.0357606, 1.0072469, −0.00483723];
N4 [−0.07376373, −0.7682612, 0.0]; and
N5 [1.0029935, −1.1994369, −0.00147767].

Next, to compute resistor values for connections between the neurons, some implementations compute resistor range. Some implementations set resistor nominal values (R+, R−) of 1 MΩ, possible resistor range of 100 KΩ to 1 MΩ and nominal series E24. Some implementations compute w1, w2, wbias resistor values for each connection as follows. For each weight value wi (e.g., the weights 222), some implementations evaluate all possible (Ri−, Ri+) resistor pairs options within the chosen nominal series and choose a resistor pair which produces minimal error value $$err = \text{Abs}\left(w_i - \frac{1}{R_i^+} + \frac{1}{R_i^-}\right).$$

The following table provides example values for the weights w1, w2, and bias, for each connection, according to some implementations.

| | Model value | R− (MΩ) | R+ (MΩ) | Implemented value |
|---|---|---|---|---|
| N1_w1 | −0.9824321 | 0.36 | 0.56 | −0.992063 |
| N1_w2 | 0.976517 | 0.56 | 0.36 | 0.992063 |
| N1_bias | −0.00204677 | 0.1 | 0.1 | 0.0 |
| N2_w1 | 1.0066702 | 0.43 | 0.3 | 1.007752 |
| N2_w2 | −1.0101418 | 0.18 | 0.22 | −1.010101 |
| N2_bias | −0.00045485 | 0.1 | 0.1 | 0.0 |
| N3_w1 | 1.0357606 | 0.91 | 0.47 | 1.028758 |
| N3_w2 | 1.0072469 | 0.43 | 0.3 | 1.007752 |
| N3_bias | −0.00483723 | 0.1 | 0.1 | 0.0 |
| N4_w1 | −0.07376373 | 0.91 | 1.0 | −0.098901 |
| N4_w2 | −0.7682612 | 0.3 | 0.39 | −0.769231 |
| N4_bias | 0.0 | 0.1 | 0.1 | 0.0 |
| N5_w1 | 1.0029935 | 0.43 | 0.3 | 1.007752 |
| N5_w2 | −1.1994369 | 0.3 | 0.47 | −1.205674 |
| N5_bias | −0.00147767 | 0.1 | 0.1 | 0.0 |

Example Advantages of Transformed Neural Networks

Before describing examples of transformation, it is worth noting some of the advantages of the transformed neural networks over conventional architectures. As described herein, the input trained neural networks are transformed to pyramid- or trapezium-shaped analog networks. Some of the advantages of pyramid or trapezium over cross bars include lower latency, simultaneous analog signal propagation, possibility for manufacture using standard integrated circuit (IC) design elements, including resistors and operational amplifiers, high parallelism of computation, high accuracy (e.g., accuracy increases with the number of layers, relative to conventional methods), tolerance towards error(s) in each weight and/or at each connection (e.g., pyramids balance the errors), low RC (low Resistance Capacitance delay related to propagation of signal through network), and/or ability to manipulate biases and functions of each neuron in each layer of the transformed network. Also, pyramids are excellent computation block by itself, since it is a multi-level perceptron, which can model any neural network with one output. Networks with several outputs are implemented using different pyramids or trapezia geometry, according to some implementations. A pyramid can be thought of as a multi-layer perceptron with one output and several layers (e.g., N layers), where each neuron has n inputs and 1 output. Similarly, a trapezium is a multilayer perceptron, where each neuron has n inputs and m outputs. Each trapezium is a pyramid-like network, where each neuron has n inputs and m outputs, where n and m are limited by IC analog chip design limitations, according to some implementations.

Some implementations perform lossless transformation of any trained neural network into subsystems of pyramids or trapezia. Thus, pyramids and trapezia can be used as universal building blocks for transforming any neural networks. An advantage of pyramid- or trapezia-based neural networks is the possibility to realize any neural network using standard IC analog elements (e.g., operational amplifiers, resistors, signal delay lines in case of recurrent neurons) using standard lithography techniques. It is also possible to restrict the weights of transformed networks to some interval. In other words, lossless transformation is performed with weights limited to some predefined range, according to some implementations. Another advantage of using pyramids or trapezia is the high degree of parallelism in signal processing or the simultaneous propagation of analog signals that increases the speed of calculations, providing lower latency. Moreover, many modern neural networks are sparsely connected networks and are much better (e.g., more compact, have low RC values, absence of leakage currents) when transformed into pyramids than into cross-bars, Pyramids and trapezia networks are relatively more compact than cross-bar based memristor networks.

Furthermore, analog neuromorphic trapezia-like chips possess a number of properties, not typical for analog devices. For example, signal to noise ratio is not increasing with the number of cascades in analog chip, the external noise is suppressed, and influence of temperature is greatly reduced. Such properties make trapezia-like analog neuromorphic chips analogous to digital circuits. For example, individual neurons, based on operational amplifier, level the signal and are operated with the frequencies of 20,000-100,000 Hz, and are not influenced by noise or signals with frequency higher than the operational range, according to some implementations. Trapezia-like analog neuromorphic chip also perform filtration of output signal due to peculiarities in how operational amplifiers function. Such trapezia-like analog neuromorphic chip suppresses the synphase noise. Due to low-ohmic outputs of operational amplifiers, the noise is also significantly reduced. Due to the leveling of signal at each operational amplifier output and synchronous work of amplifiers, the drift of parameters, caused by temperature does not influence the signals at final outputs. Trapezia-like analogous neuromorphic circuit is tolerant towards the errors and noise in input signals and is tolerant towards deviation of resistor values, corresponding to weight values in neural network. Trapezia-like analog neuromorphic networks are also tolerant towards any kind of systemic error, like error in resistor value settings, if such error is same for all resistors, due to the very nature of analog neuromorphic trapezia-like circuits, based on operational amplifiers.

Example Lossless Transformation (T-Transformation) of Trained Neural Networks

In some implementations, the example transformations described herein are performed by the neural network transformation module 226 that transform trained neural networks 220, based on the mathematical formulations 230, the basic function blocks 232, the analog component models 234, and/or the analog design constraints 236, to obtain the transformed neural networks 228.

Figure 7:
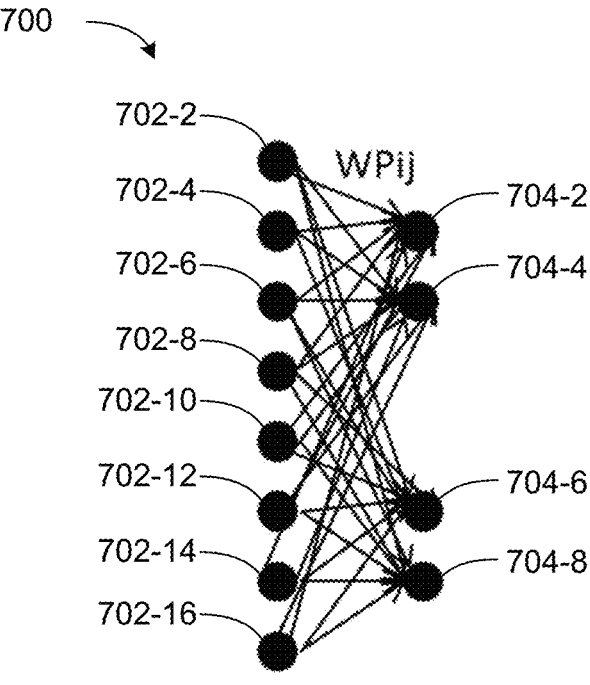
FIG. 7 shows an example perceptron, according to some implementations.

FIG. 7 shows an example perceptron 700, according to some implementations. The perceptron includes K=8 inputs and 8 neurons 702-2, . . . , 702-16 in an input layer that receives the 8 inputs. There is an output layer with 4 neurons 704-2, . . . , 704-8, in an output layer, that correspond to L=4 outputs. The neurons in the input layer are fully connected to the neurons in the output layer, making 8 times 4=32 connections. Suppose the weights of the connections are represented by a weight matrix WP (element $WP_{i,j}$ corresponds to the weight of the connection between the i-th neuron in the input layer and the j-th neuron in the output layer). Suppose further each neuron performs an activation function F.

Figure 8:
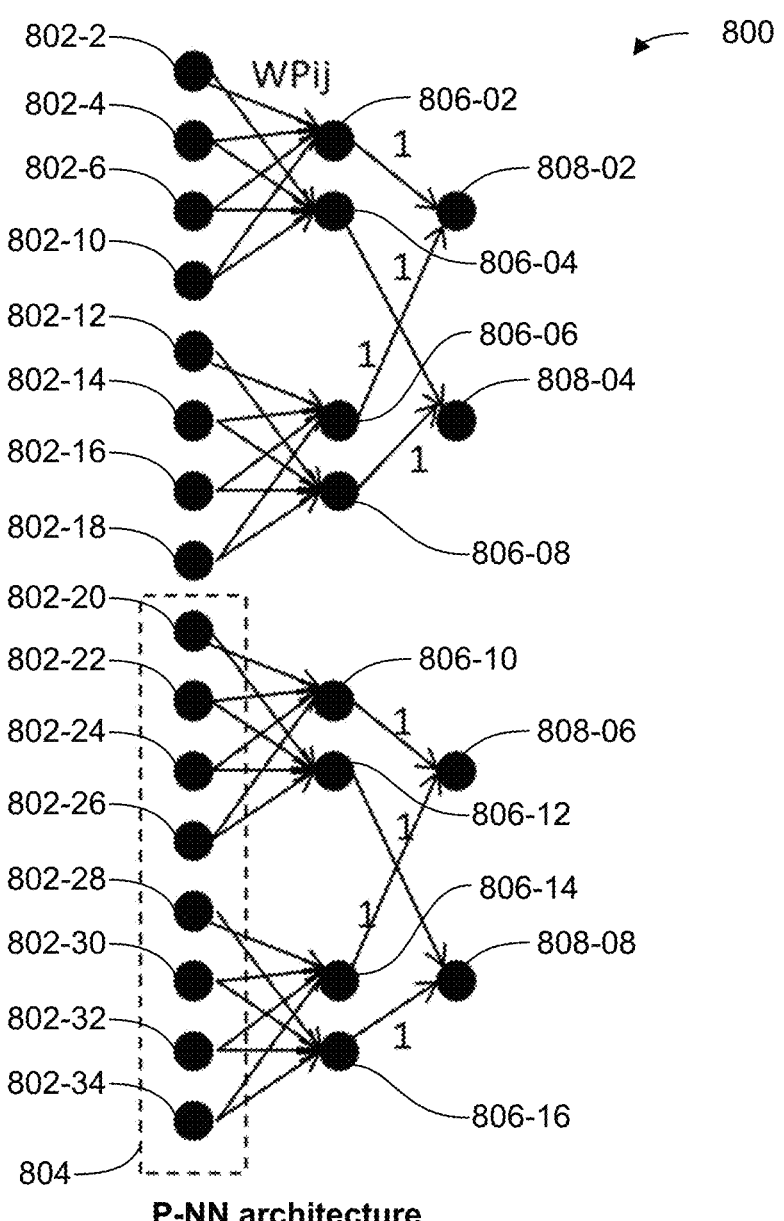
FIG. 8 shows an example Pyramid-Neural Network, according to some implementations.

FIG. 8 shows an example Pyramid-Neural Network (P-NN) 800, a type of Target-Neural Network (T-NN, or TNN), that is equivalent to the perceptron shown in FIG. 7, according to some implementations. To perform this transformation of the perceptron (FIG. 7) to the PN-NN architecture (FIG. 8), suppose, for the T-NN, that number of inputs is restricted to Ni=4 and number of outputs is restricted to No=2. The T-NN includes an input layer LTI of neurons 802-2, . . . , 802-34, that is a concatenation of two copies of the input layer of neurons 802-2, . . . , 802-16, for a total of 2 times 8=16 input neurons. The set of neurons 804, including neurons 802-20, . . . , 802-34, is a copy of the neurons 802-2, . . . , 802-18, and the input is replicated. For example, the input to the neuron 802-2 is also input to the neuron 802-20, the input 20 the neuron 802-4 is also input to the neuron 802-22, and so on. FIG. 8 also includes a hidden layer LTH1 of neurons 806-02, . . . , 806-16 (2 times 16 divided by 4=8 neurons) that are linear neurons. Each group of Ni neurons from the input layer LTI are fully connected to two neurons from the LTH1 layer. FIG. 8 also includes an output layer LTO with 2 times 8 divided by 4=4 neurons 808-02, . . . , 808-08, each neuron performing the activation function F. Each neuron in the layer LTO is connected to distinct neurons from different groups in the layer LTH1. The network shown in FIG. 8 includes 40 connections. Some implementations perform weight matrix calculation for the P-NN in FIG. 8, as follows. Weights for the hidden layer LTH1 (WTH1) are calculated from the weight matrix WP, and weights corresponding to the output layer LTO (WTO) form a sparse matrix with elements equal to 1.

Figure 9:
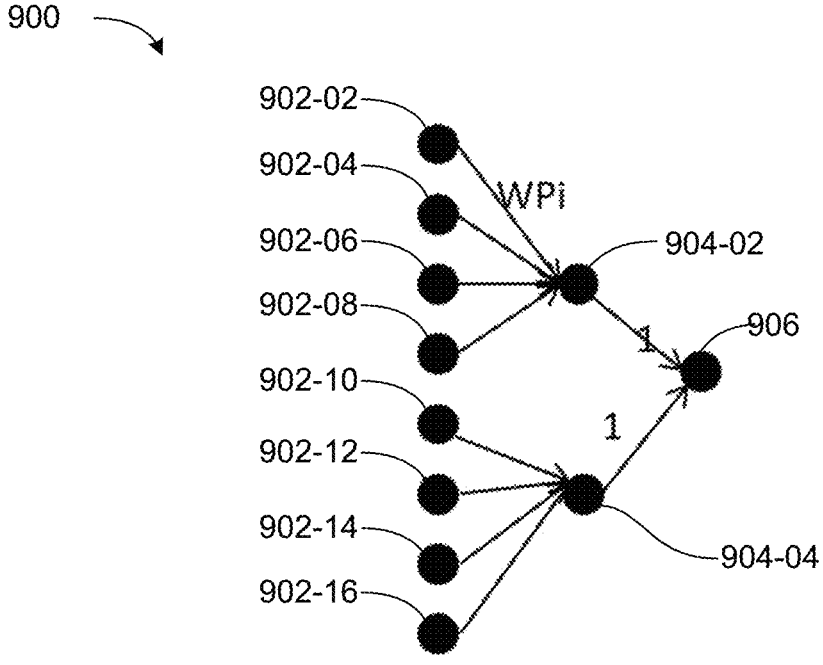
FIG. 9 shows an example Pyramid Single Neural Network, according to some implementations.

FIG. 9 shows a Pyramid Single Neural Network (PSNN) 900 corresponding to an output neuron of FIG. 8, according to some implementations. The PSNN includes a layer (LPSI) of input neurons 902-02, . . . , 902-16 (corresponding to the 8 input neurons in the network 700 of FIG. 7). A hidden layer LPSH1 includes 8 divided by 4=2 linear neurons 904-02 and 904-04, and each group of Ni neurons from LTI is connected to one neuron of the LPSH1 layer. An output layer LPSO consists of 1 neuron 906 with an activation function F, that is connected to both the neurons 904-02 and 904-04 of the hidden layer. For calculating weight matrix for the PSNN 900, some implementations compute a vector WPSH1 that is equal to the first row of WP, for the LPSH1 layer. For the LPSO layer, some implementations compute a weight vector WPSO with 2 elements, each element equal to 1. The process is repeated for the first, second, third, and fourth output neurons. A P-NN, such as the network shown in FIG. 8, is a union of the PSNNs (for the 4 output neurons). Input layer for every PSNN is a separate copy of P's input layer. For this example, the P-NN 800 includes an input layer with 8 times 4=32 inputs, a hidden layer with 2 times 4=8 neurons, and an output layer with 4 neurons.

Example Transformations with Target Neurons with N Inputs and 1 Output

In some implementations, the example transformations described herein are performed by the neural network transformation module 226 that transform trained neural networks 220, based on the mathematical formulations 230, the basic function blocks 232, the analog component models

234, and/or analog design constraints 236, to obtain the transformed neural networks 228.

Single Layer Perceptron with One Output

Suppose a single layer perceptron SLP(K,1) includes K inputs and one output neuron with activation function F. Suppose further $U \in R^K$ is a vector of weights for SLP(K,1). The following algorithm Neuron2TNN1 constructs a T-neural network from T-neurons with N inputs and 1 output (referred to as TN(N,1)).

Algorithm Neuron2TNN1

1. Construct an input layer for T-NN by including all inputs from SLP(K,1).
2. If K>N then:
   a. Divide K input neurons into $$m_1 = \left\lceil \frac{K}{N} \right\rceil$$

groups such that every group consists of no more than N inputs.
   b. Construct the first hidden layer $LTH_1$ of the T-NN from $m_1$ neurons, each neuron performing an identity activation function.
   c. Connect input neurons from every group to corresponding neuron from the next layer. So every neuron from the $LTH_1$ has no more than N input connections.
   d. Set the weights for the new connections according the following equation:

$$w_{ij} = u_j, \ j = (i-1) * N + 1, \ldots , i * N$$

$$i = 1, \ldots , \left\lceil \frac{K}{N} \right\rceil$$

3. Else (i.e., if K<=N) then:
   a. Construct the output layer with 1 neuron calculating activation function F
   b. Connect input neurons to the single output neuron. It has K≤N connections.
   c. Set the weights of the new connections by means of the following equation:

$$w_j^1 = u_j, \ j = 1, \ldots , K$$

d. Terminate the algorithm
4. Set l=1
5. If $m_l$>N:
   a. Divide $m_l$ neurons into $$m_{l+1} = \left\lceil \frac{m_l}{N} \right\rceil$$

groups, every group consists of no more than N neurons.
   b. Construct the hidden layer $LTH_{l+1}$ of the T-NN from $m_{l+1}$ neurons, every neuron has identity activation function.
   c. Connect input neurons from every group to the corresponded neuron from the next layer.

d. Set the weights of the new connections according the following equation:

$$w_{ij}^{l+1} = 1$$

$$i = 1, \ldots, \left\lceil \frac{m_l}{N} \right\rceil$$

e. Set l=l+1
6. Else (if m>=N):
    a. Construct the output layer with 1 neuron calculating activation function F
    b. Connect all LTH$_1$'s neurons to the single output neuron.
    c. Set the weights of the new connections according the following equation:

$$a. \; w_i^{l+1} = 1$$

d. Terminate the algorithm
7. Repeat steps 5 and 6.
Here $\lceil x \rceil$—minimum integer number being no less than x. Number of layers in T-NN constructed by means of the algorithm Neuron2TNN1 is h=$\lceil \log_N K \rceil$. The total number of weights in T-NN is:

$$S = K \frac{N^m - 1}{N^{m-1}(N-1)}$$

Figure 10:
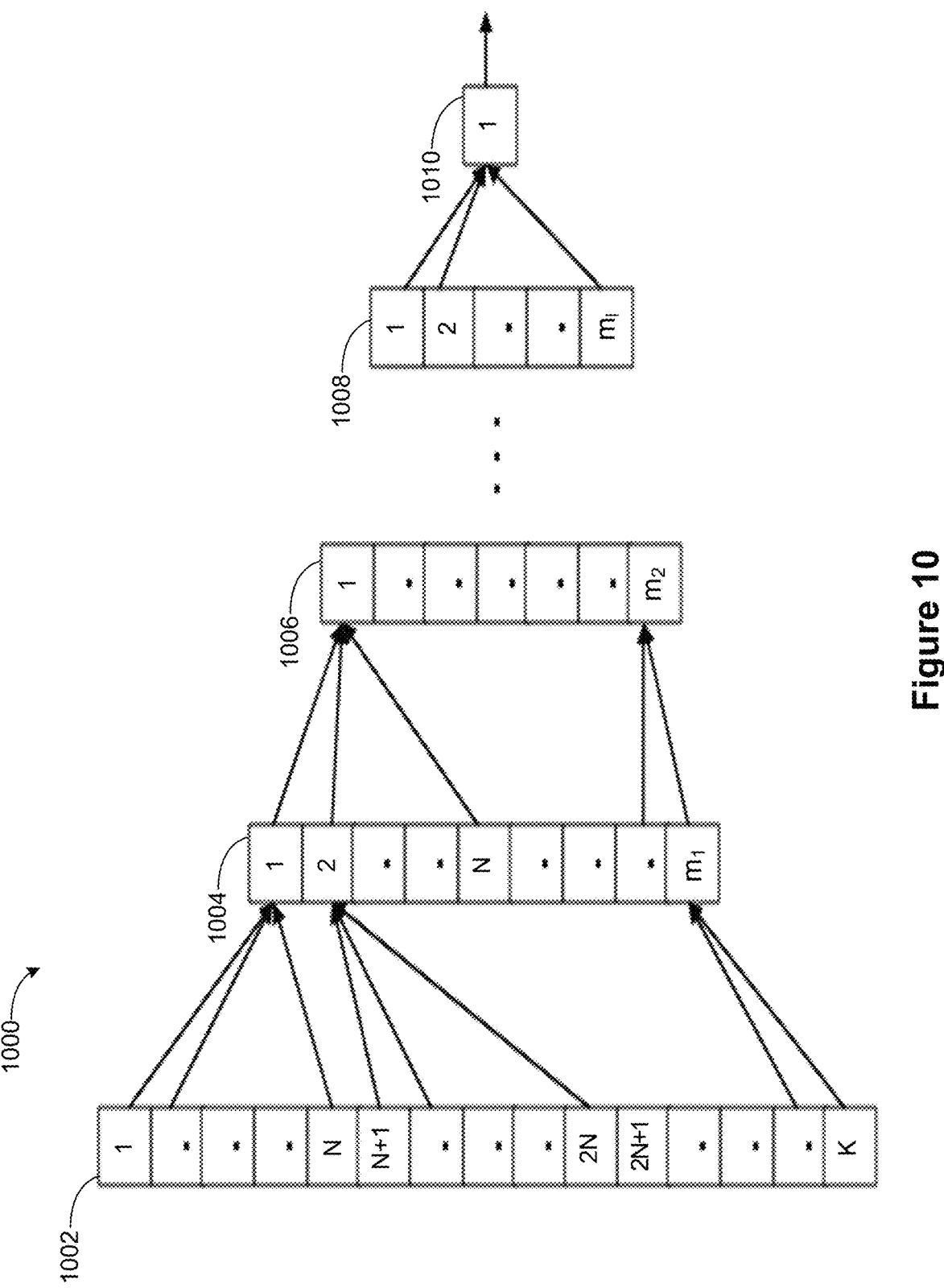
FIG. 10 shows an example of a transformed neural network, according to some implementations.

FIG. 10 shows an example of the constructed T-NN, according to some implementations. All layers except the first one perform identity transformation of their inputs. Weight matrices of the constructed T-NN have the following forms, according to some implementations.

Layer 1 (e.g., layer 1002):

$$W^1 = \begin{pmatrix} u_1 & u_2 & \ldots & u_N & 0 & 0 & \ldots & 0 & \ldots & \ldots & 0 \\ 0 & 0 & \ldots & 0 & u_{N+1} & u_{N+2} & \ldots & u_{2N} & 0 & \ldots & 0 \\ \ldots & \ldots & \ldots & \ldots & \ldots & \ldots & \ldots & \ldots & \ldots & \ldots & \ldots \\ 0 & 0 & & \ldots & \ldots & \ldots & \ldots & 0 & u_{(h-1)N+1} & \ldots & u_K \end{pmatrix}$$

Layers i=2, 3, . . . , h (e.g., layers 1004, 1006,1008, and 1010):

$$W^i = \begin{pmatrix} 1 & 1 & \ldots & 1 & 0 & 0 & \ldots & 0 & \ldots & \ldots & 0 \\ 0 & 0 & \ldots & 0 & 1 & 1 & \ldots & 1 & 0 & \ldots & 0 \\ \ldots & \ldots & \ldots & \ldots & \ldots & \ldots & \ldots & \ldots & \ldots & \ldots & \ldots \\ 0 & 0 & & \ldots & \ldots & \ldots & \ldots & 0 & 1 & \ldots & 1 \end{pmatrix}$$

Output value of the T-NN is calculated according the following formula:

$$y = F(W^m W^{m-1} \ldots W^2 W^1 x)$$

Output for the first layer is calculated as an output vector according to the following formula:

$$W^1 x = \left( \sum_{j=1}^{N} u_j x_j, \sum_{j=N+1}^{2N} u_j x_j, \ldots, \sum_{j=(m_1-1)*N+1}^{K} u_j x_j, \right)^T$$

Multiplying the obtained vector by the weight matrix of the second layer:

$$W^2 W^1 x = \left( \sum_{l=1}^{N} 1 \sum_{j=(l-1)*N+1}^{lN} u_j x_j, \sum_{l=N+1}^{2N} 1 \sum_{j=(l-1)*N+1}^{lN} u_j x_j, \ldots, \right.$$

$$\left. \sum_{l=(m_2-1)N+1}^{m_1} 1 \sum_{j=(l-1)*N+1}^{lN} u_j x_j \right)^T =$$

$$\left( \sum_{j=1}^{N^2} u_j x_j, \sum_{j=N^2+1}^{2N^2} u_j x_j, \ldots, \sum_{j=(m_2-1)*N+1}^{K} u_j x_j \right)^T$$

Every subsequent layer outputs a vector with components equal to linear combination of some sub-vector of x.
Finally, the T-NN's output is equal to:

$$y = F(W^m W^{m-1} \ldots W^2 W^1 x) = F\left( \sum_{j=1}^{K} u_j x_j \right)$$

This is the same value as the one calculated in SLP(K,1) for the same input vector x. So output values of SLP(K,1) and constructed T-NN are equal.

Single Layer Perceptron with Several Outputs
Suppose there is a single layer perceptron SLP(K, L) with K inputs and L output neurons, each neuron performing an activation function F. Suppose further U$\in$R$^{L \times K}$ is a weight matrix for SLP(K, L). The following algorithm Layer2TNN1 constructs a T-neural network from neurons TN(N, 1).
Algorithm Layer2TNN1
    1. For every output neuron i=1, . . . , L
        a. Apply the algorithm Neuron2TNN1 to SLP$_i$(K, 1) consisting on K inputs, 1 output neuron and weight vector U$_{ij}$, j=1, 2, . . . , K. A TNN$_i$ is constructed as a result.
    2. Construct PTNN by composing all TNN$_i$ into one neural net:
        a. Concatenate input vectors of all TNN$_i$, so the input of PTNN has L groups of K inputs, with each group being a copy of the SLP(K, L)'s input layer.
    Output of the PTNN is equal to the SLP(K, L)'s output for the same input vector because output of every pair SLP$_i$(K, 1) and TNN$_i$ are equal.
Multilayer Perceptron
Suppose a multilayer perceptron (MLP) includes K inputs, S layers and L$_i$ calculation neurons in i-th layer, represented as MLP(K, S, L$_1$, . . . L$_S$). Suppose U$_i \in$R$^{L_i \times L_{i-1}}$ is a weight matrix for the i-th layer.
The following is an example algorithm to construct a T-neural network from neurons TN(N, 1), according to some implementations.
Algorithm MLP2TNN1
    1. For every layer i=1, . . . , S
        a. Apply the algorithm Layer2TNN1 to SLP$_i$(L$_{i-1}$, L$_i$) consisting of L$_{i-1}$ inputs, L$_i$ output neurons, and a weight matrix U$_i$, constructing PTNN$_i$ as a result.
    2. Construct MTNN by stacking all PTNN$_i$ into one neural net; output of a TNN$_{i-1}$ is set as input for TNN$_i$.
    Output of the MTNN is equal to the MLP(K, S, L$_1$, . . . L$_S$)'s output for the same input vector because output of every pair SLP$_i$(L$_{i-1}$, L$_i$) and PTNN$_i$ are equal.

Example T-Transformations with Target Neurons with $N_I$ Inputs and $N_O$ Outputs In some implementations, the example transformations described herein are performed by the neural network transformation module 226 that transform trained neural networks 220, based on the mathematical formulations 230, the basic function blocks 232, the analog component models 234, and/or the analog design constraints 236, to obtain the transformed neural networks 228.

Example Transformation of Single Layer Perceptron with Several Outputs

Suppose a single layer perceptron SLP(K, L) includes K inputs and L output neurons, each neuron performing an activation function F. Suppose further $U \in R^{L \times K}$ is a weight matrix for SLP(K,L). The following algorithm constructs a T-neural network from neurons $TN(N_I, N_O)$, according to some implementations.

Algorithm Layer2TNNX

1. Construct a PTNN from SLP(K,L) by using the algorithm Layer2TNN1 (see description above). PTNN has an input layer consisting of L groups of K inputs.

2. Compose $$\left\lceil \frac{L}{N_o} \right\rceil$$

$\lceil L/N_O \rceil$ subsets from L groups. Each subset contains no more than $N_O$ groups of input vector copies.

3. Replace groups in every subset with one copy of input vector.

4. Construct PTNNX by rebuild connections in every subset by making $N_O$ output connections from every input neuron.

According to some implementations, output of the PTNNX is calculated by means of the same formulas as for PTNN (described above), so the outputs are equal.

Figures 11A, 11B, 11C:
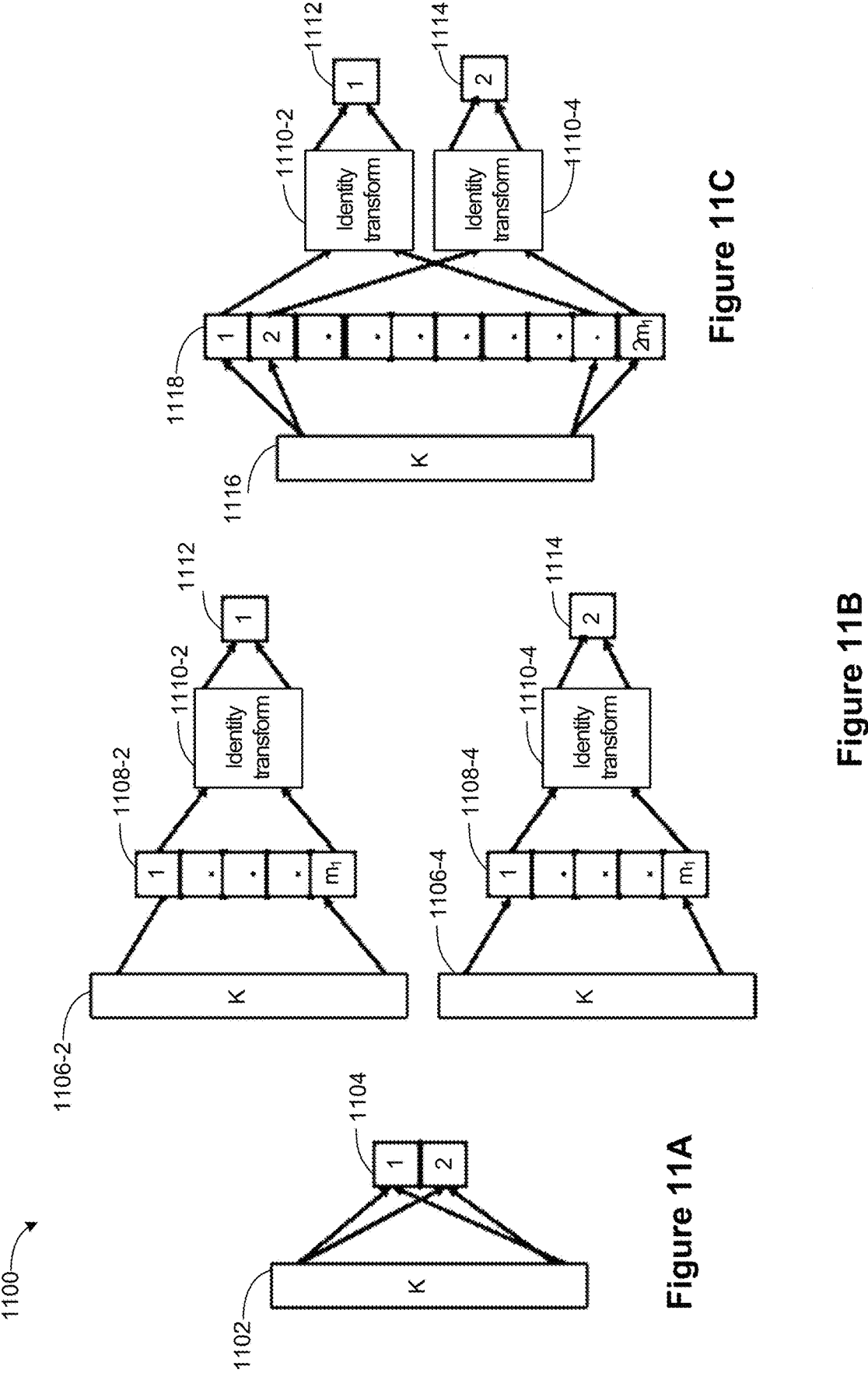
FIGS. 11A-11C show an application of a T-transformation algorithm for a single layer neural network, according to some implementations.

FIGS. 11A-11C show an application 1100 of the above algorithm for a single layer neural network (NN) with 2 output neurons and $TN(N_I, 2)$, according to some implementations. FIG. 11A shows an example source or input NN, according to some implementations. K inputs are input to two neurons 1 and 2 belonging to a layer 1104. FIG. 11B shows a PTNN constructed after the first step of the algorithm, according to some implementations. The PTNN consists of two parts implementing subnets corresponding to the output neuron 1 and neuron 2 of the NN shown in FIG. 11A. In FIG. 11B, the input 1102 is replicated and input to two sets of input neurons 1106-2 and 1106-4. Each set of input neurons is connected to a subsequent layer of neurons with two sets of neurons 1108-2 and 1108-4, each set of neurons including $m_I$ neurons. The input layer is followed by identity transform blocks 1110-2 and 1110-4, each block containing one or more layers with identity weight matrix. The output of the identity transform block 1110-2 is connected to the output neuron 1112 (corresponding to the output neuron 1 in FIG. 11A), and the output of the identity transform block 1110-4 is connected to the output neuron 1114 (corresponding to the output neuron 1 in FIG. 11A). FIG. 11C shows application of the final steps of the algorithm, including replacing two copies of the input vector (1106-2 and 1106-4) with one vector 1116 (step 3), and rebuilding connections in the first layer 1118 by making two output links from every input neuron: one link connects to subnet related to output 1 and another link connects to subnet for the output 2.

Example Transformation of Multilayer Perceptron

Suppose a multilayer perceptron (MLP) includes K inputs, S layers and $L_i$ calculation neurons in $i^{th}$ layer, represented as MLP(K, S, $L_1$, . . . $L_S$). Suppose $U_i \in R^{L_i \times L_{i-1}}$ is a weight matrix for i-th layer. The following example algorithm constructs a T-neural network from neurons $TN(N_U, N_O)$, according to some implementations.

Algorithm MLP2TNNX

1. For every layer i=1, . . . , S:

a. Apply the algorithm Layer2TNNX to $SLP_i(L_{i-1}, L_i)$ consisting on $L_{i-1}$ inputs, $L_i$ output neuron and weight matrix $U_i$. $PTNNX_i$ is constructed as a result.

2. Construct MTNNX by stacking all $PTNNX_i$ into one neural net:

a. Output of a $TNNX_{i-1}$ is set as input for $TNNX_i$.

According to some implementations. output of the MTNNX is equal to the MLP(K, S, $L_1$, . . . $L_S$)'s output for the same input vector, because output of every pair $SLP_i$ ($L_{i-1}$, $L_i$) and $PTNNX_i$ are equal.

Example Transformation of Recurrent Neural Network

A Recurrent Neural Network (RNN) contains backward connection allowing saving information. FIG. 12 shows an example RNN 1200, according to some implementations. The example shows a block 1204 performing an activation function A, that accepts an input $X_t$ 1206 and performs an activation function A, and outputs a value $h_t$ 1202. The backward arrow from the block 1204 to itself indicates a backward connection, according to some implementations. An equivalent network is shown on the right up to the point in time when the activation block receives the input $X_t$ 1206. At time 0, the network accepts input $X_t$ 1208 and performs the activation function A 1204, and outputs a value $h_o$ 1210; at time 1, the network accepts input $X_1$ 1212 and the output of the network at time 0, and performs the activation function A 1204, and outputs a value $h_1$ 1214; at time 2, the network accepts input $X_2$ 1216 and the output of the network at time 1, and performs the activation function A 1204, and outputs a value $h_1$ 1218. This process continues until time t, at which time the network accepts the input $X_t$ 1206 and the output of the network at time t−1, and performs the activation function A 1204, and outputs the value $h_t$ 1202, according to some implementations.

Data processing in an RNN is performed by means of the following formula:

$$h_t = f\left(W^{(hh)}h_{t-1} + W^{(hx)}x_t\right)$$

In the equation above, $x_t$ is a current input vector, and $h_{t-1}$ is the RNN's output for the previous input vector $x_{t-1}$. This expression consists of the several operations: calculation of linear combination for two fully connected layers $W^{(hh)}h_{t-1}$ and $W^{(hx)}x_t$, element-wise addition, and non-linear function calculation (f). The first and third operations can be implemented by trapezium-based network (one fully connected layer is implemented by pyramid-based network, a special case of trapezium networks). The second operation is a common operation that can be implemented in networks of any structure.

In some implementations, the RNN's layer without recurrent connections is transformed by means of Layer2TNNX algorithm described above. After transformation is completed, recurrent links are added between related neurons. Some implementations use delay blocks described below in reference to FIG. 13B.

Example Transformation of LSTM Network

A Long Short-Term Memory (LSTM) neural network is a special case of a RNN. A LSTM network's operations are represented by the following equations:

$$\bullet\ f_t = \sigma(W_f[h_{t-1}, x_t] + b_f);$$

$$\bullet\ i_t = \sigma(W_i[h_{t-1}, x_t] + b_i);$$

$$\bullet\ D_t = \tanh(W_D[h_{t-1}, x_t] + b_D);$$

$$\bullet\ C_t = (f_t \times C_{t-1} + i_t \times D_t);$$

$$\bullet\ o_t = \sigma(W_o[h_{t-1}, x_t] + b_o);\ \text{and}$$

$$\bullet\ h_t = o_t \times \tanh(C_t).$$

In the equations above, $W_f$, $W_i$, $W_D$, and $W_O$ are trainable weight matrices, $b_f$, $b_i$, $b_D$, and $b_O$ are trainable biases, $x_t$ is a current input vector, $h_{t-1}$ is an internal state of the LSTM calculated for the previous input vector $x_{t-1}$, and $o_t$ is output for the current input vector. In the equations, the subscript t denotes a time instance t, and the subscript t−1 denotes a time instance t−1.

Figure 13A:
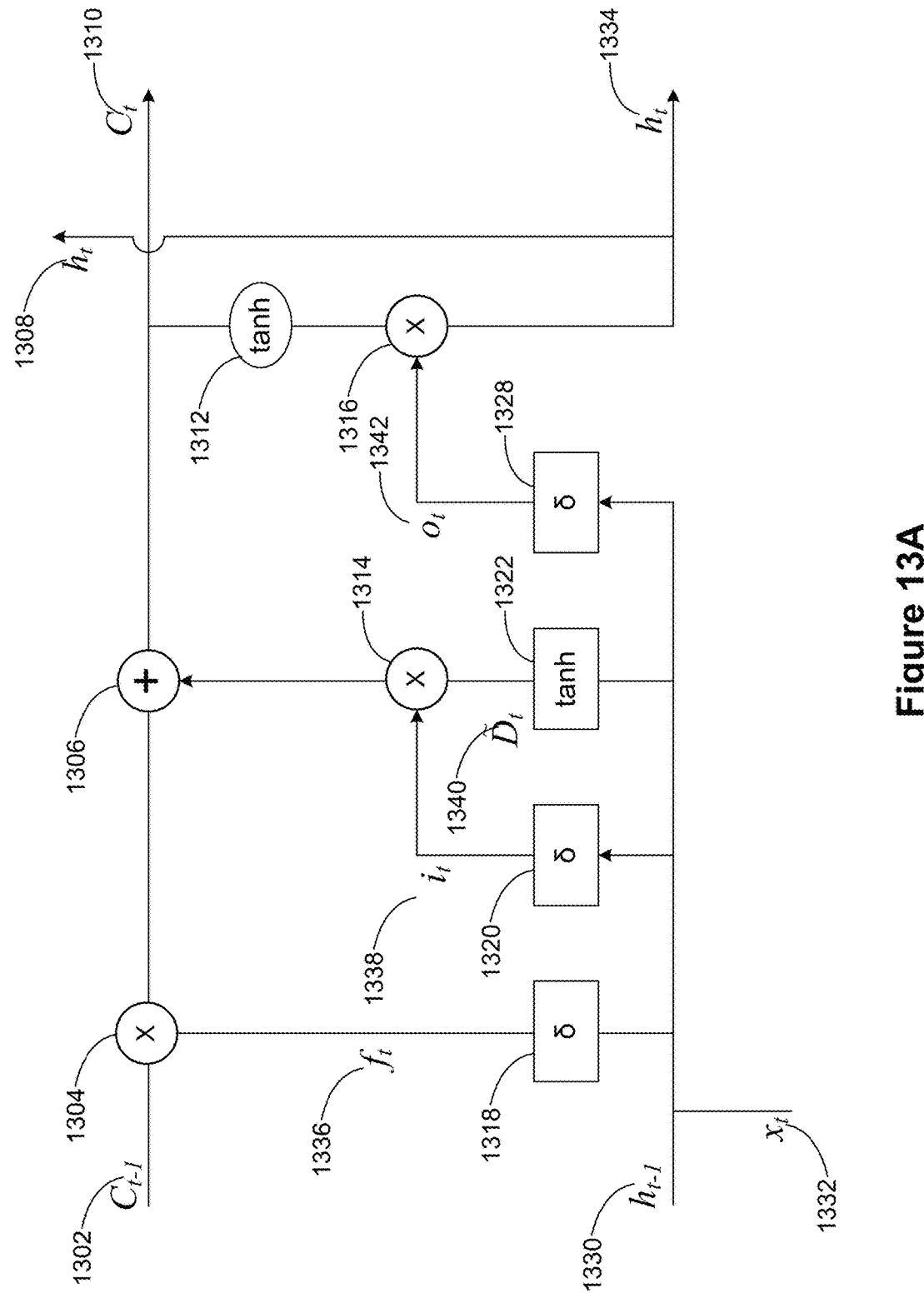
FIG. 13A is a block diagram of a LSTM neuron, according to some implementations.

FIG. 13A is a block diagram of a LSTM neuron 1300, according to some implementations. A sigmoid (a) block 1318 processes the inputs $h_{t-1}$ 1330 and $x_t$ 1332, and produces the output $f_t$ 1336. A second sigmoid (σ) block 1320 processes the inputs $h_{t-1}$ 1330 and $x_t$ 1332, and produces the output $i_t$ 1338. A hyperbolic tangent (tanh) block 1322 processes the inputs $h_{t-1}$ 1330 and $x_t$ 1332, and produces the output $D_t$ 1340. A third sigmoid (a) block 1328 processes the inputs $h_{t-1}$ 1330 and $x_t$ 1332, and produces the output $O_t$ 1342. A multiplier block 1304 processes $f_t$ 1336 and the output of a summing block 1306 (from a prior time instance) $C_{t-1}$ 1302 to produce an output that is in turn summed by the summing block 1306 along with the output of a second multiplier block 1314 that multiplies the outputs $i_t$ 1338 and $D_t$ 1340 to produce the output $C_t$ 1310. The output $C_t$ 1310 is input to another tanh block 1312 that produces an output that is multiplied a third multiplier block 1316 with the output $O_t$ 1342 to produce the output $h_t$ 1334.

There are several types of operations utilized in these expressions: (i) calculation of linear combination for several fully connected layers, (ii) elementwise addition, (iii) Hadamard product, and (iv) non-linear function calculation (e.g., sigmoid (a) and hyperbolic tangent (tanh)). Some implementations implement the (i) and (iv) operations by a trapezium-based network (one fully connected layer is implemented by a pyramid-based network, a special case of trapezium networks). Some implementations use networks of various structures for the (ii) and (iii) operations which are common operations.

The layer in an LSTM layer without recurrent connections is transformed by using the Layer2TNNX algorithm described above, according to some implementations. After transformation is completed, recurrent links are added between related neurons, according to some implementations.

Figure 13B:
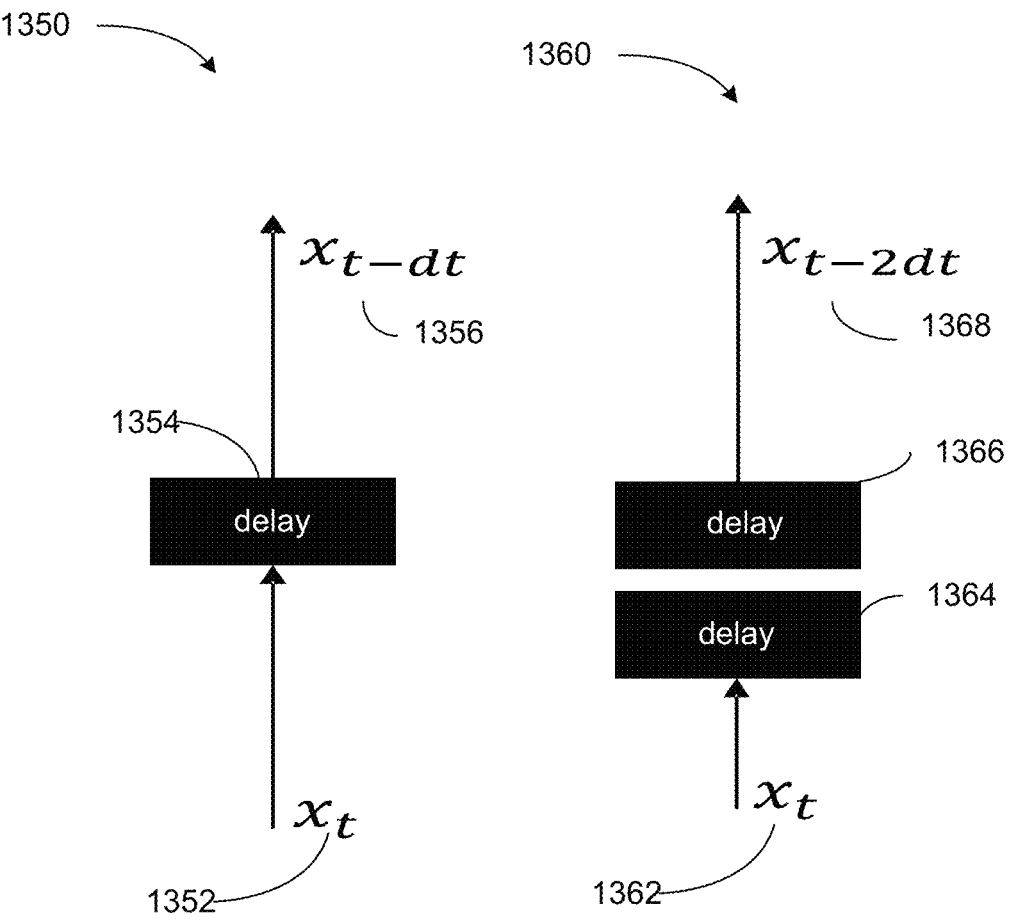
FIG. 13B shows delay blocks, according to some implementations.

FIG. 13B shows delay blocks, according to some implementations. As described above, some of the expressions in the equations for the LSTM operations depend on saving, restoring, and/or recalling an output from a previous time instance. For example, the multiplier block 1304 processes the output of the summing block 1306 (from a prior time instance) $C_{t-1}$ 1302. FIG. 13B shows two examples of delay blocks, according to some implementations. The example 1350 includes a delay block 1354 on the left accepts input $x_t$ 1352 at time t, and outputs the input after a delay of dt indicated by the output $x_{t-dt}$ 1356. The example 1360 on the right shows cascaded (or multiple) delay blocks 1364 and 1366 outputs the input $x_t$ 1362 after 2 units of time delays, indicated by the output $x_{t-2dt}$ 1368, according to some implementations.

Figure 13C:
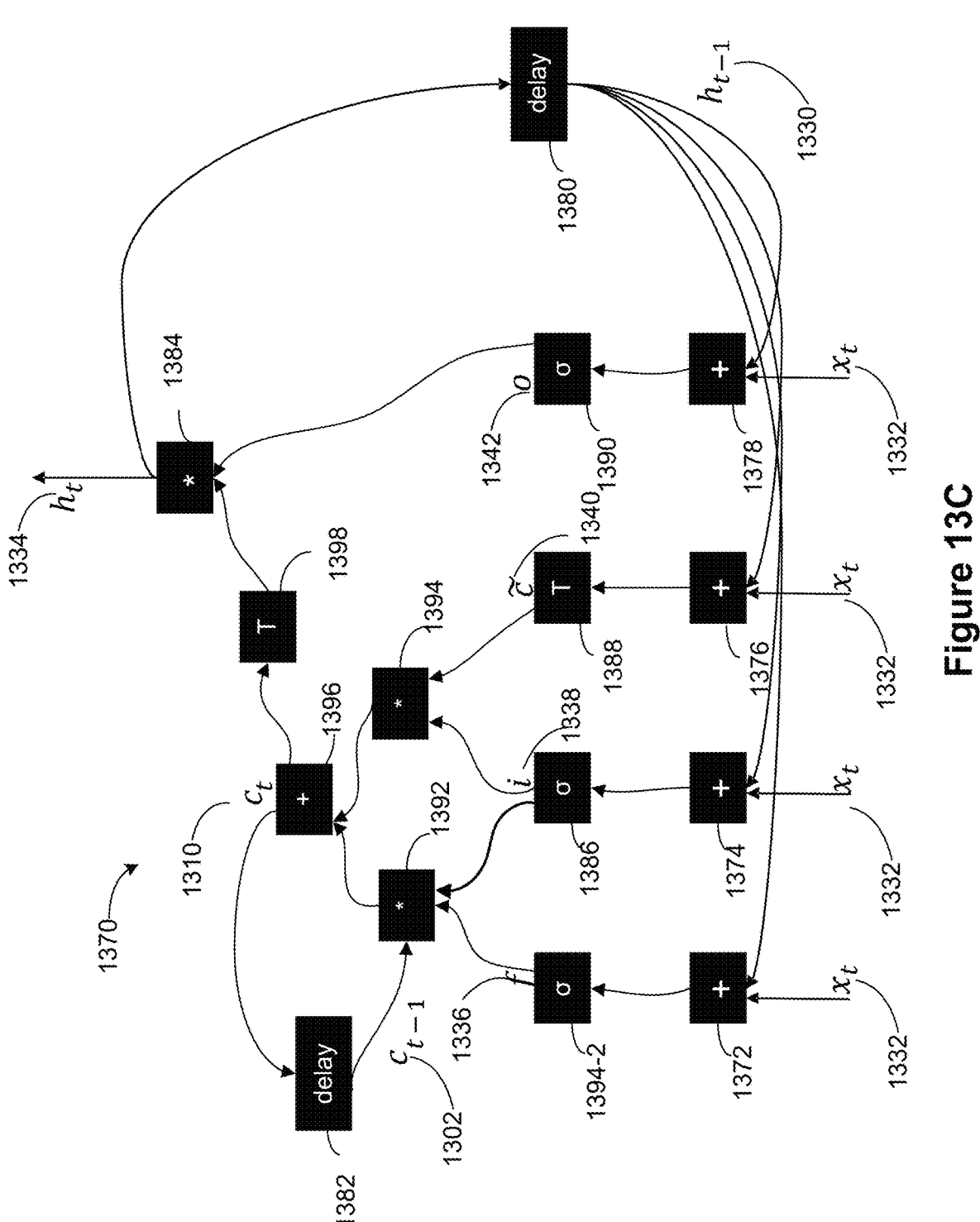
FIG. 13C is a neuron schema for a LSTM neuron, according to some implementations.

FIG. 13C is a neuron schema for a LSTM neuron, according to some implementations. The schema includes weighted summator nodes (sometimes called adder blocks) 1372, 1374, 1376, 1378, and 1396, multiplier blocks 1384, 1392, and 1394, and delay blocks 1380 and 1382. The input $x_t$ 1332 is connected to the adder blocks 1372, 1374, 1376, and 1378. The output $h_{t-1}$ 1330 for a prior input $x_{t-1}$ is also input to the adder blocks 1372, 1374, 1376, and 1378. The adder block 1372 produces an output that is input to a sigmoid block 1394-2 that produces the output $f_t$ 1336. Similarly, the adder block 1374 produces an output that is input to the sigmoid block 1386 that produces the output $i_t$ 1338. Similarly, the adder block 1376 produces an output that is input to a hyperbolic tangent block 1388 that produces the output $D_t$ 1340. Similarly, the adder block 1378 produces an output that is input to the sigmoid block 1390 that produces the output $O_t$ 1342. The multiplier block 1392 uses the outputs $i_t$ 1338, $f_t$ 1336, and output of the adder block 1396 from a prior time instance $C_{t-1}$ 1302 to produce a first output. The multiplier block 1394 uses the outputs $i_t$ 1338 and $D_t$ 1340 to produce a second output. The adder block 1396 sums the first output and second output to produce the output $C_t$ 1310. The output $C_t$ 1310 is input to a hyperbolic tangent block 1398 that produces an output that is input, along with the output of the sigmoid block 1390, $O_t$ 1342, to the multiplier block 1384 to produce the output $h_t$ 1334. The delay block 1382 is used to recall (e.g., save and restore) the output of the adder block 1396 from a prior time instance. Similarly, the delay block 1380 is used to recall or save and restore the output of the multiplier block 1384 for a prior input $x_{t-1}$ (e.g., from a prior time instance). Examples of delay blocks are described above in reference to FIG. 13B, according to some implementations.

Example Transformation of GRU Networks

A Gated Recurrent Unit) (GRU) neural network is a special case of RNN. A RNN's operations are represented by the following expressions:

$$z_t = \sigma(W_z x_t + U_z h_{t-1});$$

$$r_t = \sigma(W_r x_t + U_r h_{t-1});$$

$$j_t = \tanh(W x_t + r_t \times U h_{t-1});$$

$$h_t = z_t \times h_{t-1} + (1 - z_t) \times j_t).$$

In the equations above, $x_t$ is a current input vector, and $h_{t-1}$ is an output calculated for the previous input vector $x_{t-1}$.

Figure 14A:
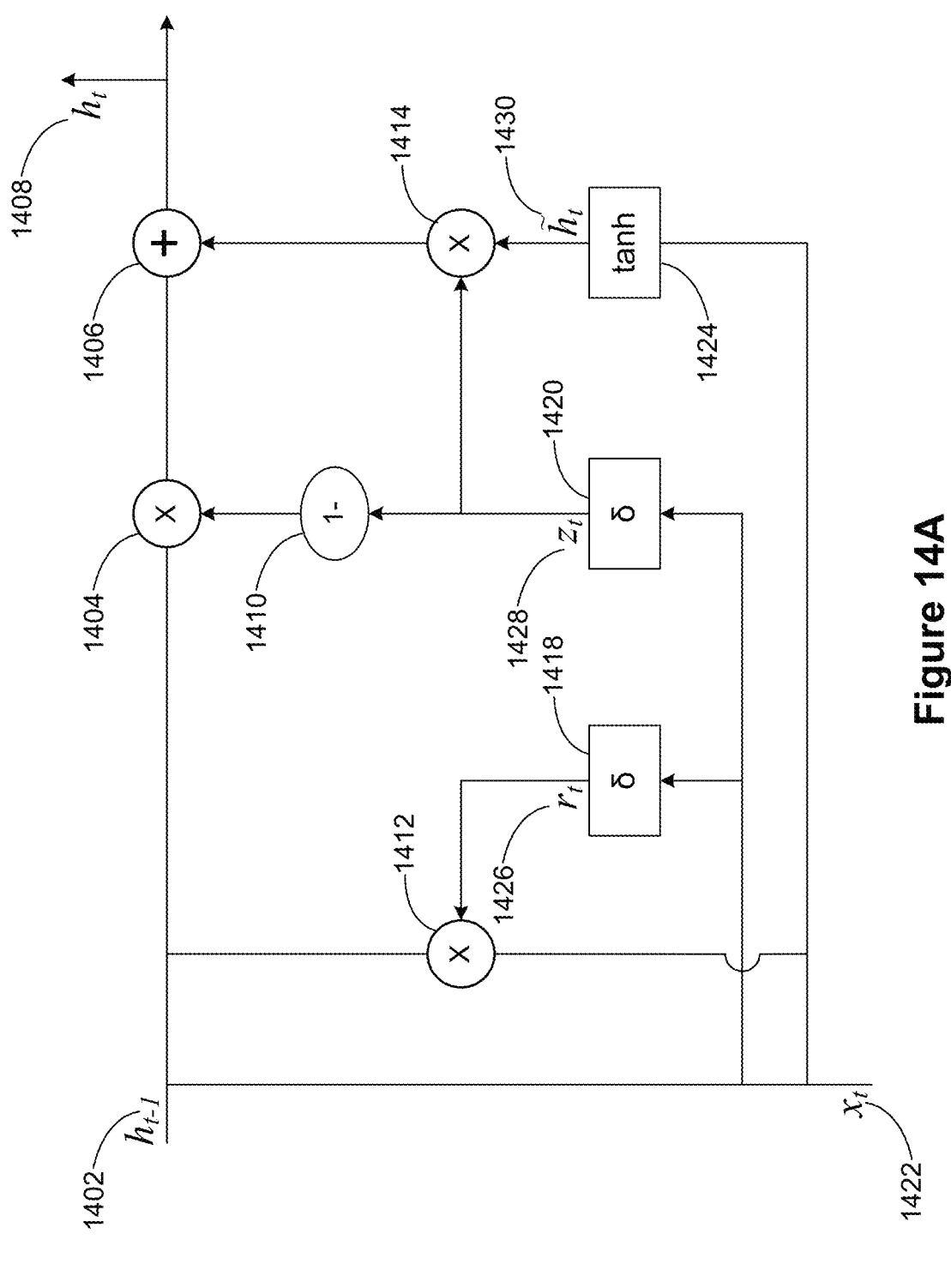
FIG. 14A is a block diagram of a GRU neuron, according to some implementations.

FIG. 14A is a block diagram of a GRU neuron, according to some implementations. A sigmoid (σ) block 1418 processes the inputs $h_{t-1}$ 1402 and $x_t$ 1422, and produces the output $r_t$ 1426. A second sigmoid (σ) block 1420 processes the inputs $h_{t-1}$ 1402 and $x_t$ 1422, and produces the output $z_t$ 1428. A multiplier block 1412 multiplies the output $r_t$ 1426 and the input $h_{t-1}$ 1402 to produce and output that is input (along with the input $x_t$ 1422) to a hyperbolic tangent (tanh) block 1424 to produce the output $j_t$ 1430. A second multiplier block 1414 multiplies the output $j_t$ 1430 and the output $z_t$ 1428 to produce a first output. The block 1410 computes 1—the output $z_t$ 1428 to produce an output that is input to a third multiplier block 1404 that multiplies the output and the input $h_{t-1}$ 1402 to produce a product that is input to an adder block 1406 along with the first output (from the multiplier block 1414) to produce the output $h_t$ 1408. The input $h_{t-1}$ 1402 is the output of the GRU neuron from a prior time interval output t−1.

Figure 14B:
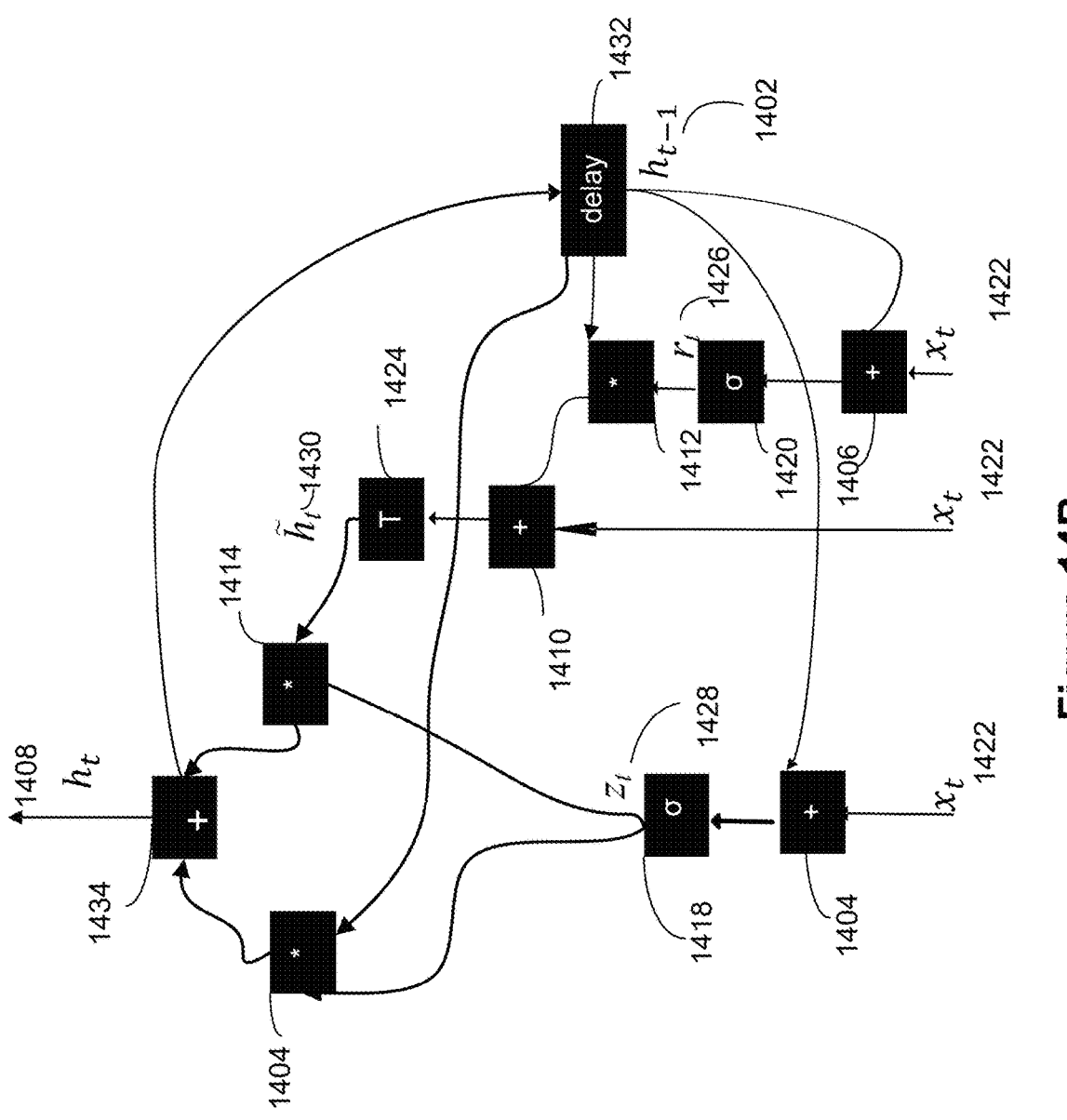
FIG. 14B is a neuron schema for a GRU neuron, according to some implementations.

FIG. 14B is a neuron schema for a GRU neuron 1440, according to some implementations. The schema includes weighted summator nodes (sometimes called adder blocks) 1404, 1406, 1410, 1406, and 1434, multiplier blocks 1404, 1412, and 1414, and delay block 1432. The input $x_t$ 1422 is connected to the adder blocks 1404, 1410, and 1406. The output $h_{t-1}$ 1402 for a prior input $x_{t-1}$ is also input to the adder blocks 1404 and 1406, and the multiplier blocks 1404 and 1412. The adder block 1404 produces an output that is input to a sigmoid block 1418 that produces the output $Z_t$ 1428. Similarly, the adder block 1406 produces an output that is input to the sigmoid block 1420 that produces the output $r_t$ 1426 that is input to the multiplier block 1412. The output of the multiplier block 1412 is input to the adder block 1410 whose output is input to a hyperbolic tangent block 1424 that produces an output 1430. The output 1430 as well as the output of the sigmoid block 1418 are input to the multiplier block 1414. The output of the sigmoid block 1418 is input to the multiplier block 1404 that multiplies that output with the input from the delay block 1432 to produce a first output. The multiplier block produces a second output. The adder block 1434 sums the first output and the second output to produce the output $h_t$ 1408. The delay block 1432 is used to recall (e.g., save and restore) the output of the adder block 1434 from a prior time instance. Examples of delay blocks are described above in reference to FIG. 13B, according to some implementations.

Operation types used in GRU are the same as the operation types for LSTM networks (described above), so GRU is transformed to trapezium-based networks following the principles described above for LSTM (e.g., using the Layer2TNNX algorithm), according to some implementations.

Example Transformation of Convolutional Neural Network

In general, Convolutional Neural Networks (CNN) include several basic operations, such as convolution (a set of linear combinations of image's (or internal map's) fragments with a kernel), activation function, and pooling (e.g., max, mean, etc.). Every calculation neuron in a CNN follows the general processing scheme of a neuron in an MLP: linear combination of some inputs with subsequent calculation of activation function. So a CNN is transformed using the MLP2TNNX algorithm described above for multilayer perceptrons, according to some implementations.

Figures 15A, 15B:
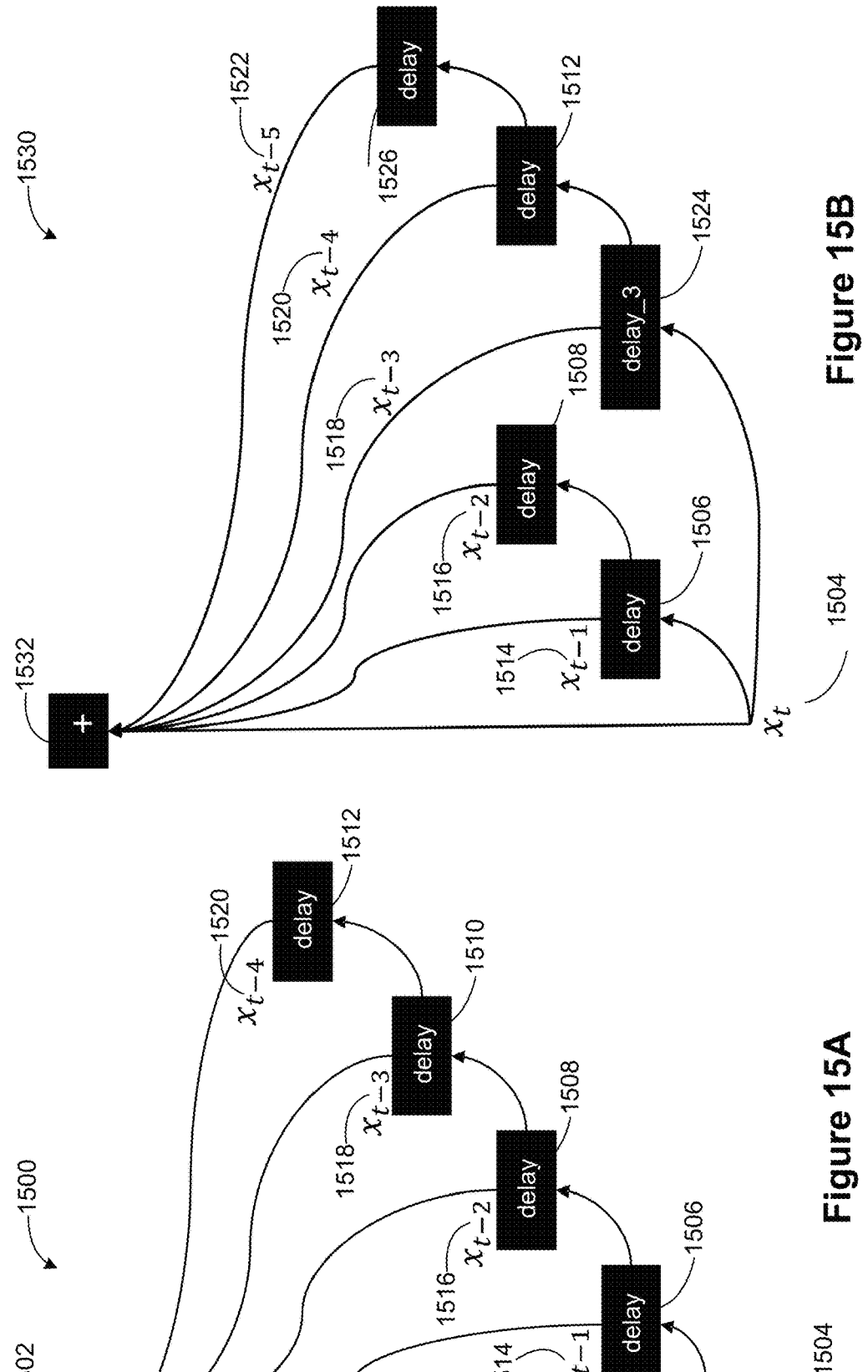
FIGS. 15A and 15B are neuron schema of variants of a single Conv1D filter, according to some implementations.

Conv1D is a convolution performed over time coordinate. FIGS. 15A and 15B are neuron schema of variants of a single Conv1D filter, according to some implementations. In FIG. 15A, a weighted summator node 1502 (sometimes called adder block, marked '+') has 5 inputs, so it corresponds to 1Dconvolution with a kernel of 5. The inputs are $x_t$ 1504 from time t, $x_{t-1}$ 1514 from time t−1 (obtained by inputting the input to a delay block 1506), $x_{t-2}$ 1516 from time t−2 (obtained by inputting the output of the delay block 1506 to another delay block 1508), $x_{t-3}$ 1518 from time t−3 (obtained by inputting the output of the delay block 1508 to another delay block 1510), and $x_{t-4}$ 1520 from time t−4 (obtained by inputting the output of the delay block 1510 to another delay block 1512. For large kernels, it is sometimes beneficial to utilize different frequency delay blocks, so that some of the blocks produce bigger delays. Some implementations substitute several small delay blocks for one large delay block, as shown in FIG. 15B. In addition to the delay blocks in FIG. 15A, the example uses a delay_3 block 1524 that produces $x_{t-3}$ 1518 from time t−3, and another delay block 1526 that produces the $x_{t-5}$ 1522 from time t−5. The delay_3 1524 block is an example of multiple delay blocks, according to some implementations. This operation does not decrease total number of blocks, but it may decrease total number of consequent operations performed over the input signal and reduce accumulation of errors, according to some implementations.

In some implementations, convolutional layers are represented by trapezia-like neurons and fully connected layer is represented by cross-bar of resistors. Some implementations use cross-bars, and calculate resistance matrix for the cross-bars.

Example Approximation Algorithm for Single Layer Perceptron with Multiple Outputs In some implementations, the example transformations described herein are performed by the neural network transformation module 226 that transform trained neural networks 220, and/or the analog neural network optimization module 246, based on the mathematical formulations 230, the basic function blocks 232, the analog component models 234, and/or the analog design constraints 236, to obtain the transformed neural networks 228.

Suppose a single layer perceptron SLP(K, L) includes K inputs and L output neurons, each output neuron performing an activation function F. Suppose further that $U \in R^{L \times K}$ is a weight matrix for SLP(K, L). The following is an example for constructing a T-neural network from neurons TN($N_f$, $N_O$) using an approximation algorithm Layer2TNNX_Approx, according to some implementations. The algorithm applies Layer2TNN1 algorithm (described above) at the first stage in order to decrease a number of neurons and connections, and subsequently applies Layer2TNNX to process the input of the decreased size. The outputs of the resulted neural net are calculated using shared weights of the layers constructed by the Layer2TNN1 algorithm. The number of these layers is determined by the value p, a parameter of the algorithm. If p is equal to 0 then Layer2TNNX algorithm is applied only and the transformation is equivalent. If p>0, then p layers have shared weights and the transformation is approximate.

Algorithm Layer2TNNX_Approx

1. Set the parameter p with a value from the set $\{0, 1, \ldots, \lceil \log_{N_f} K \rceil - 1\}$.

2. If p>0 apply the algorithm Layer2TNN1 with neuron TN($N_f$, 1) to the net SLP(K, L) and construct first p layers of the resulted subnet (PNN). The net PNN has $$N_p = \left\lceil \frac{K}{N_f^p} \right\rceil$$

neurons in the output layer.

3. Apply the algorithm Layer2TNNX with a neuron TN($N_f$, $N_O$) and construct a neural subnet TNN with $N_p$ inputs and L outputs.

4. Set the weights of the PNN net. The weights of every neuron i of the first layer of the PNN are set according to the rule $$w_{ik_i}^{(1)} = C.$$

Here, C is any constant not equal to zero, $k_i=(i-1)N_f+1$, and $$w_{ij}^{(1)} = \frac{1}{L}\sum_{i=1}^{L}\frac{U_{lj}}{U_{ik_i}}C,$$

for all weights j of this neuron except $k_i$. All other weights of the PNN net are set to 1.

$$w_{ik_i}^{(1)}$$

represents a weight for the first layer (as denoted by the superscript (1)) for the connection between the neuron i and the neuron $k_i$ in the first layer.

5. Set the weights of the TNN subnet. The weights of every neuron i of the first layer of the TNN (considering the whole net this is (p+1)th layer) are set according to the equation $$w_{ik_i}^{(p+1)} = \frac{U_{ik_i}}{C}.$$

All other weights of the TNN are set to 1.

6. Set activation functions for all neurons of the last layer of the TNN subnet as F. Activation functions of all other neurons are identity.

Figure 16:
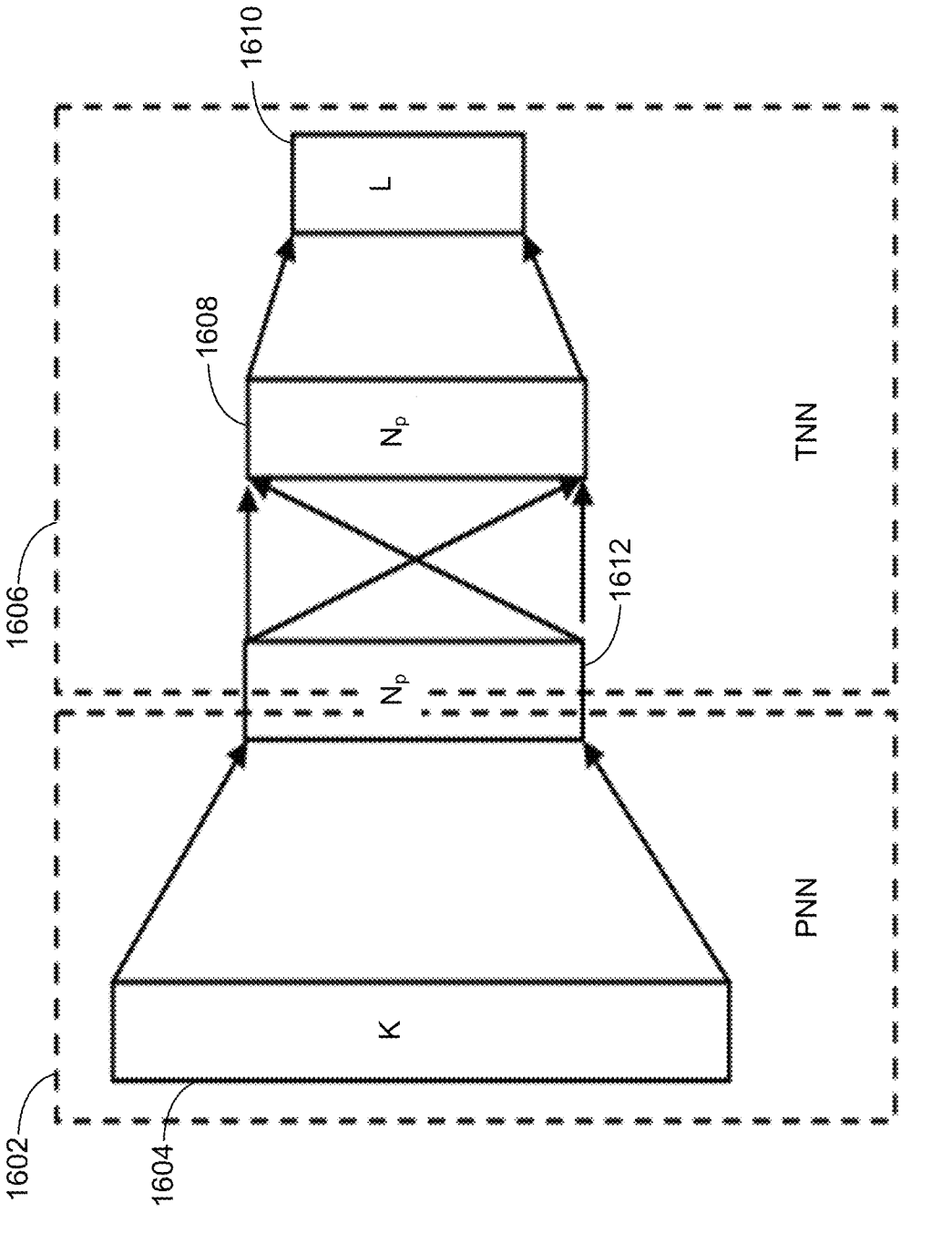
FIG. 16 shows an example architecture of a transformed neural network, according to some implementations.

FIG. 16 shows an example architecture 1600 of the resulting neural net, according to some implementations. The example includes a PNN 1602 connected to a TNN 1606. The PNN 1602 includes a layer for K inputs and produce $N_p$ outputs, that is connected as input 1612 to the TNN 1606. The TNN 1606 generates L outputs 1610, according to some implementations.

Approximation Algorithm for Multilayer Perceptron with Several Outputs

Suppose a multilayer perceptron (MLP) includes K inputs, S layers and $L_i$ calculation neurons in i-th layer, represented as MLP(K, S, $L_1$, . . . $L_S$). Suppose further $U_i \in R^{L_i \times L_{i-1}}$ is a weight matrix for the i-th layer. The following example algorithm constructs a T-neural network from neurons TN($N_I$, $N_O$), according to some implementations. Algorithm MLP2TNNX_Approx 1. For every layer i=1, . . . , S:
        a. Apply the algorithm Layer2TNNX_Approx (described above) to $SLP_i(L_{i-1}, L_i)$ consisting of $L_{i-1}$ inputs, $L_i$ output neuron, and weight matrix $U_i$. If i=1, then $L_0=K$. Suppose this step constructs $PTNNX_i$ as a result.
    2. Construct a MTNNX (a multilayer perceptron) by stacking all $PTNNX_i$ into one neural net, where output of a $TNNX_{i-1}$ is set as input for $TNNX_i$.

Example Methods of Compression of Transformed Neural Networks

In some implementations, the example transformations described herein are performed by the neural network transformation module 226 that transform trained neural networks 220, and/or the analog neural network optimization module 246, based on the mathematical formulations 230, the basic function blocks 232, the analog component models 234, and/or the analog design constraints 236, to obtain the transformed neural networks 228.

This section describes example methods of compression of transformed neural networks, according to some implementations. Some implementations compress analog pyramid-like neural networks in order to minimize the number of operational amplifiers and resistors, necessary to realize the analog network on chip. In some implementations, the method of compression of analog neural networks is pruning, similar to pruning in software neural networks. There is nevertheless some peculiarities in compression of pyramid-like analog networks, which are realizable as IC analog chip in hardware. Since the number of elements, such as operational amplifiers and resistors, define the weights in analog based neural networks, it is crucial to minimize the number of operational amplifiers and resistors to be placed on chip. This will also help minimize the power consumption of the chip. Modern neural networks, such as convolutional neural networks, can be compressed 5-200 times without significant loss of the accuracy of the networks. Often, whole blocks in modern neural networks can be pruned without significant loss of accuracy. The transformation of dense neural networks into sparsely connected pyramid or trapezia or cross-bar like neural networks presents opportunities to prune the sparsely connected pyramid or trapezia-like analog networks, which are then represented by operational amplifiers and resistors in analog IC chips. In some implementations, such techniques are applied in addition to conventional neural network compression techniques. In some implementations, the compression techniques are applied based on the specific architecture of the input neural network and/or the transformed neural networks (e.g., pyramids versus trapezia versus cross-bars).

For example, since the networks are realized by means of analog elements, such as operational amplifiers, some implementations determine the current which flows through the operational amplifier when the standard training dataset is presented, and thereby determine if a knot (an operational amplifier) is needed for the whole chip or not. Some implementations analyze the SPICE model of the chip and determine the knots and connections, where no current is flowing and no power is consumed. Some implementations determine the current flow through the analog IC network and thus determine the knots and connections, which are then pruned. Besides, some implementations also remove the connections if the weight of connection is too high, and/or substitute resistor to direct connector if the weight of connection is too low. Some implementations prune the knot if all connections leading to this knot have weights that are lower than a predetermined threshold (e.g., close to 0), deleting the connections where an operational amplifier always provides zero at output, and/or changing an operational amplifier to a linear junction if the amplifier gives linear function without amplification.

Some implementations apply compression techniques specific to pyramid, trapezia, or cross-bar types of neural networks. Some implementations generate pyramids or trapezia with larger amount of inputs (than without the compression), thus minimizing the number of layers in pyramid or trapezia. Some implementations generate a more compact trapezia network by maximizing the number of outputs of each neuron.

Example Generation of Optimal Resistor Set

In some implementations, the example computations described herein are performed by the weight matrix computation or weight quantization module 238 (e.g., using the resistance calculation module 240) that compute the weights 272 for connections of the transformed neural networks, and/or corresponding resistance values 242 for the weights 272.

This section describes an example of generating an optimal resistor set for a trained neural network, according to some implementations. An example method is provided for converting connection weights to resistor nominals for implementing the neural network (sometimes called a NN model) on a microchip with possibly less resistor nominals and possibly higher allowed resistor variance.

Suppose a test set 'Test' includes around 10,000 values of input vector (x and y coordinates) with both coordinates varying in the range [0;1], with a step of 0.01. Suppose network NN output for given input X is given by Out=NN (X). Suppose further that input value class is found as follows: Class_nn(X)=NN(X)>0.61?1:0.

The following compares a mathematical network model M with a schematic network model S. The schematic network model includes possible resistor variance of rv and processes the 'Test' set, each time producing a different vector of output values S(Test)=Out_s. Output error is defined by the following equation:

$$Err_{out} = \text{Mean} \left( \sum_{i=1}^{N} \frac{|S(X_i) - M(X_i)|}{N} \right)$$

Classification error is defined by the following equation:

$$Err_{class} = \text{Mean} \left( \sum_{i=1}^{N} \frac{\text{Class\_s}(X_i) \neq \text{Class\_m}(X_i)}{N} \right)$$

Some implementations set the desired classification error as no more than 1%.

Example Error Analysis

Figure 17A:
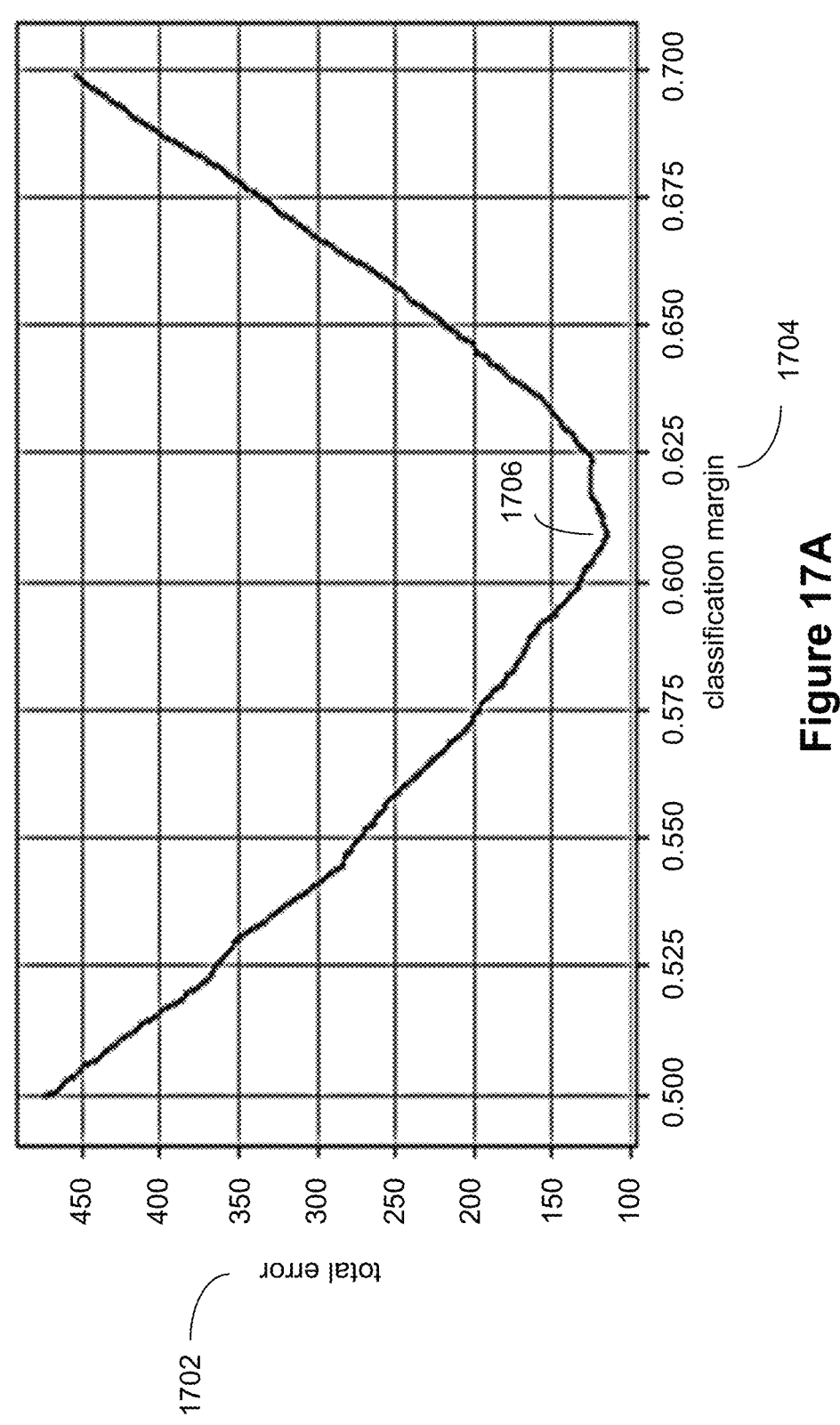
FIG. 17A shows an example chart illustrating dependency between output error and classification error, according to some implementations.
Figure 17B:
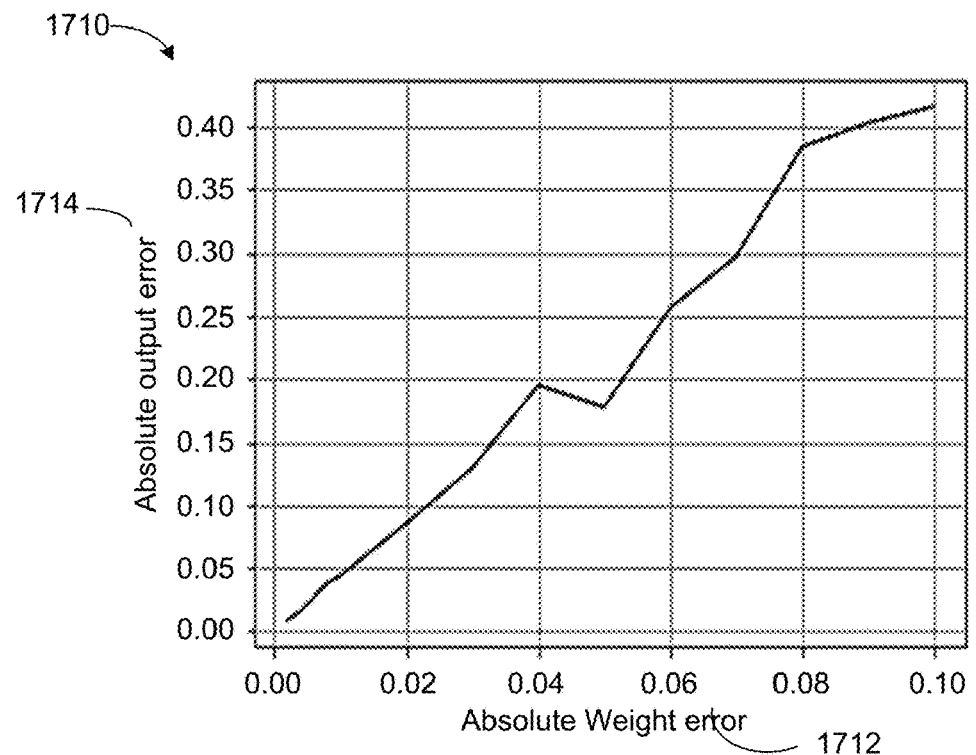
FIGS. 17B and 17C illustrate the dependency between Absolute Weight error and Absolute Output error for various samples, according to some implementations.
Figure 17C:
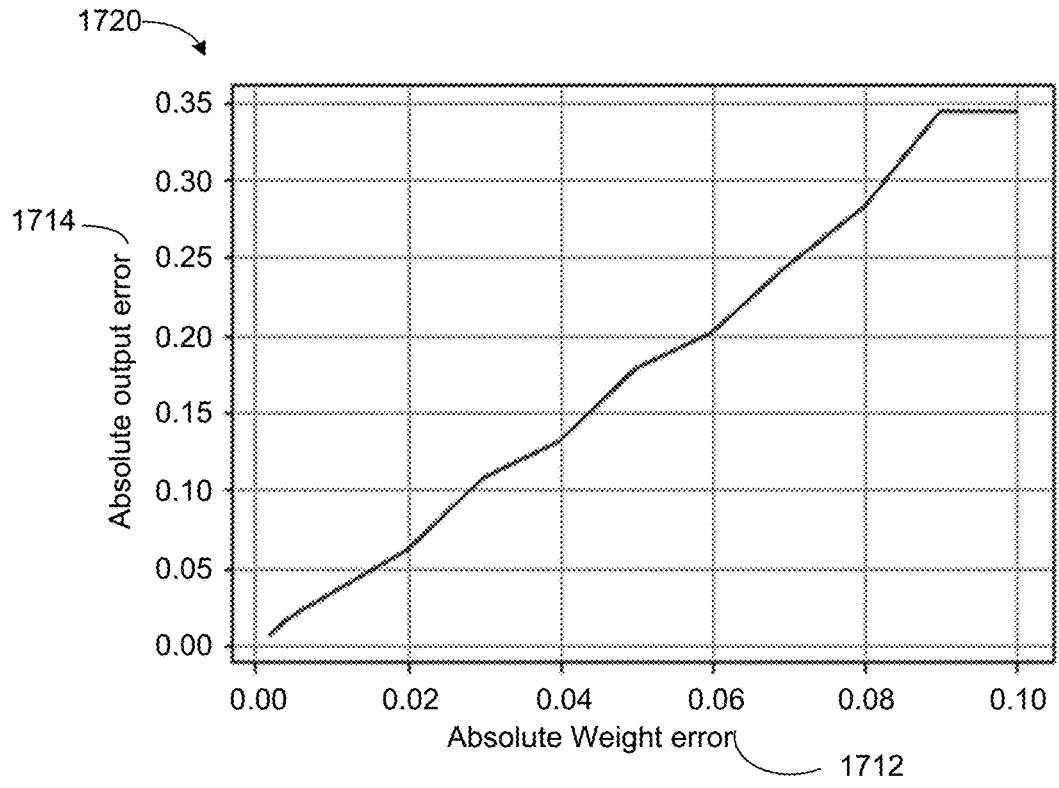

FIG. 17A shows an example chart 1700 illustrating dependency between output error and classification error on the M network, according to some implementations. In FIG. 17A, the x-axis corresponds to classification margin 1704, and the y-axis corresponds to total error 1702 (see description above). The graph shows total error (difference between output of model M and real data) for different classification margins of output signal. For this example, according to the chart, the optimal classification margin 1706 is 0.610.

Suppose another network O produces output values with a constant shift versus relevant M output values, there would be classification error between O and M. To keep the classification error below 1%, this shift should be in the range of [−0.045, 0.040]. Thus, possible output error for S is 45 mV.

Possible weight error is determined by analyzing dependency between weight/bias relative error over the whole network and output error. The charts 1710 and 1720 shown in FIGS. 17B and 17C, respectively, are obtained by averaging 20 randomly modified networks over the 'Test' set, according to some implementations. In these charts, x-axis represents the absolute weight error 1712 and y-axis represents the absolute output error 1714. As can be seen from the charts, output error limit of 45 mV (y=0.045) allows for 0.01 relative or 0.01 absolute error value (value of x) for each weight. Maximum weight modulus (maximum of absolute value of weights among all weights) for the neural network is 1.94.

Example Process for Choosing Resistor Set

A resistor set together with a {R+, R−} pair chosen from this set has a value function over the required weight range

[−wlim; wlim] with some degree of resistor error r_err. In some implementations, value function of a resistor set is calculated as follows:

Possible weight options array is calculated together with weight average error dependent on resistor error;

The weight options in the array is limited to the required weight range [−wlim; wlim];

Values that are worse than neighboring values in terms of weight error are removed;

An array of distances between neighboring values is calculated; and

The value function is a composition of square mean or maximum of the distances array.

Some implementations iteratively search for an optimal resistor set by consecutively adjusting each resistor value in the resistor set on a learning rate value. In some implementations, the learning rate changes over time. In some implementations, an initial resistor set is chosen as uniform (e.g., [1;1; . . . ;1]), with minimum and maximum resistor values chosen to be within two orders of magnitude range (e.g., [1;100] or [0.1;10]). Some implementation choose R+=R−. In some implementations, the iterative process converges to a local minimum. In one case, the process resulted in the following set: [0.17, 1.036, 0.238, 0.21, 0.362, 1.473, 0.858, 0.69, 5.138, 1.215, 2.083, 0.275]. This is a locally optimal resistor set of 12 resistors for the weight range [−2; 2] with rmin=0.1 (minimum resistance), rmax=10 (maximum resistance), and r_err=0.001 (an estimated error in the resistance). Some implementations do not use the whole available range [rmin; rmax] for finding a good local optimum. Only part of the available range (e.g., in this case [0.17; 5.13]) is used. The resistor set values are relative, not absolute. Is this case, relative value range of 30 is enough for the resistor set.

In one instance, the following resistor set of length 20 is obtained for abovementioned parameters: [0.300, 0.461, 0.519, 0.566, 0.648, 0.655, 0.689, 0.996, 1.006, 1.048, 1.186, 1.222, 1.261, 1.435, 1.488, 1.524, 1.584, 1.763, 1.896, 2.02]. In this example, the value 1.763 is also the R−=R+ value. This set is subsequently used to produce weights for NN, producing corresponding model S. The model S's mean square output error was 11 mV given the relative resistor error is close to zero, so the set of 20 resistors is more than required. Maximum error over a set of 20 input data was calculated to be 33 mV. In one instance, S, DAC, and ADC converters with 256 levels were analyzed as a separate model, and the result showed 14 mV mean square output error and 49 mV max output error. An output error of 45 mV on NN corresponds to a relative recognition error of 1%. The 45 mV output error value also corresponds to 0.01 relative or 0.01 absolute weight error, which is acceptable. Maximum weight modulus in NN is 1.94. In this way, the optimal (or near optimal) resistor set is determined using the iterative process, based on desired weight range [−wlim; wlim], resistors error (relative), and possible resistors range.

Typically, a very broad resistor set is not very beneficial (e.g., between 1⅓ orders of magnitude is enough) unless different precision is required within different layers or weight spectrum parts. For example, suppose weights are in the range of [0, 1], but most of the weights are in the range of [0, 0.001], then better precision is needed within that range. In the example described above, given the relative resistor error is close to zero, the set of 20 resistors is more than sufficient for quantizing the NN network, with given precision. In one instance, on a set of resistors [0.300, 0.461, 0.519, 0.566, 0.648, 0.655, 0.689, 0.996, 1.006, 1.048, 1.186, 1.222, 1.261, 1.435, 1.488, 1.524, 1.584, 1.763, 1.896, 2.02] (note values are relative), an average S output error of 11 mV was obtained.

Example Process for Quantization of Resistor Values

In some implementations, the example computations described herein are performed by the weight matrix computation or weight quantization module 238 (e.g., using the resistance calculation module 240) that compute the weights 272 for connections of the transformed neural networks, and/or corresponding resistance values 242 for the weights 272.

This section describes an example process for quantizing resistor values corresponding to weights of a trained neural network, according to some implementations. The example process substantially simplifies the process of manufacturing chips using analog hardware components for realizing neural networks. As described above, some implementations use resistors to represent neural network weights and/or biases for operational amplifiers that represent analog neurons. The example process described here specifically reduces the complexity in lithographically fabricating sets of resistors for the chip. With the procedure of quantizing the resistor values, only select values of resistances are needed for chip manufacture. In this way, the example process simplifies the overall process of chip manufacture and enables automatic resistor lithographic mask manufacturing on demand.

Figure 18A:
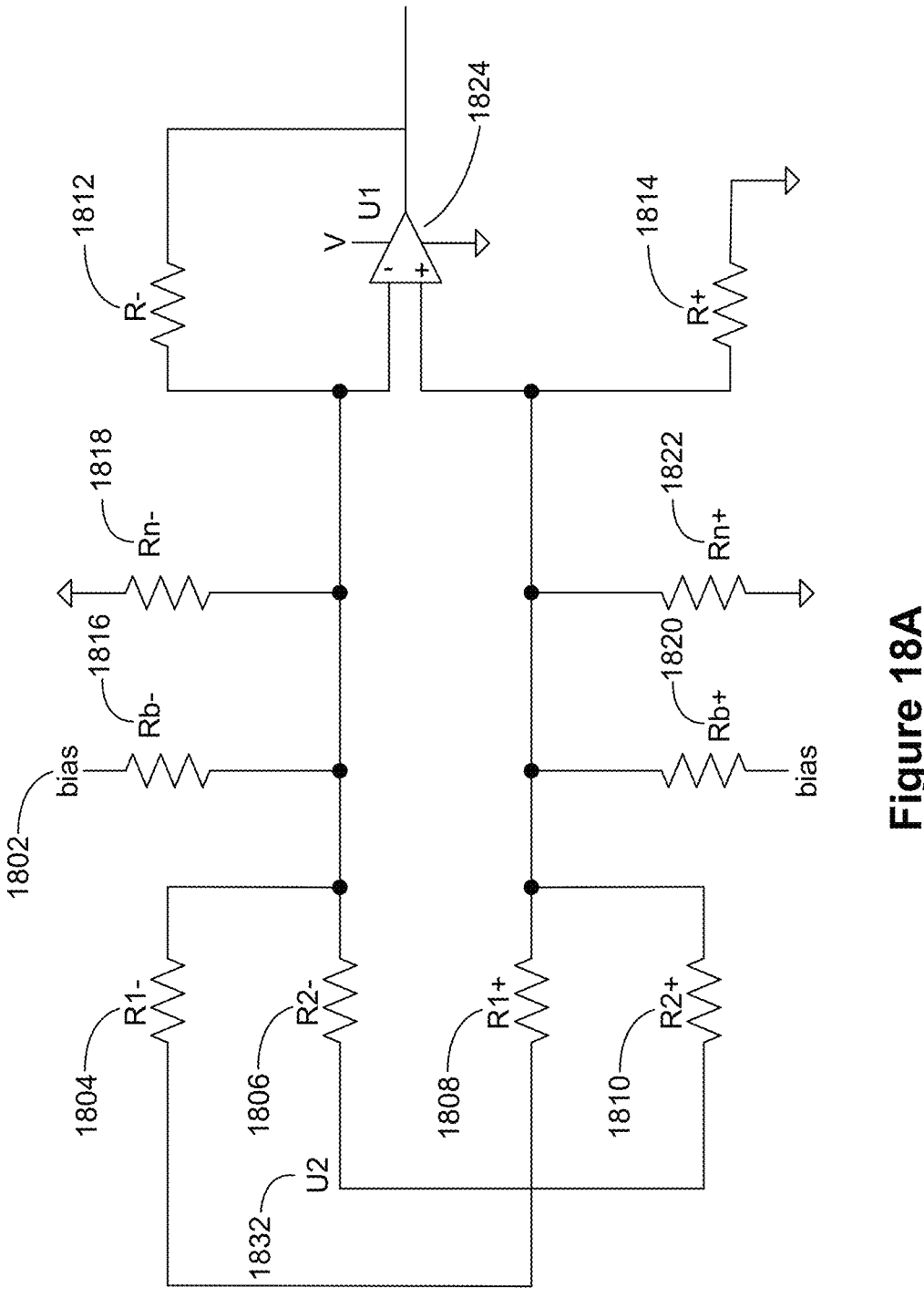
FIGS. 18A and 18B provide example schemes of a neuron model used for resistors quantization, according to some implementations.

FIG. 18A provides an example scheme of a neuron model 1800 used for resistors quantization, according to some implementations. In some implementations, the circuit is based on an operational amplifier 1824 (e.g., AD824 series precision amplifier) that receives input signals from negative weight fixing resistors (R1− 1804, R2− 1806, Rb− bias 1816, Rn− 1818, and R− 1812), and positive weight fixing resistors (R1+ 1808, R2+ 1810, Rb+ bias 1820, Rn+ 1822), and R+ 1814). The positive weight voltages are fed into direct input of the operational amplifier 1824 and negative weights voltages are fed into inverse input of the operational amplifier 1824. The operational amplifier 1824 is used to allow weighted summation operation of weighted outputs from each resistor, where negative weights are subtracted from positive weights. The operational amplifier 1824 also amplifies signal to the extent necessary for the circuit operation. In some implementations, the operational amplifier 1824 also accomplishes RELU transformation of output signal at it's output cascade.

The following equations determine the weights, based on resistor values:

Voltage at the output of neuron is determined by the following equation:

$$U_{out} = \sum_{i=1}^{N}\left(\frac{R^+}{R_i^+} - \frac{R^-}{R_i^-}\right)U_i$$

The weights of each connection are determined by following equation:

$$w_i = \frac{R^+}{R_i^+} - \frac{R^-}{R_i^-}$$

The following example optimization procedure quantizes the values of each resistance and minimize the error of neural network output, according to some implementations:

1. Obtain a set of connection weights and biases {w1, . . . , wn, b}.
2. Obtain possible minimum and maximum resistor values {Rmin, Rmax}. These parameters are determined based on the technology used for manufacturing. Some implementations use TaN or Tellurium high resistivity materials. In some implementations, the minimum value of resistor is determined by minimum square that can be formed lithographically. The maximum value is determined by length, allowable for resistors (e.g., resistors made from TaN or Tellurium) to fit to the desired area, which is in turn determined by the area of an operational amplifier square on lithographic mask. In some implementations, the area of arrays of resistors is smaller than the area of one operational amplifier, since the arrays of resistors are stacked (e.g., one in BEOL, another in FEOL).
3. Assume that each resistor has r_err relative tolerance value
4. The goal is to select a set of resistor values {R1, . . . , Rn} of given length N within the defined [Rmin; Rmax], based on {w1, . . . , wn, b} values. An example search algorithm is provided below to find sub-optimal {R1, . . . , Rn} set based on particular optimality criteria.
5. Another algorithm chooses {Rn, Rp, Rni, Rpi} for a network given that {R1 . . . Rn} is determined.

Example {R1, . . . , Rn} Search Algorithm

Some implementations use an iterative approach for resistor set search. Some implementations select an initial (random or uniform) set {R1, . . . , Rn} within the defined range. Some implementations select one of the elements of the resistor set as a R−=R+ value. Some implementations alter each resistor within the set by a current learning rate value until such alterations produce 'better' set (according to a value function). This process is repeated for all resistors within the set and with several different learning rate values, until no further improvement is possible.

Some implementations define the value function of a resistor set as follows:

Possible weight options are calculated according to the formula (described above):

$$w_i = \frac{R^+}{R_i^+} - \frac{R^-}{R_i^-}$$

Expected error value for each weight option is estimated based on potential resistor relative error r_err determined by IC manufacturing technology.

Weight options list is limited or restricted to [−wlim; wlim] range

Some values, which have expected error beyond a high threshold (e.g., 10 times r_err), are removed Value function is calculated as a square mean of distance between two neighboring weight options. So, value function is minimal when weight options are distributed uniformly within [−wlim; wlim] range Suppose the required weight range [−wlim; wlim] for a model is set to [−5; 5], and the other parameters include N=20, r_err=0.1%, rmin=100 KΩ, rmax=5 MΩ. Here, rmin and rmax are minimum and maximum values for resistances, respectively.

In one instance, the following resistor set of length 20 was obtained for abovementioned parameters: [0.300, 0.461, 0.519, 0.566, 0.648, 0.655, 0.689, 0.996, 1.006, 1.048, 1.186, 1.222, 1.261, 1.435, 1.488, 1.524, 1.584, 1.763, 1.896, 2.02] MΩ. R−=R+=1.763 MΩ.

Example {Rn, Rp, Rni, Rpi} Search Algorithm

Some implementations determine Rn and Rp using an iterative algorithm such as the algorithm described above. Some implementations set Rp=Rn (the tasks to determine Rn and Rp are symmetrical—the two quantities typically converge to a similar value). Then for each weight w_i, some implementations select a pair of resistances {Rni, Rpi} that minimizes the estimated weight error value:

$$w_{err} = \left(\frac{R^+}{R_i^+} + \frac{R^-}{R_i^-}\right) \cdot r_{err} + \left|w_i - \frac{R^+}{R_i^+} + \frac{R^-}{R_i^-}\right|$$

Some implementations subsequently use the {Rni; Rpi; Rn; Rp} values set to implement neural network schematics. In one instance, the schematics produced mean square output error (sometimes called S mean square output error, described above) of 11 mV and max error of 33 mV over a set of 10,000 uniformly distributed input data samples, according to some implementations. In one instance, S model was analyzed along with digital-to-analog converters (DAC), analog-to-digital converters (ADC), with 256 levels as a separate model. The model produced 14 mV mean square output error and 49 mV max output error on the same data set, according to some implementations. DAC and ADC have levels because they convert analog value to bit value and vice-versa. 8 bits of digital value is equal to 256 levels. Precision cannot be better than 1/256 for 8-bit ADC.

Some implementations calculate the resistance values for analog IC chips, when the weights of connections are known, based on Kirchhoff's circuit laws and basic principles of operational amplifiers (described below in reference to FIG. 19A), using Mathcad or any other similar software. In some implementations, operational amplifiers are used both for amplification of signal and for transformation according to the activation functions (e.g., ReLU, sigmoid, Tangent hyperbolic, or linear mathematical equations), Some implementations manufacture resistors in a lithography layer where resistors are formed as cylindrical holes in the SiO2 matrix and the resistance value is set by the diameter of hole. Some implementations use amorphous TaN, TiN of CrN or Tellurium as the highly resistive material to make high density resistor arrays. Some ratios of Ta to N Ti to N and Cr to N provide high resistance for making ultra-dense high resistivity elements arrays. For example, for TaN, Ta5N6, Ta3N5, the higher the N ratio to Ta, the higher is the resistivity. Some implementations use Ti2N, TiN, CrN, or Cr5N, and determine the ratios accordingly. TaN deposition is a standard procedure used in chip manufacturing and is available at all major Foundries.

Example Operational Amplifier

Figure 19A:
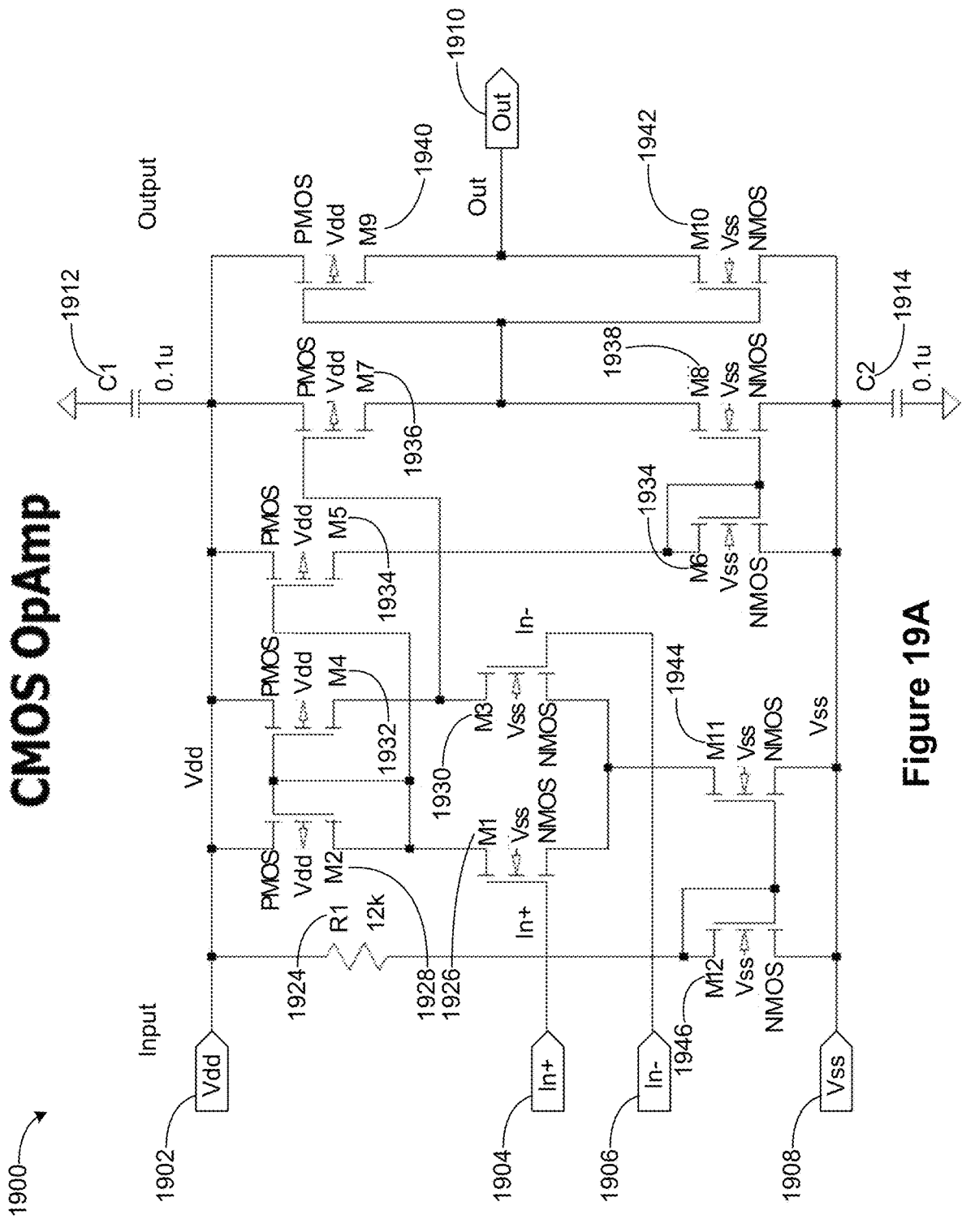
FIG. 19A shows a schematic diagram of an operational amplifier made on CMOS, according to some implementations.

FIG. 19A shows a schematic diagram of an operational amplifier made on CMOS (CMOS OpAmp) 1900, according to some implementations. In FIG. 19A, In+ (positive input or pos) 1404, and In− (negative input or neg) 1406, and Vdd− (positive supply voltage relative to GND) 1402 are contact inputs. Contact Vss− (negative supply voltage or GND) is indicated by the label 1408. The circuit output is Out 1410 (contact output). Parameters of CMOS transistors are determined by the ratio of geometric dimensions: L (the length of the gate channel) to W (the width of the gate channel), examples of which are shown in the Table shown in FIG. 19B (described below). The current mirror is made on NMOS transistors M11 1944, M12 1946, and resistor R1 1921 (with an example resistance value of 12 kΩ), and provides the offset current of the differential pair (M1 1926 and M3 1930). The differential amplifier stage (differential pair) is made on the NMOS transistors M1 1926 and M3 1930. Transistors M1, M3 are amplifying, and PMOS transistors M2 1928 and M4 1932 play the role of active current load. From the M3 transistor, the signal is input to the gate of the output PMOS transistor M7 1936. From the transistor M1, the signal is input to the PMOS transistor M5 (inverter) 1934 and the active load on the NMOS transistor M6 1934. The current flowing through the transistor M5 1934 is the setting for the NMOS transistor M8 1938. Transistors M7 1936 is included in the scheme with a common source for a positive half-wave signal. The M8 transistors 1938 are enabled by a common source circuit for a negative half-wave signal. To increase the overall load capacity of the operational amplifier, the M7 1936 and M8 1938 outputs include an inverter on the M9 1940 and M10 1942 transistors. Capacitors C1 1912 and C2 1914 are blocking.

FIG. 19B shows a table 1948 of description for the example circuit shown in FIG. 19A, according to some implementations. The values for the parameters are provided as examples, and various other configurations are possible. The transistors M1, M3, M6, M8, M10, M11, and M12 are N-Channel MOSFET transistors with explicit substrate connection. The other transistors M2, M4, M5, M7, and M9 are P-Channel MOSFET transistors with explicit substrate connection. The Table shows example shutter ratio of length (L, column 1) and width (W, column 2) are provided for each of the transistors (column 3).

In some implementations, operational amplifiers such as the example described above are used as the basic element of integrated circuits for hardware realization of neural networks. In some implementations, the operational amplifiers are of the size of 40 square microns and fabricated according to 45 nm node standard.

In some implementations, activation functions, such as ReLU, Hyperbolic Tangent, and Sigmoid functions are represented by operational amplifiers with modified output cascade. For example, RELU, Sigmoid, or Tangent function is realized as an output cascade of an operational amplifier (sometimes called OpAmp) using corresponding well-known analog schematics, according to some implementations.

In the examples described above and below, in some implementations, the operational amplifiers are substituted by inverters, current mirrors, two-quadrant or four quadrant multipliers, and/or other analog functional blocks, that allow weighted summation operation.

Example Scheme of a LSTM Block

Figure 20A:
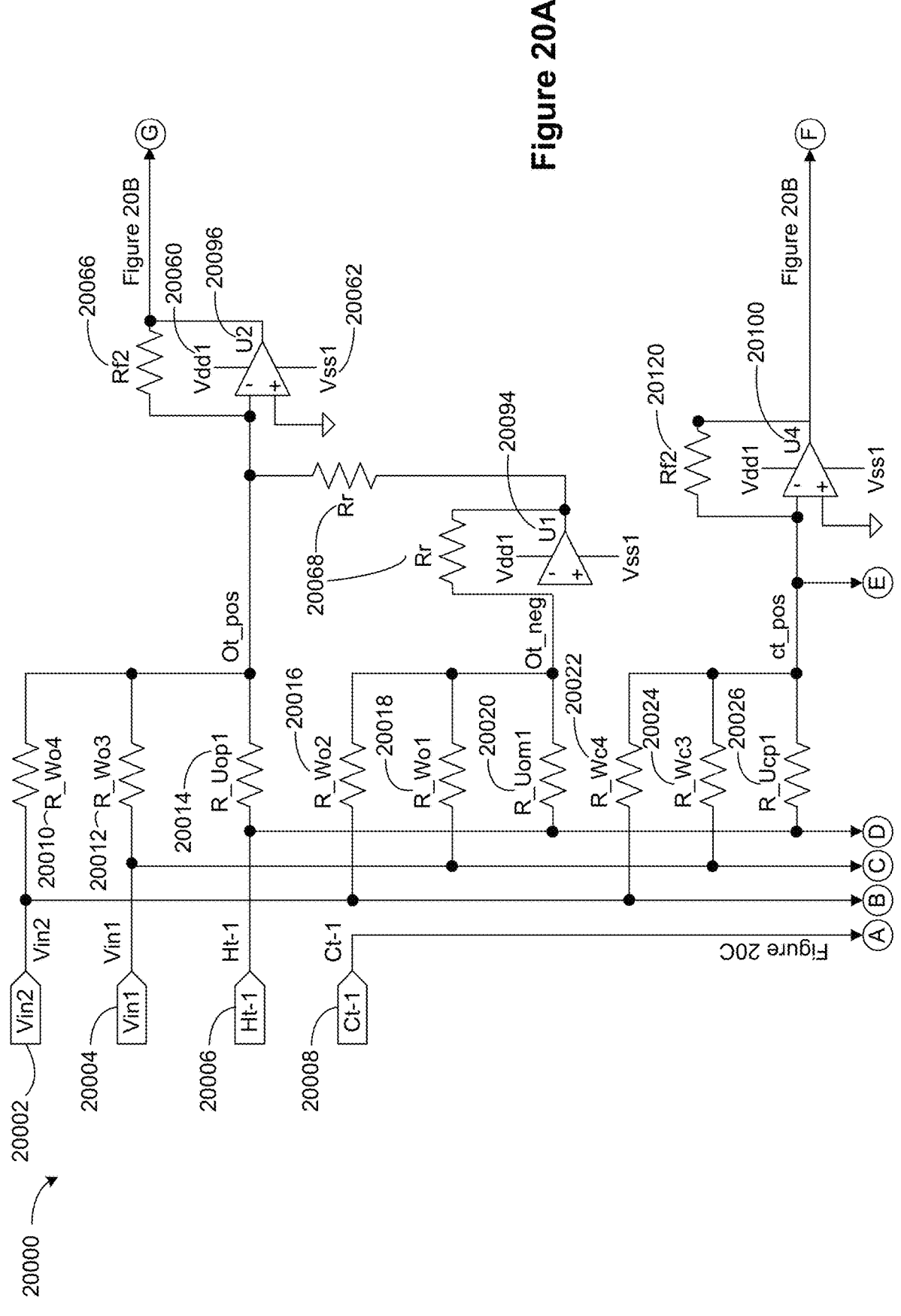
FIGS. 20A-20E show a schematic diagram of a LSTM block, according to some implementations.
Figure 20B:
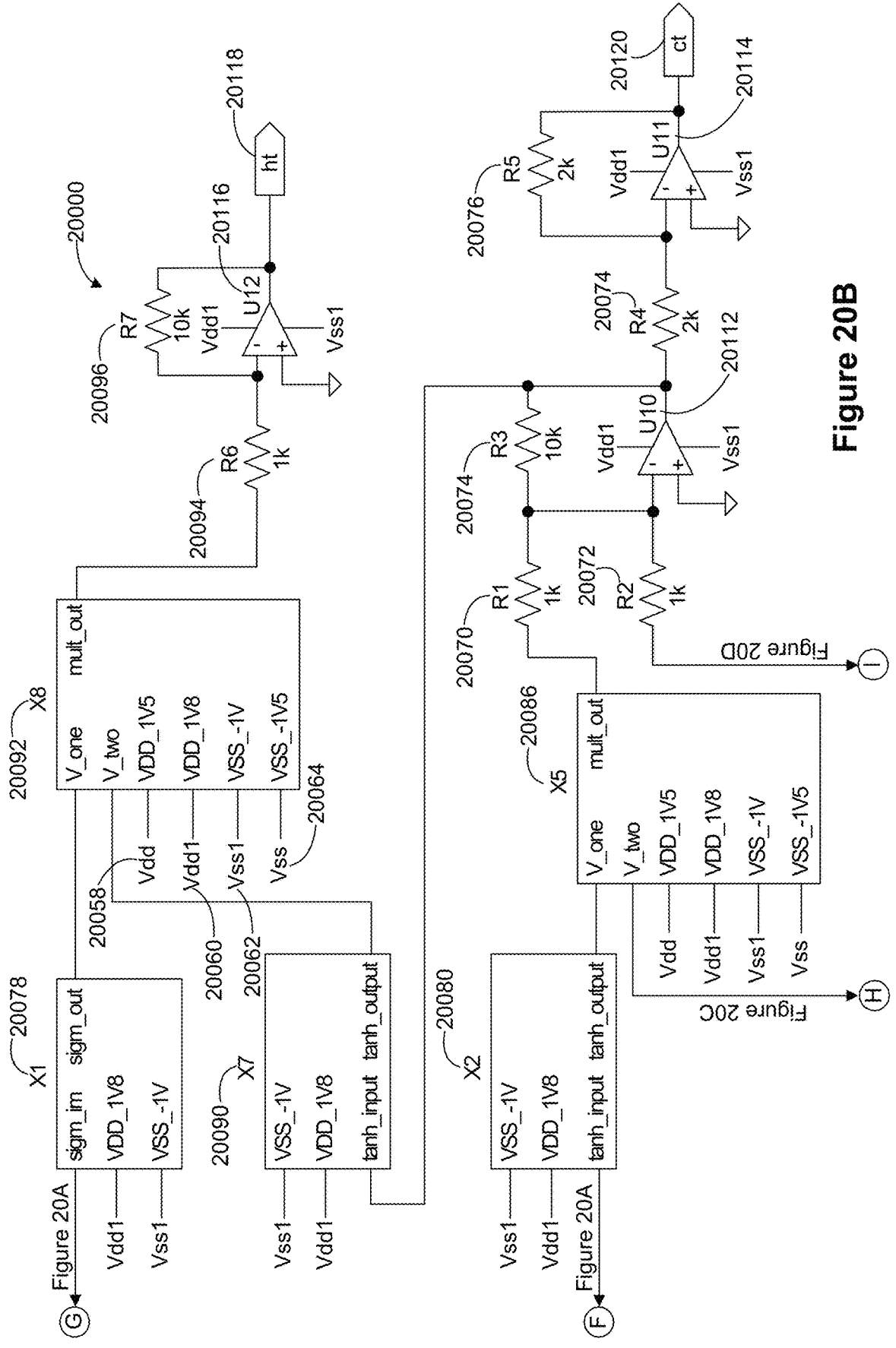
Figure 20C:
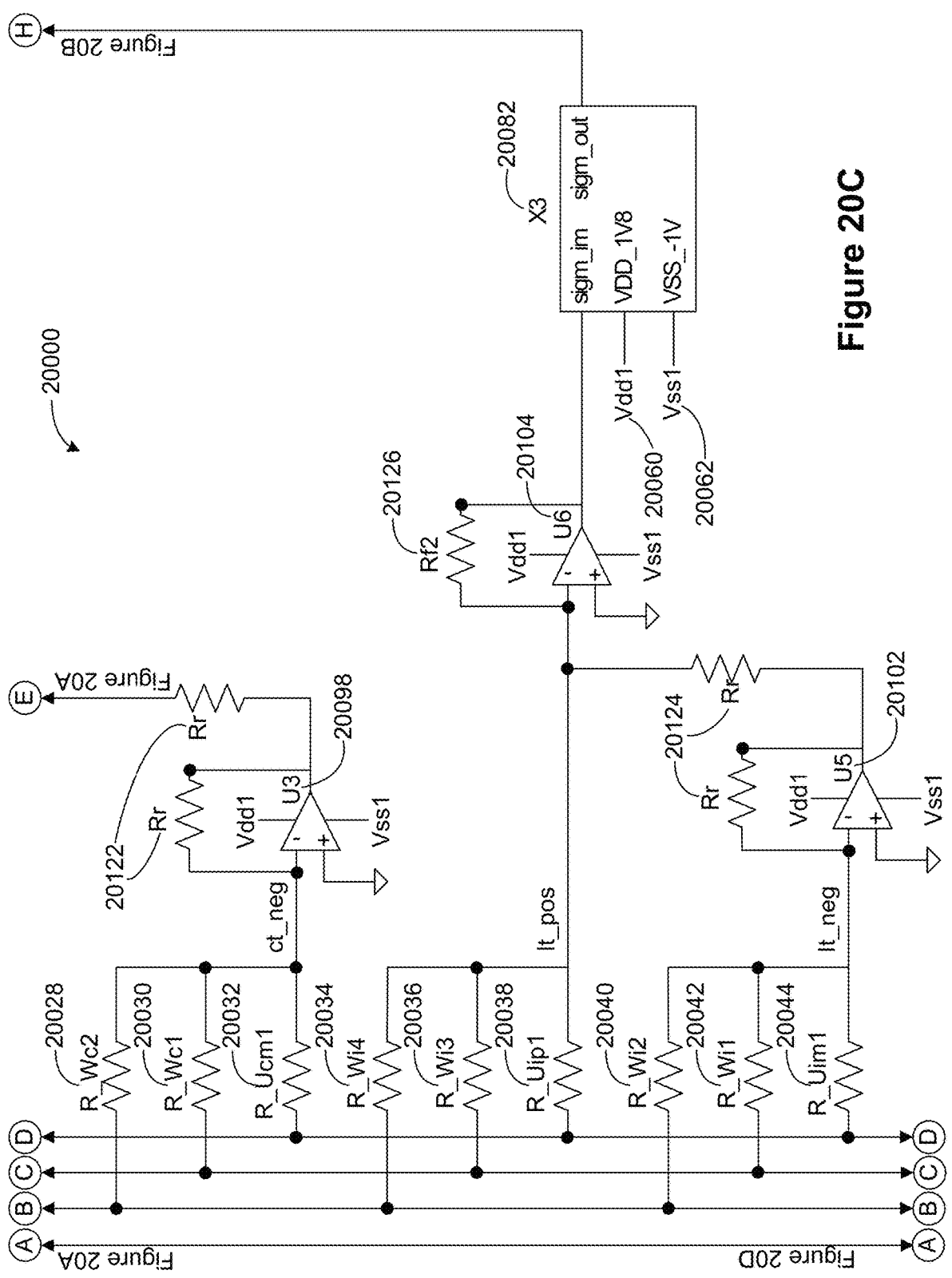
Figure 20D:
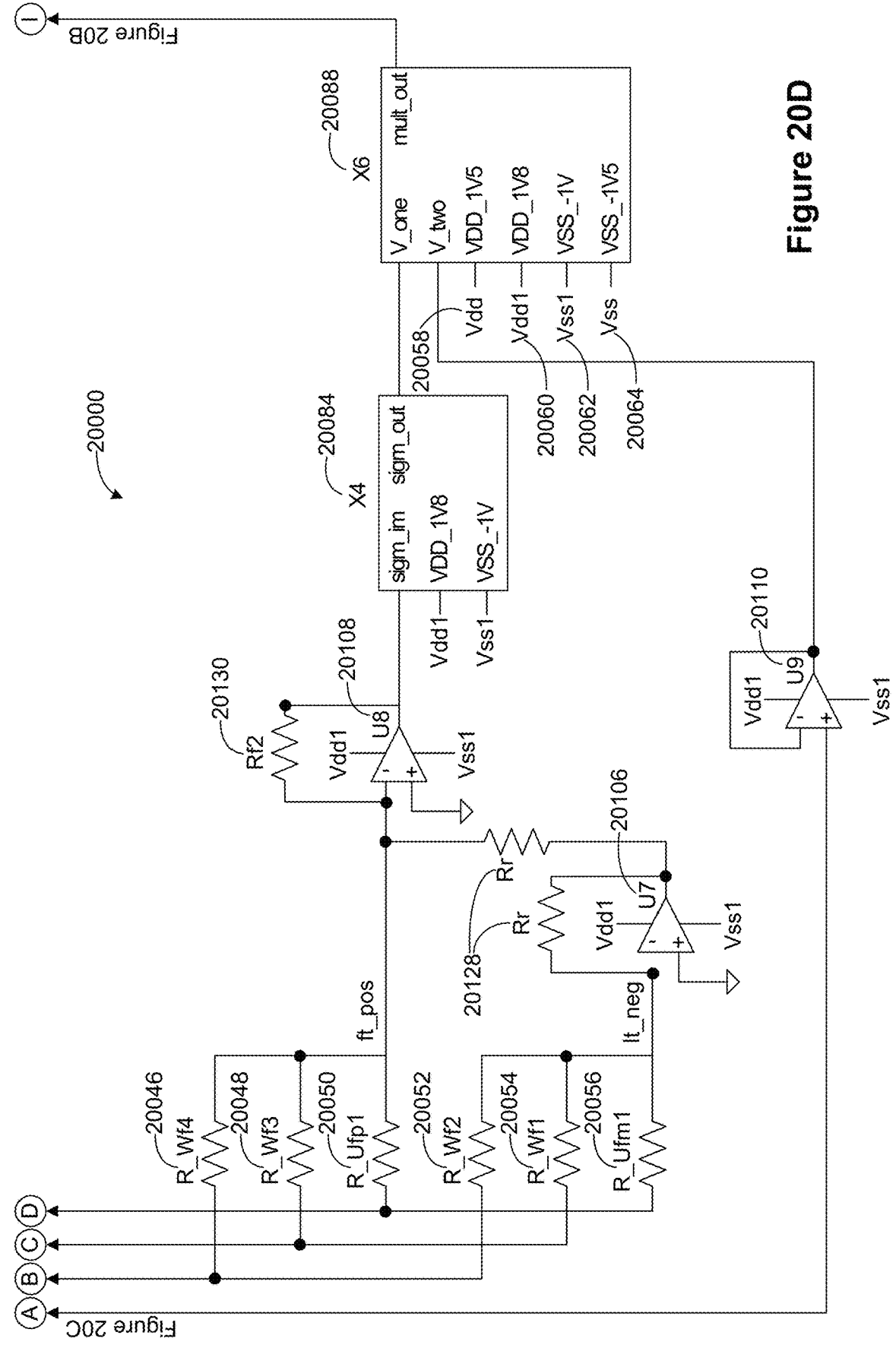

FIGS. 20A-20E show a schematic diagram of a LSTM neuron 20000, according to some implementations. The inputs of the neuron are Vin1 20002 and Vin2 20004 that are values in the range [−0.1, 0.1]. The LSTM neuron also input the value of the result of calculating the neuron at time H(t−1) (previous value; see description above for LST neuron) 20006 and the state vector of the neuron at time C(t−1) (previous value) 20008. Outputs of the neuron LSTM (shown in FIG. 20B) include the result of calculating the neuron at the present time H(t) 20118 and the state vector of the neuron at the present time C(t) 20120. The scheme includes:

a "neuron O" assembled on the operational amplifiers U1 20094 and U2 20100, shown in FIG. 20A. Resistors R_Wo1 20018, R_Wo2 20016, R_Wo3 20012, R_Wo4 20010, R_Uop1 20014, R_Uom1 20020, Rr 20068 and Rf2 20066 set the weights of connections of the single "neuron O". The "neuron O" uses a sigmoid (module X1 20078, FIG. 20B) as a nonlinear function;

a "neuron C" assembled on the operational amplifiers U3 20098 (shown in FIG. 20C) and U4 20100 (shown in FIG. 20A). Resistors R_Wc1 20030, R_Wc2 20028, R_Wc3 20024, R_Wc4 20022, R Ucp1 20026, R_Ucm1 20032, Rr 20122, and Rf2 20120, set the weights of connections of the "neuron C". The "neuron C" uses a hyperbolic tangent (module X2 22080, FIG. 2B) as a nonlinear function;

a "neuron I" assembled on the operational amplifiers U5 20102 and U6 20104, shown in FIG. 20C. Resistors R_Wi1 20042, R_Wi2 20040, R_Wi3 20036, and R_Wi4 20034, R_Uip1 20038, R_Uim1 20044, Rr 20124, and Rf2 20126 set the weights of connections of the "neuron I". The "neuron I" uses a sigmoid (module X3 20082) as a nonlinear function; and a "neuron f" assembled on the operational amplifiers U7 20106 and U8 20108, as shown in FIG. 20D. Resistors R_Wf1 20054, R_Wf2 20052, R_Wf3 20048, R_Wf4 20046, R_Ufp1 20050, R_Ufm1 20056, Rr 20128 and Rf2 20130 set the weights of connections of the "neuron f". The "neuron f" uses a sigmoid (module X4 20084) as a nonlinear function.

The outputs of modules X2 20080 (FIG. 20B) and X3 20082 (FIG. 20C) are input to the X5 multiplier module 20086 (FIG. 20B). The outputs of modules X4 20084 (FIG. 20D) and buffer to U9 20010 are input to the multiplier module X6 20088. The outputs of the modules X5 20086 and X6 20088 are input to the adder (U10 20112). A divider 10 is assembled on the resistors R1 20070, R2 20072, and R3 20074. A nonlinear function of hyperbolic tangent (module X7 20090, FIG. 20B) is obtained with the release of the divisor signal. The output C(t) 20120 (a current state vector of the LSTM neuron) is obtained with the buffer-inverter on the UT1 20114 output signal. The outputs of modules X1 20078 and X7 20090 is input to a multiplier (module X8 20092) whose output is input to a buffer divider by 10 on the U12 20116. The result of calculating the LSTM neuron at the present time H(t) 20118 is obtained from the output signal of U12 20116.

Figure 20E:
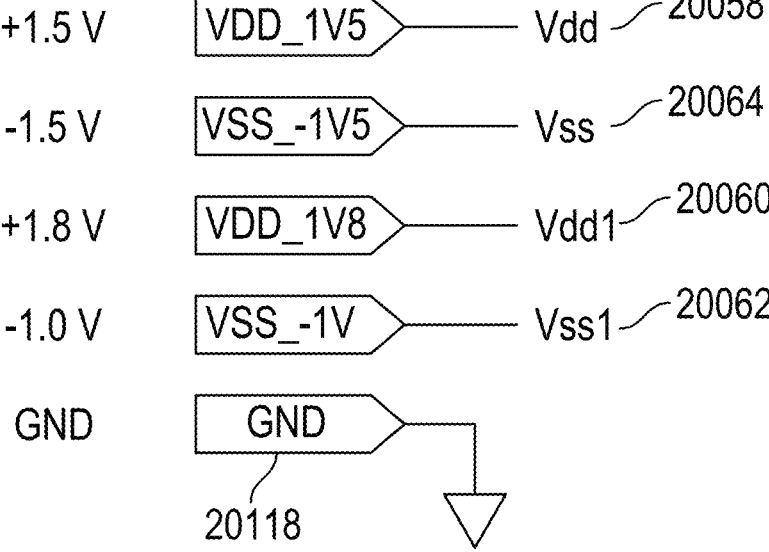

FIG. 20E shows example values for the different configurable parameters (e.g., voltages) for the circuit shown in FIGS. 20A-20D, according to some implementations. Vdd 20058 is set to +1.5V, Vss 20064 is set to −1.5V, Vdd1 20060 is set to +1.8V, Vss1 20062 is set to −1.0V, and GND 20118 is set to GND, according to some implementations.

FIG. 20F shows a table 20132 of description for the example circuit shown in FIG. 20A-20D, according to some implementations. The values for the parameters are provided as examples, and various other configurations are possible. The transistors U1-U12 are CMOS OpAmps (described above in reference to FIGS. 19A and 19B). X1, X3, and X4 are modules that perform the Sigmoid function. X2 and X7 are modules that perform the Hyperbolic Tangent function. X5 and X8 are modules that perform the multiplication function. Example resistor ratings include: Rw=10 kΩ, and Rr=1.25 kΩ. The other resistor values are expressed relative to Rw. For example, Rf2=12 times Rw, R_Wo4=5 times Rw, R_Wo3=8 times Rw, R_Uop1=2.6 times Rw, R_Wo2=12 times Rw, R_W1=w times Rw, and R_Uom1=2.3 times Rw, R_wc4=4 times Rw, R_Wc3=5.45 times Rw, R Ucp1=3 times Rw, R_Wc2=12 times Rw, R_Wc1=2.72 times Rw, R_Ucm1=3.7 times Rw, R_Wi4=4.8 times Rw, W_Wi3=6 times Rw, W_Uip1=2 times Rw, R_Wi2=12 times Rw, R_WiT=3 times Rw, R_Uim1=2.3 times Rw, R_Wf4=2.2 times Rw, R_Wf3=5 times Rw, R_Wfp=4 times Rw, R_Wf2=2 times Rw, R_Wf1=5.7 times Rw, and Rfm1=4.2 times Rw.

Example Scheme of a Multiplier Block

FIGS. 21A-21I show a schematic diagram of a multiplier block 21000, according to some implementations. The neuron 21000 is based on the principle of a four-quadrant multiplier, assembled using operational amplifiers U1 21040 and U2 21042 (shown in FIG. 21B), U3 21044 (shown in FIG. 21H), and U4 21046 and U5 21048 (shown in FIG. 21I), and CMOS transistors M1 21052 through M68 21182. The inputs of the multiplier include V_one 21020 21006 and V_two 21008 (shown in FIG. 21B), and contact Vdd (positive supply voltage, e.g., +1.5 V relative to GND) 21004 and contact Vss (negative supply voltage, e.g., −1.5 V relative to GND) 21002. In this scheme, additional supply voltages are used: contact Input Vdd1 (positive supply voltage, e.g., +1.8 V relative to GND), contact Vss1 (negative supply voltage, e.g., −1.0 V relative to GND). The result of the circuit calculations are output at mult_out (output pin) 21170 (shown in FIG. 21I).

Figure 21B:
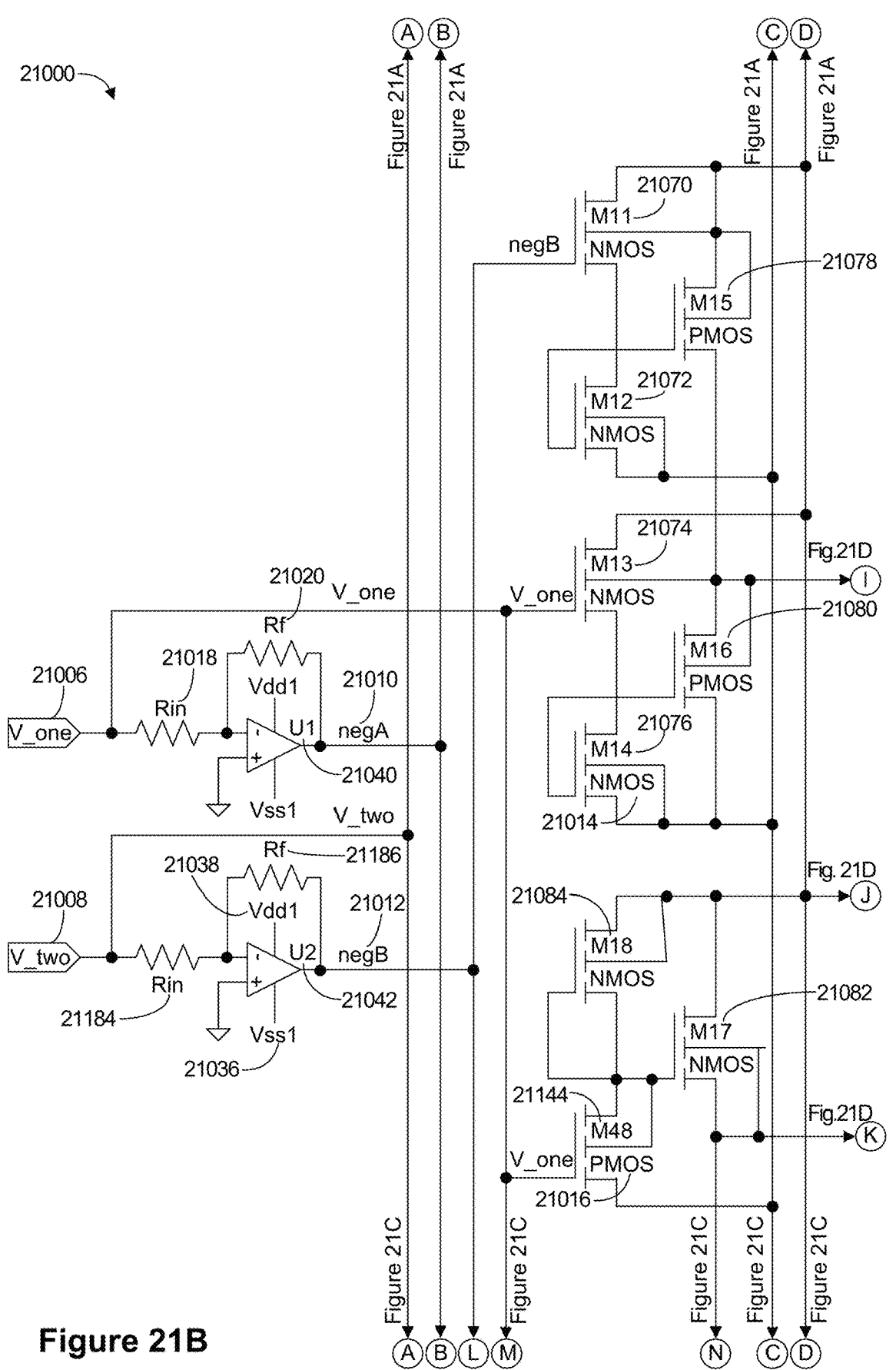
Figure 21C:
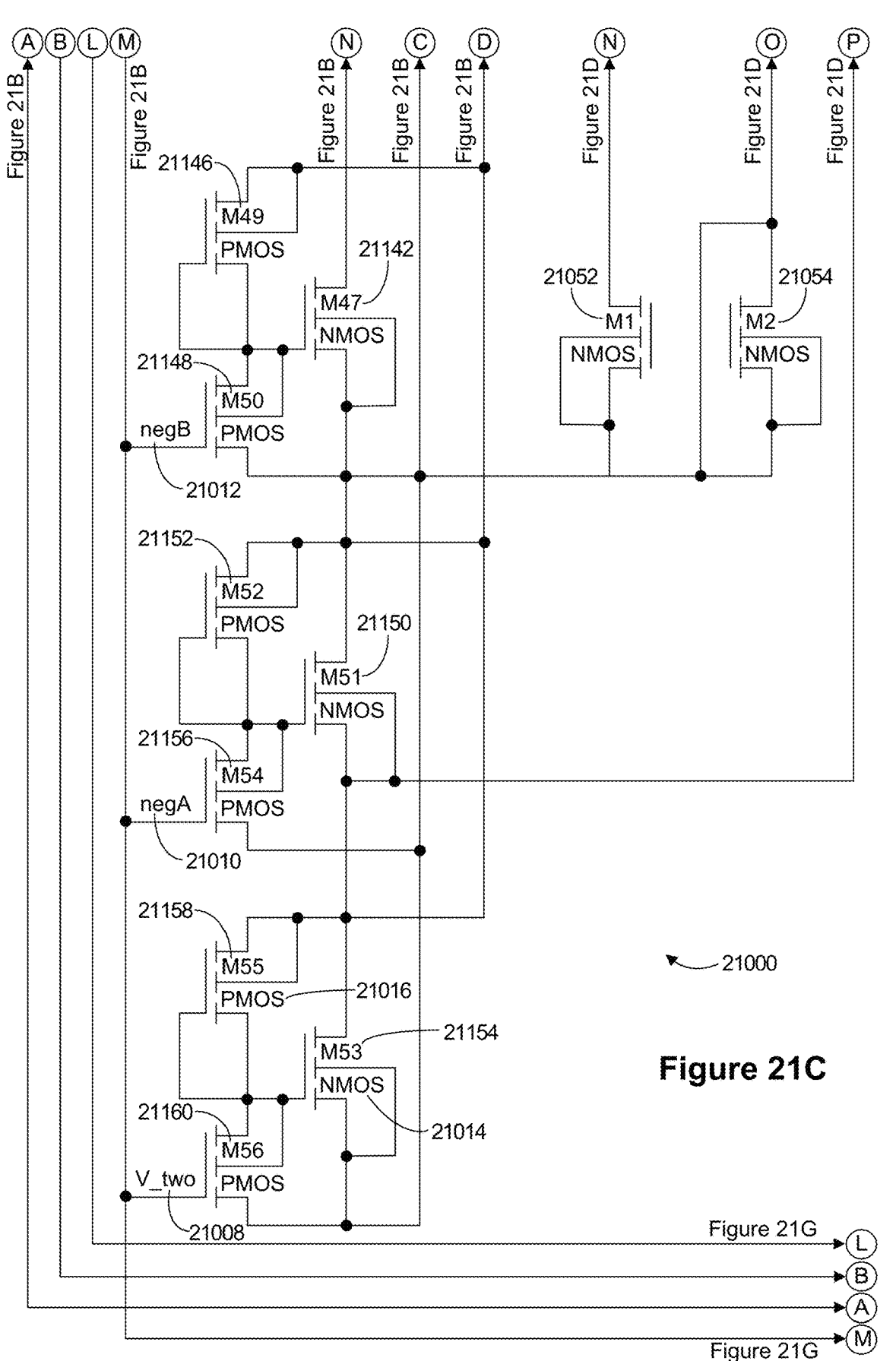

Referring to FIG. 21B, input signal (V_one) from V_one 21006 is connected to the inverter with a single gain made on U1 21040, the output of which forms a signal negA 21006, which is equal in amplitude, but the opposite sign with the signal V_one. Similarly, the signal (V_two) from the input V_two 21008 is connected to the inverter with a single gain made on U2 21042, the output of which forms a signal negB 21012 which is equal in amplitude, but the opposite sign with the signal V_two. Pairwise combinations of signals from possible combinations (V_one, V_two, negA, negB) are output to the corresponding mixers on CMOS transistors.

Figure 21D:
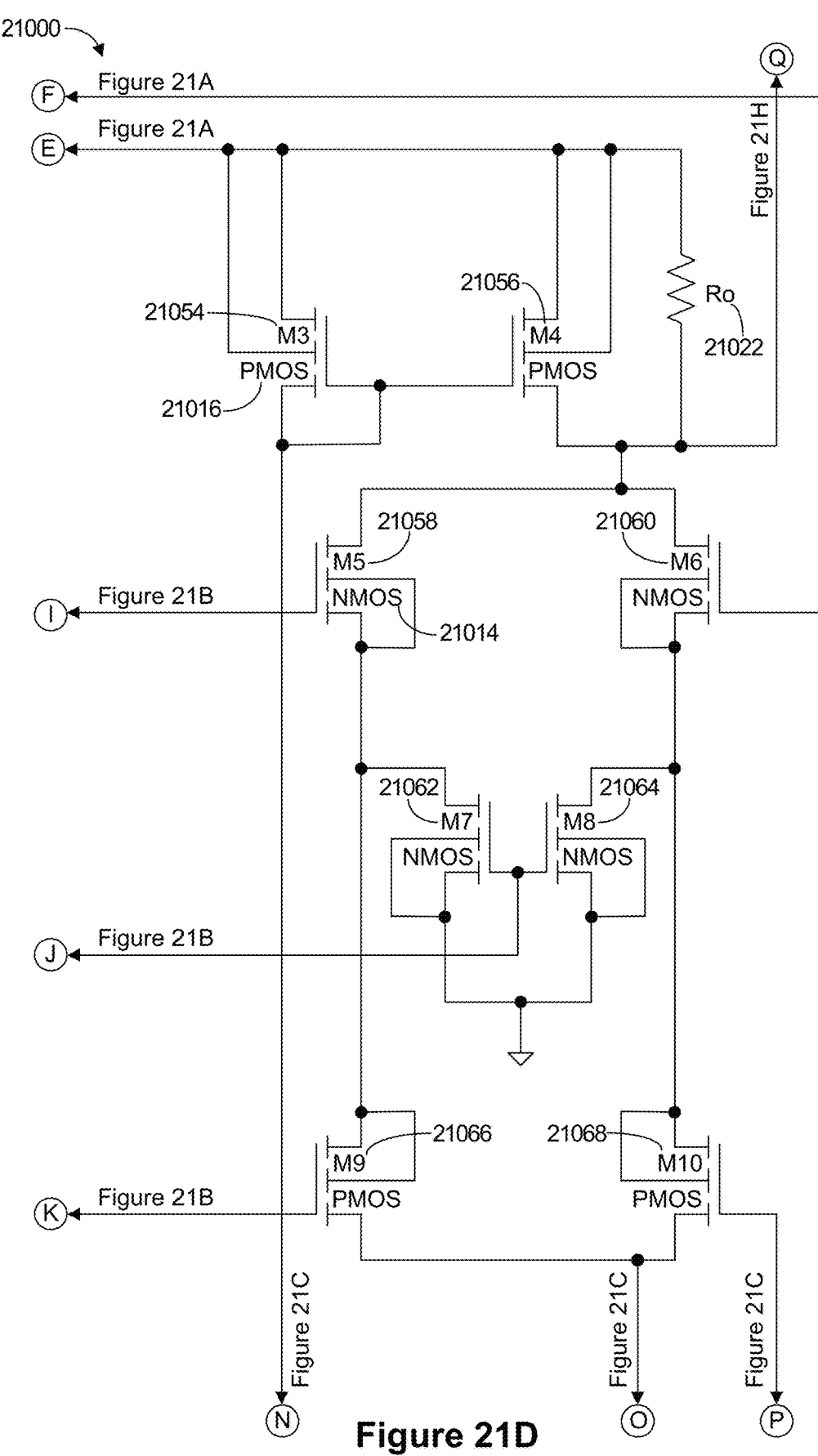
Figure 21E:
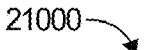
Figure 21F:
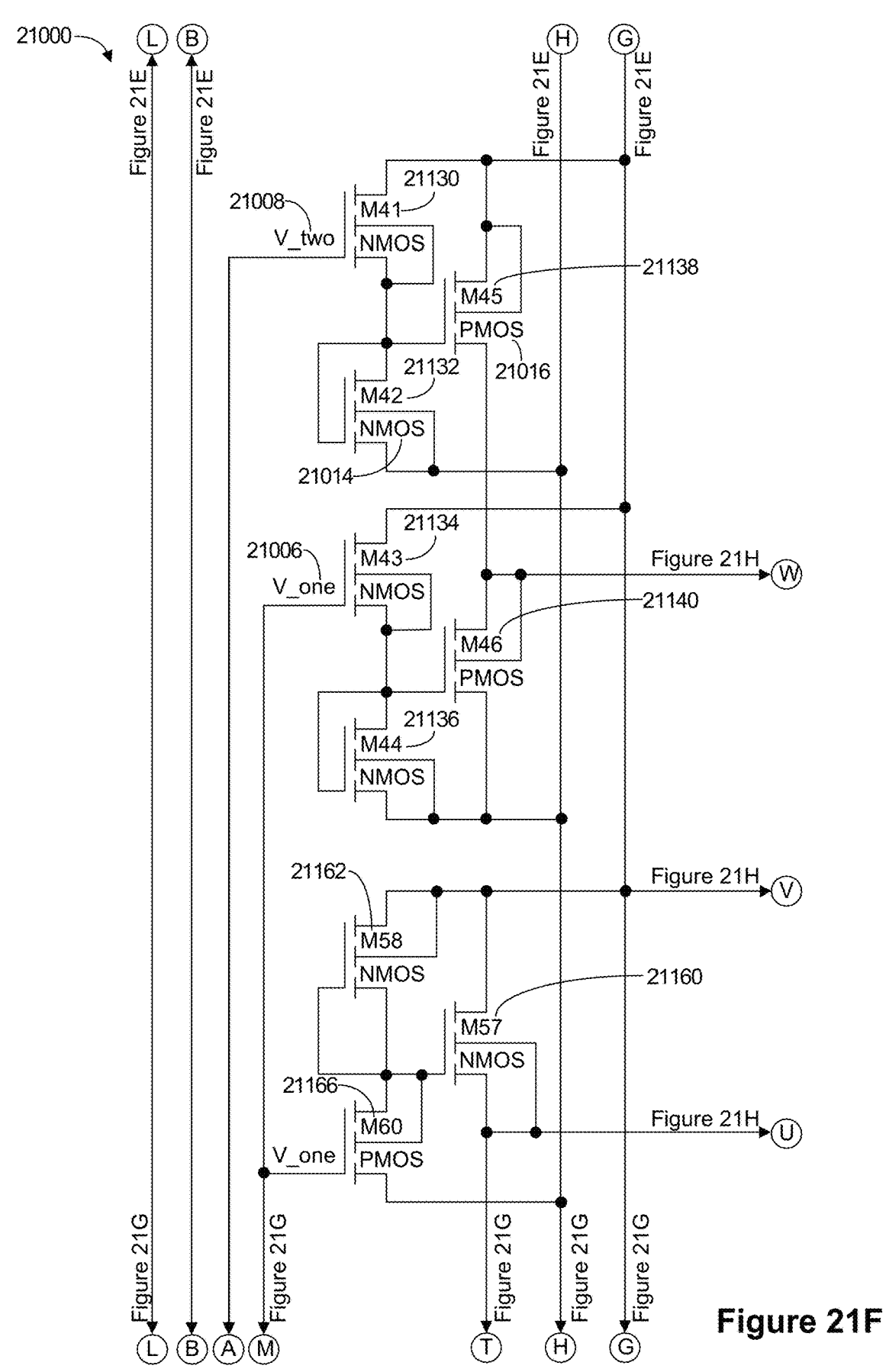
Figure 21G:
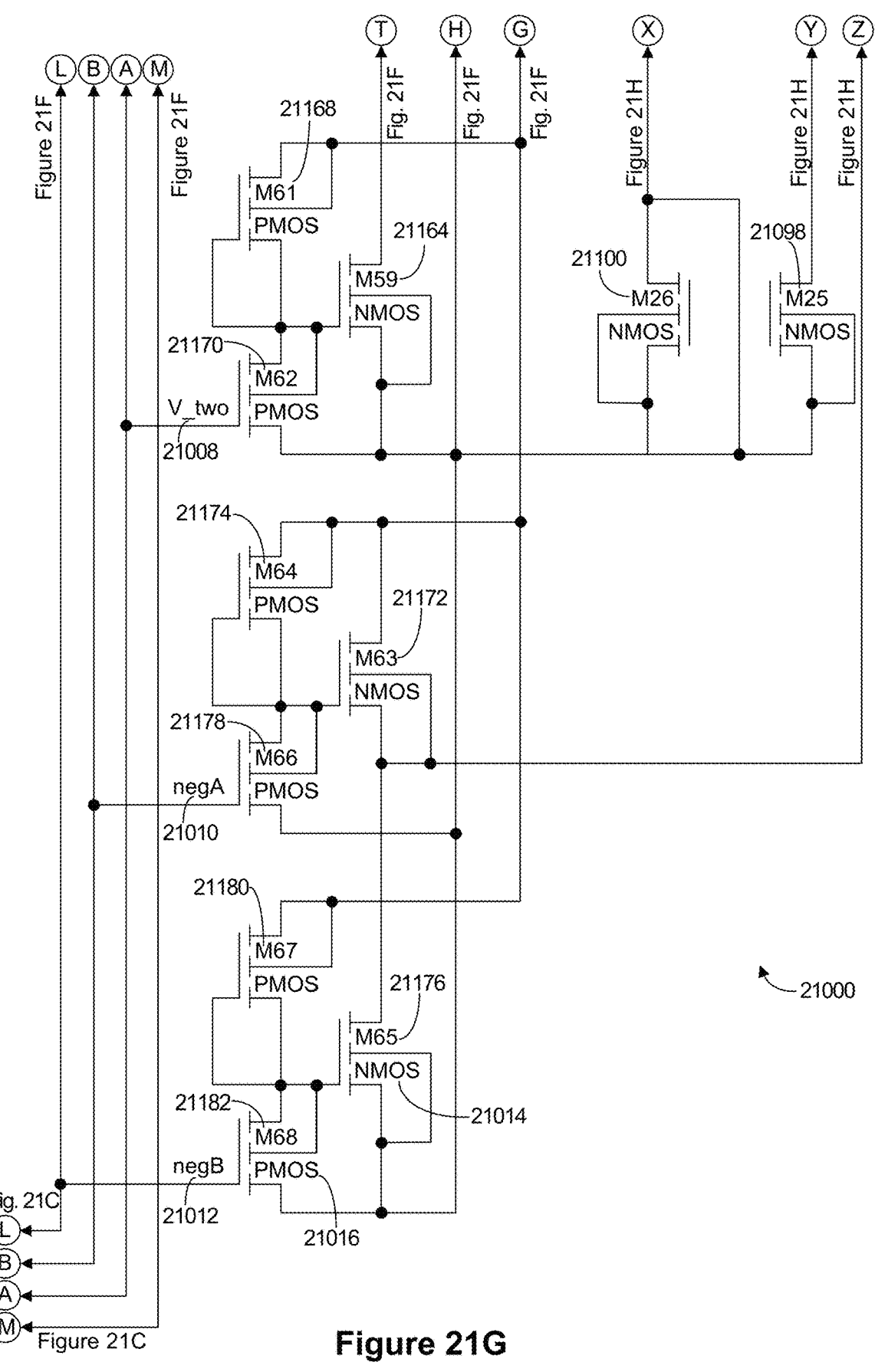
Figure 21H:
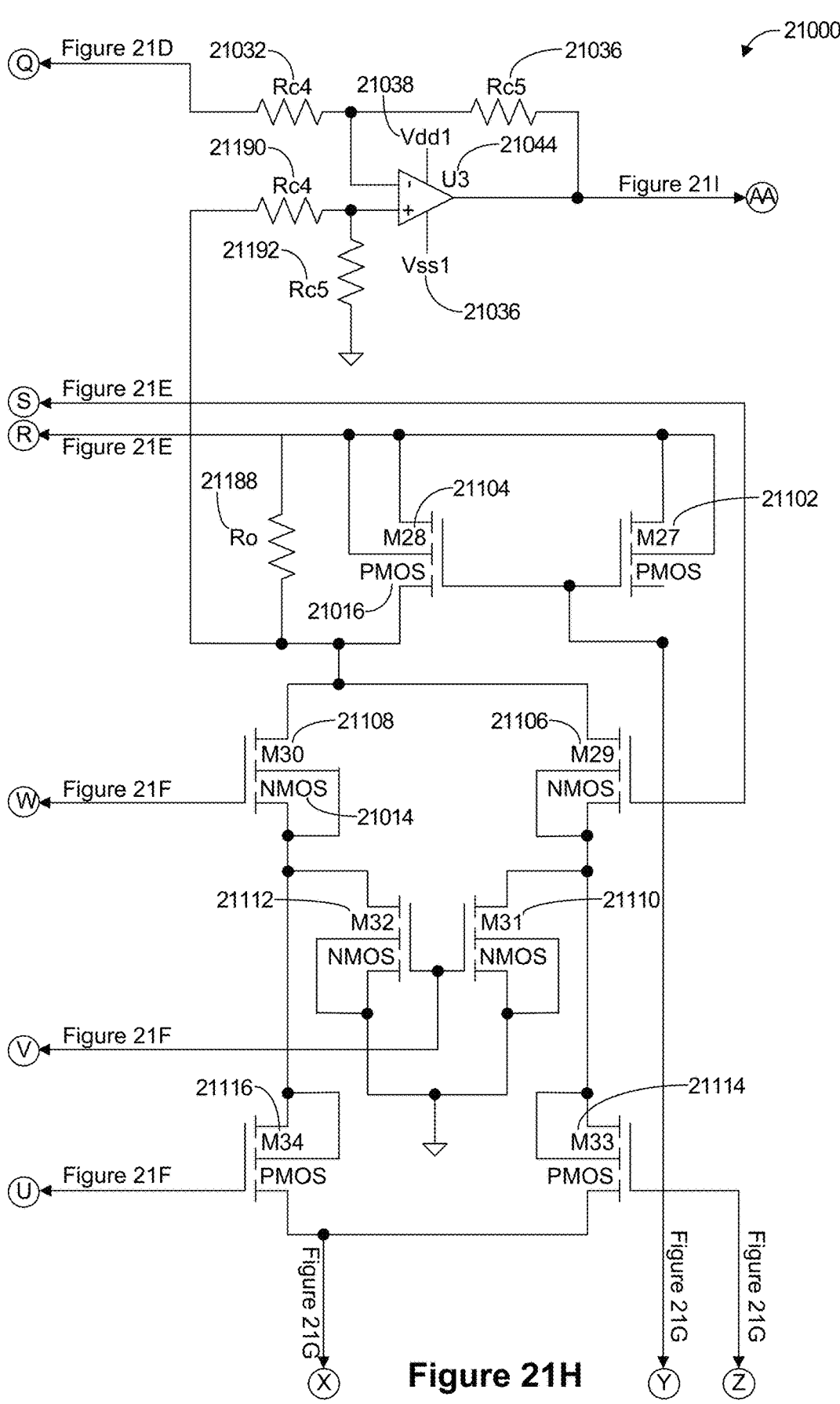

Referring back to FIG. 21A, V_two 21008 and negA 21010 are input to a multiplexer assembled on NMOS transistors M19 21086, M20 21088, M21 21090, M22 21092, and PMOS transistors M23 21094 and M24 21096. The output of this multiplexer is input to the NMOS transistor M6 21060 (FIG. 21D).

Similar transformations that occur with the signals include:

negB 21012 and V_one 21020 are input to a multiplexer assembled on NMOS transistors M11 21070, M12 2072, M13 2074, M14 21076, and PMOS transistors M15 2078 and M16 21080. The output of this multiplexer is input to the M5 21058 NMOS transistor (shown in FIG. 21D);

V_one 21020 and negB 21012 are input to a multiplexer assembled on PMOS transistors M18 21084, M48 21144, M49 21146, and M50 21148, and NMOS transistors M17 21082, M47 21142. The output of this multiplexer is input to the M9 PMOS transistor 21066 (shown in FIG. 21D);

negA 21010 and V_two 21008 are input to a multiplexer assembled on PMOS transistors M52 21152, M54 21156, M55 21158, and M56 21160, and NMOS transistors M51 21150, and M53 21154. The output of this multiplexer is input to the M2 NMOS transistor 21054 (shown in FIG. 21C);

negB 21012 and V_one 21020 are input to a multiplexer assembled on NMOS transistors M11 21070, M12 21072, M13 21074, and M14 21076, and PMOS transistors M15 21078, and M16 21080. The output of this multiplexer is input to the M10 NMOS transistor 21068 (shown in FIG. 21D);

negB 21012 and negA 21010 are input to a multiplexer assembled on NMOS transistors M35 21118, M36

21120, M37 21122, and M38 21124, and PMOS transistors M39 21126, and M40 21128. The output of this multiplexer is input to the M27 PMOS transistor 21102 (shown in FIG. 21H);

V_two 21008 and V_one 21020 are input to a multiplexer assembled on NMOS transistors M41 21130, M42 21132, M43 21134, and M44 21136, and PMOS transistors M45 21138, and M46 21140. The output of this multiplexer is input to the M30 NMOS transistor 21108 (shown in FIG. 21H);

V_one 21020 and V_two 21008 are input to a multiplexer assembled on PMOS transistors M58 21162, M60 21166, M61 21168, and M62 21170, and NMOS transistors M57 21160, and M59 21164. The output of this multiplexer is input to the M34 PMOS transistor 21116 (shown in FIG. 21H); and negA 21010 and negB 21012 are input to a multiplexer assembled on PMOS transistors M64 21174, M66 21178, M67 21180, and M68 21182, and NMOS transistors M63 21172, and M65 21176. The output of this multiplexer is input to the PMOS transistor M33 21114 (shown in FIG. 21H).

Figure 21I:
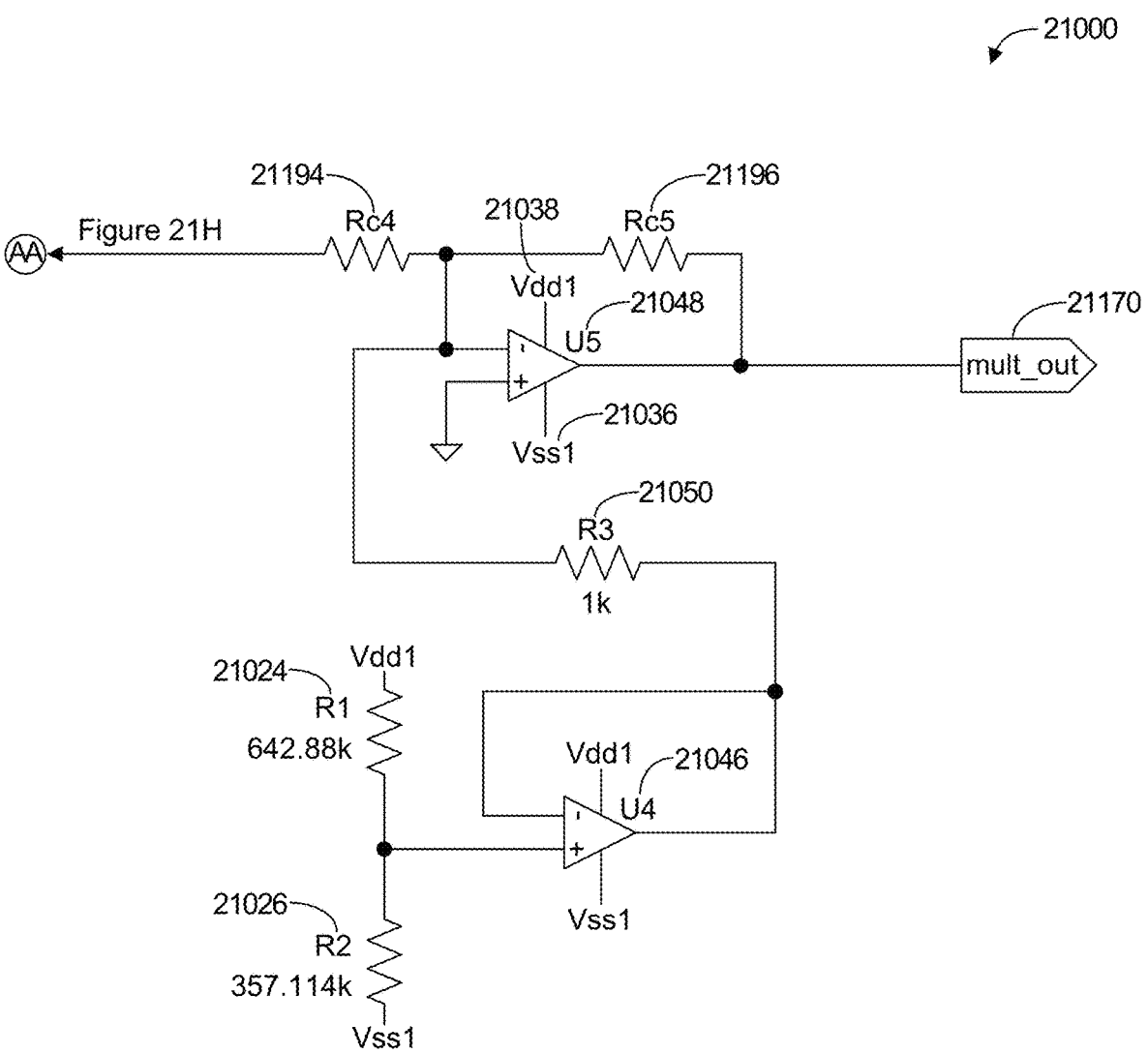

The current mirror (transistors M1 21052, M2 21053, M3 21054, and M4 21056) powers the portion of the four quadrant multiplier circuit shown on the left, made with transistors M5 21058, M6 21060, M7 21062, M8 21064, M9 21066, and M10 21068. Current mirrors (on transistors M25 21098, M26 21100, M27 21102, and M28 21104) power supply of the right portion of the four-quadrant multiplier, made with transistors M29 21106, M30 21108, M31 21110, M32 21112, M33 21114, and M34 21116. The multiplication result is taken from the resistor Ro 21022 enabled in parallel to the transistor M3 21054 and the resistor Ro 21188 enabled in parallel to the transistor M28 21104, supplied to the adder on U3 21044. The output of U3 21044 is supplied to an adder with a gain of 7,1, assembled on U5 21048, the second input of which is compensated by the reference voltage set by resistors R1 21024 and R2 21026 and the buffer U4 21046, as shown in FIG. 21I. The multiplication result is output via the Mult_Out output 21170 from the output of U5 21048.

FIG. 21J shows a table 21198 of description for the schematic shown in FIGS. 21A-21I, according to some implementations. U1-U5 are CMOS OpAmps. The N-Channel MOSFET transistors with explicit substrate connection include transistors M1, M2, M25, and M26 (with shutter ratio of length (L)=2.4u, and shutter ratio of width (W)=1.26u), transistors M5, M6, M29, and M30 (with L=0.36u, and W=7.2u), transistors M7, M8, M31, and M32 (with L=0.36u, and W=199.98u), transistors M11-M14, M19-M22, M35-M38, and M41-M44 (with L=0.36u and W=0.4u), and transistors M17, M47, M51, M53, M57, M59, M43, and M64 (with L=0.36u and W=0.72u). The P-Channel MOSFET transistors with explicit substrate connection include transistors M3, M4, M27, and M28 (with shutter ratio of length (L)=2.4u, and shutter ratio of width (W)=1.26u), transistors M9, M10, M33, and M34 (with L=0.36u, and W=7.2u), transistors M18, M48, M49, M50, M52, M54, M55, M56, M58, M60, M61, M62, M64, M66, M67, and M68 (with L=0.36u, and W=0.8u), and transistors M15, M16, M23, M24, M39, M40, M45, and M46 (with L=0.36u and W=0.72u). Example resistor ratings include Ro=1 kΩ, Rin=1 kΩ, Rf=1 kΩ, Rc4=2 kΩ, and Rc5=2 kΩ, according to some implementations.

Example Scheme of a Sigmoid Block

Figure 22A:
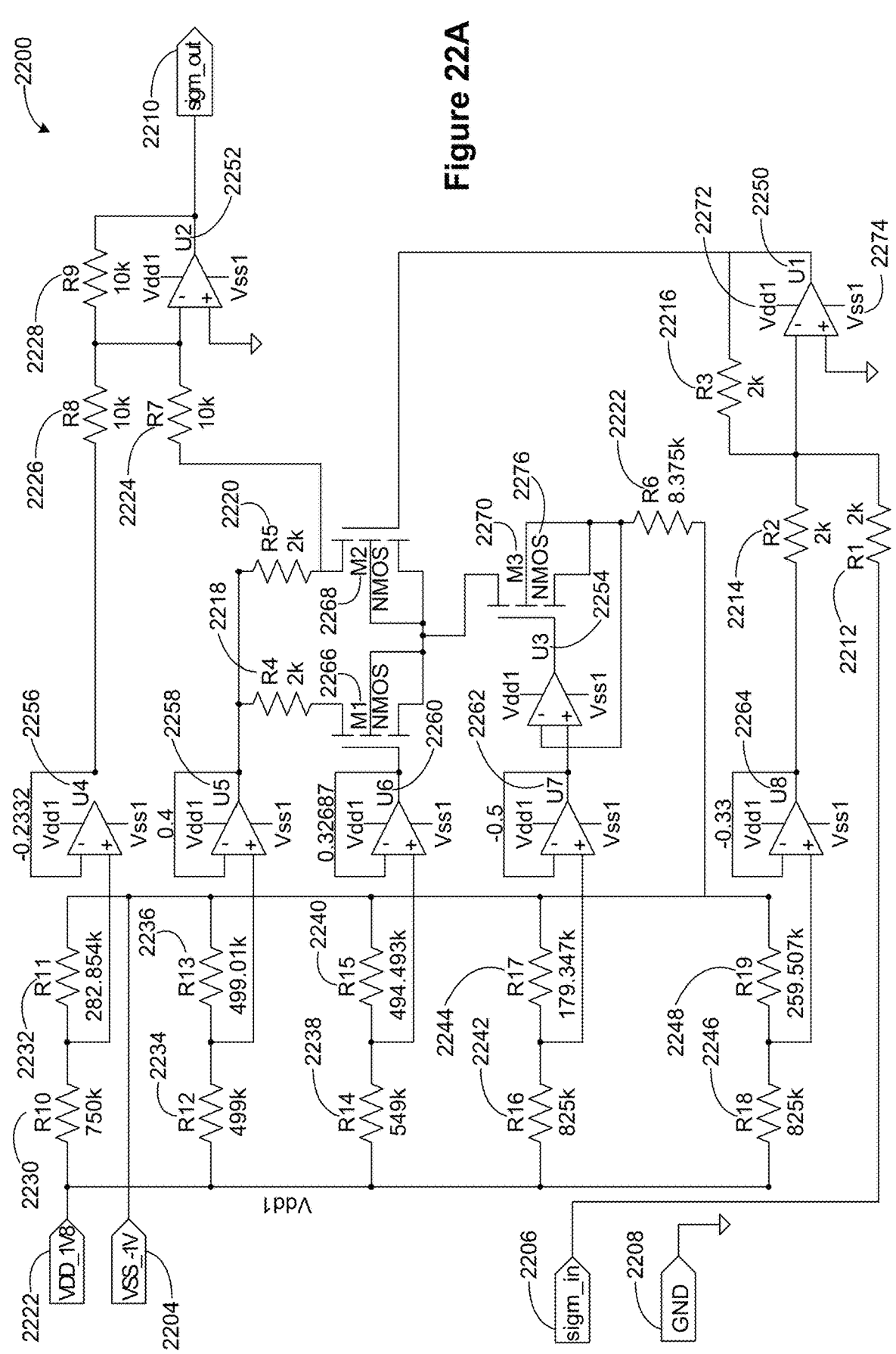
FIG. 22A shows a schematic diagram of a sigmoid neuron, according to some implementations.

FIG. 22A shows a schematic diagram of a sigmoid block 2200, according to some implementations. The sigmoid function (e.g., modules X1 20078, X3 20082, and X4 20084, described above in reference to FIGS. 20A-20F) is implemented using operational amplifiers U1 2250, U2 2252, U3 2254, U4 2256, U5 2258, U6 2260, U7, 2262, and U8 2264, and NMOS transistors M1 2266, M2 2268, and M3 2270. Contact sigm_in 2206 is module input, contact Input Vdd1 2222 is positive supply voltage +1.8 V relative to GND 2208, and contact Vss1 2204 is negative supply voltage −1.0 V relative to GND. In this scheme, U4 2256 has a reference voltage source of −0.2332 V, and the voltage is set by the divider R10 2230 and R11 2232. The U5 2258 has a reference voltage source of 0.4 V, and the voltage is set by the divider R12 2234 and R13 2236. The U6 2260 has a reference voltage source of 0.32687 V, the voltage is set by the divider R14 2238 and R15 2240. The U7 2262 has a reference voltage source of −0.5 V, the voltage is set by the divider R16 2242 and R17 2244. The U8 2264 has a reference voltage source of −0.33 V, the voltage is set by the divider R18 2246 and R19 2248.

The sigmoid function is formed by adding the corresponding reference voltages on a differential module assembled on the transistors M1 2266 and M2 2268. A current mirror for a differential stage is assembled with active regulation operational amplifier U3 2254, and the NMOS transistor M3 2270. The signal from the differential stage is removed with the NMOS transistor M2 and resistor R5 2220 is input to the adder U2 2252. The output signal sigm_out 2210 is removed from the U2 adder 2252 output.

FIG. 22B shows a table 2278 of description for the schematic diagram shown in FIG. 22A, according to some implementations. U1-U8 are CMOS OpAmps. M1, M2, and M3 are N-Channel MOSFET transistors with a shutter ratio of length (L)=0.18u, and shutter ration of width (W)=0.9u, according to some implementations.

Example Scheme of a Hyperbolic Tangent Block

Figure 23A:
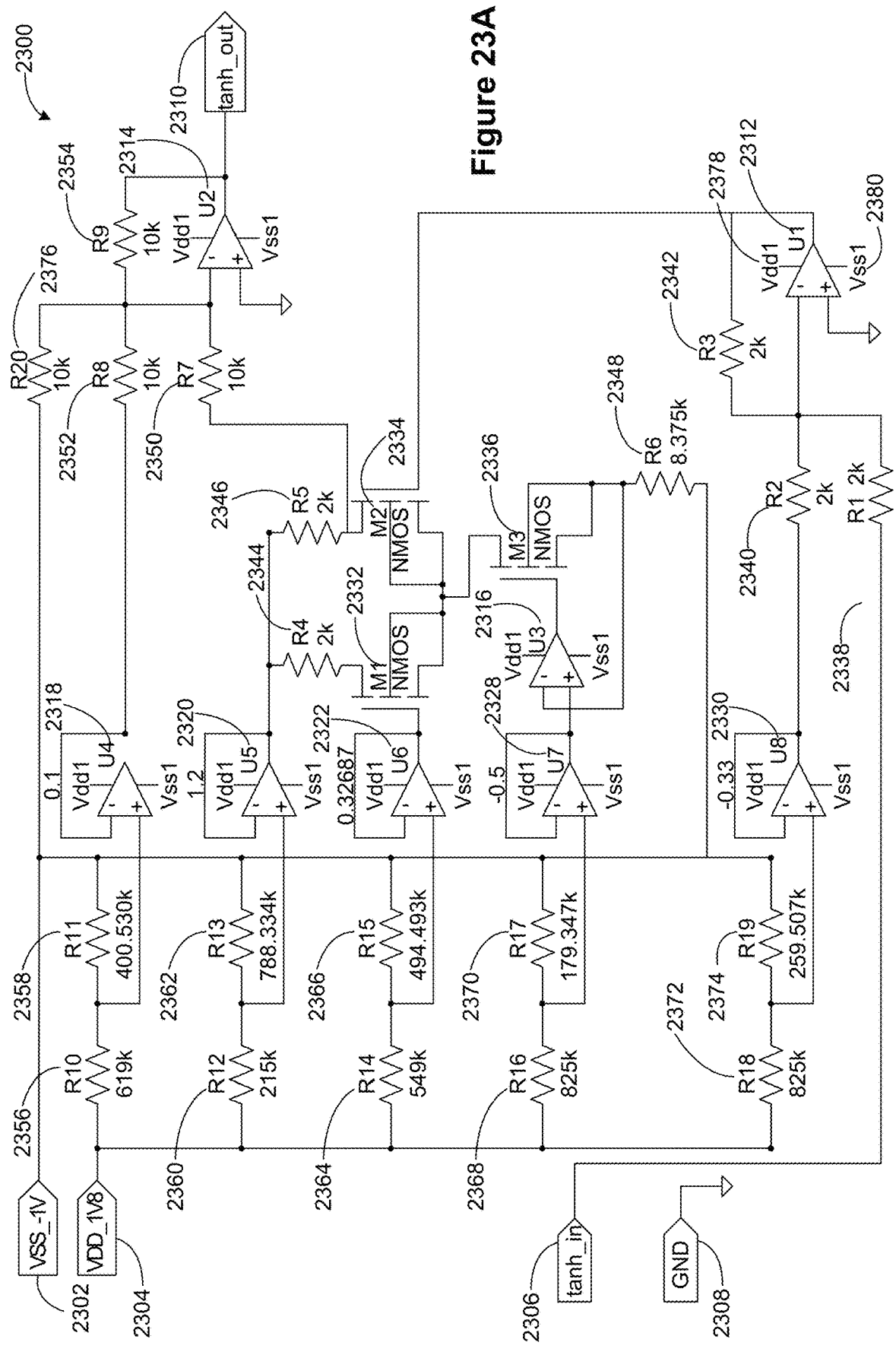
FIG. 23A shows a schematic diagram of a hyperbolic tangent function block, according to some implementations.

FIG. 23A shows a schematic diagram of a hyperbolic tangent function block 2300, according to some implementations. The hyperbolic tangent function (e.g., the modules X2 20080, and X7 20090 described above in reference to FIGS. 20A-20F) is implemented using operational amplifiers (U1 2312, U2 2314, U3 2316, U4 2318, U5 2320, U6 2322, U7 2328, and U8 2330) and NMOS transistors (M1 2332, M2 2334, and M3 2336). In this scheme, contact tan h_in 2306 is module input, contact Input Vdd1 2304 is positive supply voltage +1.8 V relative to GND 2308, and contact Vss1 2302 is negative supply voltage −1.0 V relative to GND. Further, in this scheme, U4 2318 has a reference voltage source of −0.1 V, the voltage set by the divider R10 2356 and R11 2358. The U5 2320 has a reference voltage source of 1.2 V, the voltage set by the divider R12 2360 and R13 2362. The U6 2322 has a reference voltage source of 0.32687 V, the voltage set by the divider R14 2364 and R15 2366. The U7 2328 has a reference voltage source of −0.5 V, the voltage set by the divider R16 2368 and R17 2370. The U8 2330 has a reference voltage source of −0.33 V, the voltage set by the divider R18 2372 and R19 2374. The hyperbolic tangent function is formed by adding the corresponding reference voltages on a differential module made on transistors M1 2332 and M2 2334. A current mirror for a differential stage is obtained with active regulation operational amplifier U3 2316, and NMOS transistor M3 2336. With NMOS transistor M2 2334 and resistor R5 2346, the signal is removed from the differential stage and input to the adder U2 2314. The output signal tan h_out 2310 is removed from the U2 adder 2314 output.

Figure 23B:
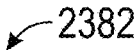
FIG. 23B shows a table of description for the schematic diagram shown in FIG. 23A, according to some implementations.

FIG. 23B shows a table 2382 of description for the schematic diagram shown in FIG. 23A, according to some implementations. U1-U8 are CMOS OpAmps, and M1, M2, and M3 are N-Channel MOSFET transistors, with a shutter ratio of length (L)=0.18u, and the shutter ratio of width (W)=0.9u.

Example Scheme of a Single Neuron OP1 CMOS OpAmp

Figure 24A:
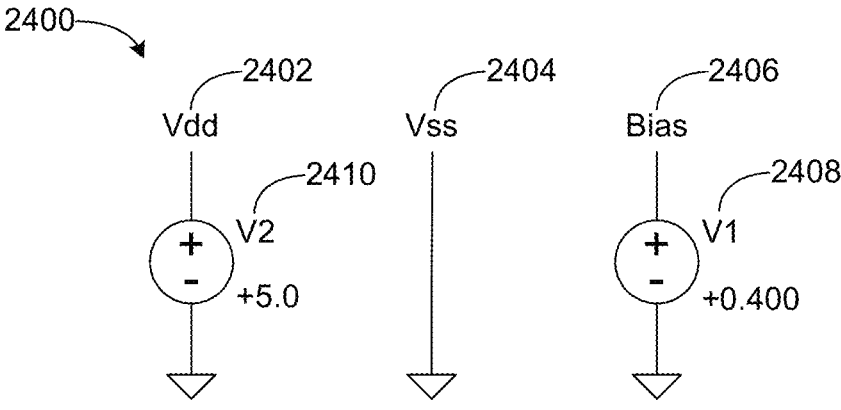
FIGS. 24A-24C show a schematic diagram of a single neuron CMOS operational amplifier, according to some implementations.
Figure 24B:
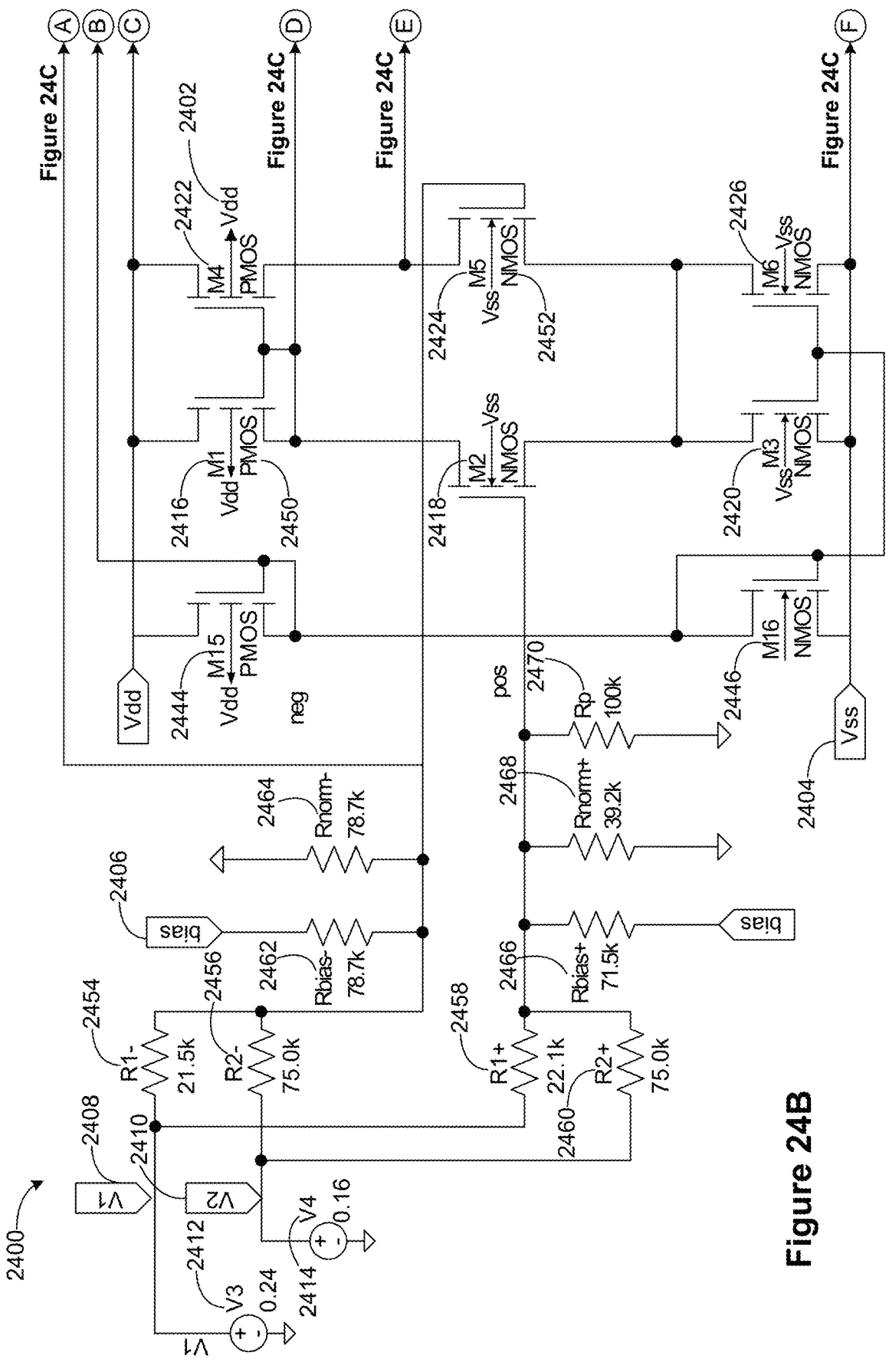
Figure 24C:
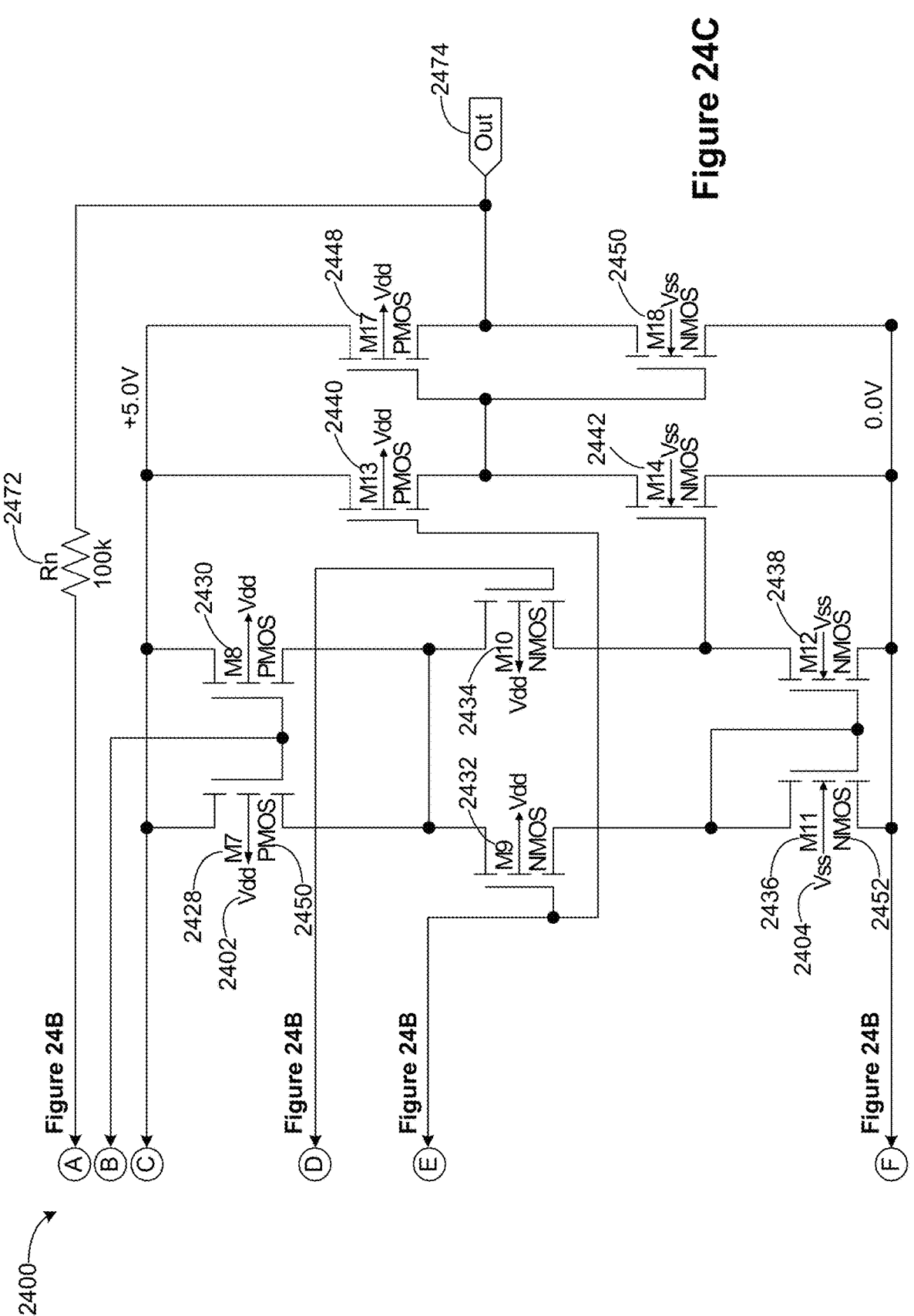

FIGS. 24A-24C show a schematic diagram of a single neuron OP1 CMOS OpAmp 2400, according to some implementations. The example is a variant of a single neuron on an operational amplifier, made on CMOS according to an OP1 scheme described herein. In this scheme, contacts V1 2410 and V2 2408 are inputs of a single neuron, contact bias 2406 is voltage +0.4 V relative to GND, contact Input Vdd 2402 is positive supply voltage +5.0 V relative to GND, contact Vss 2404 is GND, and contact Out 2474 is output of a single neuron. Parameters of CMOS transistors are determined by the ratio of geometric dimensions: L (the length of the gate channel), and W (the width of the gate channel). This Op Amp has two current mirrors. The current mirror on NMOS transistors M3 2420, M6 2426, and M13 2440 provides the offset current of the differential pair on NMOS transistors M2 2418 and M5 2424. The current mirror in the PMOS transistors M7 2428, M8 2430, and M15 2444 provides the offset current of the differential pair on the PMOS transistors M9 2432 and M10 2434. In the first differential amplifier stage, NMOS transistors M2 2418 and M5 2424 are amplifying, and PMOS transistors M1 2416 and M4 2422 play the role of active current load. From the M5 2424 transistor, the signal is output to the PMOS gate of the transistor M13 2440. From the M2 2418 transistor, the signal is output to the right input of the second differential amplifier stage on PMOS transistors M9 2432 and M10 2434. NMOS transistors M11 2436 and M12 2438 play the role of active current load for the M9 2432 and M10 2434 transistors. The M17 2448 transistor is switched on according to the scheme with a common source for a positive half-wave of the signal. The M18 2450 transistor is switched on according to the scheme with a common source for the negative half-wave of the signal. To increase the overall load capacity of the Op Amp, an inverter on the M17 2448 and M18 2450 transistors is enabled at the output of the M13 2440 and M14 2442 transistors.

FIG. 24D shows a table 2476 of description for the schematic diagram shown in FIG. 24A-24C, according to some implementations. The weights of the connections of a single neuron (with two inputs and one output) are set by the resistor ratio: w1=(Rp/R1+)–(Rn/R1–); w2=(Rp/R2+)–(Rn/R2–); w bias=(Rp/Rbias+)–(Rn/Rbias–). Normalizing resistors (Rnorm– and Rnorm+) are necessary to obtain exact equality: (Rn/R1–)+(Rn/R2–)+(Rn/Rbias–)+(Rn/Rnorm–)= (Rp/R1+)+(Rp/R2+)+(Rp/Rbias+)+(Rp/Rnorm+). N-Channel MOSFET transistors with explicit substrate connection include transistors M2 and M5 with L=0.36u and W=3.6u, transistors M3, M6, M11, M12, M14, and M16 with L=0.36u and W=1.8u, and transistor M18 with L=0.36u and W=18u. P-Channel MOSFET transistors with explicit substrate connection include transistors M1, M4, M7, M8, M13, and M15 with L=0.36u and W=3.96u, transistors M9 and M10 with L=0.36u and W=11.88u, and transistor M17 with L=0.36u and W=39.6u.

Example Scheme of a Single Neuron OP3 CMOS OpAmp

FIGS. 25A-25D show a schematic diagram of a variant of a single neuron 25000 on operational amplifiers, made on CMOS according to an OP3 scheme, according to some implementations. The single neuron consists of three simple operational amplifiers (OpAmps), according to some implementations. The unit Neuron adder is performed on two Opamps with bipolar power supply and the RELU activation function is performed on an OpAmp with unipolar power supply and with a gain of =10. Transistors M1 25028-M16 25058 are used for summation of negative connections of the neuron. Transistors M17 25060-M32 25090 are used for adding the positive connections of the neuron. The RELU activation function is performed on the transistors M33 25092-M46 25118. In the scheme, contacts V1 25008 and V2 25010 are inputs of the single neuron, contact bias 25002 is voltage +0.4 V relative to GND, contact Input Vdd 25004 is positive supply voltage +2.5 V relative to GND, contact Vss 25006 is negative supply voltage −2.5 V, and contact Out 25134 is output of the single neuron. Parameters of CMOS transistors used in a single neuron are determined by the ratio of geometric dimensions: L (the length of the gate channel) and W (the width of the gate channel). Consider the operation of the simplest OpAmp included in a single neuron. Each op amp has two current mirrors. The current mirror on NMOS transistors M3 25032 (M19 25064, M35 25096), M6 25038 (M22 25070, M38 25102) and M16 25058 (M32 25090, M48 25122) provides the offset current of the differential pair on NMOS transistors M2 25030 (M18 25062, M34 25094) and M5 25036 (M21 25068, M35 25096). The current mirror in PMOS transistors M7 25040 (M23 25072, M39 25104), M8 25042 (M24 25074, M40 25106) and M15 25056 (M31 2588) provides the offset current of the differential pair on PMOS transistors M9 25044 (M25 25076, M41 25108) and M10 25046 (M26 25078, M42 25110). In the first differential amplifier stage, NMOS transistors M2 25030 (M18 25062, M34 25094) and M5 25036 (M21 25068, M37 25100) are amplifying, and PMOS transistors M1 25028 (M17 25060, M33 25092) and M4 25034 (M20 25066, M36 25098) play the role of active current load. From the transistor M5 25036 (M21 25068, M37 25100), the signal is input to the PMOS gate of the transistor M13 25052 (M29 25084, M45 25116). From the transistor M2 25030 (M18 25062, M34 25094), the signal is input to the right input of the second differential amplifier stage on PMOS transistors M9 25044 (M25 25076, M41 25108) and M10 25046 (M26 25078, M42 25110). NMOS transistors M11 25048 (M27 25080, M43 25112) and M12 25048 (M28 25080, M44 25114) play the role of active current load for transistors M9 25044 (M25 25076, M41 25108) and M10 25046 (M26 25078, M42 25110). Transistor M13 25052 (M29 25082, M45 25116) is included in the scheme with a common source for a positive half-wave signal. The transistor M14 25054 (M30 25084, M46 25118) is switched on according to the scheme with a common source for the negative half-wave of the signal.

The weights of the connections of a single neuron (with two inputs and one output) are set by the resistor ratio: w1=(R feedback/R1+)–(R feedback/R1–); w2=(R feedback/R2+)–(R feedback/R2–); wbias=(R feedback/Rbias+)–(R feedback/Rbias–); w1=(R p*K amp/R1+)–(R n*K amp/R1–); w2=(R p*K amp/R2+)–(R n*K amp/R2–); wbias=(R p*K amp/Rbias+)–(R n*K amp/Rbias–), where K amp=R1ReLU/R2ReLU. R feedback=100k—used only for calculating w1, w2, wbias. According to some implementations, example values include: R feedback=100k, Rn=Rp=Rcom=10k, K amp ReLU=1+90k/10k=10, w1= (10k*10/22.1k)–(10k*10/21.5k)=−0.126276, w2=(10k*10/75k)–(10k*10/71.5k)=−0.065268, wbias=(10k*10/71.5k)– (10k*10/78.7 k)=0.127953.

The input of the negative link adder of the neuron (M1-M17) is received from the positive link adder of the neuron (M17-M32) through the Rcom resistor.

Figure 25A:
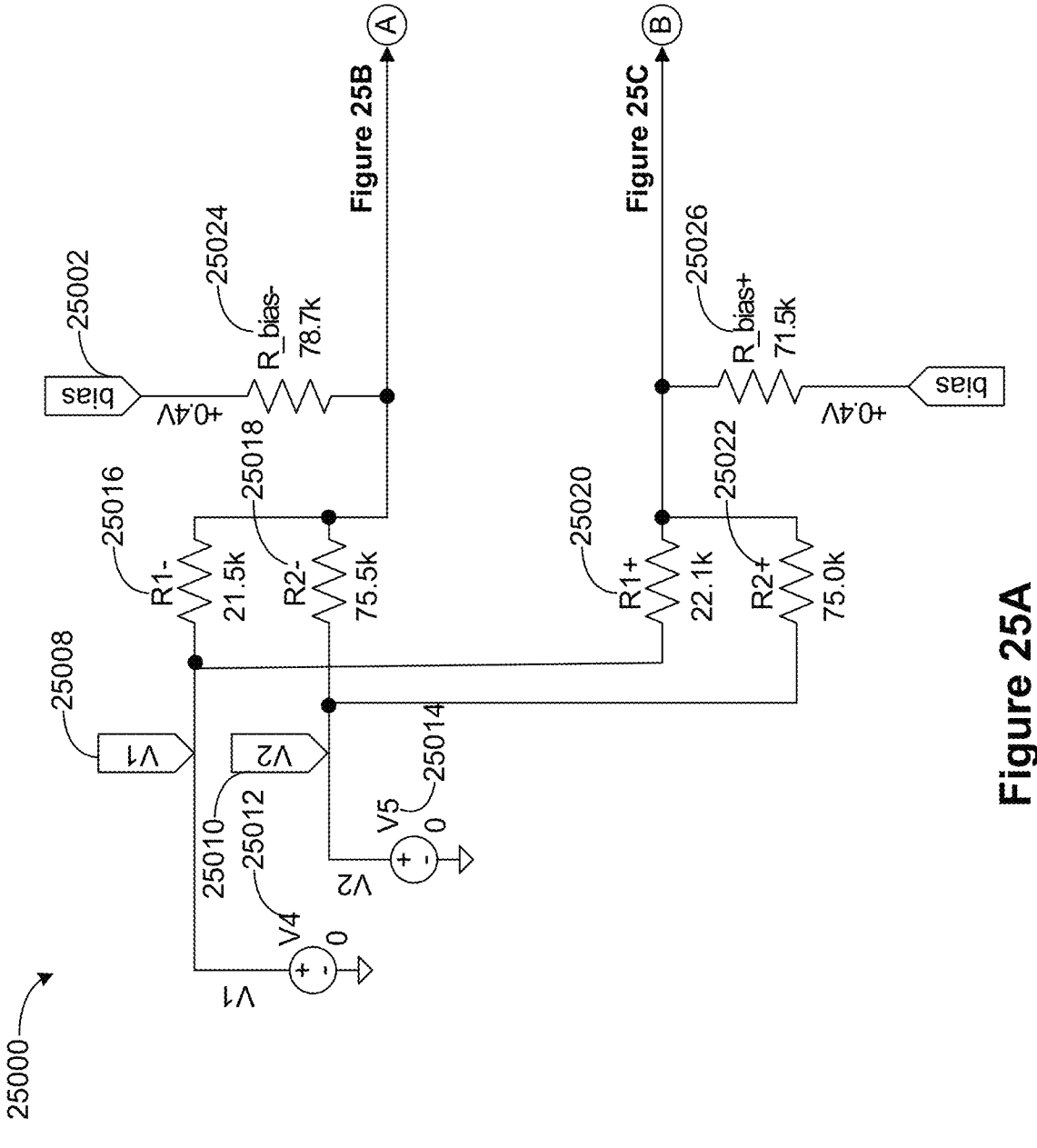
FIGS. 25A-25D show a schematic diagram of a variant of a single neuron CMOS operational amplifiers according to some implementations.
Figure 25B:
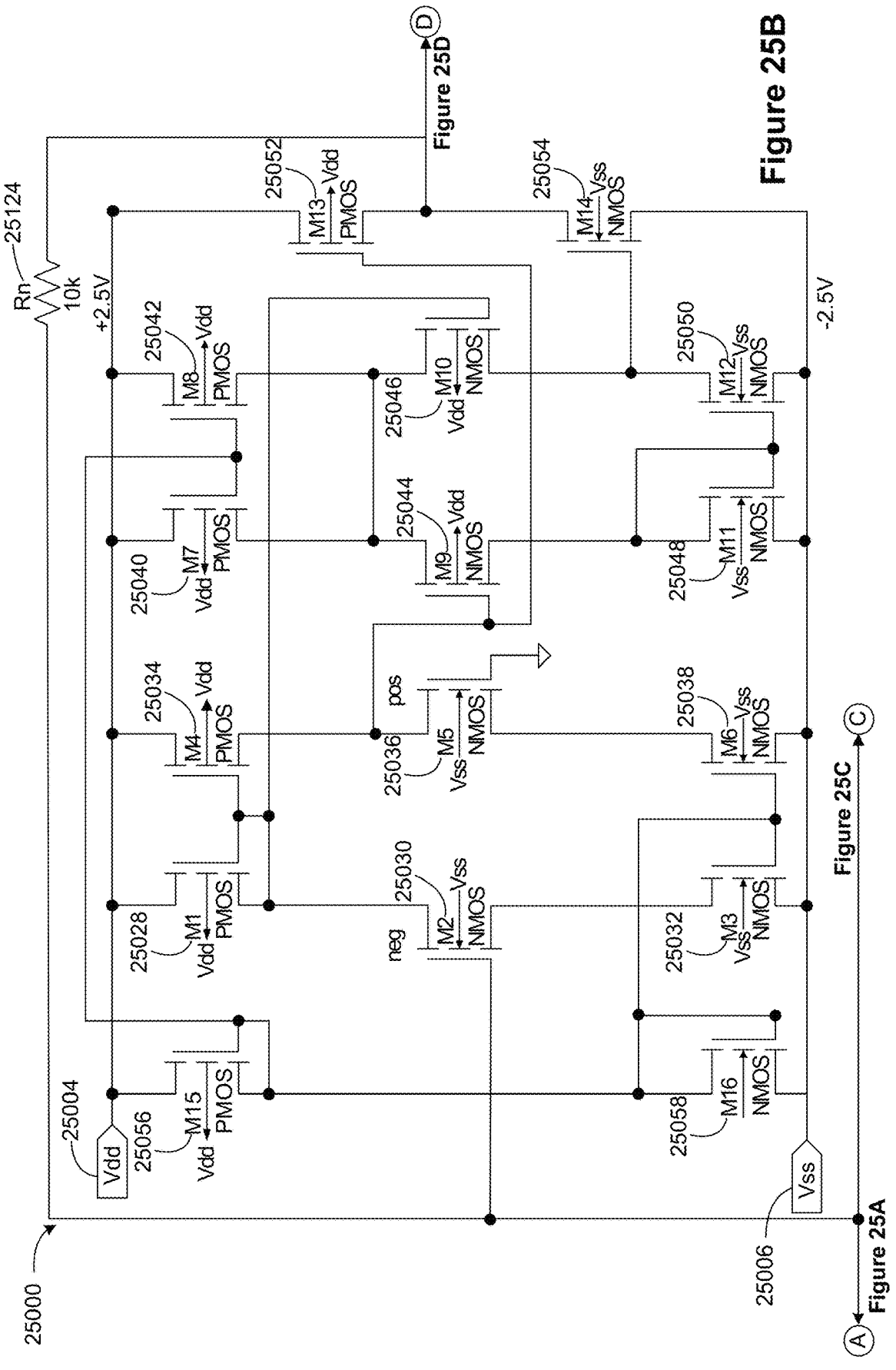
Figure 25C:
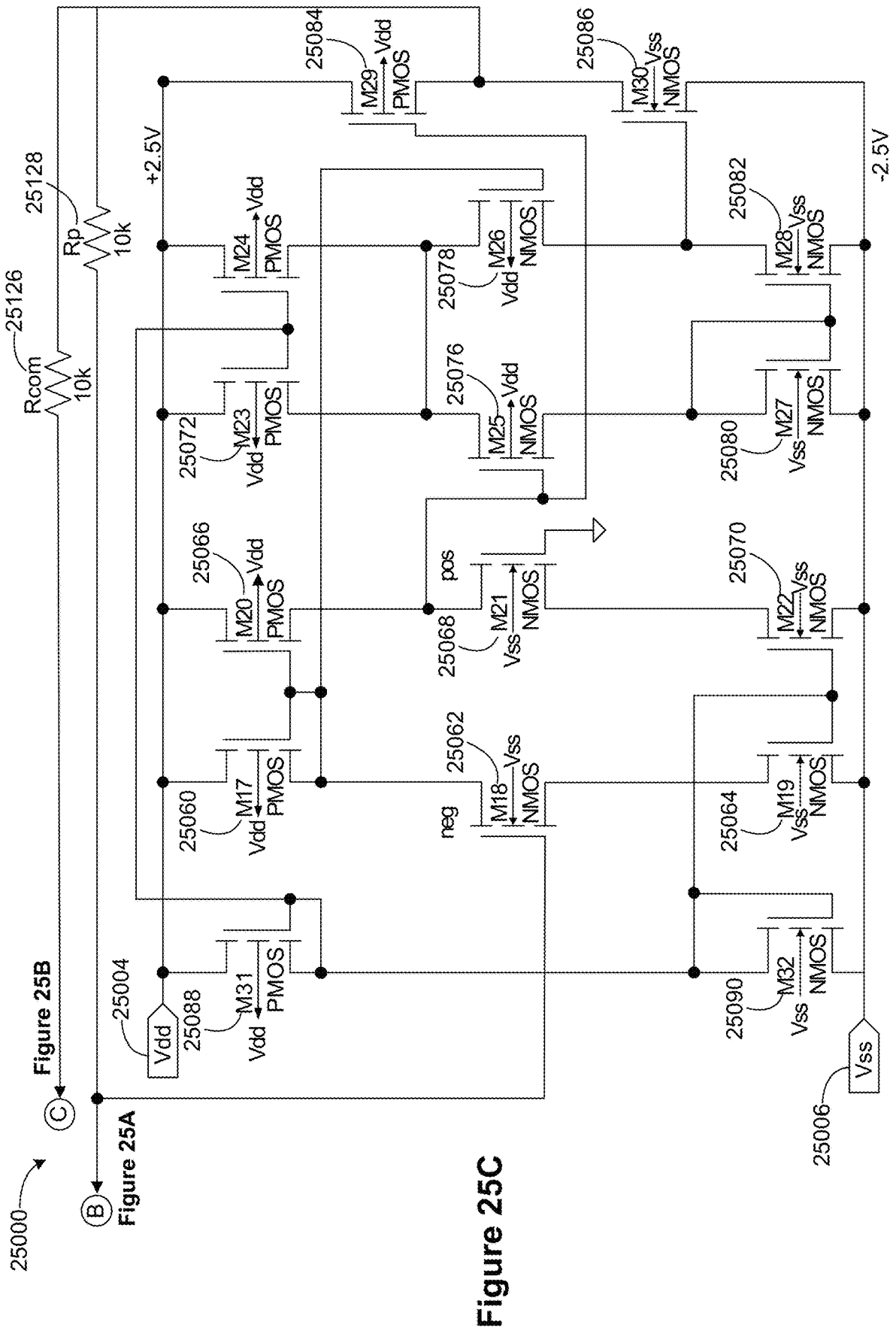
Figure 25D:
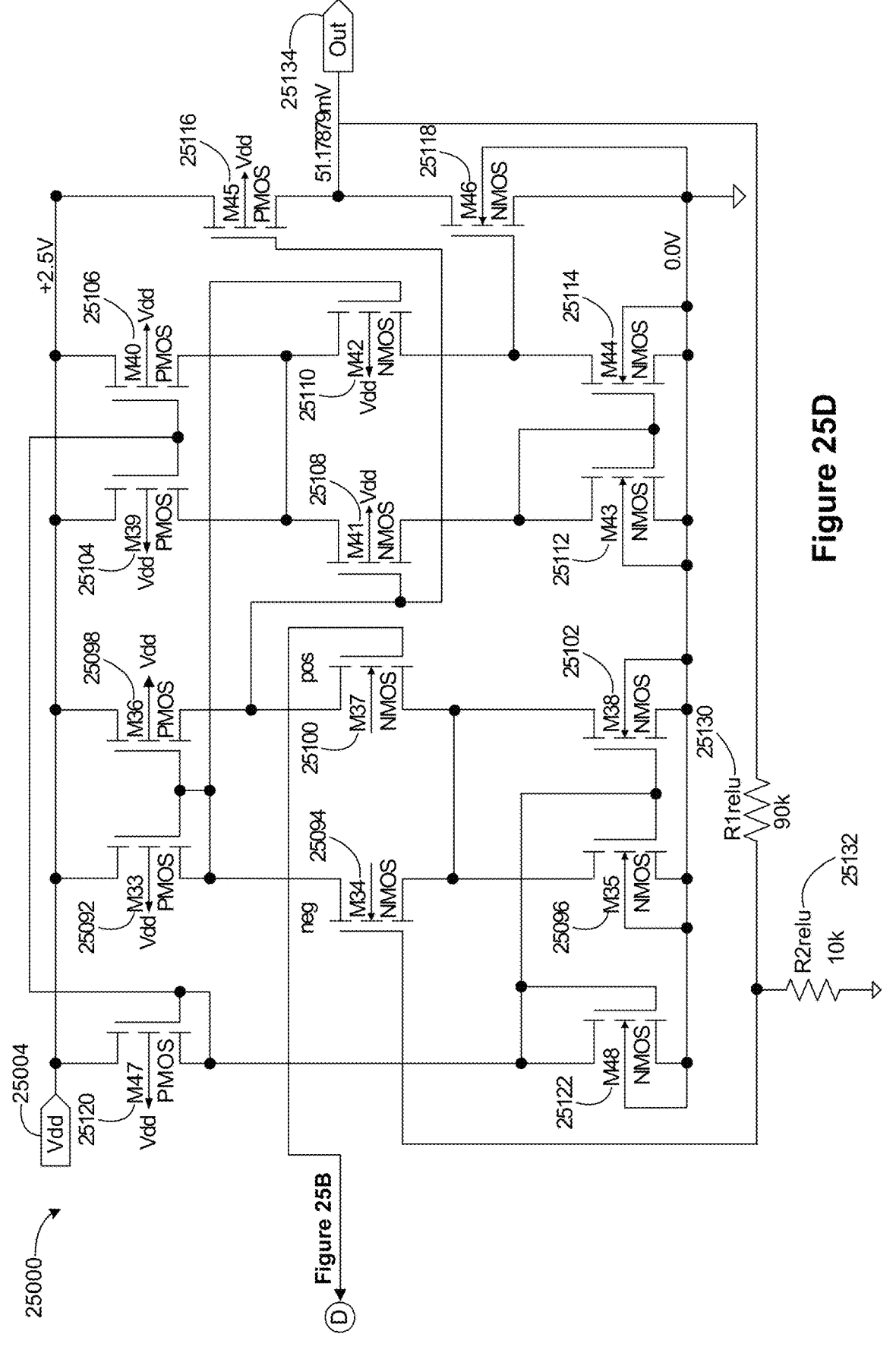
Figure 26A:
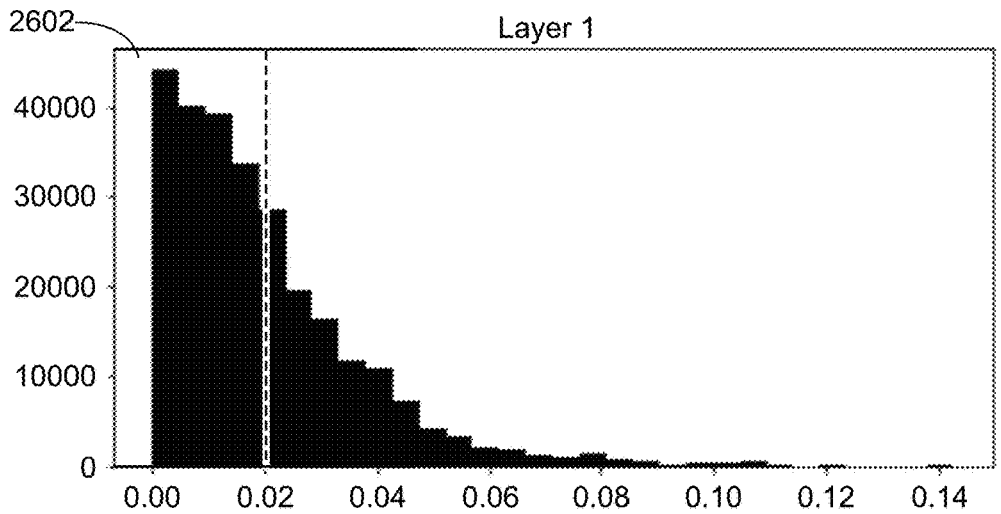
FIGS. 26A-26K show example weight distribution histograms, according to some implementations.
Figure 26B:
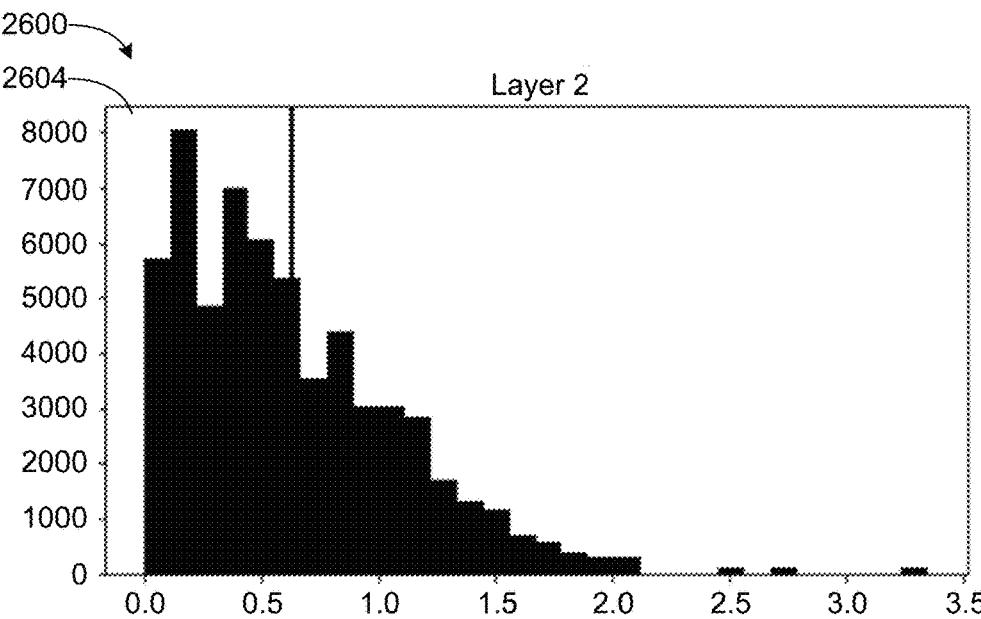
Figure 26C:
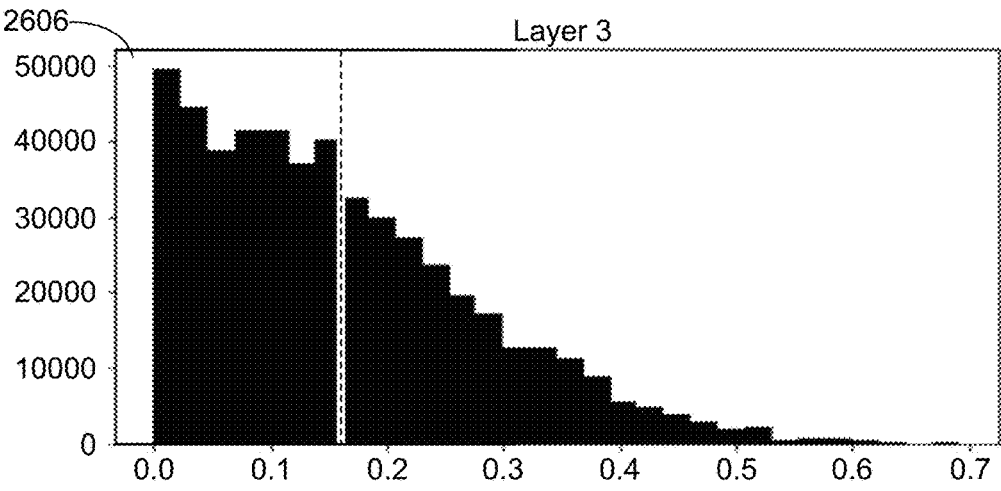
Figure 26D:
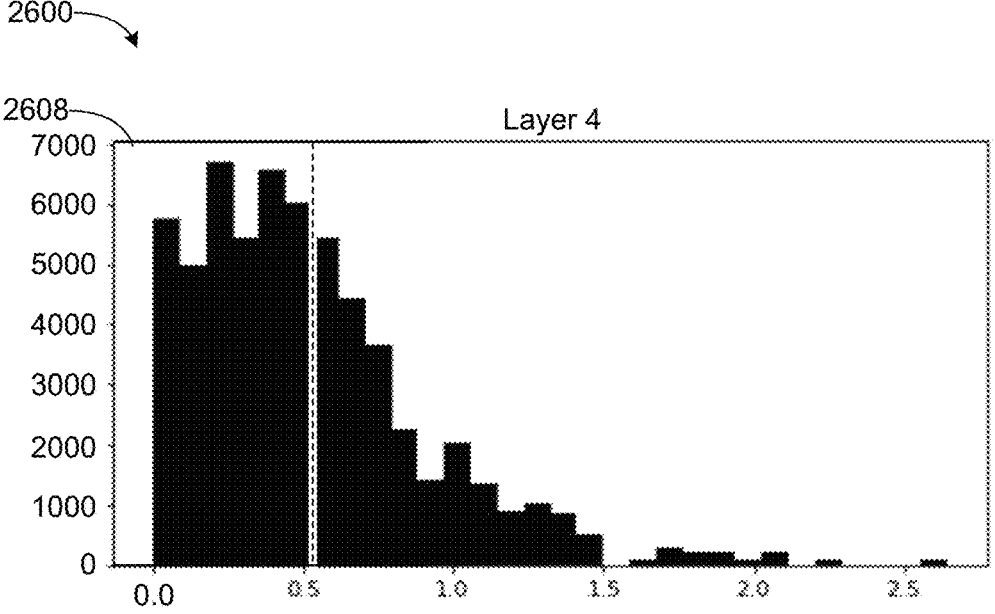
Figure 26E:
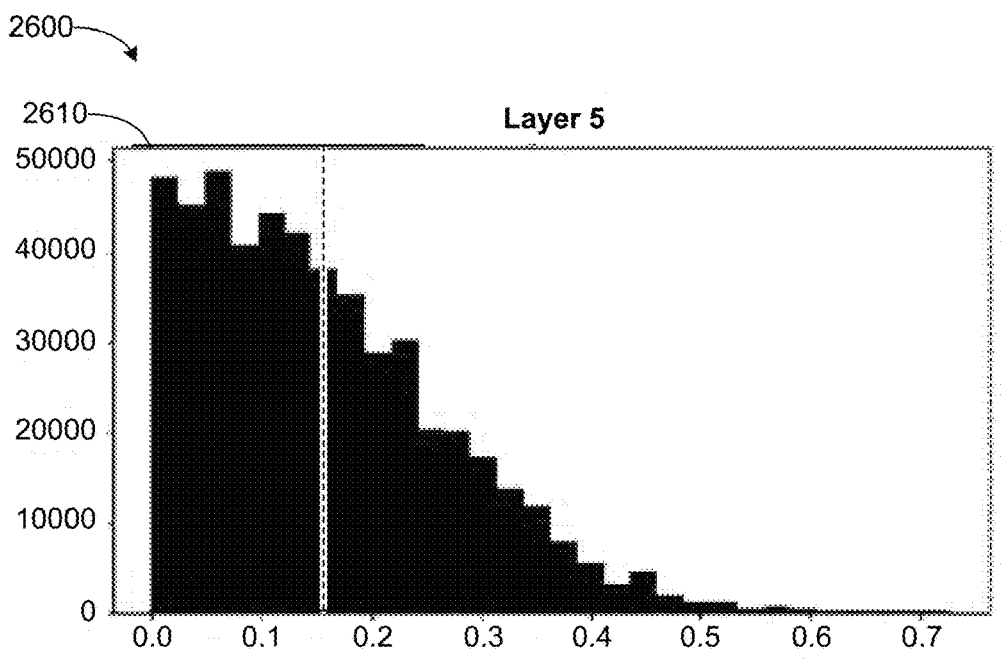
Figure 26F:
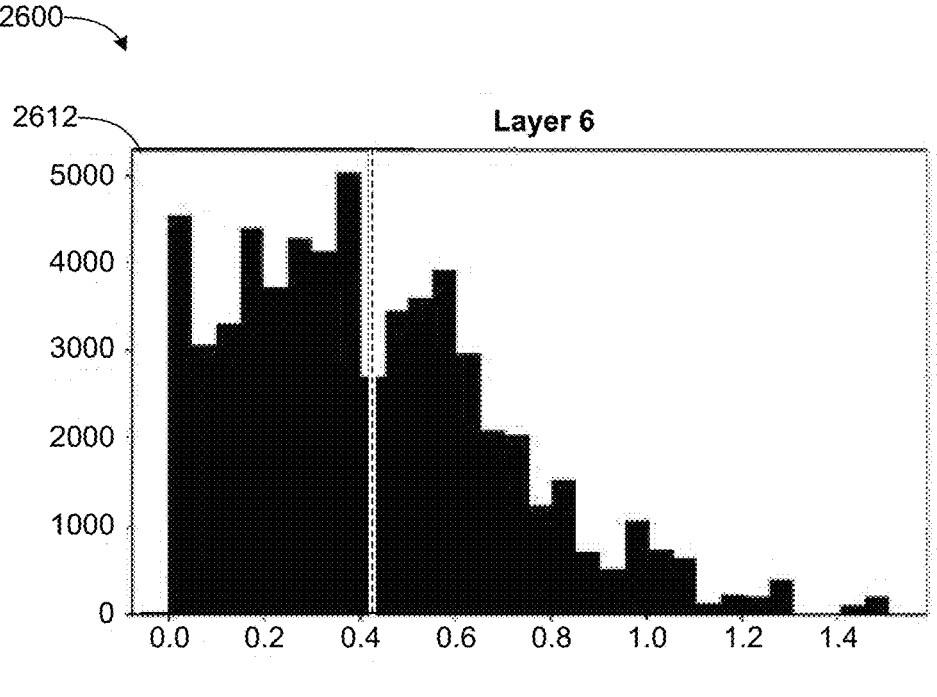
Figure 26G:
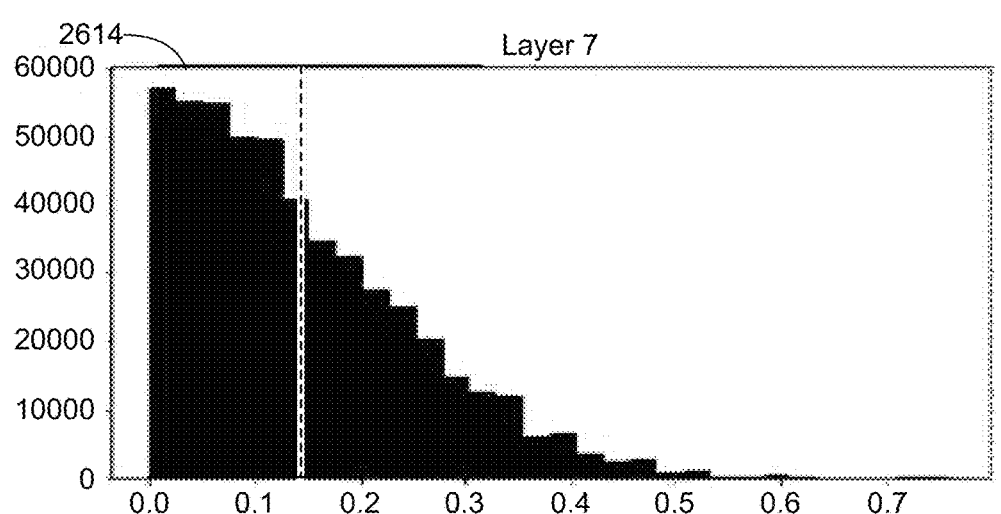
Figure 26H:
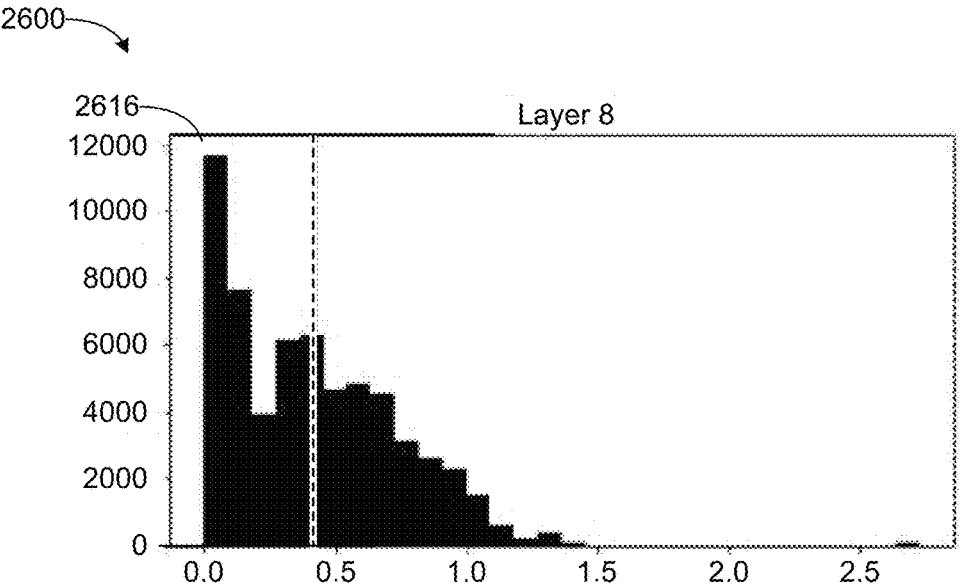
Figure 26I:
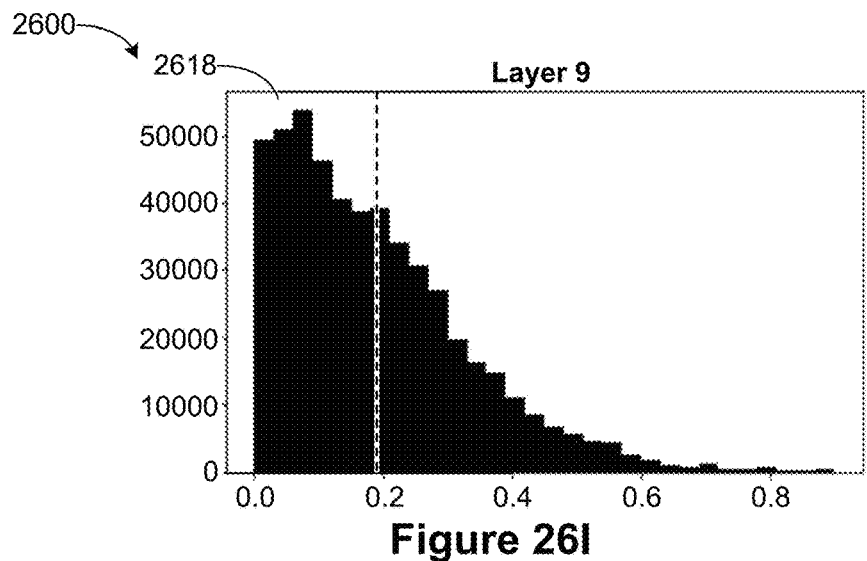
Figure 26J:
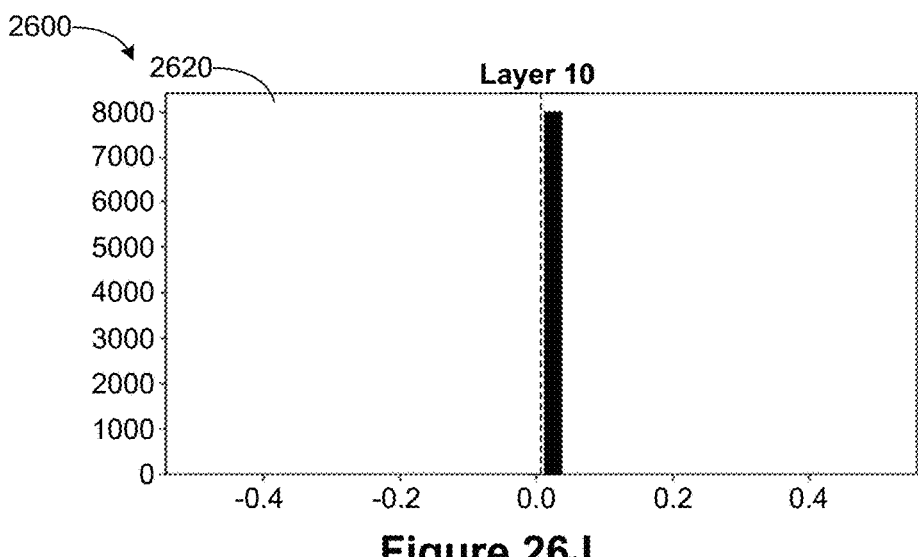
Figure 26K:
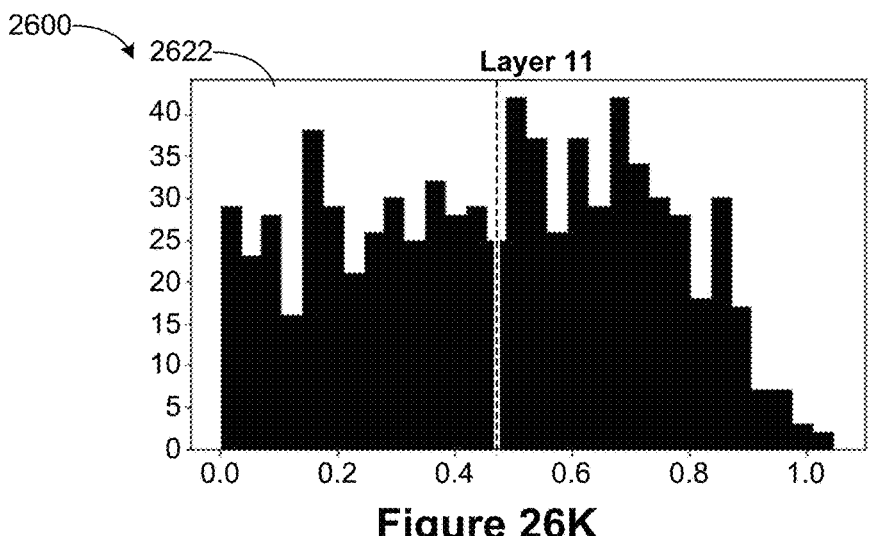

FIG. 25E shows a table 25136 of description for the schematic diagram shown in FIG. 25A-25D, according to some implementations. N-Channel MOSFET transistors with explicit substrate connection include transistors M2, M5, M18, M21, M34, and M37, with L=0.36u and W=3.6u, transistors M3, M6, M11, M12, M14, M16, M19, M22, M27, M28, M32, M38, M35, M38, M43, M44, M46, and M48, with L=0.36u and W=1.8u. P-Channel MOSFET transistors with explicit substrate connection include transistors M1, M4, M7, M8, M13, M15, M17, M20, M23, M24, M29, M31, M33, M36, M39, M40, M45, and M47 with L=0.36u and W=3.96u, and transistor M9, M10, M25, M26, M41, and M42, with L=0.36u and W=11.88u.

Example Methods for Optimizations and Transformations for Analog Hardware Realization of Trained Neural Networks Some implementations perform a two-stage conversion process for optimizing and/or transforming trained neural networks to analog hardware. A first stage (sometimes called T-transformation or T conversion) converts any neural network, existing in digital form in Keras, Tensor flow, or other library, and/or formulated in any form (e.g., software code, algorithms, diagrams, reduced to written instructions, other program code, or hardware in the loop) into a T-Network (examples of which are described above). Each element has an electronic circuit representation. A second stage converts the T-Network into a behavioral model (Netlist), which can be uploaded to modern IC CAD software packages (e.g., Synopsys, Cadence, or Mentor Graphics). In some implementations, both stages or algorithms can be realized as software packages and the function of conversion can be done automatically.

The techniques described herein are related to the class of automated Integration Circuit (IC) design synthesis algorithms. Digital integrated circuits can be synthesized using Register Transfer Language (RTL) code. For example, RISC-V processor cores or any ARM architectures or RAM memory cells or other digital circuits, can be synthesized. It is not obvious, however, that analog integrated circuits can be translated into a mask set, similar to digital integrated circuits. Typically, analog circuit design is node- and process-specific and the placement of analog elements inside the layout is critical. Therefore, the analog circuit design is implemented manually. But if one analog core element is developed, and the neural network integrated circuit consists of identical analog core elements connected in a certain way according to a connection scheme, the design of an analog integrated circuit can be synthesized using standard core elements, based on the connections between standard cells (e.g., Netlist). Conventional systems (e.g., Syntiant) have tried to automate the process of neural network conversion into electronic circuit design layout. But there are no known algorithms that would allow automatic generation of the IC design layout from an initial mathematical neural network. The techniques described herein can be used to fully automate generation of analog integrated circuit design layout for an initial neural network, regardless of the type of the neural network, including feed forward and recurrent neural networks. The algorithms described herein can be used to automatically generate IC layout, in combination with any relevant CAD software package (e.g., Synopsys, Mentor Graphics, or Cadence).

As used herein, "T-conversion" is a process of transformation of a mathematically formulated neural network, in any form (e.g., software code or algorithms, diagrams, reduced to written instructions, other program code, or hardware in the loop), into another neural network having a direct representation in IC circuit schematics. This means that the resultant neural network consists of elements having an electronic circuit representation. R-quantization is a process of weight quantization of the initial neural network during T-transformation, and includes substituting abstract weights with resistor values. O-quantization is a process of replacing each ideal operational amplifier with the schematic of a certain operational amplifier from a library. R-randomization is a stochastic modeling process that models neural network output for a given set of resistor values. The resistors have random variation and/or tolerance as defined by a manufacturing process. In some implementations, the process includes randomly choosing resistor values from those allowed by a preset variation interval of resistor values. O-randomization is a process of randomly choosing the parameters of an operational amplifier from the range allowed by process norm variations (e.g., as set by a fab). An SNM model is a Single Neuron Model in mathematical form and in schematics. The term "FEOL" refers to Front End of Line layers of Integration Circuits, and "BEOL" refers to Back End of Line layers of Integration Circuits. This is illustrated below in FIG. 30.

Example T-Conversion Algorithm

Figure 27A:
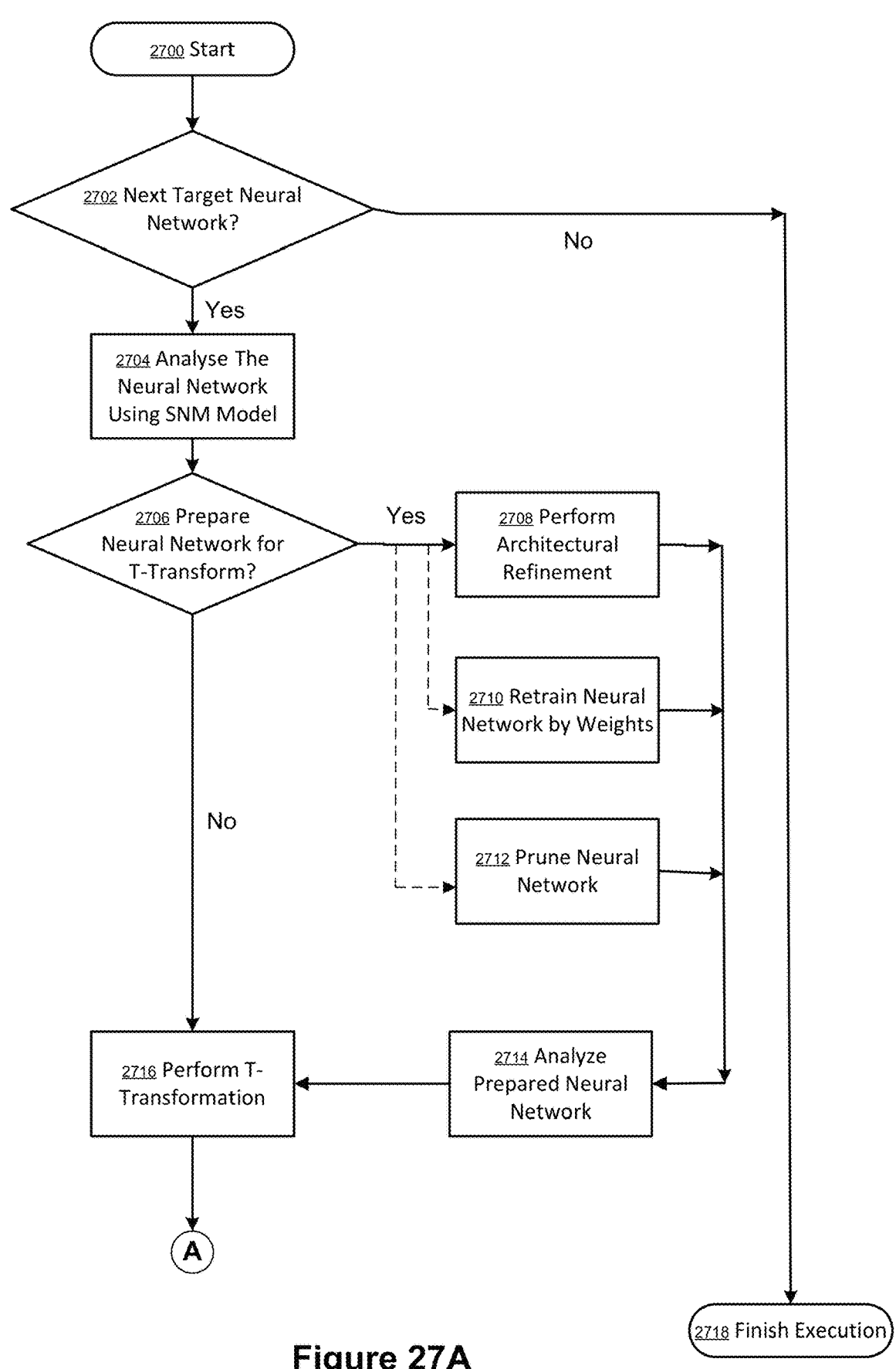
FIGS. 27A and 27B show a flowchart of a method for T-conversion of neural networks, according to some implementations.
Figure 27B:
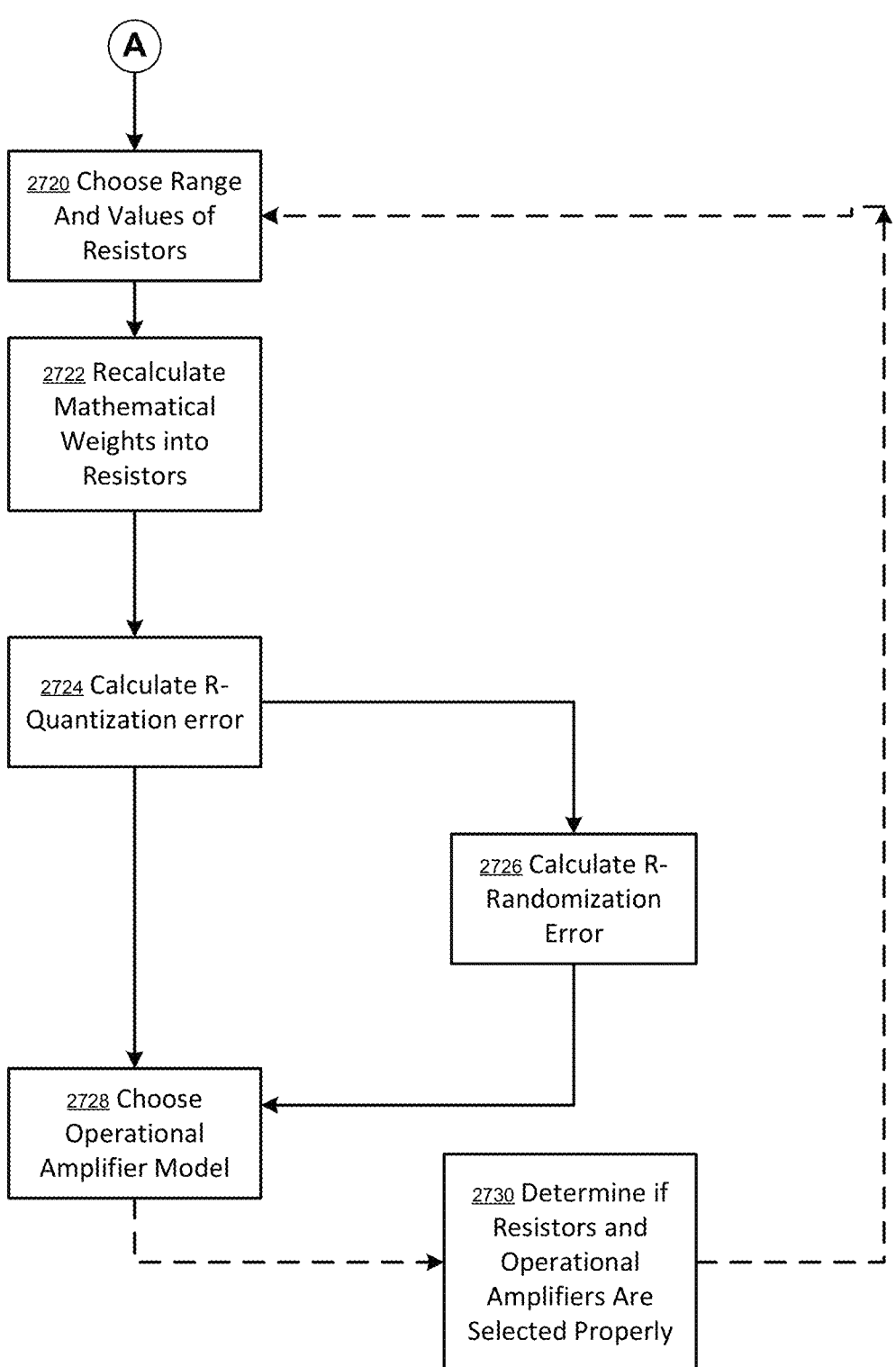

T-conversion includes operations shown in FIGS. 27A and 27B, according to some implementations. The algorithm starts (2700) by selecting (2702) a next target neural network formulated in any form (e.g., software code, such as algorithms, diagrams, reduced to written instructions, other program code, or hardware in the loop). The target neural network has to be converted into an analog circuit. The algorithm finishes (2718) execution if all neural networks (or parts of neural networks) have been transformed. The neural networks may include convolutional neural networks, perceptron type neural networks, recurrent LSTM type neural networks, recurrent GRU type neural networks, fully connected feedforward neural networks, and/or any other feedforward or recurrent network types, selected from the universe of neural networks. In some implementations, the neural networks are used for edge computing, and both recurrent and feedforward neural networks may be used.

The selected neural network is analyzed (2704) using an SNM model. This step may include searching for non-linear elements in the neural network, calculating the range of weights for each layer as well as the values of the sum of the weights for each neuron, and/or analyzing the architecture from the point of view of compatibility with T-conversion basic concepts. Based on this analysis, the algorithm determines (2706) if the neural network needs to be prepared for T-transformation. If the neural network needs to be prepared for T-transformation, the algorithm performs (2708) architectural refinement which includes changes of the neural network architecture to better suit T-transformation. Architectural refinement is described in more detail below.

Some implementations retrain (2710) the neural network by weights, including introducing additional regularizers to the network. Regularizers are additions to the general training loss function (e.g., penalties depending on the network weights). The regularizers reduce nominal values of neural network weights and reduce weight sums for each neuron. The method includes completing training with the regularizers on the value of each weight, and/or the sum of the weights of the neuron. An example is the Keras 12 regularizer, which reduces absolute weight values. In some implementations, for each Conv-BatchNorm-ReLU block, a complex custom regularizer is used. The custom regularizer treats each BatchNorm layer as a normalization. It also calculates combined Conv-BatchNorm multipliers (i.e., weights) applied to the neural network signals in its propagation path and reduces these combined weights in absolute value for each neuron.

Some implementations prune (2712) the neural network. Pruning can be software pruning or pruning as described above. Subsequently, the prepared neural network is analyzed (2714) for any remaining steps. If there are remaining preparation steps, the preceding steps are repeated. Next, the method performs (2716) T-transformation, which may include applying batch normalization weights to the weights of the previous layer of any BatchNormalization layer (sometimes called a batchNorm layer or a BN layer). During inference, any BatchNormalization layer essentially works as a linear normalization layer, applying additive and multiplicative coefficients to the signal. These coefficients can be calculated for each neuron based on layer weights for this neuron using the following set of equations:

$$sigma = math.sqrt(\text{moving\_variance} + epsilon)$$

$$k\_mult = gamma/sigma$$

$$k\_add = beta - \text{moving\_mean} * k\_mult$$

In the equations above, gamma, beta, moving_mean, and moving_variance are trainable weights of a batchNorm layer, and epsilon is a fixed coefficient of the batchNorm layer. As any composition of linear transformations is a linear transformation, a convolution layer (sometimes called Conv, without activation) followed by a BN layer can be interpreted as a single linear transformation of a neural network signal (i.e., a signal layer of a T-network). In some implementations, the T-Transformation step 2716 also includes translation of the neural network into a directed graph structure made from single neurons and weight connections, and a merge of all layers that do not have an activation function. For example, a superposition of linear transformations is a linear transformation. Therefore, if there are three dense layers without activation, for example, the three dense layers are essentially like one dense layer, but with different weights. There is always activation on dense layers, but there are cases when it is not present on convolutions. Further, suppose a linear transformation is x'=Ax+b, and the subsequent linear transformation is x"=A'x'+b'=A' (Ax+b)+b'=(A'A)x+(A'b+b'). The subsequent linear transformation can be treated as a single linear transformation in relation to x with weights defined according to the above formula. To illustrate further, suppose there are two sequential dense layers and there is no activation function between them. Suppose further that the first dense layer is described with a weight matrix $W_1$ and a bias $b_1$, and the second dense layer is described with a weight matrix $W_2$ and a bias $b_2$. Then, both layers together produce an output of $X_{out}=W_2$ $(W_1 \cdot X+b_1)+b_2=(W_2 \cdot W_1)X+W_2 \cdot b_1+b_2$ which is a single linear transformation with a weight matrix of $W_2 \cdot W_1$.

Layers with a ReLU in the original neural network become ReLU1, according to some implementations. To maintain the normal operation of the neural network during this transformation, the passage of signals through the neural network is analyzed and weight correction is performed. When the weights of layer N are divided by a factor, the weights of layer N+1 are multiplied by that factor. Such a correction wave is performed through the entire network until it is possible to achieve complete compliance (e.g., all of the weights are within the physical limits). The signals on layers with unlimited ReLU are scaled so that they do not get out of the physical limiter. To illustrate, suppose possible output values for a particular neuron P with ReLU activation lies in the range [0, N], where N>Vfeed (or 1). In order to keep the signal within the required range of [0, Vfeed] (or [0,1]), some implementations reduce weights and bias of the neuron P by a factor of N/Vfeed as follows:

$$w' = w * Vfeed/N$$

$$b' = b * Vfeed/N$$

The signal on the next layer is scaled by multiplying all weights values for connections originating from neuron P output, by a factor of N/Vfeed as follows:

$$w'' = w * N/Vfeed$$

If necessary, some implementations introduce additional intermediate layers that limit the number of input and output links of the neuron. In order to reduce the output links of the neuron, some implementations use output splitting. Suppose a neuron P has K outputs leading to neurons $\{P_i, \ldots, P_k\}$ with weights $\{w_1, \ldots, w_k\}$. Some implementations add neurons $Q_1, Q_2$ and an arbitrary index $1 <= q < K$, and change neuron connections in the following way: P has two outputs leading to neurons $\{Q_1, Q_2\}$ with weights $\{1,1\}$; $Q_1$ has q outputs leading to neurons $\{P_1, \ldots, P_q\}$ with weights $\{w_1, \ldots, w_q\}$; $Q_2$ has k-q outputs leading to neurons $\{P_{q+1}, \ldots, P_k\}$ with weights $\{w_{q+1}, \ldots, w_k\}$. Input splitting is performed similarly for the inputs to the neural network. In this way, a T-converted neural network is obtained, which is fully equivalent to the initial trained neural network, and the representation is generated in electronic schematics, which can be converted to a behavioral model (e.g., aNetlist).

FIG. 27B shows steps for conversion of the T-converted neural Network to a Netlist, according to some implementations. In some implementations, the conversion includes the representation of each single neuron as a subcircuit or a separate model. In some implementations, the conversion includes the representation of each operational amplifier as a subcircuit or a separate model. In some implementations, the conversion includes a numerical operational amplifier model that describes one or more of the following effects: (i) evaluation of the operation of the operational amplifier in the nonlinear region (i.e., where the output voltage is close to zero or close to the supply voltage), including depending on the current gain; (ii) the effect in the linear domain of the operational amplifier from the final gain factor, including depending on the current gain; and (iii) the effect in the linear domain of the operational amplifier from a random shift for each operational amplifier within the specified limits (due to the technical process), including depending on the current gain. Step 2720 includes selecting possible range and values of the resistors, based on limitations of resistor manufacturing technology, die area, and energy consumption requirements. Step 2722 is sometimes called R-quantization, for calculating resistor values from mathematical weights. Step 2724 includes a calculation of R-quantization error which is the mean error of the equivalent analog network with quantized resistors and perfect operational amplifiers versus a math network on a set of input data. Step 2726 includes a calculation of R-randomization error, which is the mean error of the equivalent analog network with quantized resistors with random tolerance error and imperfect operational amplifiers with a predefined output model versus the math network on the set of input data.

In some implementations, the conversion is preceded by mathematical modeling, which uses (2728) a numerical model of the operational amplifier, and compares the result of the R-quantized and O-quantized network. In some implementations, the conversion is followed by modeling (2730) the netlist in CAD software to make sure that the conversion did not lead to additional discrepancies between the RO-quantized network and the netlist in CAD software. Part of the netlist modeling in CAD software includes supplying the input in constant voltage (dc) mode with a set of analog values corresponding to a specific sample of the dataset control sample used to evaluate the mathematical neural network, and removing the corresponding output voltages.

The conversion is preceded by mathematical modeling, which uses a behavioral model of an op-amp and compares simulated results of the R-quantized and O-quantized network with a respective initial mathematical model. After the conversion is finished, behavioral models of components in the synthesized netlist are changed for actual EDA-based models of the respective electronic components (i.e., opamps and integrated resistors). Such models are available either from the process vendor (a foundry) or designed in-house for the given fabrication process. The final netlist is characterized, and simulation results are then compared with the results taken from behavioral model simulation and with an initial mathematical model. The result of the multistage conversion process is a netlist based on an actual manufacturing process. The netlist represents a ready-to-manufacture integrated circuit IP-block.

Example PPG Sensor-Based Heart Rate Estimation

An example neural network calculates heart rate based on PPG and accelerometer signals. The neural network includes a convolutional network of 10 layers, which accepts raw PPG and accelerometer signals as inputs. The neural network is trained using LOSO validation and mean average error beats per minute (bpm) as the target. Network weights are regularized. Some of the connections and neurons are pruned. The resulting neural network has accuracy of approximately 4.6 bpm on high-intensity data down to approximately 1.7 bpm on low-intensity data. The neural network is T-transformed using the T-converter software module. Example operations are described above according to some implementations. Subsequently, quantization is performed, so that weights are reduced to component values. The T-converted neural network has approximately 43,000 neurons and approximately 1.2 million connections. Randomized tests are carried out, demonstrating that additional network error caused by T-transform, quantization and manufacturing scatter does not exceed 0.5 bpm. The NASP neural network is converted to Netlist plus a principal component model using the Netlist Generation Module. The Netlist passes the test bench, verifying that it produces similar results (within reasonable calculation error of $1.0*10^{-6}$) as a digital model on analog input signals, corresponding to dataset samples. True Netlist can be synthesized when a customer choses the technology node and the process design kit (PDK). The IP block GDSII layout is synthesized from true Netlist using standard CAD software. The Netlist contains descriptions of 2.4 million of resistors in BEOL layers and 43,000 Operational Amplifiers placed in FEOL layers.

Example Speech Key Word Spotting

A DS CNN convolutional network NASP IP block synthesis is provided as another example. The DS-CNN for spectrogram accepts 49 by 10 input and includes 10 words. The DS CNN includes 5 convolutional layers, 4 depthwise convolutional layers, an average pooling layer, a fully connected layer, and an output layer that includes Softmax of length 12. The DS-CNN has 94.4% accuracy. T-conversion generates a 12 layer T-Network with 72,000 neurons, 2.5 million connections, weights that are quantized and restricted, and RELU restricted to RELU 6. The T-network is transformed to a functional model (Netlist) based on amplifiers and resistors, including 72,000 operational amplifiers, 1,440,000 transistors, and 5 million resistors. Two resistors correspond to one connection. True Netlist is synthesized after a customer chooses the technology node and PDK. The IP block GDSII layout is synthesized from true Netlist using standard CAD software.

Example Optimizations for Analog Hardware Realization of Neural Networks

Figure 28A:
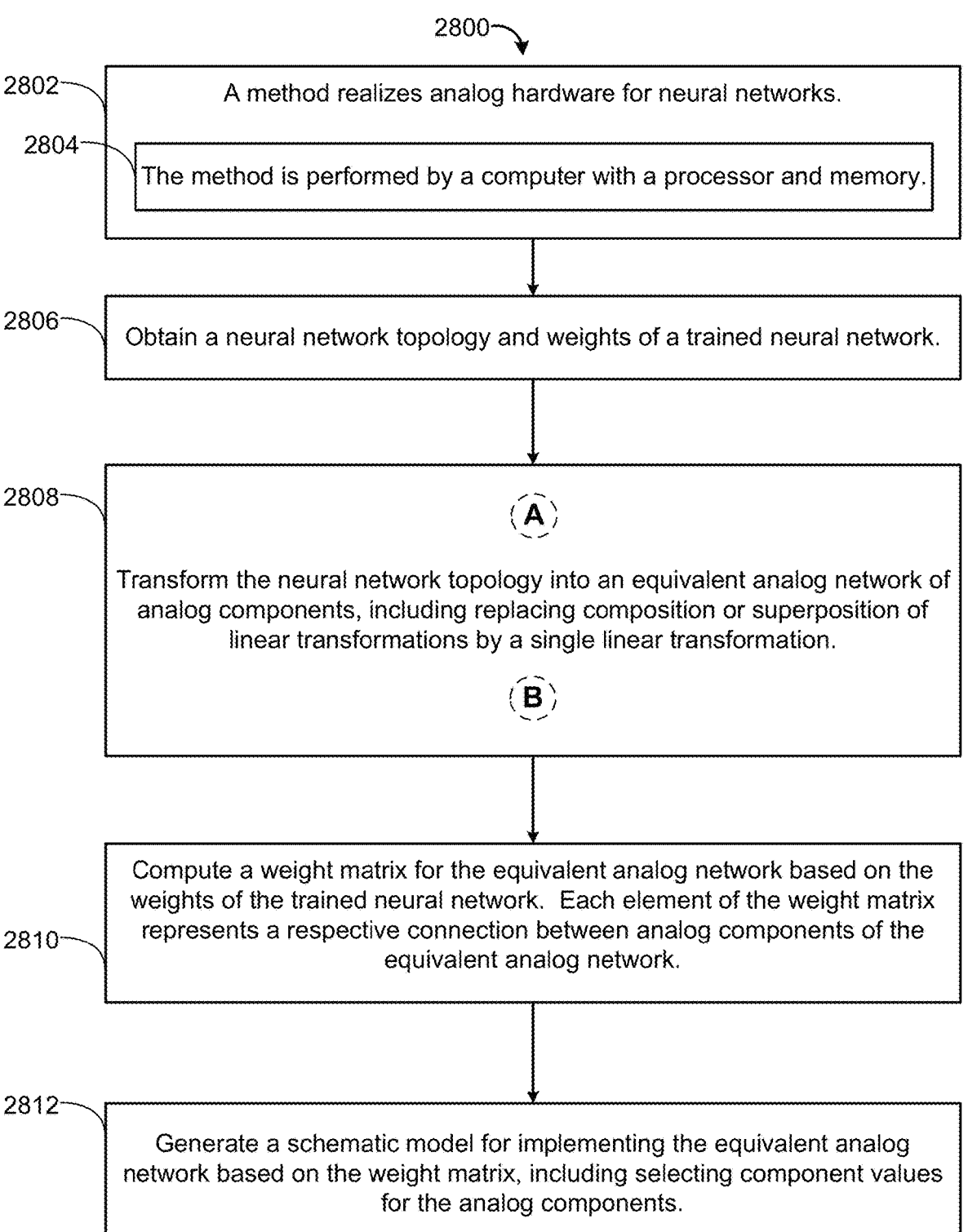

FIGS. 28A-28C show a flowchart of a method 2800 for hardware realization (2802) of neural networks, according to some implementations. The method is performed (2804) at a computing device 200 (e.g., using the neural network transformation module 226) having one or more processors 202, and memory 214 storing one or more programs configured for execution by the one or more processors 202. The method includes obtaining (2806) a neural network topology 224 and weights 222 of a trained neural network 220. In some implementations, the trained neural network is trained using software simulations to generate the weights.

The method also includes transforming (2808) the neural network topology into an equivalent analog network of analog components, including replacing composition or superposition of linear transformations by a single linear transformation. This step reduces the number of neurons, thereby reducing die area, energy consumption, and complexity of the following steps.

Referring next to FIG. 28B, some implementations retrain the neural network after introducing additional regularizers. In some implementations, prior to transforming the neural network topology to the equivalent analog network, the method performs (2814) several operations. The operations include adding (2816) regularizers (e.g., additions to the general training loss function, such as penalties depending on the network weights) to the neural network topology to reduce nominal values of the weights or to reduce the weight sum for each neuron. The system also retrains (2820) the trained neural network to obtain updated weights for the weight matrix. Adding regularizers help keep weights in required ranges. Weights outside certain ranges are not ideal at quantizing, which leads to increased error, energy consumption, or die area in comparison with regularized weights. The use of regularizers and additional learning adapt the neural network to further the analog transformation. In some implementations, the regularizers include (2818) a predetermined regularizer for each convolution batch normalization ReLU block. The predetermined regularizer treats each batch normalization layer as a normalization layer and calculates combined convolution-batch normalization multipliers applied to an input neural network signal in the signal's propagation path. This reduces the absolute value of the combined weights for each neuron. During inference, BatchNormalization (indicated by the prefix "bn") is a linear transformation with coefficients defined as follows (this example is for tensorflow keras, as indicated by the "tf" prefix, but other frameworks operate similarly):

$$sigma = tf.sqrt(bn.\text{moving\_variance} + bn.epsilon)$$

$$k\_mult = multiplier = bn.gamma/sigma$$

$$k\_add = bn.beta - bn.\text{moving\_mean} * k\_mult$$

In the equations above, k_mult and k_add determine coefficients for the linear transformation X_out=k_mult*X_in+k_add. In the equations above, bn.gamma, bn.beta, bn.moving_mean, and bn.moving_variance are trainable weights of a BatchNormalization layer, and epsilon is a fixed coefficient of the BatchNormalization layer.

Referring next to FIG. 28C, in some implementations, transforming (2808) the neural network topology to the equivalent analog network includes translating (2822) weights for each batch normalization layer into weights for its previous layer. Typically, BatchNormalization comes in blocks of three layers: convolution followed by BatchNorm, followed by ReLU. Convolution is a linear transformation. BatchNorm during inference is also a linear transformation. ReLU produces non-linearity. So, some implementations combine the two linear transformations (Convolution and BatchNorm) into one linear transformation. The coefficients of this combined linear transformation are calculated from weights of both layers. In some implementations, transforming the neural network topology into the equivalent analog network includes merging (2824) layers that do not have an activation function. In some implementations, transforming the neural network topology into the equivalent analog network includes transforming (2826) a linear transformation followed by another linear transformation into a single linear transformation. Some implementations combine any number of consecutive convolutional or dense layers (or any other layer type that produces a linear transformation) when there are no activations between them.

In some implementations, transforming the neural network topology into the equivalent analog network includes transforming (2828) layers with ReLU into ReLU1. In some implementations, transforming layers with ReLU into ReLU1 includes maintaining (2830) normal operation of the trained neural network during the transformation by analyzing the passage of signals through the trained neural network and performing weight correction. Weight correction is defined as multiplication of weights and bias (if available) of a neuron by a certain coefficient and division of weights of outgoing connections of this neuron by the same coefficient. Some implementations use weight correction in order to achieve maximum compliance between the original network and the transformed network, where compliance is measured as the average distance between both networks' output at different input signals. Weight correction may be performed layer-wise and/or neuron-wise. When weight correction is performed neuron-wise, it includes adjusting weights and bias of one or more neurons and adjustment of weights of outgoing connections of the one or more neurons. Weight correction may be used to keep signals in the network below a physical limit (because in analog, the system cannot produce any signal above the physical limit). So, when performing weight correction, some implementations first analyze the output range for each neuron on a given set of inputs. If the upper bound of the output range exceeds the physical limit, some implementations perform weight correction. In some implementations, performing weight correction includes: (i) when the weights of a layer N are divided by a factor, adjusting (2832) the weights of layer N+1 by multiplying the weights by that factor; and (ii) repeating (2832) the weight correction for the trained neural network until complete compliance is achieved. This step entails applying layer-wise weight correction to layers or neuron-wise weight correction to neurons until complete compliance is achieved. Compliance refers to a state when output signals for each neuron are below feed voltage for layers with unlimited ReLU activation. Possible neuron outputs are calculated for a wide set of network input data (e.g., 1,000 to 10,000 samples). For neuron-wise weight correction, weights and bias of a neuron are divided by factor, and weights of outgoing connections are multiplied by that factor. In some implementations, performing weight correction includes scaling (2834) signals on layers with unlimited ReLU (i.e., layers that do not have a maximum activation value) so that the signals do not get out of the physical limit described above. In some implementations, transforming the neural network topology to the equivalent analog network includes introducing (2836) additional intermediate layers that limit the number of input or output links of neurons by splitting input or output of the neurons. Compliance is a state and weight correction is a method that may be used to achieve the state. In cases where correction is required, it is performed on pairs of layers until all of the layers' outputs are within the physical limits. Weight correction is applied when an activation function is present. Activation is considered to be ReLU. When it is not ReLU, weight correction in the general case is not possible. When there is no activation between layers, the method includes performing superposition of linear transformations.

In some implementations, the method includes pruning at least some of the connections of the neural network topology. In some implementations, the method further includes quantizing and/or restricting the weights of the neural network topology. In some implementations, the method further includes identifying non-linear elements in the neural network topology and replacing them with linear elements. In some implementations, to enable regularization, the method includes: (i) calculating a range of weights for each layer of the neural network topology and (ii) calculating values for the sum of the weights for each neuron of the neural network topology. In some implementations, the method includes determining compatibility of the neutral network topology for conversion to the equivalent analog network. In some instances, network architecture is not suitable for conversion if the architecture contains known elements which cannot be transformed (e.g., non-linear elements). In such cases, the method includes performing architecture refinement of blocks, which contain such elements, according to some implementations.

Referring back to FIG. 28A, the method also includes computing (2810) a weight matrix for the equivalent analog network based on the weights of the trained neural network. Each element of the weight matrix represents (2810) a respective connection between analog components of the equivalent analog network.

The method also includes generating (2812) a schematic model for implementing the equivalent analog network based on the weight matrix, including selecting component values for the analog components.

Example Quantization Algorithms

T-network R-quantization is a conversion algorithm from a vector of weights w to particular resistor values for each neuron, based on limiting the values to discrete values from a particular set. This pre-defined resistor set is specified by a resistor manufacturer and is characterized by resistance values and tolerance. In some cases, the resistor set is not limited to certain discrete values, but is limited to a given continuous range.

For single neuron schemes, the R-quantization includes solving a system of equations and/or inequalities connecting weights and resistor values. The number of resistor parameters is typically more than twice the number of weights of neural networks, so the system of equations normally has a plurality of solutions. A goal of the R-quantization algorithm (sometimes called RQA) is to select one of the solutions from this plurality that best fits certain optimization criteria. Possible optimization criteria depend on the process limitations described below.

R-quantization error (EQR) is the mean error of a T-network with quantized resistors and perfect operational amplifiers versus a math network on a set of input data. RO-quantization error (EQRO) is the mean error of a T-network with quantized resistors and imperfect operational amplifiers with a particular pre-defined output model versus the math network on the set of input data. RO-quantization R-randomization error (EQRO-RR) is the mean error of a T-network with quantized resistors with random tolerance error and imperfect operational amplifiers with a particular pre-defined output model versus the math network on the set of input data. RO-quantization RO-randomization error (EQRO-RRO) is the mean error of a T-network with quantized resistors with random tolerance error and imperfect operational amplifiers with a particular pre-defined output model and random tolerance errors that affects operational amplifiers' shift value, versus the math network on the set of input data. Quantization is performed independently for each of the components.

RQA is an optimization algorithm that uses optimization criteria, including one or more of the following: (i) energy consumption (tends to maximize resistor values), (ii) die area (tends to minimize resistor values), and (iii) minimizing of the error metrics (tends to minimize negative input relative (to feedback) resistors values).

Experimental Data Comparing R-Quantization Algorithms

For this experiment, an optimization criteria of EQRO was chosen with an operational amplifier shift value of $1.0*10^{-5}$. Resistor sets of $[1, \ldots, N]$ with $N=30, 50,$ and $100$ were used for this experiment. The exact scaling coefficient is not important, because in EQRO metrics, there are no absolute resistor values. There are only relative values.

The MNIST dataset is a publicly available database of handwritten digits, with each digit classified as "0", "1", "2", . . . , or "9". The MNIST dataset was reduced to the classes of "4" and "9". There were 11791 training samples and 1991 testing samples. Forty convolutional networks of the same structure with random initial parameters were trained for 5 epochs each on this dataset. These networks were then T-transformed, having 13 layers, 20,000 neurons, and 940,000 connections after the transformation.

Figure 18B:
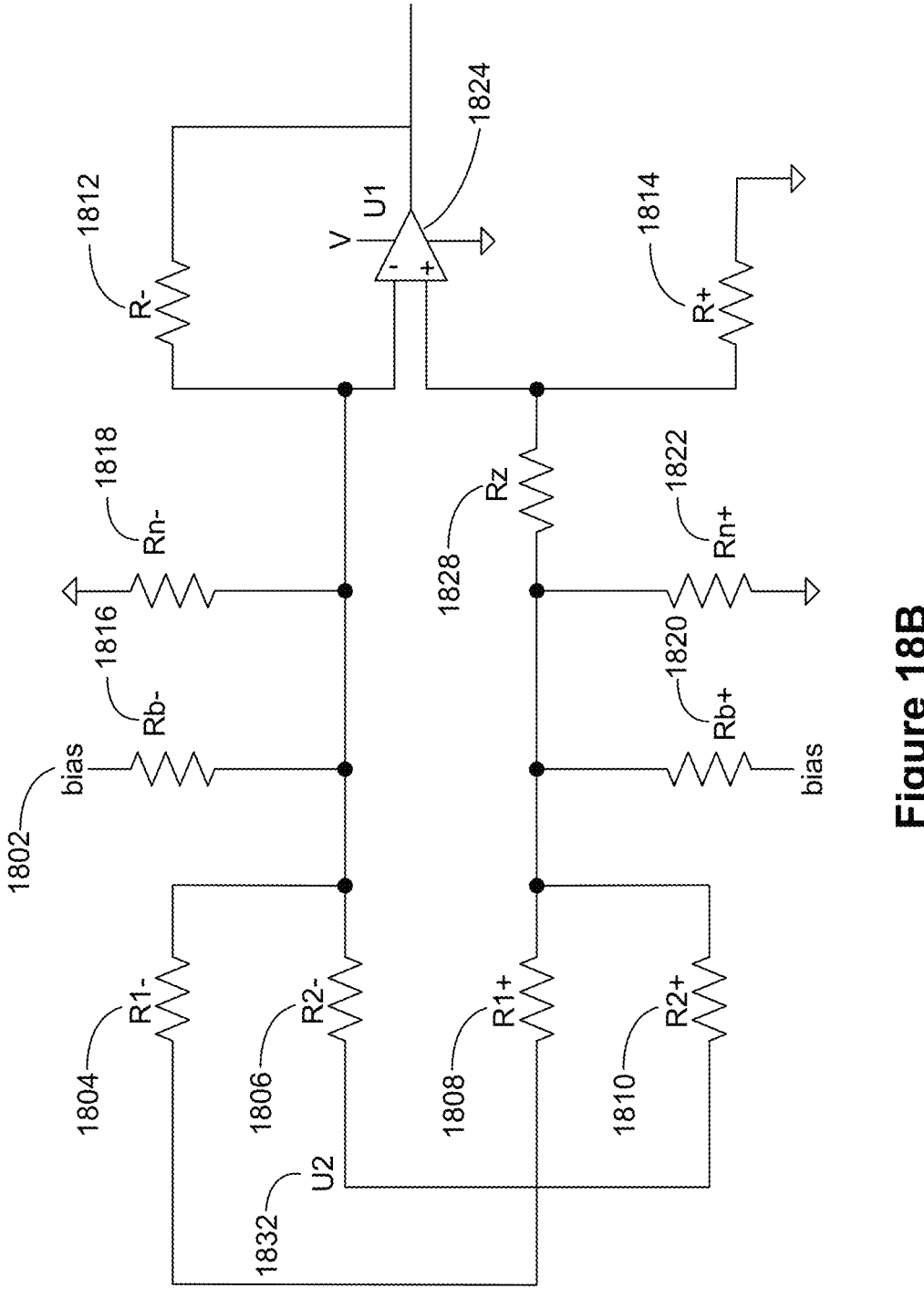

For each of the four algorithms listed above and for each of the 40 networks, the mean EQRO error over the test samples was calculated and compared with the received EQRO values. The EQR value is given for reference. The values are summarized in the table below:

OP1.1 and OP1.2 are models defining schematic architectures. Example OP1.1 schematics are shown in FIG. 18A, and example OP1.2 schematics are shown in FIG. 18B, according to some implementations. FIG. 18B is an example scheme of a neuron model 1826 used for resistors quantization, according to some implementations. OP1.2 differs from OP1.1 in that OP1.2 has an additional Rz resistor 1828. OP1.1 or OP1.2 schematics provide a total area of an operational amplifier, which in turn defines the total area of the resistor set for the operational amplifier. This can be used for placement of resistors for the neurons. There are many different ways of placing resistors for the neurons, each having a quantization algorithm. Typically, two or more models are constructed and a model is selected based on the results. As shown in the table above, the standard deviation of the EQRO metrics for each network is relatively high, and the two algorithms have comparable results. There are networks where OP1.1 performs better and there are networks where OP1.2 perform better. In this specific case, OP1.2 shows about a 10-20% statistical advantage over OP1.1 based on the EQRO metric.

FIGS. 29A and 29B show a flowchart of a method 2900 for hardware realization (2902) of neural networks, according to some implementations. The method is performed (2904) at a computing device 200 (e.g., using the neural network transformation module 226) having one or more processors 202, and memory 214 storing one or more programs configured for execution by the one or more processors 202. The method includes obtaining (2906) a neural network topology 224 and weights 222 of a trained neural network 220. In some implementations, the trained neural network is trained using software simulations to generate the weights.

The method transforms (2908) the neural network topology into an equivalent analog network of analog components including a plurality of operational amplifiers and a plurality of resistors. Each operational amplifier represents an analog neuron of the equivalent analog network, and each resistor represents a connection between two analog neurons. Transforming the neural network topology includes performing resistor quantization and operational amplifier quantization to obtain a quantized network for the equivalent analog network. Each resistor is assigned a resistance value and each operational amplifier is assigned values for one or more functional parameters (e.g., open-loop gain, input impedance, and output impedance). O-quantization includes selecting an operational amplifier model from a set of predefined models (previously developed in silicon) that best meets optimality criteria and restrictions of a neuron. With operational amplifiers, when there is only one model to choose for each neuron, this step can be implemented using a brute force technique for selecting values of a single parameter. The single parameter is an operational amplifier model itself. Some implementations run simulations with one operational amplifier, then with another operational amplifier, and so on. For R-quantization, on the other hand, a brute-force solution is not possible because there are many inter-dependent parameters. These parameters are neuron resistance values. Their number and meaning are defined by

| | EQR Rset 1 . . . 30 | EQRO Rset 1 . . . 30 | EQR Rset 1 . . . 50 | EQRO Rset 1 . . . 50 | EQR Rset 1 . . . 100 | EQRO Rset 1 . . . 100 |
|---|---|---|---|---|---|---|
| OP1.1 | 2.8 ± 1.0 (e–3) | 5.2 ± 1.5 (e–3) | 0.9 ± 0.3 (e–3) | 3.9 ± 1.1 (e–3) | 0.25 ± 0.1 (e–3) | 2.8 ± 0.7 (e–3) |
| OP1.2 | 2.6 ± 1.2 (e–3) | 4.7 ± 1.7 (e–3) | 0.9 ± 0.4 (e–3) | 3.2 ± 0.9 (e–3) | 0.26 ± 0.2 (e–3) | 2.3 ± 0.7 (e–3) | a neuron architecture (e.g., OP1.1 shown in FIG. 18A). For OP1.1, for N connections, there are 2N+5 parameters or resistor values for a neuron.

In some implementations, the quantized network is obtained by analyzing (2910) output tolerance of the neural network using Monte-Carlo simulation where resistors and operational amplifier parameters are considered having stochastic components caused by temperature shift and manufacturing tolerance.

In some implementations, performing resistor quantization includes converting (2912) a vector of weights of the trained neural network to particular resistor values of a single analog neuron. In some implementations, the resistor values are discrete values from a pre-determined resistor set. Each resistor in the resistor set is characterized by a respective resistance value and a respective tolerance value. In some implementations, the resistor values are limited to a continuous range.

In some implementations, performing resistor quantization includes solving (2914) a system of equations and/or inequalities connecting weights of the trained neural network and resistor values. The number of resistors is more than twice the number of weights, and the system of equations has a plurality solutions. In some implementations, solving the system of equations includes selecting (2916) a solution based on one or more optimization criteria. The criteria include (i) energy consumption (tends to maximize resistor values), (ii) die area (tends to minimize resistor values), and (iii) minimization of one or more error metrics (tends to minimize negative input relative (to feedback) resistors values). Because the energy consumed is $E=U/R^2$, maximizing resistor values (R) minimizes energy. A resistor's die area is proportional to its resistance value. Resistors should be placed above operational amplifiers, so they are limited by operational amplifier die area. Therefore, the resistor die area should not exceed the operational amplifier die area. This means that resistance values should be limited. The quantization solves a system of X equations (typically, non-linear equations) considering Y resistance values, where X>Y, and the resistances can have values from a predefined set of discrete values. Some implementations also consider optimality criteria, such as die size, energy consumption, and/or tolerance, which are partially competing objectives. Some implementations reduce the complexity of the task for specific cases using particular schematic options. In some implementations, the one or more optimization criteria include R-quantization error (EQR), which is the mean error of the equivalent analog network with quantized resistors and perfect operational amplifiers versus a math network on a set of input data. Perfect operational amplifiers produce an output voltage of max(0, min(x, Vfeed)), where x is a weighted sum of the inputs and Vfeed is the feed voltage. The math network is the original network, which is being converted to analog hardware. It is a network defined in an ML framework. Input data is a set of tensors of data, such as pictures or sounds in the form of analog signals. In some implementations, the one or more optimization criteria include RO-quantization error (EQRO), which is the mean error of the equivalent analog network with quantized resistors and imperfect operational amplifiers with a particular pre-defined output model versus the math network on the set of input data. Imperfect operational amplifiers have some design flaws (designed in silicon) and produce slightly different output from perfect operational amplifiers. In some implementations, the one or more optimization criteria include RO-quantization R-randomization error (EQRO-RR), which is the mean error of the equivalent analog network with quantized resistors with random tolerance error and imperfect operational amplifiers with a predefined output model versus the math network on the set of input data. When operational amplifiers are designed in silicon, they can be described by a model. U=IR is a resistor model. Similarly, operational amplifiers have their models. The models have many parameters and connect output voltage with input voltages and resistor values. In some implementations, the one or more optimization criteria include RO-quantization RO-randomization error (EQRO-RRO), which is the mean error of a T-network with quantized resistors with random tolerance error and imperfect operational amplifiers with a predetermined output model and random tolerance error. The random tolerance error affects the operational amplifier shift value versus the math network on the set of input data. For each of the four types (EQR, EQRO, EQRO-RR, and EQRO-RRO) described above, the error is a "mean error" of the equivalent analog network versus the original math network. A set of sample input data is selected, and the outputs of the two networks are compared. Some implementations compute the error for more than one set of sample inputs. For example, some implementations create 20, 50, or even 100 sample inputs, compute the outputs from both networks, then compute root-mean-square (RMS) error for all of the sample inputs. Some implementations use Monte-Carlo methods for this modeling.

In some implementations, performing operational amplifier quantization includes (2918) selecting an appropriate operational amplifier model from a set of predetermined operational amplifier models according to a set of predetermined limitations and/or optimality criteria. In some implementations, the set of predetermined limitations and/or optimality criteria includes limitations of operational amplifiers for output currents. In some implementations, the set of predetermined limitations and/or optimality criteria includes neuron or operational amplifier die area limitations or minimization. In some implementations, the set of predetermined limitations and/or optimality criteria includes neuron or operational amplifier energy consumption limitations or minimization. In some implementations, the set of predetermined limitations and/or optimality criteria includes operational amplifier input voltage range limitations. In some implementations, the set of predetermined limitations and/or optimality criteria includes minimization of error metrics for resistor quantization.

Figure 30:
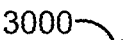
FIG. 30 shows a standard view of a layout with front-end of line layers (FEOL) connected to back-end of line layers (BEOL), according to some implementations.

Referring back to FIG. 29A, the method also includes generating (2920), based on the quantized network, a functional behavioral model, which includes the plurality of operational amplifiers placed in front-end of line layers (FEOL layers) and the plurality of resistances placed in back-end of line layers (BEOL layers). This layout saves die area. Although resistors occupy the same die space as OpAmps, the resistors are in the BEOL and the OpAmps are underneath in the FEOL. Netlist is a list of operational amplifier models, resistor models, and connections between the operational amplifiers and resistors. A Netlist defines the chip layout, comprising all elements. The layout is generated based on the Netlist, which describes all of the schematics at the model level. In some implementations, resistors are placed in the BEOL and are connected to the amplifiers through vertical vias (copper rods which connect the BEOL and FEOL layers). Placing some elements in the BEOL and connecting them with some elements in the FEOL may use conventional techniques. FIG. 30 shows a standard view of a layout 3000 with the FEOL elements 3006 connected to the BEOL elements 3002, according to some implementations. Thin film resistors are placed in the BEOL 3002, and operational amplifiers are placed in the FEOL 3006, separated by the MEOL (middle-end of line layers) 3004, according to some implementations.

Example Adaptive Universal Interface and Host Controller for Driving Analog Neuromorphic Computing Hardware Described herein is a universal adaptive interface and host controller to drive analog neuromorphic neural networks, according to some implementations. The adaptability of the interface includes the capability to automatically change the number of inputs, outputs and power control parameters depending on architecture (e.g., the number of inputs, the number of outputs, and the number of layers) of an analog neuromorphic neural network. The interface and/or the host controller may be responsible for (i) the dataflow to the inputs of the analog neural network through a deserializer, and/or (ii) control of output signals of the analog neural network. The output signals are converted into digital form and stored in memory, according to some implementations. The signals pass through a serializer and/or a post-processing module, and are accessible through external digital interfaces, such as a serial peripheral interface (SPI), an inter-integrated circuit (I2C), or a controller area network (CAN), which switch a flag at a general purpose input output (GPIO) block of the interface.

In some implementations, the universal adaptive interface includes a host controller and a number of units that provide capabilities for enabling or disabling layer by layer and/or core configuration, enabling or disabling working mode, output mode, data flow control, boot and program execution, internal data postprocessing, system control and non-standard interfaces, subsystem control, standard external interfaces control, external mode setting, sleep mode module, and/or power management.

Figure 31:
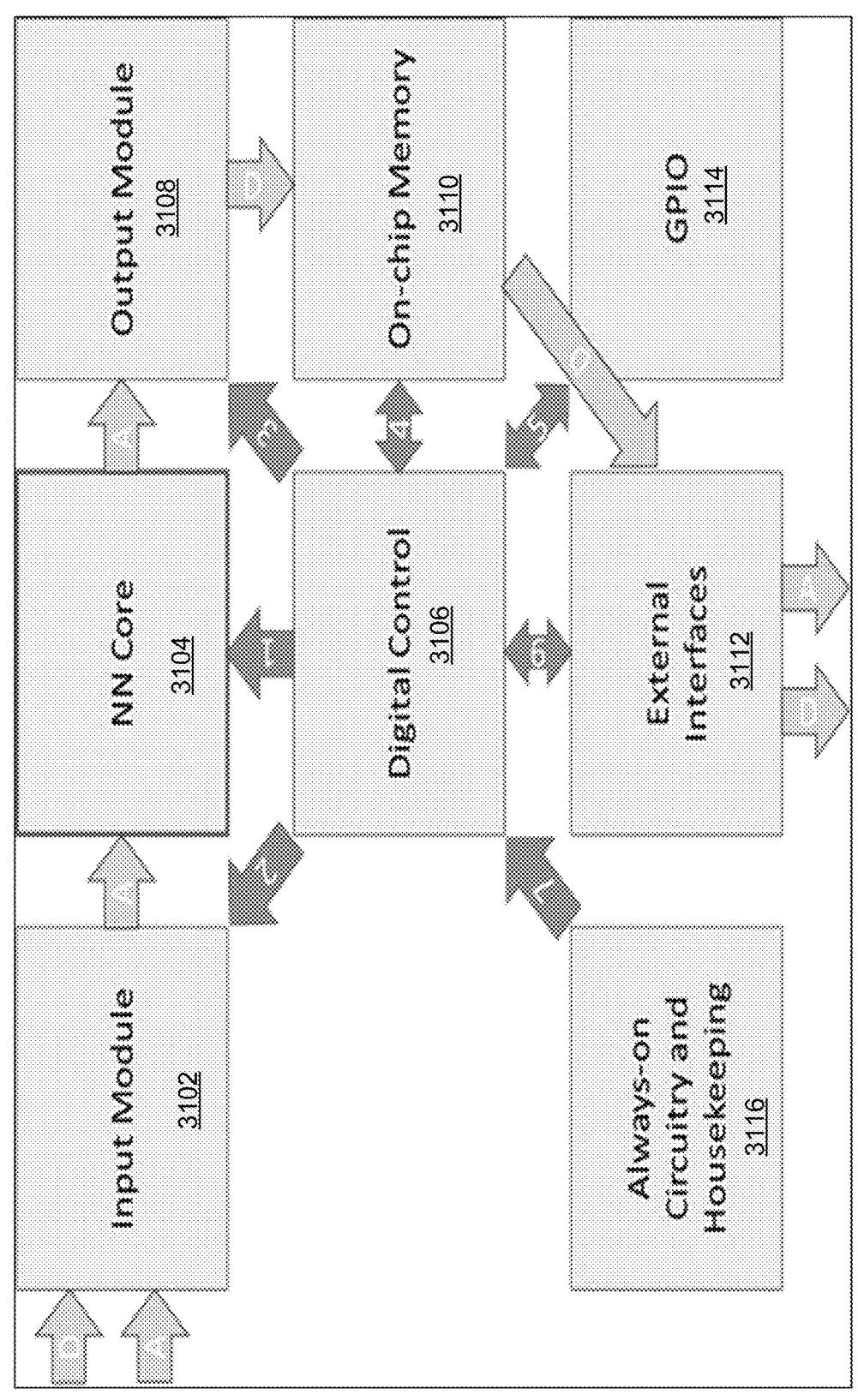
FIG. 31 shows a block diagram of a system that uses an adaptive universal interface, according to some implementations.

FIG. 31 shows a block diagram of a system 3100 that uses an adaptive universal interface, according to some implementations. The system 3100 may be fabricated as an integrated circuit, according to some implementations. Analog data (indicated by arrows labelled 'A') and/or digital data (indicated by arrows labelled 'D') is input into an input module 3102, which comprises a sampler, an analog-to-digital converter (ADC), a deserializer, and a digital-to-analog converter (DAC) with sample and hold units. The input module 3102 is used to convert linear digital or analog consecutive data into an array of parallel analog inputs, necessary for analog neuromorphic core operation (of a neural network core 3104, sometimes called an analog neuromorphic neural network or an analog neural network). In some implementations, a digital controller module 3106 is responsible for power management of the neuromorphic core 3104, allowing switching on and switching off certain layers of the neuromorphic core 3104, in order to optimize the neural core power consumption.

An output module 3108 includes one or more analog to digital converters, which digitize the analog outputs from last layers of neurons of the analog neuromorphic neural network 3104 and supply digital values to an on-chip memory 3110 and then to an external interfaces block 3112, which opens data to external circuitry according to a general purpose input output (GPIO) block 3114. In some implementations, there is also an always-on circuitry and housekeeping block 3116, which is responsible for driving external mode settings, a sleep mode module, and a power management module. The on-chip memory 3110 may include both SRAM (with DMA) and NVM.

An example control flow and data flow are described herein, according to some implementations. The digital control module 3106 enables or disables (indicated by the arrow labelled '1' in FIG. 31) one or more layers, and sets core configuration, for the neural network core 3104. The digital control module 3106 subsequently enables or disables the working mode (indicated by the arrow labelled '2') for the input module 3102. The digital control module 3106 also signals (indicated by the arrow labelled '3') the output module 3108 to begin operating in an output mode, for data flow control. The digital control module 3106 also signals (or receives signals from) the on-chip memory 3110 (as indicated by the double arrow labeled '4') for boot and program execution, and internal data postprocessing. The digital control module 3106 also exchanges signals (as indicated by the double arrow labeled '5') with the GPIO module 3114 for system control and non-standard interfaces, or subsystem control. The digital control module 3106 also exchanges signals (as indicated by the double arrow labeled '6') with the external interfaces module 3112 for standard external interface control. The always-on circuitry and housekeeping module 3116 provides signals (as indicated by the arrow labeled '7') to the digital control module 3106 for external mode setting, sleep mode, and/or power management. For data flow, digital signals (indicated by arrows labeled 'D') flow to the input module 3102, from the output module 3108 to the on-chip memory 3110, from the on-chip memory 3110 to the external interfaces 3112, and output from the external interfaces module 3112. Analog signals are input to the input module 3102, from the input module to the neural network core 3104, from the neural network core 3104 to the output module 3108, and output from the external interfaces 3112.

The universality of the interface arises from the independence of its circuitry to the type and size of the neural core, the number of layers, the number of inputs and the number of outputs. In some implementations, the deserializer is designed to drive any number of parallel analog inputs within the range of up to 5000 parallel inputs and the output block is designed to drive any number of outputs up to 1024 analog outputs, which are converted from analog to digital signals at the ADC block and then arrive at the serializer. The power control unit is designed to switch on and switch off any of neural core layers, depending on a program running in a digital host processor. The external interfaces block 3112 includes standard digital interfaces as well as a sound DAC, according to some implementations. Thus, the described interface can be adapted to any type of neural network, defined by an architecture of a neural core and is universal for any architecture of neural core. The described interface is adaptive. Depending on the programming of the host processor, the interface can drive neural cores of any size with any number of inputs, outputs and/or layers.

Example tasks of the adaptive universal interface include (i) ADC control, including speed variation and/or disabling/enabling. Sampling frequency may be varied, for example, during different physical activities. The aim is to save power during light activity or no activity. The example tasks also include (ii) layer-by-layer (or part-by-part) enable/disable control. A goal is to make the control block generic and applicable to any neural network design. The example tasks also include (iii) communications with a system host (if there is any) and (iv) working as a system host for stand-alone operations. This includes enforcing proper startup sequences and booting from an external nonvolatile memory (NVM). The example tasks also include (v) controlling external periphery circuits, like LED drivers or other actuators, (vi) partial reconfiguration of the NN core on the fly, and (vii) telemetry tracking and data storing (e.g., for automotive applications).

In a typical usage scenario, according to some implementations, the core keeps the chip in reset, initiates an interface (e.g., SPI or I2C) and then allows the system host to put the program directly into RAM through DMA. When the program is booted, the chip goes through initialization and starts working. The data is sent to the system host via an interface. In another standalone scenario, the core keeps the chip in reset and boots the program from the external NVM chip (currently on-chip NVM is usually economically inefficient). Subsequently, the chip starts. The data is typically used to generate control signals for actuators (e.g., using GPIO pins).

In some implementations, the universal adaptive interface entails a host processor, which is used for (i) supplying data to the analog neuromorphic core, (ii) extracting data from the analog neuromorphic core and (iii) controlling the whole process of inference of the neuromorphic analog core. The neuromorphic analog cores represent the structure of some neural network and is varied, depending on neural network architecture and size. In some implementations, the host processor controls dataflow into and out of neural core, and/or controls or supplies data to external interfaces, and acquires data from digital or analog input. In some implementations, digital output is SPIO or I2C and is supplied to an external circuit after a flag at a GPIO module is switched. In some implementations, the host processor is one of: RISC-V, ARM, ARC, or 8051. In some implementations, the interface is configured to drive a neural core, representing an arbitrary neural network, not depending on the number of inputs, the number of outputs, and/or the number of layers in the neural network core. In some implementations, the input is a digital or analog audio signal and the output is a digital audio signal. In some implementations, the interface can be adopted to any type and/or size of the neural network core by just changing the program of the host controller. In some implementations, the system includes modules for pre-processing the data before it is input into the neural core and post-processing the data after it is output from the neural core. Some implementations include a programmable power control, realized by a host controller, which switches on and switches off certain layers of the neural network core in order to minimize the IC power consumption. In some implementations, the system includes a deserializer, which is realized as a combination of an analog to digital converter, a first-in first-out (FIFO) buffer, and sample and hold units (e.g., 5000 units), supplying (concurrently) up to 5000 analog inputs to the neural core. Some implementations include circuitry of the interface, where on-chip memory includes both SRAM (with DMA) and NVM used for boot and program execution, and internal data post-processing. Some implementations include circuitry for the interface, where preprocessing is implemented using a direct Fourier transformation and post-processing is implemented using an inverse Fourier transformation.

In some implementations, the number of inputs of the neural network is equal to the number of outputs of the deserialiser. A scalable deserialiser is implemented using a configurable IP block of a deserializer, generally similar to memory compilers. Required parameters of the deserialiser can be set during the chip design stage to minimize overhead, or the deserializer may use a fixed block with known maximum input capacity. In the second case, it is possible to configure such a block during execution. In some implementations, similar configuration is implemented for the output interface of the neural network core. It may include a set of analog-to-digital converters and multiplexers. Various combinations of these parts allow adaptation for any number of neural network outputs. Here again, the required options may be chosen during the chip design stage to minimize overhead, or may be implemented using a single configurable block. For adaptability, the interface is adapted to any type and/or size of the neural network core by just changing the program of the host controller. The interface has a configuration register controlling all sub-blocks, so it is possible to reconfigure the interface block by just changing the data in the configuration register. In some implementations, the layer-by-layer disable control strongly depends on data propagation through the specific neural network. The configuration of enable/disable control is unique for each neural network and is determined through a mix of transistor-level simulations and test chip measurements. The configurability of the interface block may be implemented by storing the proper enable or disable configuration into an on-chip nonvolatile memory during pre-production.

In some implementations, the neural network core keeps the chip in reset, initiates an interface (e.g., SPI or I2C), and then allows the system host to put the program directly into RAM through DMA. When the program is booted, the chip goes through initialization and starts working. The data is sent to the system host via an interface. In some implementations, in another standalone scenario, the core keeps the chip in reset and boots the program from the external NVM chip (on-chip NVM is generally economically inefficient). After that, the chip starts. The data generates control signals for actuators (e.g., using GPIO pins). In any case, the data from sensors can be processed by different means, such as by an algorithm running in software on a microcontroller, by a hardware-implemented algorithm, or by a neural network digitally implemented in FPGA. The device that processes the data may be a system host or a device that is controlled by the system host.

Some implementations enable partial reconfiguration of a neural network core during execution. For example, suppose a neural network core works in two modes—a "low power low precision" mode and a "high power high precision" mode. The latter mode uses the whole structure of the former and some additional circuitry. Therefore, the universal interface can get a control signal from the system host and configure the neural network according to the current need of the system. Such an approach is very important for wearable devices and other battery-powered systems.

Figure 32:
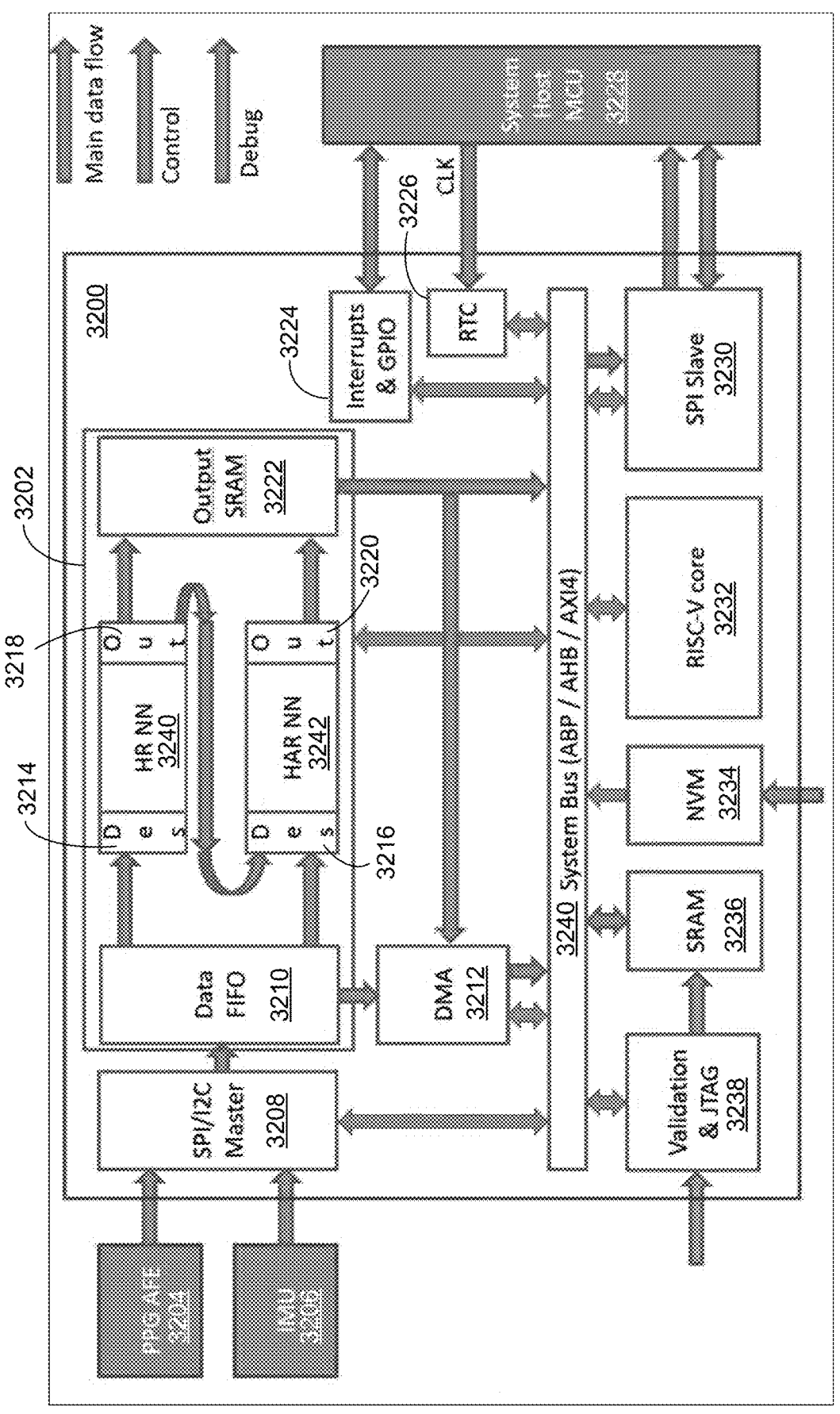
FIG. 32 shows a block diagram of another system that uses an adaptive universal interface, according to some implementations.

FIG. 32 shows a block diagram of a system 3200 that uses an adaptive universal interface, according to some implementations. In this example, the system 3200 includes a SPI/I2C Master 3208, which accepts signals from a photoplethysmogram (PPG) analog front-end (AFE) module 3204, and signals from an inertial measurement unit (IMU) 3206, and provides input data to a data FIFO module 3210. The FIFO module 3210 provides signals to a deserializer 3214 connected to a first analog neural network 3240 (e.g., a high-resolution (HR) neural network) and another deserializer 3216 connected to a second analog neural network 3242 (e.g., a human activity recognition (HAR) neural network). The first analog neural network 3240 is connected to an output module 3218 which converts analog to digital signals. Signals from the output module 3218 are input to the deserializer 3216 and input to an output SRAM 3222 (sometimes called an on-chip memory). The second analog neural network 3242 accepts input from the deserializer 3216 and outputs signals to an output module 3220 which converts analog to digital signals and outputs data to the output SRAM 3222. Data from the data FIFO module 3210 and the output SRAM module 3222 can be written to an external memory (e.g., either SRAM 3236 or NVM 3234) via a system bus 3240 (or via a DMA engine 3212 and using the system bus 3240). The adaptive universal interface block 3202 can be fabricated as a chip using techniques described below, according to some implementations. The block 3202 may include a data FIFO module 3210, one or more deserializers 3214 and 3216, one or more analog neural networks HR NN 3240 and HAR NN 3242, one or more output modules 3218 and 3220 and an output SRAM 3222. The block 3202 can be controlled via the system bus 3240), by a CPU (e.g., a RISC-V core 3232), or indirectly by a system host or microcontroller unit (e.g., a system host MCU 3228, using a SPI slave 3230). The system host MCU 3228 may control the block 3202 and/or the system 3200 as a whole, using an interrupt and/or a GPIO module 3224, and/or a real-time clock (RTC) module 3226 (for clock signals). The system host MCU 3228 may also provide data input to the system 3200 and/or the block 3202, via the SPI slave 3230. The system 3200 can be debugged using a validation and Joint Test Action Group (JTAG) module 3238, or by writing data to the NVM 3234.

Figure 33:
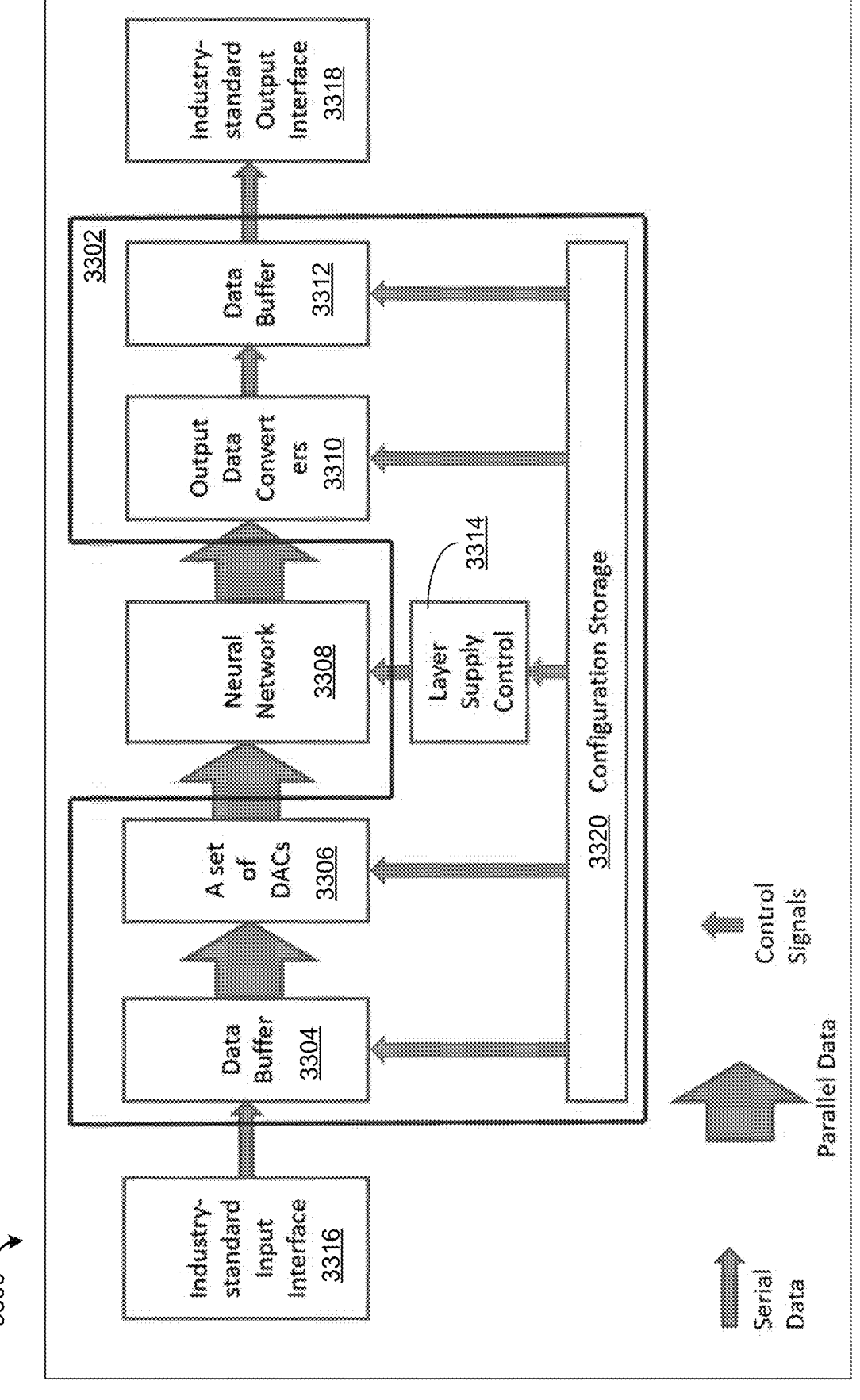
FIG. 33 shows a block diagram of another system that uses an adaptive universal interface, according to some implementations.

FIG. 33 shows a block diagram of another system 3300 that uses an adaptive universal interface 3302, according to some implementations. The system 3300 includes an industry-standard input interface 3316 (e.g., SPI, I2C, or CAN) for supplying digital signals, and an industry-standard output interface 3318 (e.g., SPI, I2C, or CAN) for collecting output signals from the interface 3302. The interface 3302 includes a data buffer 3304 for buffering input signals from the input interface 3316, and a set of DACs 3306 for converting digital signals buffered by the data buffer 3304 into analog signals to input to an analog neural network 3308. The analog neural network 3308 processes the analog signals from the DACs 3306 and outputs signals to output data converters 3310 (e.g., ADCs), which convert the analog signals to digital signals. The digital signals are buffered by another data buffer 3312. Data buffered by the data buffer 3312 is output to the industry-standard output interface 3318. As shown in FIG. 33, signals from the industry standard input interface 3316, the output data converters 3310, and the data buffer 3312 are serial data, whereas data transmitted by the data buffer 3304, the set of DACs 3306, and the neural network is parallel data. Control signals from a configuration storage device 3320 control the data buffer 3304, the set of DACs 3306, the output data converters 3310, and the data buffer 3312. The configuration storage 3320 also provides control signals for controlling a layer supply control 3314, which controls the power supply for layers of the analog neural network 3308. In contrast to FIG. 32, here the adaptive universal interface 3302 excludes the analog neural network 3308 (i.e., the interface and analog neural network need not be on the same chip).

An example system can be used to produce a specification for analog neuromorphic computing hardware that includes an adaptive universal interface (e.g., the block 3202 described above in reference to FIG. 32), according to some implementations. The system (e.g., the computing device 200) includes one or more processors 202, memory 214, and a plurality of library routines (e.g., libraries generated by the library generation module 254) stored in the memory. The plurality of library routines includes (i) an input interface library routine configured to convert linear digital signals or consecutive analog signals to an array of parallel analog inputs for analog neural networks, (ii) a power management unit library routine configured to switch on or switch off layers of the analog neural networks, and (iii) an output interface library routine configured to digitize analog output from the analog neural networks. An example input interface is a 1024-word memory buffer, where each word is 8 bits, and a 1024-channel 8-bit DAC. An example power management unit is a programmable timer (e.g., 25 pairs of enable and disable signals with their activation connected to specific timers). An example output interface example is an 8-channel 8-bit ADC and an 8-byte storage SRAM.

The system also includes one or more programs stored in the memory. The one or more programs are configured for execution by the one or more processors and include instructions for: (i) receiving an analog neural network specification (e.g., a transformed analog neural network 228); (ii) extracting a plurality of parameter values, from the analog neural network specification, corresponding to parameters of the library routines; and (iii) generating a chip fabrication specification that includes an analog neural network corresponding to the analog neural network specification, the input interface library routine, the power management unit library routine, and the output interface library routine, using the plurality of parameter values for the library routines. Examples of parameters are the number of inputs (e.g., 1 to 10,000 inputs), the number of layers (e.g., 3 to 100), and the number of outputs (e.g., 1 to 100). In some implementations, the output of the system is the specification for a chip and files that realize this specification, such as a netlist, layout abstract, or a full layout of the chip.

In some implementations, the input interface library routine includes a specification for one or more digital to analog converters configured to generate analog input for the analog neural core based on one or more digital signals (e.g., signals from one or more CCD/CMOS image sensors).

In some implementations, the input interface library routine includes specifications for a plurality of devices, including one or more of: samplers, analog-to-digital converters, de-serializers, digital-to-analog converters, FIFO buffers, and hold units. For example, for a sensor analog front end, some implementations take digital signals from a FIFO buffer and then deserialize them via DACs and hold units. When working directly with an analog sensor, some implementations digitize the signal, store it in a FIFO buffer, then do the same as in the first example. Some implementations take samples of input analog signals directly into analog hold units corresponding to successive inputs of a neural network.

In some implementations, the output interface library routine includes a specification for one or more analog to digital converters configured to digitize analog output from the final layers of neurons of the analog neural core. For example, the output interface library routine includes a specification for small array of fast DACs in conjunction with more analog hold units, to save area and power. In this way, each DAC is connected to multiple hold units via a multiplexer.

In some implementations, the input interface library routine and the output interface library routine are configured to interface with the analog neural core (representing an arbitrary neural network), based on the number of inputs (e.g., a dozen to a few thousand), the number of outputs (e.g., a dozen to a few hundred), and the type of the analog neural core.

In some implementations, the power management unit library routine is configured to control power supplied to the layers of the analog neural core based on the number of layers (e.g., between five and a hundred layers) of the analog neural core.

In some implementations, the output interface library routine includes specifications for a variable number of comparators, multiplexers, and analog-to-digital converters (ADCs) with different resolutions. The number of comparators, the number of multiplexers, and the number of ADCs are determined based on devices necessary for proper quantization of outputs of the analog neural core. Proper quantization is characterized by having an acceptable error of the neural network output signal. This value is a parameter of a neural network, and is used to create requirements for the specific interface block.

In some implementations, the input interface library routine and the output interface library routine are further configured to sample signals at a frequency determined based on physical activity levels of a user of the system. In some implementations, the sampling frequency is determined based on the physical activity level (e.g., for running, use higher frequency; for low activity, use lower frequency, and so on), using data from accelerometers and/or PPG sensors, to determine the physical activity level. Some implementations disable some parts of the network and continue running at the same frequency.

In some implementations, the chip fabrication specification further includes specification for a host interface in communications with a host processor (e.g., RISC-V, ARM, ARC, or 8051), which is configured to control the analog neural core (e.g., indirectly influence the analog neural core's working modes based on the analog neural core's output).

In some implementations, the chip fabrication specification includes a specification for a reconfiguration unit, which reconfigures the analog neural core depending on the type of inference application is executing in the analog neural core. For example, for a neural network that recognizes the type of human activity, a portion of the network is always working and provides coarse "light/heavy" recognition. If the activity is light, the rest of the network is not turned on and this saves substantial power. If the activity is heavy, the rest of the network is switched on during the next execution and provides detailed recognition (like "running/crossfit/bike" and so on). The whole network keeps working until the activity goes to "light" again. The interface block executes appropriate layer enable control for this process. In some implementations, execution is controlled to occur once in X seconds when the activity is light and once in Y seconds when the activity is heavy. In some implementations, some neurons have two separate enable signals, one controlled by the layer control, and the second controlled by the reconfiguration unit.

In some implementations, the chip fabrication specification includes a specification for a telemetry unit configured to track performance of the analog neural core. Typical performance metrics include power consumption (tracked via current sensors) and propagation delay (tracked via additional telemetry comparators in the output interface or in some layers). In some implementations, the specification includes a specification for fabricating a chip with a sensor, and/or additional telemetry comparators.

In some implementations, the analog neural core is configured to reset the apparatus and initiate an interface (e.g., a serial peripheral interface (SPI), an inter-integrated circuit (I2C), or a controller area network (CAN)) for a system host to write a program into memory (e.g., a RAM) of the apparatus using direct memory access (DMA) operations.

These operations in turn cause the apparatus to perform initialization steps, begin execution of the analog neural core, and send output to the system host.

In some implementations, the analog neural core is configured to reset a chip fabricated using the specification and to read a program into a memory (e.g., a RAM) of the chip from an external non-volatile memory (NVM), which in turn causes the chip to perform initialization steps, begin execution, and send control signals to one or more actuators (e.g., using GPIO pins).

In some implementations, the power management unit is configured to dynamically disable or enable each layer of the analog neural core during signal propagation.

In some implementations, the power management unit is programmed based on transistor-level simulations and/or test chip measurements of the analog neural core (the chip-to-chip parameter mismatch affects propagation delay, so it's possible to trim the timing of enabling and disabling individual layers with respect to this mismatch and save power by minimizing enabled time), and the power management unit is configured to store enable or disable configurations in on-chip nonvolatile memory.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A system for producing analog neuromorphic computing hardware, comprising:

one or more processors;

memory;

a plurality of library routines stored in the memory, wherein the plurality of library routines includes (i) an input interface library routine configured to convert linear digital signals or consecutive analog signals to an array of parallel analog inputs for analog neural networks, (ii) a power management unit library routine configured to switch on or switch off layers of the analog neural networks, and (iii) an output interface library routine configured to digitize analog output from the analog neural networks; and one or more programs stored in the memory, wherein the one or more programs are configured for execution by the one or more processors and include instructions for:

receiving an analog neural network specification;

extracting a plurality of parameter values, from the analog neural network specification, corresponding to parameters of the library routines; and generating a chip fabrication specification for an apparatus that includes an analog neural core corresponding to the analog neural network specification, the input interface library routine, the power management unit library routine, and the output interface library routine, using the plurality of parameter values for the library routines.

2. The system of claim 1, wherein the input interface library routine includes a specification for one or more digital to analog converters configured to generate analog input for the analog neural core based on one or more digital signals.

3. The system of claim 1, wherein the input interface library routine comprises specifications for a plurality of devices selected from the group consisting of: samplers, analog-to-digital converters, de-serializers, digital-to-analog converters, FIFO buffers, and hold units.

4. The system of claim 1, wherein the output interface library routine comprises a specification for one or more analog to digital converters configured to digitize analog output from a final layers of neurons of the analog neural core.

5. The system of claim 1, wherein the input interface library routine and the output interface library routine are configured to interface with the analog neural core representing an arbitrary neural network, based on a number of inputs, a number of outputs, and a type of the analog neural core.

6. The system of claim 1, wherein the power management unit library routine is configured to control power supplied to layers of the analog neural core based on a number of layers of the analog neural core.

7. The system of claim 1, wherein the output interface library routine comprises specifications for a variable number of comparators, multiplexers and analog-to-digital converters (ADCs) with different resolutions, wherein a number of comparators, a number of multiplexers, and a number of ADCs are determined based on devices necessary for proper quantization of outputs of the analog neural core.

8. The system of claim 1, wherein the input interface library routine and the output interface library routine are further configured to sample signals at a frequency determined based on physical activity levels of a user.

9. The system of claim 1, wherein the chip fabrication specification further comprises specification for a host interface in communications with a host processor that is configured to control the analog neural core.

10. The system of claim 1, wherein the chip fabrication specification includes a specification for a reconfiguration unit configured to reconfigure the analog neural core depending on a type of inference application executed on the analog neural core.

11. The system of claim 1, wherein the chip fabrication specification includes a specification for a telemetry unit configured to track performance of the analog neural core.

12. The system of claim 1, wherein the analog neural core is configured to reset the apparatus to initiate an interface for a system host to write a program into a memory of the apparatus using direct memory access (DMA) operations that in turn causes the apparatus to perform initialization steps, begin execution of the analog neural core, and send output to the system host.

13. The system of claim 1, wherein the analog neural core is configured to reset a chip fabricated using the chip fabrication specification and to read a program into a memory of the chip from an external non-volatile memory (NVM) that in turn causes the chip to perform initialization steps, begin execution, and send control signals to one or more actuators.

14. The system of claim 1, wherein the power management unit library routine is configured to dynamically disable or enable each layer of the analog neural core during signal propagation.

15. The system of claim 1, wherein the power management unit library routine is programmed based on transistor-level simulations and/or test chip measurements of the analog neural core, and wherein the power management unit library routine is configured to store enable or disable configurations in an on-chip nonvolatile memory.

16. A method for producing analog neuromorphic computing hardware, comprising:

receiving an analog neural network specification;

extracting a plurality of parameter values, from the analog neural network specification, corresponding to parameters of a plurality of library routines including an input interface library routine, a power management unit library routine, and an output interface library routine; and generating a chip fabrication specification for an apparatus that includes an analog neural core corresponding to the analog neural network specification, the input interface library routine, the power management unit library routine, and the output interface library routine, using the plurality of parameter values for the plurality of library routines, wherein (i) the input interface library routine converts linear digital signals or consecutive analog signals to an array of parallel analog inputs for analog neural networks, (ii) the power management unit library routine switches on or switch off layers of the analog neural networks, and (iii) the output interface library routine digitizes analog output from the analog neural networks.

17. The method of claim 16, wherein the input interface library routine includes a specification for one or more digital to analog converters configured to generate analog input for the analog neural core based on one or more digital signals.

18. The method of claim 16, wherein the input interface library routine comprises specifications for a plurality of devices selected from the group consisting of: samplers, analog-to-digital converters, de-serializers, digital-to-analog converters, FIFO buffers, and hold units.

19. The method of claim 16, wherein the output interface library routine comprises a specification for one or more analog to digital converters configured to digitize analog output from a final layers of neurons of the analog neural core.

20. The method of claim 16, wherein the input interface library routine and the output interface library routine are configured to interface with the analog neural core representing an arbitrary neural network, based on a number of inputs, a number of outputs, and a type of the analog neural core.

\* \* \* \* \*